US010786426B2

(12) United States Patent
Backer

(10) Patent No.: US 10,786,426 B2
(45) Date of Patent: *Sep. 29, 2020

(54) DUAL PLUMBING SYSTEM FOR A HOT TUB OR SPA

(71) Applicant: WEXCO INCORPORATED, York, PA (US)

(72) Inventor: Scott Stephen Backer, Albany, OR (US)

(73) Assignee: WEXCO INCORPORATED, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,985

(22) Filed: May 24, 2019

(65) Prior Publication Data

US 2019/0290540 A1 Sep. 26, 2019

Related U.S. Application Data

(63) Continuation-in-part of application No. 16/011,365, filed on Jun. 18, 2018, now Pat. No. 10,299,985,
(Continued)

(51) Int. Cl.
*A61H 33/00* (2006.01)
*F16L 41/03* (2006.01)
(Continued)

(52) U.S. Cl.
CPC ....... *A61H 33/0087* (2013.01); *A61H 33/027* (2013.01); *A61H 33/6063* (2013.01);
(Continued)

(58) Field of Classification Search
CPC .............. A61H 33/0087; A61H 33/027; A61H 33/6063
(Continued)

(56) References Cited

U.S. PATENT DOCUMENTS 3,913,187 A 10/1975 Okuda
3,925,851 A 12/1975 Bevans
(Continued)

FOREIGN PATENT DOCUMENTS

DE 202012104309 U1 2/2014
WO 96/17576 A1 6/1996

OTHER PUBLICATIONS

European Patent Office, Extended European Search Report, in European Patent Application No. EP19163856.8, dated Jul. 9, 2019, which is a foreign application to which this U.S. application shares the benefit of priority.
(Continued)

*Primary Examiner* — Erin Deery
(74) *Attorney, Agent, or Firm* — Kolitch Romano LLP

(57) ABSTRACT

Systems, apparatus and methods for providing air and water to hot tub jets. The present teachings include jet assemblies, manifold assemblies, and related components, as well as methods of assembling hot tubs involving these components. In some cases, the present teachings describe the use of dual extrusion tubing to route air and water through adjacent, connected fluid conduits. In some cases, the present teachings describe a "press-and-click" method of connecting various components.

20 Claims, 61 Drawing Sheets

Related U.S. Application Data which is a continuation of application No. 15/926,873, filed on Mar. 20, 2018, now Pat. No. 10,105,282.

(51) Int. Cl.
*A61H 33/02* (2006.01)
*F16L 33/035* (2006.01)
*F16L 37/098* (2006.01)

(52) U.S. Cl.
CPC ......... *F16L 33/035* (2013.01); *F16L 37/0985* (2013.01); *F16L 41/03* (2013.01); *A61H 33/02* (2013.01); *A61H 33/60* (2013.01); *A61H 33/601* (2013.01); *Y10T 137/87249* (2015.04)

(58) Field of Classification Search
USPC ................ 285/304, 305, 314, 317, 321, 921
See application file for complete search history.

(56) References Cited

U.S. PATENT DOCUMENTS

| | | | |
|---|---|---|---|
| 3,981,048 A | 9/1976 | Moody et al. | |
| 4,086,937 A | 5/1978 | Hechler, IV | |
| 4,508,665 A * | 4/1985 | Spinnett | A61H 33/6057 239/101 |
| 4,672,692 A | 6/1987 | Savage | |
| 4,972,531 A * | 11/1990 | Gravatt | A61H 33/027 239/600 |
| 5,104,157 A * | 4/1992 | Bahner | F16L 37/084 285/307 |
| 5,197,459 A | 3/1993 | Henkin et al. | |
| 5,474,102 A | 12/1995 | Lopez | |
| 5,754,989 A | 5/1998 | Ludlow | |
| 5,809,648 A | 9/1998 | Kurth et al. | |
| 5,850,640 A | 12/1998 | Pinciaro | |
| 6,279,177 B1 | 8/2001 | Gloodt | |
| 6,543,067 B2 | 4/2003 | Eddington et al. | |
| 6,745,413 B2 | 6/2004 | Pinciaro | |
| 2004/0025245 A1 | 2/2004 | Pinciaro | |
| 2007/0067900 A1 | 3/2007 | Moretto | |
| 2008/0000020 A1 | 1/2008 | Romano | |
| 2008/0209627 A1 | 9/2008 | Geddes et al. | |
| 2008/0210785 A1 | 9/2008 | Hou et al. | |
| 2010/0064429 A1 | 3/2010 | Strickland | |
| 2012/0144579 A1 | 6/2012 | Fabian | |
| 2014/0001748 A1 | 1/2014 | Ignaczak et al. | |
| 2014/0101914 A1 | 4/2014 | Harder | |

OTHER PUBLICATIONS

Intellectual Property Office, Combined Search and Examination Report, in UK Patent Application No. GB1903747.2, dated Sep. 20, 2019, which is a foreign application to which this U.S. application shares the benefit of priority.

* cited by examiner

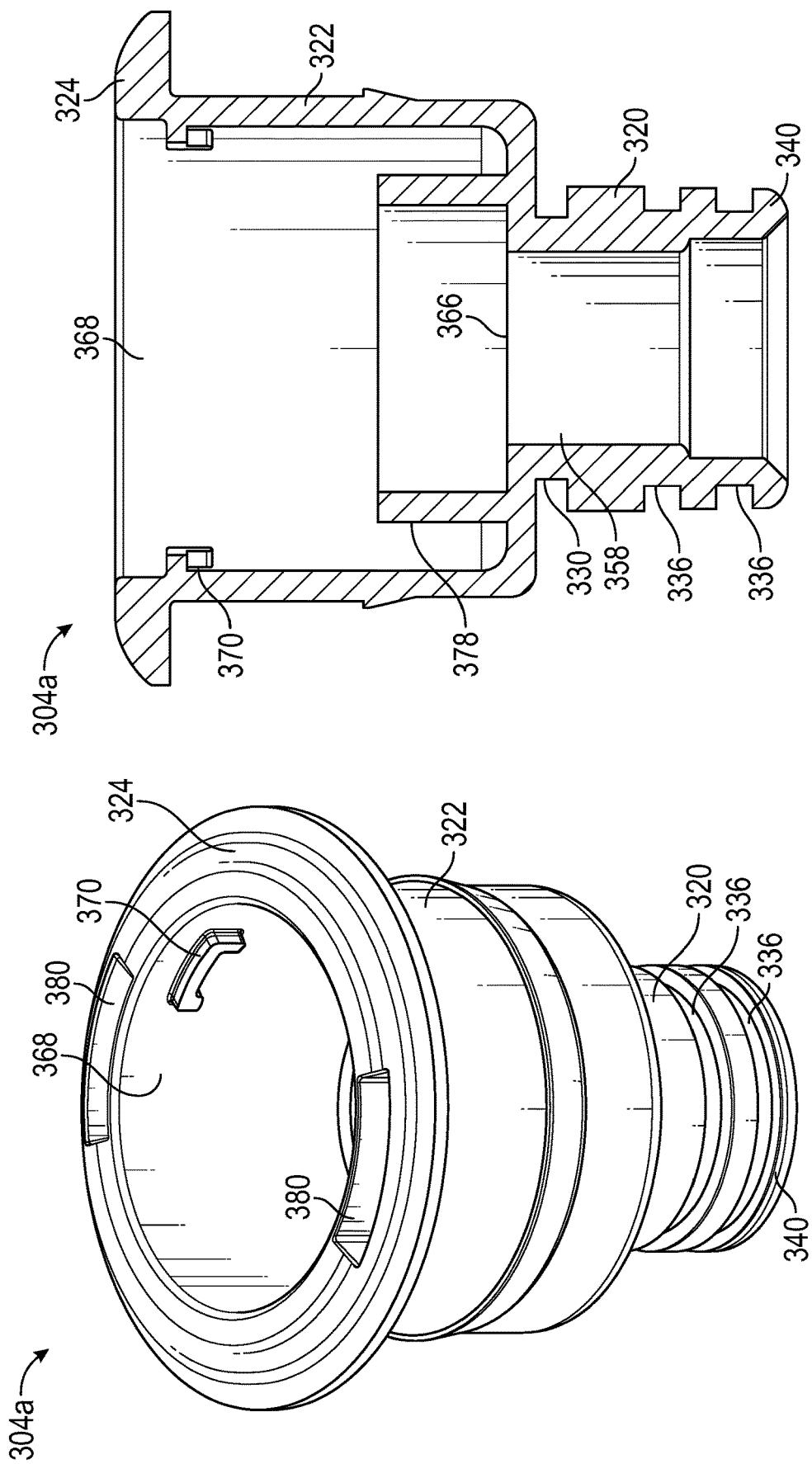

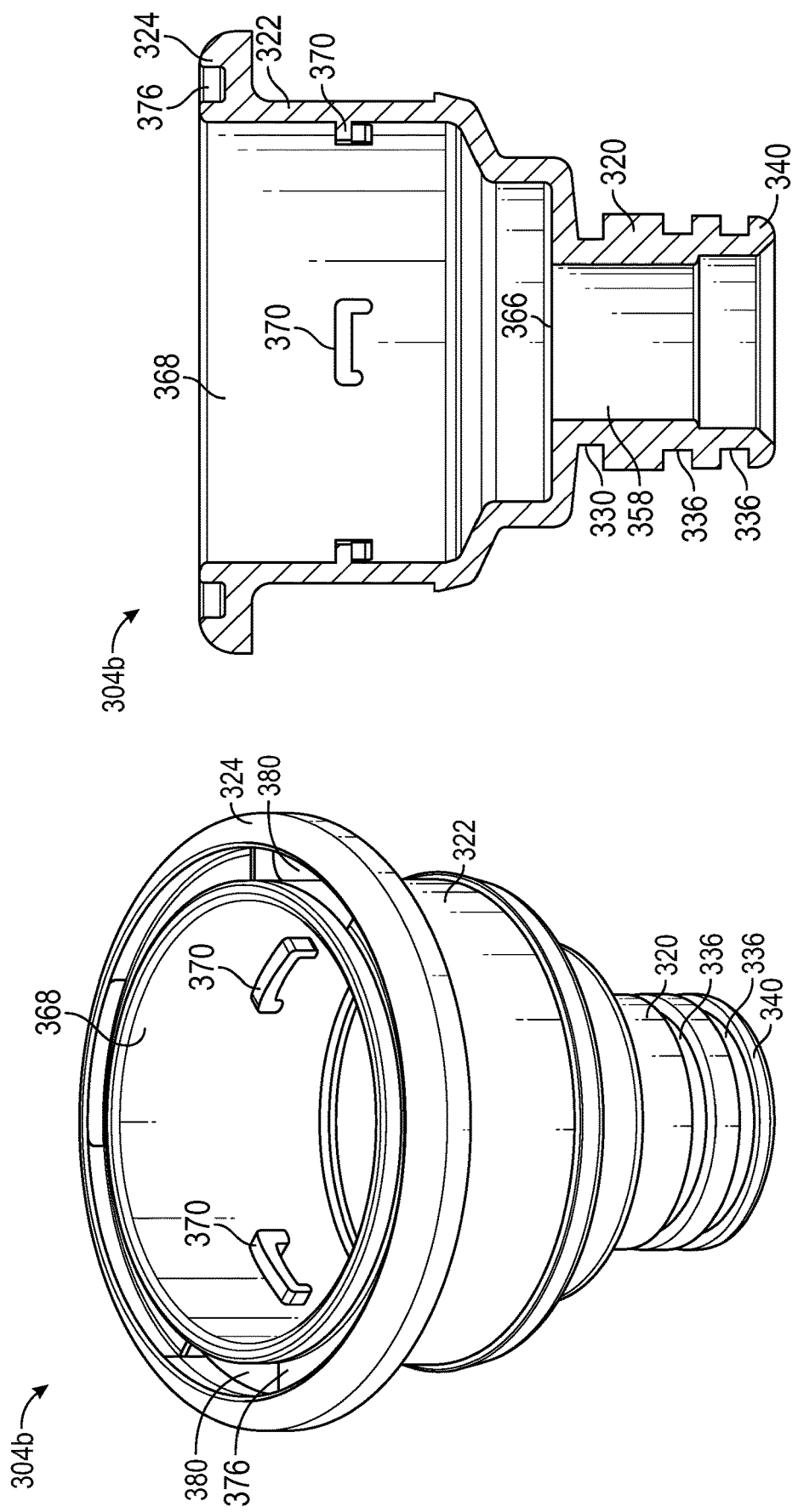

DUAL PLUMBING SYSTEM FOR A HOT TUB OR SPA

FIELD

This disclosure relates to systems and methods for hot tub, swim spa and personal therapy unit plumbing systems. More specifically, the disclosed embodiments relate to improved methods for simultaneously providing water and air to jets in a hot tub or spa.

BACKGROUND

A hot tub or spa is a pool of heated water typically sized to provide space for between one and ten people. Hot tubs and spas are often used for relaxation, various forms of therapy (including hydrotherapy and/or aromatherapy), pleasure, massage, training, and/or rehab (for example, in the case of a swim spa). Hot tubs and spas may be located either indoors or outdoors. Hot tubs are often used for social gatherings and/or for individual use. In addition, hot tubs are known to have a variety of health benefits. Hot tubs and spas can come in a wide variety of shapes, sizes, colors, and styles and may include a variety of additional accessories from filters to lights to built-in audio. In many cases, external portions of the hot tub and/or the frame may be decorated.

Hot tubs use jets to deliver a combination of water and air to the pool of water contained within the hot tub shell. In many cases, the jets may be used for massage purposes as well as circulating the water. The jets also provide fresh, heated water to the hot tub shell after cycling the water through appropriate heating and filtering systems. A plumbing system separately transports water and/or air from respective sources to the jets which may be located in a variety of places throughout the hot tub shell. The hot tub shell is supported by a hot tub frame which may also serve to contain and protect the plumbing system, as well as providing a structure for applying a decorative exterior.

In known methods, air and water are delivered to a given jet by separate tubes and associated system components. A typical hot tub may have approximately 45 jets, though a large hot tub may have many more, potentially more than 100. This can result in a large number of separate tubes which must be installed by hand and contained between the hot tub frame and the hot tub shell. This is a highly complicated process with many steps and involves an extraordinary amount of labor. Accordingly, there is a need for hot tub plumbing systems that simplify the delivery of air and water to the jets, and reduce the labor involved in assembling the hot tub.

SUMMARY

The plumbing system of the present teachings reduces the amount of labor during installation by significantly decreasing the number of tubes, connections and associated fittings used. This decrease is accomplished by using dual extrusion tubing which delivers air and water simultaneously. Benefits of using dual extrusion tubing may include halving the amount of labor involved in installing the plumbing system in a hot tub as well as decreasing the likelihood of mistakes. Furthermore, dual extrusion tubing can be used in conjunction with specialized manifolds that simplify how air and water are routed to the hot tub jets. Additionally, the systems and methods of installing a plumbing system according to the present teachings simplifies installation by using a "press-and-click" assembly. Benefits of this method of assembly may include a further reduction in labor as well as a reduction in the amount of glue and adhesive used.

The present disclosure provides systems, apparatuses, and methods relating to a hot tub plumbing system wherein one portion of the tubing (for example, one passage of a length of dual extrusion tubing) carries a water stream and a second portion carries an air stream. In some embodiments, a hot tub plumbing system may include a "press-and-click" method of assembly and wherein two components may be coupled together when aligned by applying axial compressive forces to overcome a spring bias or other resistive force, after which the components are locked together and O-rings ensure a seal. In some cases, components of the plumbing system can thereby be joined in a water tight manner without the use of glue or primer. The reduction or elimination of glue and primer is significant in many forms. Manual application can be inconsistent, which can lead to failures of the joint that are difficult and costly to repair. Furthermore, glue and primer contain volatile organic compounds that can pose environmental and human health issues.

In some embodiments, a jet assembly may include a jet insert, a jet body, and a jet back; wherein the jet back may be configured to be separately coupled to the tubing and then "snapped" onto the jet body according to the "press-and-click" method. In some embodiments, a manifold may be used which can simultaneously provide both air and water streams to the length and/or lengths of tubing and which is configured to couple together, via the "press-and-click" method, with other manifolds to form a multi-port manifold and/or with an end cap to end the flow of water and air.

In some examples, a hot tub jet assembly comprises a jet back including a first hollow protrusion configured to receive a stream of water and a second hollow protrusion adjacent the first hollow protrusion and configured to receive a stream of air; and a jet body configured to receive the streams of water and air from the jet back, to merge the streams of water and air together to form a mixed stream of air and water, and to provide the mixed stream of air and water from an outlet; wherein the jet back includes a resilient ring configured to engage one or more hooks disposed on the jet body.

In some examples, a hot tub plumbing system comprises a manifold assembly configured to receive separate air and water supply streams and to direct those streams into a water egress port and an air egress port, wherein the air egress port is substantially parallel to and adjacent to the water egress port; a dual extrusion tube including a first tubular portion configured to couple to the water egress port and a second tubular portion configured to couple to the air egress port; a jet back including a pair of adjacent parallel hollow protrusions each configured to receive one of the streams of air and water from a respective one of the tubular portions of the dual extrusion tube; and a jet body configured to receive the streams of air and water from the jet back, to merge the streams of air and water together to form a mixed stream of air and water, and to provide the mixed stream of air and water from an outlet; wherein the jet back includes a resilient member extending from a first end of the jet back and configured to engage one or more projections extending from the jet body.

In some examples, a hot tub plumbing system comprises a manifold configured to channel an air stream into an air egress port and to channel a water stream into a water egress port; a dual extrusion tube including a first hollow portion configured to couple to the water egress port and a second hollow portion configured to couple to the air egress port;

and a jet back including: a first hollow protrusion configured to receive the water stream from the first hollow portion of the dual extrusion tube; a second hollow protrusion configured to receive the air stream from the second hollow portion of the dual extrusion tube; and a spring-biased ring spaced from a first end of the jet back.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 14 is an isometric view of another embodiment of a jet body that can be used as part of a jet assembly, according to aspects of the present teachings.

FIG. 15 is a sectional elevational view of the jet body of FIG. 14.

FIG. 16 is an isometric view of yet another embodiment of a jet body that can be used as part of a jet assembly, according to aspects of the present teachings.

FIG. 17 is a sectional elevational view of the jet body of FIG. 16.

DETAILED DESCRIPTION

Introduction

Figure 1:
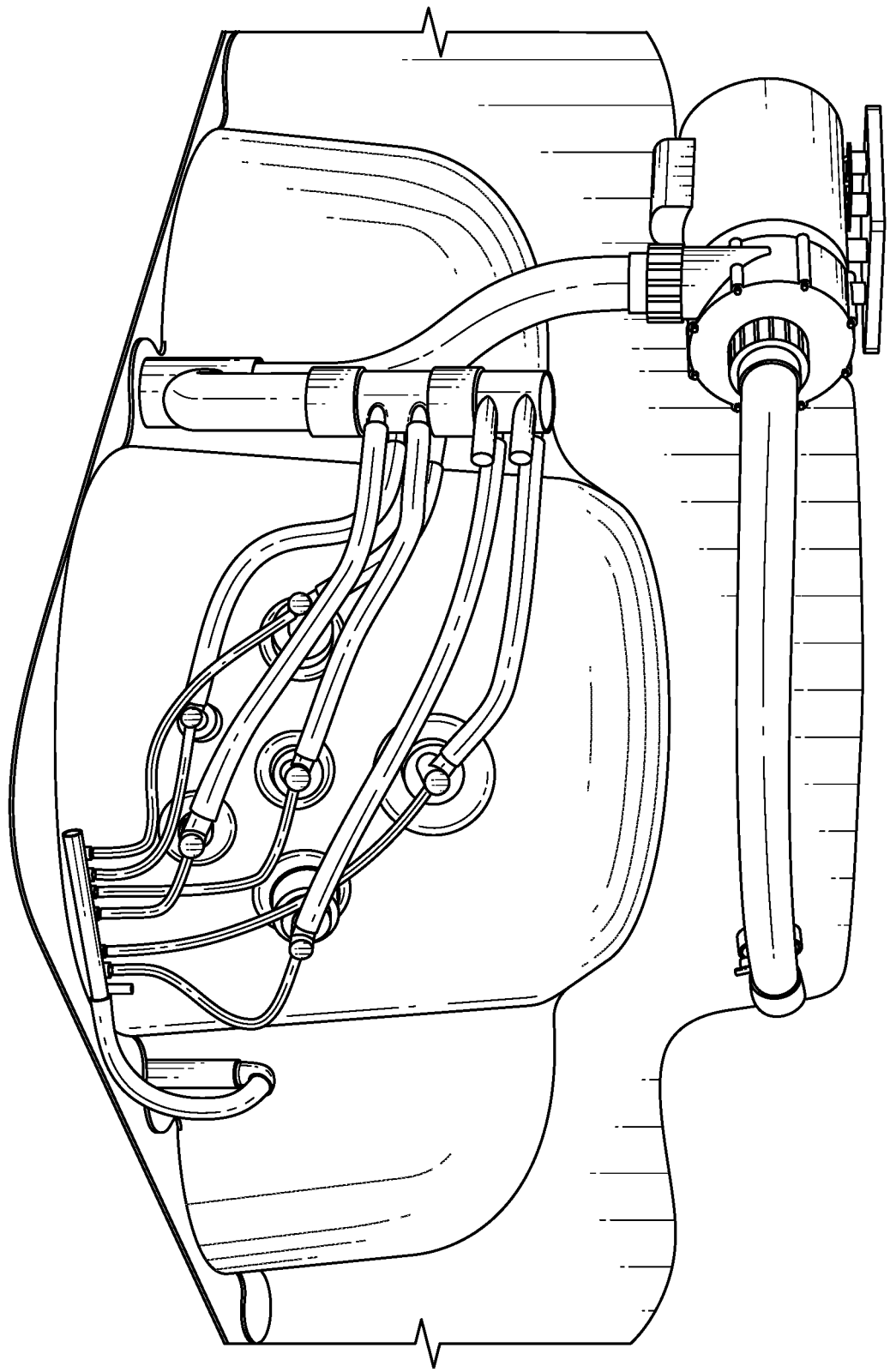
FIG. 1 depicts a perspective view of portions of a prior art hot tub plumbing system.

As described above, hot tubs use jets to deliver a combination of water and air to various parts of a hot tub shell. In many cases, the jets may be used for massage purposes as well as circulating the water. In known approaches, the plumbing system includes two complex networks of tubing. One network delivers water from the water supply to each jet while a second network of tubing delivers air from an air supply to each jet. An example of this type of system is generally shown in FIG. 1. Note that FIGS. 1 and 2 (described below) each show only a representative sample of 6 jets. A typical hot tub will contain 45 or more jets, and a larger hot tub may have 80 or more jets, potentially resulting in hundreds of separate sections of air and water tubing, each of which must be processed and installed by hand.

Additionally, as FIG. 1 shows, in conventional hot tub plumbing systems, each air tube and each water tube must be coupled with an appropriate supply manifold on one end and with the back of a jet on the other. Manifolds are used to transition from a larger supply tube or pipe to the smaller tubes that attach to individual jets. These supply pipes must also be installed by hand, connecting one end to the manifold and the other to the air and/or water source. This results in many additional connections that must be installed by hand. In addition to the labor associated with such a large number of tubes and connections, there is a significant possibility that mistakes may be made during assembly. To have a functional hot tub, it is important that each tube connects to the correct locations (both the correct location on the hot tub and the correct manifold) and takes the correct path between the manifold and the jet (or between the air or water supply and the manifold). A missed or incorrect connection might result in only air or only water being delivered to a particular jet, or even two jets being connected together such that neither functions.

Further, in previously known plumbing systems, each connection typically requires the use of glue and/or primer, and the application of a clamp. In known methods, installing a single water tube requires cutting the tube to the correct length, sliding a clamp onto each end of the tube, applying glue to both ends of the tube and the two ports that the tube is connecting, sliding an end of the tube onto each port, and using pliers or a specialized tool to slide the clamps down over the ends of the ports. A similar process must be used for each of the air tubes, although not always requiring a clamp. Although glue is sometimes not used on the air tubes, a primer is often applied to each end of the tube, as well as to the ports to which the air tube is being coupled.

Hot tubs are typically assembled in a series of sequential steps. In some cases, the various steps are divided among multiple stations. For example, in one exemplary method of assembly, a worker at a first station installs the jets on the hot tub shell while a worker at a second station cuts the air and water tubes to predetermined lengths and places clamps on each end of the tubing some distance up from the ends. At the same station, a worker also couples (using glue and repositioning the clamp) one end of the water tubes to a water distribution manifold and/or couples one end of the air tubes to an air manifold. A worker at a third station installs the manifolds on the hot tub, connecting each to the appropriate supply. A worker at the third station also couples the free end of each air and water tube to the jets.

Coupling each tube to a jet or a manifold involves application of glue and/or primer and repositioning the clamp. Thus, glue and primer must be used at multiple stations. The workers at each station must keep track of which tube needs primer and which needs glue as well as where each tube goes. This complexity increases the likelihood of mistakes. Further, the large quantities of glue and primer used and present in the assembly area can be both a health concern and an environmental concern.

The present disclosure represents several improvements over the prior art: the systems and methods according to the present teachings greatly decrease the amount of labor involved in assembling a plumbing system, reduce the need for glue and primer, and decrease the likelihood of mistakes. The presently described improvements therefore represent a significant reduction in the time, labor, and cost of manufacturing a hot tub.

Figure 2:
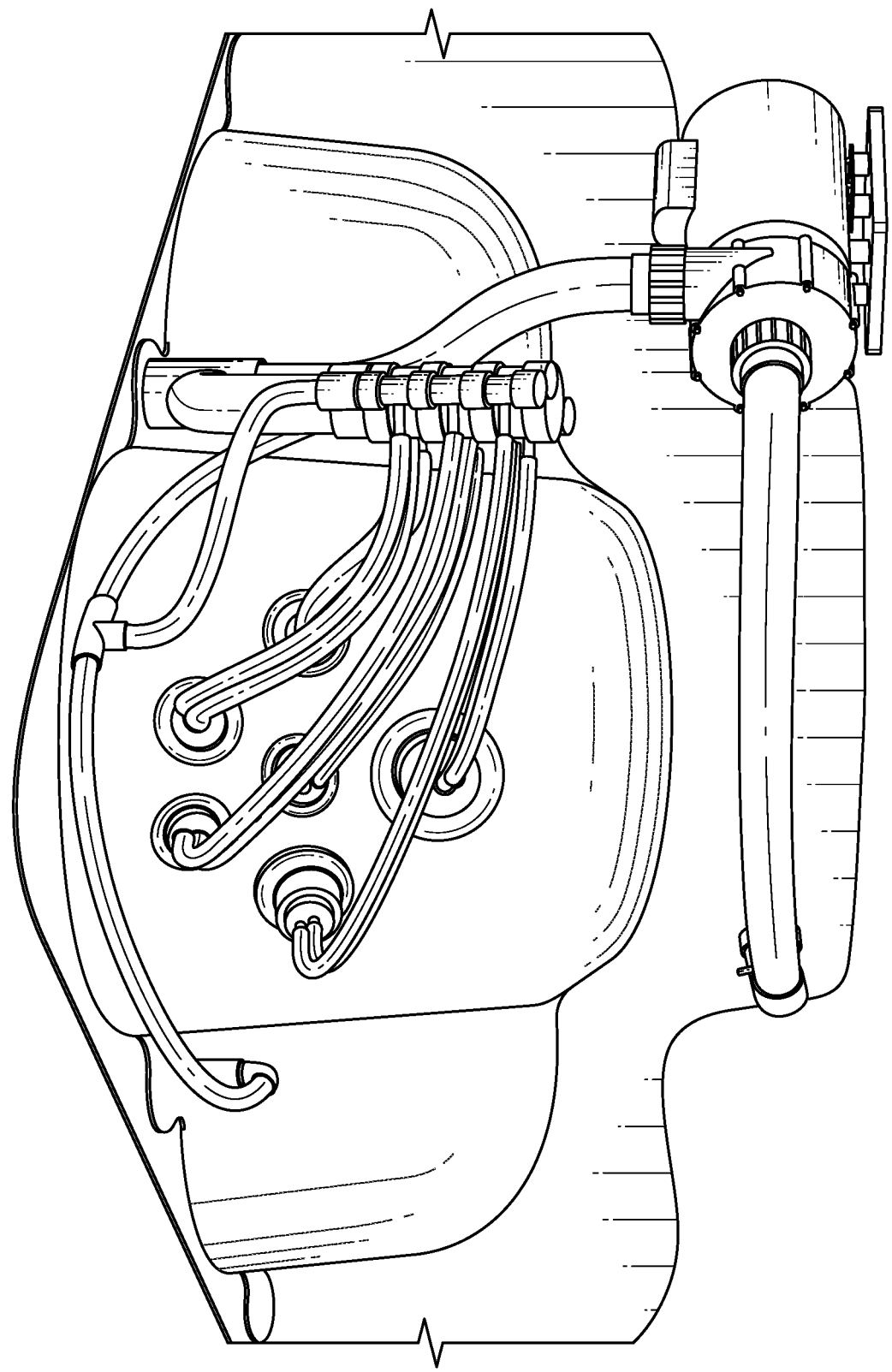
FIG. 2 depicts a perspective view of portions of a hot tub plumbing system, according to aspects of the present teachings.

More specifically, the use of dual extrusion tubing halves the number of tubes needed to route air and water from the manifolds to the hot tub jets, as compared to the use of individual air and water tubes. Instead of using one tube to carry a stream of air to each jet and a second tube to carry a stream of water to each jet, the present disclosure teaches the use of a single length of dual extrusion tubing, having two passages, for each jet. The larger passage of the dual extrusion tubing carries a stream of water while the smaller passage, joined to the larger passage, carries a stream of air. An example of an improved system according to aspects of the present disclosure is generally shown in FIG. 2.

In addition, the present disclosure describes simplified installation of hot tub plumbing systems through the use of improved jet assemblies and manifold assemblies. For example, the present disclosure teaches simplified installation of the jets by teaching a jet assembly comprising three components. A jet insert forms the flow director and decorative portion visible from the interior of the hot tub shell. A jet body couples with the jet insert through the wall of the hot tub shell, affixing both in place. A jet back couples with the tubing and with the jet body, thereby separately delivering air and water to the jet body where the separate streams of air and water can merge before entering the hot tub body via the jet insert.

The present disclosure also simplifies installation by using a combined air and water manifold. In other words, instead of separate air and water manifolds, according to the present teachings a single, universal manifold can carry both air and water. The manifolds of the present disclosure are configured to have a first, larger passage for water and a second, smaller passage for air. The air passage may be joined to the outside of the water passage. In some cases, two air passages disposed on opposite sides of the water passage may be used. Parallel egress ports, one from the water passage and one from the air passage, are configured to couple with the tubing (for example, dual extrusion tubing).

In some cases, manifolds according to the present teachings have two sets of egress ports, each configured to couple with a dual extrusion tube. A universal manifold having two sets of egress ports allows for more flexibility in the plumbing system than known systems, for example systems which have four ports in the water manifolds and six or more in the air manifolds. According to the present teachings, because the air and water ports may be disposed together in sets (with each set including one air port and one water port), there may always be an equal number of air and water ports.

Moreover, a smaller number of ports on the base unit (i.e. two sets of ports on each manifold) decreases the number of unused ports in the presently disclosed systems. If there is an odd number of jets, only one set of unused ports needs to be plugged (i.e., capped). If there is an even number of jets, then manifolds can be added or removed until the number of ports exactly matches the number of jets. Note that in FIG. 1 (the prior art), several unused air and water ports are capped while none of the ports in FIG. 2 (an embodiment of the presently disclosed system) are unused or capped. Thus, in this manner manifolds according to aspects of the present disclosure may significantly simplify the plumbing process.

The systems and methods of the present teachings may also reduce the need for glue and primer, because the manifolds and the components of the jet assemblies may be configured to couple together in a water tight and air tight manner without the use of glue. For example, a ridge on the water egress and ingress ports may ensure a tight seal, while a clamp may ensure that the associated dual extrusion tubing will not slide off of the ports. A lubricant such as soapy water may be used to facilitate sliding the tubing over the ports. Such a lubricant typically does not pose the health and environmental concerns that glue and primer do.

The present disclosure also teaches an improved clamp having a pair of contiguous arcuate apertures which are configured to fit around the dual extrusion tubing contemplated by the present teachings. The clamp also has a releasable end portion so that the clamp can be placed over the tubing at a desired location and tightened without any need to reposition it. Two sets of complementary ratcheting teeth are engaged to secure the clamp in place. Use of this improved clamp reduces the amount that each clamp needs to be handled, further decreasing the amount of labor required.

The present disclosure further teaches an improved method of assembly in which many of the components may be configured to be able to be coupled together by being compressed together when aligned to overcome a resistive force. This "press-and-click" method greatly simplifies assembly, reduces the need for glue, and significantly reduces the amount of labor. The present disclosure uses "press-and-click" to refer to a connection mechanism in which two components may be fastened or engaged together by applying axial compressive forces to overcome a spring bias or other resistive force, after which the components are locked together in an air tight and/or water tight fashion. This is distinct from prior art hot tub plumbing systems in which fastening the plumbing components together typically requires gluing and press fitting individual water and air hoses to make a secure connection.

The plumbing system of the present disclosure may be assembled in a series of sequential steps. In some examples, the steps may be distributed between multiple stations. For example, a worker at a first station may install the jet inserts and jet bodies on the hot tub shell as well as installing any pumps and/or valves on the hot tub shell and/or hot tub frame. A worker at a second station may cut the dual extrusion tubing to predetermined lengths and attach the jet backs to the tubing using a clamp. A worker at the second station may also attach a second end of each length of dual extrusion tubing to the manifolds. In some examples, a worker at the second station may use a lubricant (e.g. soapy water) to make it easier to slide the dual extrusion tubing over the ports.

A worker at a third station may cut the supply pipes to the appropriate lengths and affix (using glue or primer) each end of the supply pipes to appropriate adapters. For example, a male adapter may be used to couple the supply pipe to a manifold, while a female adapter may be used to couple the supply pipe to the air and/or water sources. These adapters may be specially configured to interface with the specialized manifolds contemplated by the present teachings, as described in detail below. Since only the connection between the supply pipes and the adapters requires glue or primer, the amount of glue and primer used in the installation process is greatly decreased in comparison with current methods. Moreover, only one station (in this example, the third station) may need to use the glue and primer; this may reduce the number or workers exposed to the glue and primer, and may facilitate ventilation and other safety procedures.

A worker at a fourth station might install the pipes and tubing on the hot tub. This may involve using the "press-and-click" method described above to couple the supply pipes to the appropriate source, couple the other end of the supply pipes to a first manifold, couple the manifolds together, couple an end cap onto the last manifold, and couple the jet backs to the jet bodies. The use of a universal "press-and-click" method on all the components may greatly increase the efficiency of the assembly process while significantly reducing the potential for mistakes.

Thus, the hot tub plumbing systems of the present disclosure may result in a significant improvement over prior art, for example by decreasing the amount of labor involved during installation, decreasing the reliance on glue, and providing a simple method of simultaneously delivering separate streams of air and water with reduction in the likelihood of mistakes during assembly.

Various aspects and examples of a hot tub plumbing system configured to simultaneously deliver both air and water to each jet and having components configured to be assembled in a universal "press-and-click" method, as well as related methods, are described below and illustrated in the associated drawings. Unless otherwise specified, a hot tub plumbing system and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder. Similarly, "substantially parallel" structures are structures that are generally parallel, but that could have slight deviations from parallel, for instance due to manufacturing tolerances or slight assembly misalignments.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

"Hot tub" and "hot tub plumbing system" are used throughout this disclosure to mean any equipment that uses jets to provide mixed streams of air and water. This includes not only conventional spas, but also swim spas, therapy pools and the like.

"In fluid communication" is used to describe parts which are coupled (whether directly or indirectly through intervening components) in such a way that a fluid, liquid, gas, and/or any other suitable substance capable of flowing, running, and/or moving in a fluid manner can move freely between the parts. Parts may be in direct fluid communication, wherein the substance can move directly from one part to the other and/or vice versa. Parts also may be in indirect fluid communication, wherein the substance can move from one part to an intermediate part or parts and from the intermediate parts or parts to the second part and/or vice versa.

Terms such as "upstream" and "downstream" are used to indicate a relative position and/or orientation with respect to the principal or expected direction of flow of fluid, liquid, gas, and/or other suitable substance. For example, an "upstream end" of an object is the end of the object that a moving fluid encounters first when the fluid is flowing in an expected direction, whereas a "downstream end" of the object is the end of the object that a moving fluid encounters last when the fluid is flowing in an expected direction.

Overview

In general, a hot tub plumbing system according to the present teachings may include jet inserts, jet bodies, and jet backs (which collectively may be referred to as a "jet assembly"), manifolds, manifold adapters, and manifold end caps (which collectively may be referred to as a "manifold assembly"), clamps, and/or dual extrusion tubing that carries both air and water. These components may be used together in an integrated plumbing system that provides numerous advantages over more conventional hot tub plumbing systems.

Figure 3:
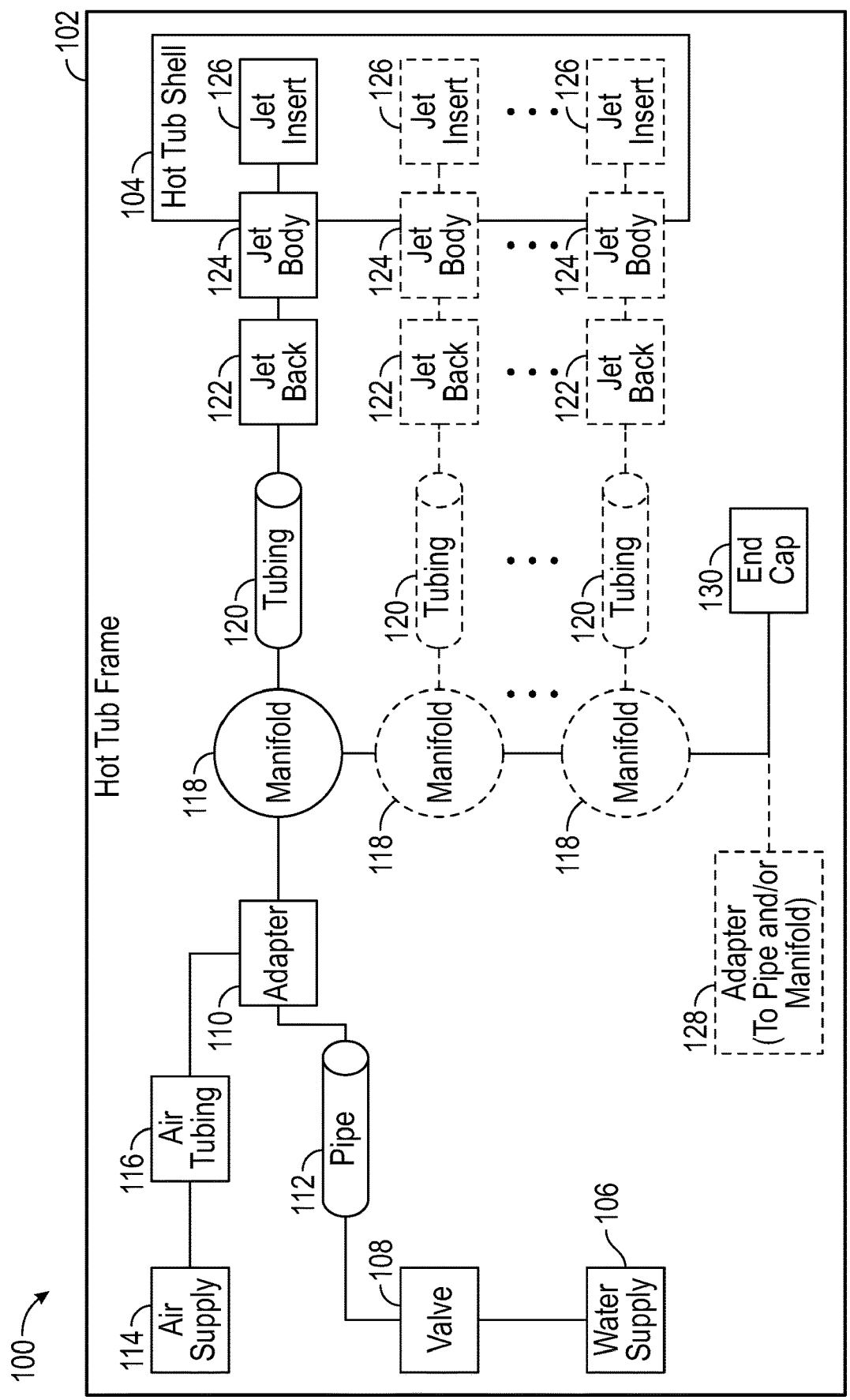
FIG. 3 is a block diagram of an exemplary hot tub plumbing system, according to aspects of the present teachings.

FIG. 3 is an illustrative block diagram of an exemplary hot tub, generally indicated at 100, having an improved plumbing system. Hot tub 100 includes a hot tub frame 102 which contains and supports a hot tub shell 104 and the plumbing system which provides air and water to hot tub shell 104. Hot tub shell 104 may also be referred to as a hot tub body or a hot tub body portion. The plumbing system of hot tub 100 includes a water supply 106 which connects with a valve 108. Valve 108 is connected to an adapter 110 via a pipe 112. Water supply 106, valve 108, and pipe 112 may include any suitable structures configured to provide water to adapter 110.

In some examples, pipe 112 may be a 2-inch pipe configured to carry water from valve 108 to adapter 110. In some examples, water supply 106 may include a water pump, a heating system, and/or a filtering system. In some examples, water supply 106 may receive water from a drain or water output structure of hot tub shell 104 such that hot tub 100 recycles water, for example, by passing it through a heating and/or filtering system. In some examples, valve 108 may be directly coupled to water supply 106. In some examples, valve 108 may be coupled indirectly to water supply 106 via a length of pipe and/or an adapter.

Hot tub 100 also includes an air supply 114 and air tubing 116 which connects air supply 114 to adapter 110. Air supply 114 and air tubing 116 may include any suitable structures configured to provide air to adapter 110. In some examples, hot tub 100 may use environmental air and air supply 114 may include a vent to the exterior of hot tub 100, such that air for the air supply is drawn in through the vent by negative pressure. In some examples, air supply 114 may include a vent configured to have a variable opening, the size of which may be adjusted by a user to control the ratio of air and water delivered by the jets of the hot tub.

Adapter 110 couples with a first of one or more manifolds 118. Each of the one or more manifolds 118 connects with a length of tubing 120 which in turn connects with a jet back 122. Each jet back 122 couples to a jet body 124, and each jet body 124 couples to hot tub shell 104 and a jet insert 126. Additionally, or alternatively, the jet insert may be referred to as a jet face. In some examples, jet body 124 may couple to hot tub shell 104 and jet insert 126 may couple to a portion of jet body 124 that is disposed inside hot tub shell 104. In some examples, jet insert 126 may couple to hot tub shell 104 and jet body 124 may couple to a portion of jet insert 126 that is disposed outside hot tub shell 104. In some examples, jet body 124 and jet insert 126 couple together to form a unit, or are integrally formed as a single component, which couples to hot tub shell 104. In some examples, tubing 120 may be dual extrusion tubing which has two separate passages, for air and water respectively. In some examples, tubing 120 may include separate lengths of tubing for air and water.

Adapter 110 separately provides air and water to the first of one or more manifolds 118. Each of the one or more manifolds 118 simultaneously may pass a first portion of the air and water as separate streams to another downstream component while allowing a second portion of the air and water to pass as separate streams to tubing 120 and thence to a jet back 122. Additionally, or alternatively, the separate air and water streams may be referred to as separate air and water supply streams. In some examples, coupling manifold 118 to tubing 120 may include using a clamp.

In some examples, manifold 118 passes the first portion of the air and water to another manifold. In some examples, manifold 118 passes the first portion of air and water to an adapter 128. Adapter 128 may couple to another length of pipe (similar to pipe 112), another adapter 110, and/or another manifold 118. Adapter 128 may couple to a length of pipe in cases where multiple clusters of manifolds 118 are needed, in which case the same water and air supplies may provide water and air to all of the different sets of manifolds. In some examples, it may be advantageous to have a plurality of clusters of manifolds spaced out at different portions of hot tub 100 to better reach each jet with the least amount of tubing. Any suitable number of manifolds grouped in any suitable number and/or size of clusters may be used.

An end cap 130 may be coupled with at least one of the one or more manifolds 118. In some examples, end cap 130 may be coupled with a last manifold 118 to end the flow of air and water and to ensure the plumbing system is sealed. In some examples, only one cluster of manifolds may be used and the last manifold may be coupled with end cap 130. In some examples, hot tub 100 may include several groups and/or clusters of manifolds and the manifold at the end of the last cluster may be coupled with end cap 130. In some cases, a separate end cap may not be required. For example, one of manifolds 118 or adapters 128 may be formed with integral caps or seals.

Each section of tubing 120 may provide separate streams of air and water to a jet back 122. In some examples, coupling tubing 120 to jet back 122 may include using a clamp. Jet back 122 provides separate streams of air and water to jet body 124. In some examples, jet body 124 may be configured to merge the streams of air and water before delivering the air and water mixture to hot tub shell 104 via jet insert 126. In some examples, jet body 124 may include a nozzle formed as an integral part of jet body 124. In some examples, a separate nozzle may be press-fit into jet body 124. In some examples, jet insert 126 may include a flow director. In some examples, jet insert 126 may be visible to a user inside hot tub shell 104 and may include decorative portions.

In some examples, some of the components of hot tub 100 may be configured to be able to be coupled together when aligned by being compressed together to overcome a resistive force. As described above, the present disclosure uses "press-and-click" to refer to a connection mechanism in which two components may be fastened or engaged together by applying axial compressive forces to overcome a spring bias or other resistive force, after which the components are locked together in some fashion. This is distinct from prior art hot tub plumbing systems in which fastening the plumbing components together typically requires gluing and press fitting to make a secure connection. In some examples, a "press-and-click" assembly method may be facilitated by features of the components such as spring-biased clips, retaining features, and O-rings.

In some examples, two components locked together by a "press-and-click" method may be able to be unlocked and/or uncoupled. In other words, a "press-and-click" method may include releasably coupling two components. Releasably coupling components together may be advantageous as it may, for example, allow a worker to uncouple components that were coupled together by mistake, or for the purpose of replacing damaged or defective components.

In some examples, adapter 110 may be configured to couple to manifold 118 by the glueless "press-and-click" method. In some examples, each of one or more manifolds 118 may be configured to couple to other manifolds 118 and/or adapters 110 and 128 by the glueless "press-and-click" method. In some examples, end cap 130 may be configured to couple to manifolds 118 by the glueless "press-and-click" method. In some examples, adapter 110, each of one or more manifolds 118, adapter 128, and/or end cap 130 may be configured to be coupled together interchangeably such that any number of components may be used in any suitable order.

In some examples, jet back 122 and jet body 124 may be configured to be coupled together by the glueless "press-and-click" method. In some examples, jet body 124 and jet insert 126 may be configured to be coupled together by the glueless "press-and-click" method. In some examples, jet body 124 and jet insert 126 may be configured to be releasably coupled together without the use of glue and/or by, for example, aligning the components and rotating one with respect to the other. For example, rotating the jet body with respect to the jet insert may engage hooks within each of the components.

Examples, Components, and Alternatives

The following sections describe selected aspects of exemplary hot tub plumbing systems as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Jet Assembly

As shown in FIGS. 4-30, this section describes a jet assembly 200 according to aspects of the present teachings. Additionally, or alternatively, a jet assembly may be referred to as a jet. Jet assembly 200 includes a jet back 202, a jet body 204, and a jet insert 206, which are respectively examples of jet back 122, jet body 124, and jet insert 126 described above more generally. Additionally or alternatively, the jet insert may be referred to as a jet face. In some embodiments, jet assembly 200 may further include a nozzle 208.

Overview

Figure 4:
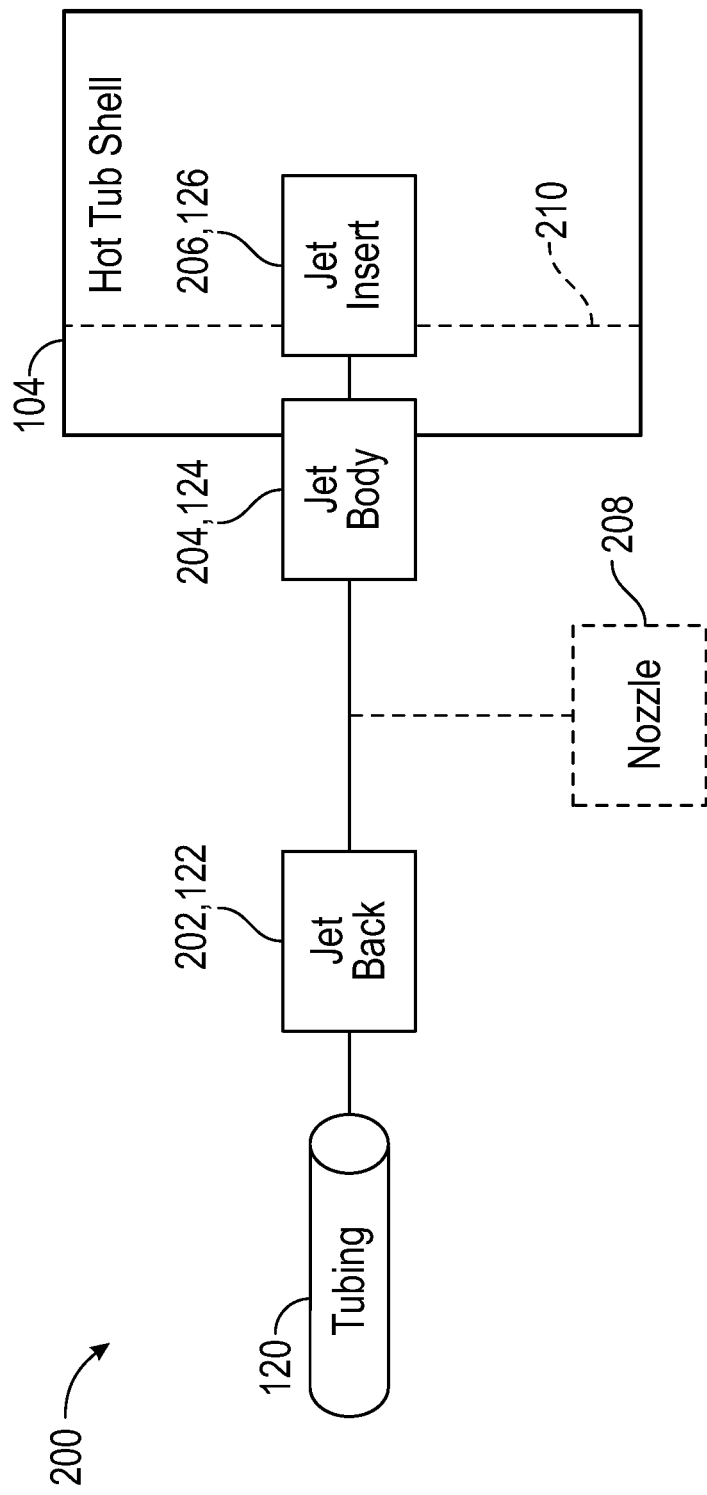
FIG. 4 is a block diagram of an exemplary jet assembly, according to aspects of the present teachings.

FIG. 4 is a block diagram of an illustrative jet assembly, generally indicated at 200, having a jet back 202, a jet body 204, and a jet insert 206. Jet assembly 200 may include any suitable structures configured to couple tubing 120 with hot tub shell 104 such that tubing 120 is in fluid communication with the interior of hot tub shell 104. For example, jet assembly 200 may include a jet back which couples to tubing 120 and to a jet body; the jet body may couple to hot tub shell 104 and/or a jet insert. In some examples, jet assembly 200 may merge separate streams of air and water before passing the air and water mixture to hot tub shell 104. Tubing 120 and hot tub shell 104 are also schematically depicted in FIG. 4. Nozzle 208 is depicted in dashed lines to indicate that it may be included in some, but not all, embodiments.

Jet back 202 may include any suitable structure configured to couple with tubing 120, receive streams of air and water from tubing 120, releasably couple with jet body 204, and pass the streams of air and water to jet body 204. For example, jet back 202 may include a water ingress port and an air ingress port which together form a set of ingress ports. In some examples, jet back 202 may further include a central portion configured to couple to and form a water tight seal with jet body 204. In some examples, the set of ingress ports may be configured to couple with dual extrusion tubing. In some examples, the set of ingress ports of jet back 202 may be configured to couple with separate lengths of tubing for air and for water. In some examples, coupling jet back 202 with tubing 120 may include the use of one or more clamps.

Jet body 204 may include any suitable structure configured to couple with jet back 202, to couple with jet insert 206 and/or hot tub shell 104, and to pass the air and water (either mixed or as separate streams) to hot tub shell 104. Jet body 204 may be further configured to form a water tight seal with jet back 202. In some examples, forming a water tight seal with jet back 202 may include the use of one or more O-rings. In some examples, jet body 204 may be further configured to merge the separate streams of air and water. In some examples, jet bodies 204 having different dimensions may be used to couple with jet inserts 206 having various sizes and/or styles.

Jet insert 206 may include any suitable structure configured to couple with jet body 204 and/or hot tub shell 104, and to pass the mix of air and water to the interior of hot tub shell 104. In some examples, some or all of jet insert 206 may be visible from the interior of hot tub shell 104 and/or jet insert 206 may further include decorative portions or features. In some examples, jet insert 206 may include a flow director which may be configured to increase the speed of and/or change the direction of the air and water mixture.

Any suitable method of coupling jet body 204 and jet insert 206 together and affixing the combination to hot tub shell 104 may be used. In some examples, jet body 204 attaches to hot tub shell 104 and jet insert 206 couples to a portion of jet body 204 which is disposed within hot tub shell 104 (this example is schematically depicted by solid lines in FIG. 4). In some examples, jet insert 206 attaches to hot tub shell 104 and jet body 204 couples to a portion of jet insert 206 which is disposed outside hot tub shell 104 (this example is schematically depicted by dashed line 210 in FIG. 4). In some examples, both jet body 204 and jet insert 206 may be attached to hot tub shell 104 as well as coupled together.

In some examples, jet assembly 200 may further include nozzle 208. Nozzle 208 may include any suitable structure for increasing the speed of the water, controlling the direction of the water, and/or merging the streams of air and water. In some examples, nozzle 208 may include a separate piece which is press-fit into jet body 204. In some examples, nozzle 208 may include a structure formed as an integral part of jet back 202 and/or jet body 204. In some examples, nozzle 208 may be omitted.

In some examples, some of the components of jet assembly 200 may be configured to be able to be coupled together when aligned by being compressed together to overcome a resistive force. As described above, the present disclosure uses "press-and-click" to refer to a connection mechanism in which two components may be fastened or engaged together by applying axial compressive forces to overcome a spring bias or other resistive force, after which the components are locked together in some fashion.

More specifically, in some examples, jet back 202 and jet body 204 may be configured to be coupled together by a glueless "press-and-click" method. In some examples, attachment structures such as spring biased clips and retaining features may be used to facilitate a "press-and-click" method of assembly. Additionally, or alternatively, features such as O-rings may be used to ensure a water tight seal between components.

Similarly, in some examples, jet body 204 and jet insert 206 may be configured to be coupled together by the glueless "press-and-click" method. In some examples, jet body 204 and jet insert 206 may be configured to be coupled together without the use of glue and/or by a mechanism other than a "press-and-click" method. For example, jet body 204 and jet insert 206 may be configured to be coupled together by a method which includes aligning the components and rotating one with respect to the other. In some examples, rotating jet body 204 with respect to jet insert 206 may engage attachment structures such as hooks within each of the components.

This section includes a description of various possible embodiments of jet assembly 200, according to aspects of the present teachings. A person of ordinary skill in the art will recognize that other embodiments or variations are possible within the scope of the present teachings.

First Straight Back Embodiment

FIGS. 5 through 19 depict a first embodiment 300 of general jet assembly 200, which includes a straight back jet back. In the present teachings, a jet assembly may sometimes be referred to simply as a "jet." The first embodiment of jet assembly 200 is generally indicated at 300 and includes a jet back 302, a jet body 304, and a nozzle 308. Jet assembly 300 also may include a jet insert, or jet face (not shown). Additionally, or alternatively, jet back 302 may be referred to as a straight back jet back or a straight jet back. Jet back 302 is an example of jet back 202 described above, jet body 304 is an example of jet body 204 described above, a compatible jet insert would be an example of jet insert 206 described above, and nozzle 308 is an example of nozzle 208 described above.

Figure 5:
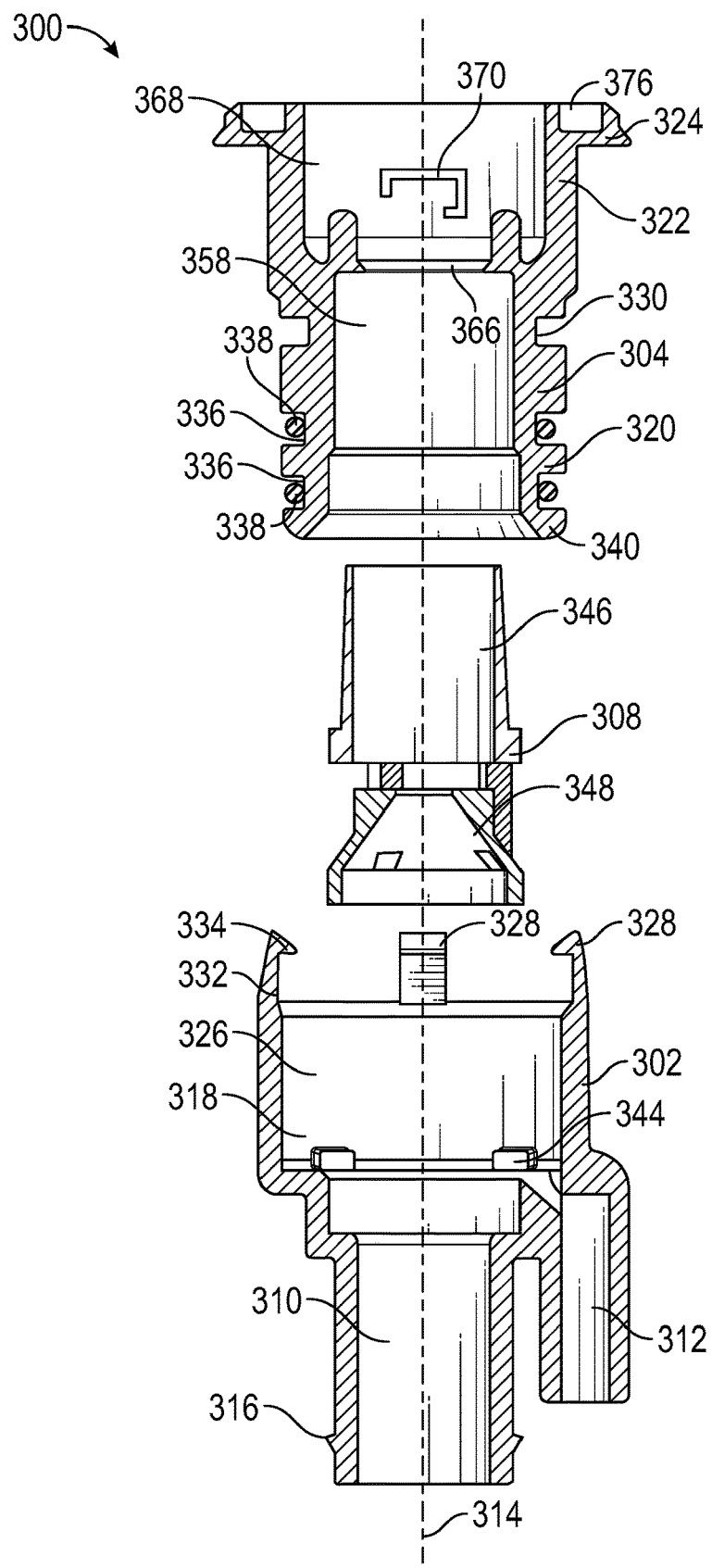
FIG. 5 is an exploded sectional view of a jet assembly, according to aspects of the present teachings.
Figure 6:
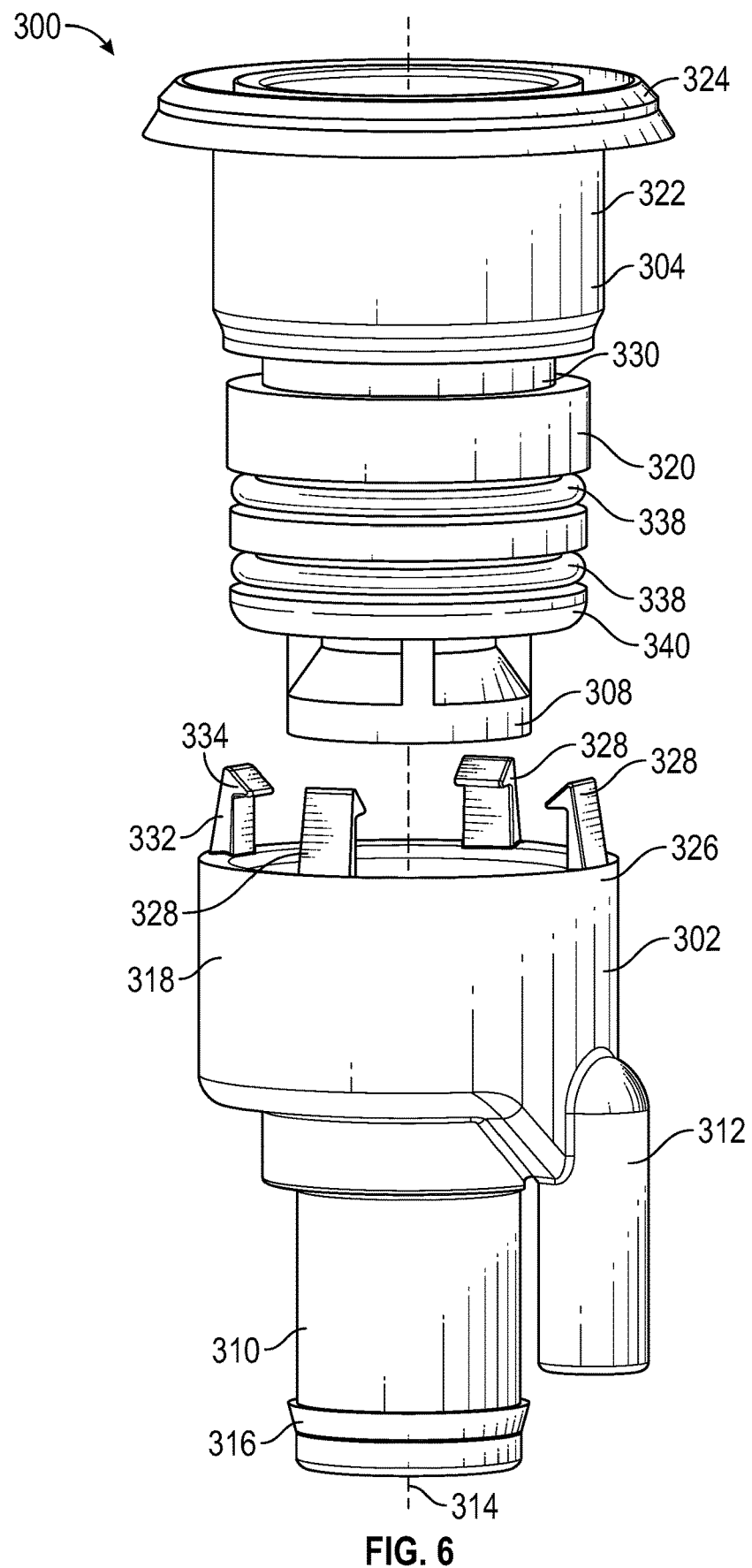
FIG. 6 is a partially exploded isometric view of the jet assembly of FIG. 5.
Figure 7:
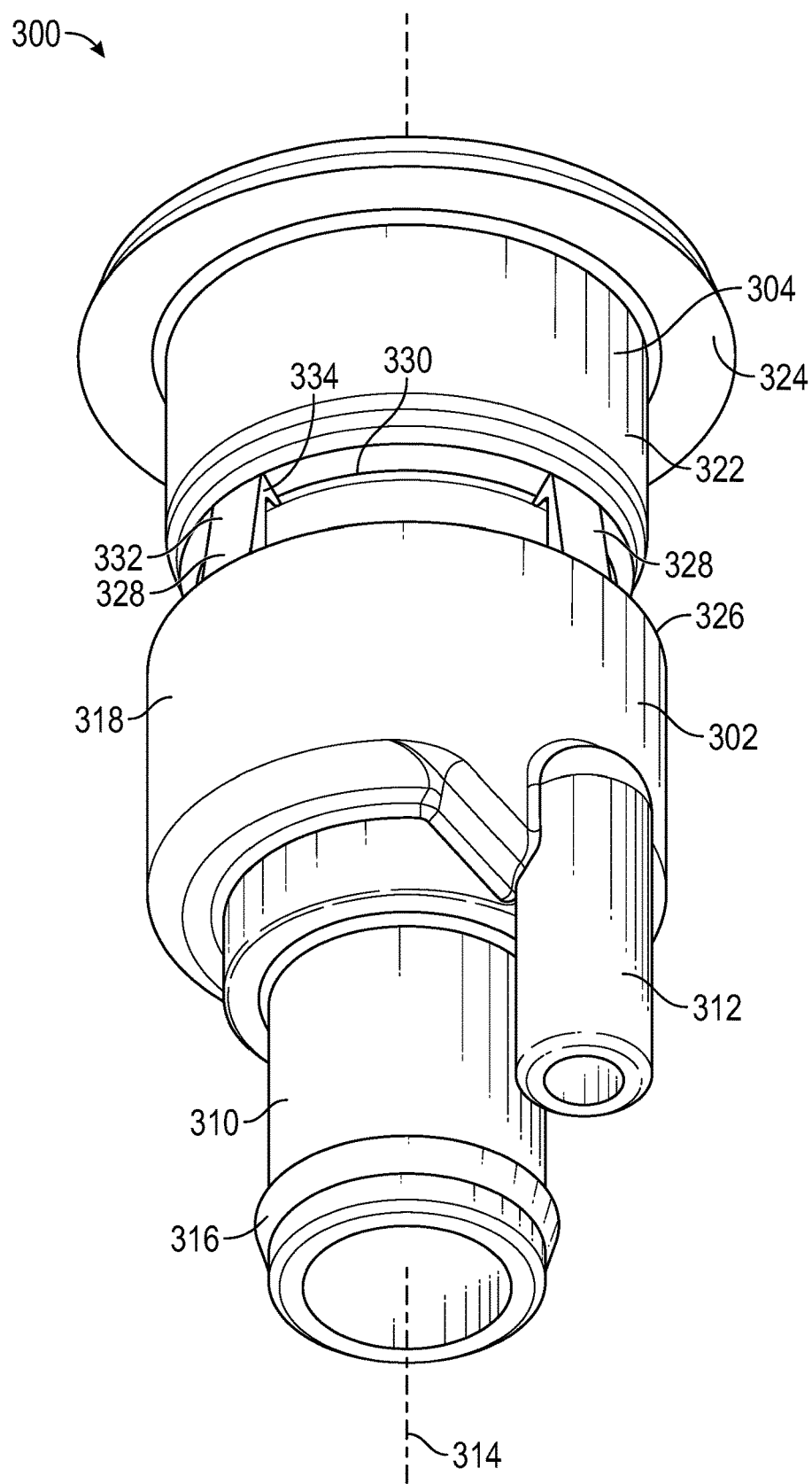
FIG. 7 is an isometric view of the jet assembly of FIG. 5, showing the jet assembly in an assembled state.
Figure 8:
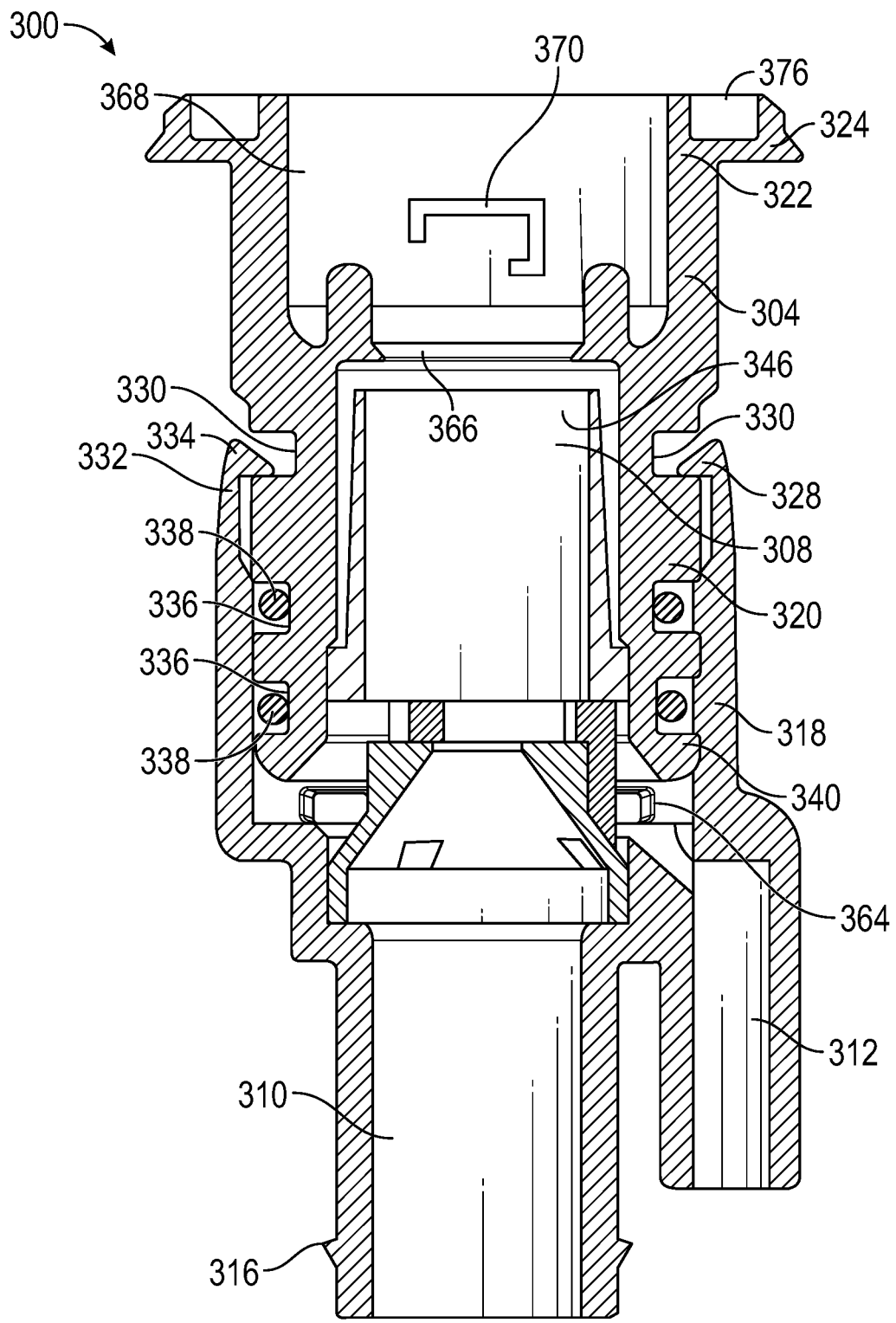
FIG. 8 is a sectional view of the jet assembly of FIG. 5, showing the jet assembly in an assembled state.
Figure 9:
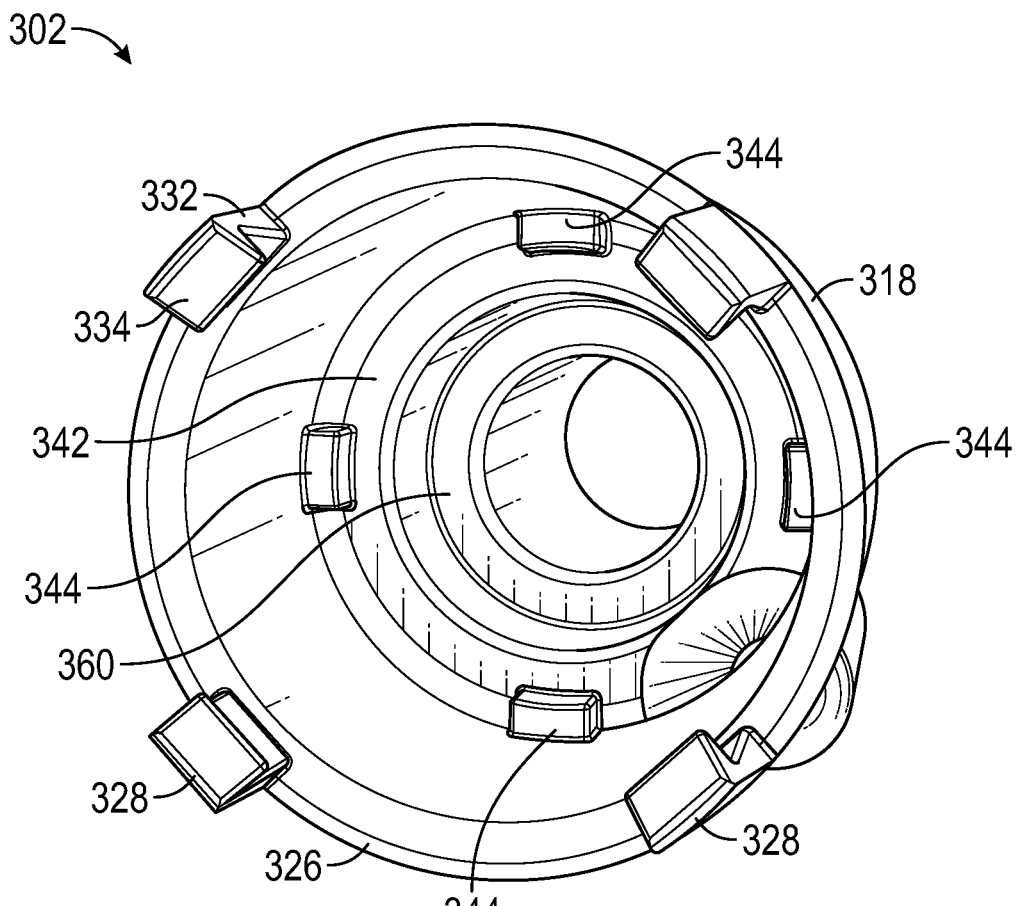
FIG. 9 is an isometric view of a jet back portion of the jet assembly of FIG. 5.
Figure 10:
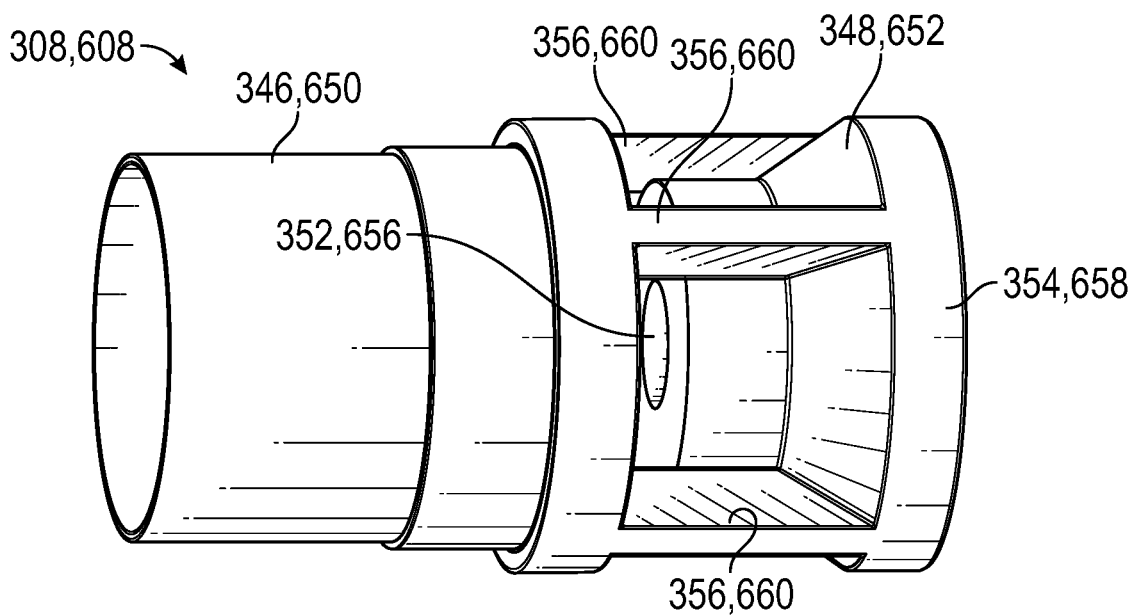
FIG. 10 is an isometric view of a nozzle portion of the jet assembly of FIG. 5.
Figure 11:
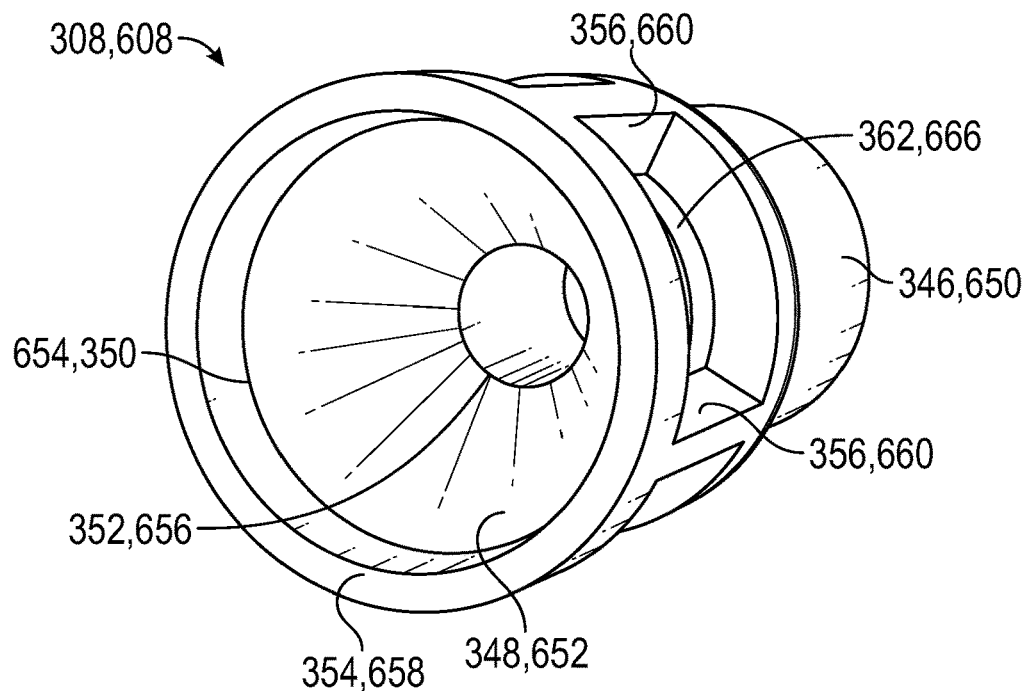
FIG. 11 is another isometric view of the nozzle portion shown in FIG. 10.
Figure 12:
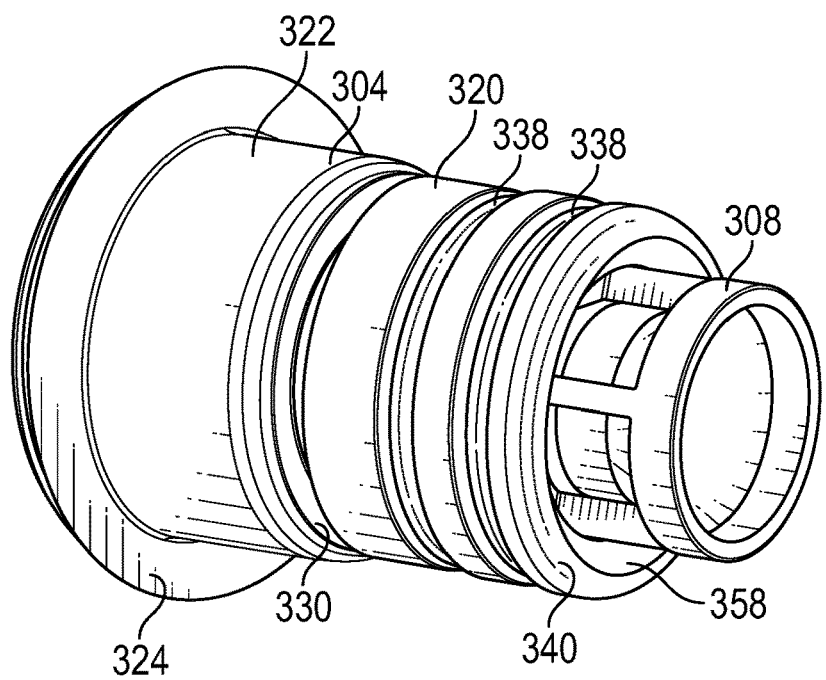
FIG. 12 is an isometric view of a nozzle portion installed in a jet body portion of the jet assembly of FIG. 5.
Figure 13:
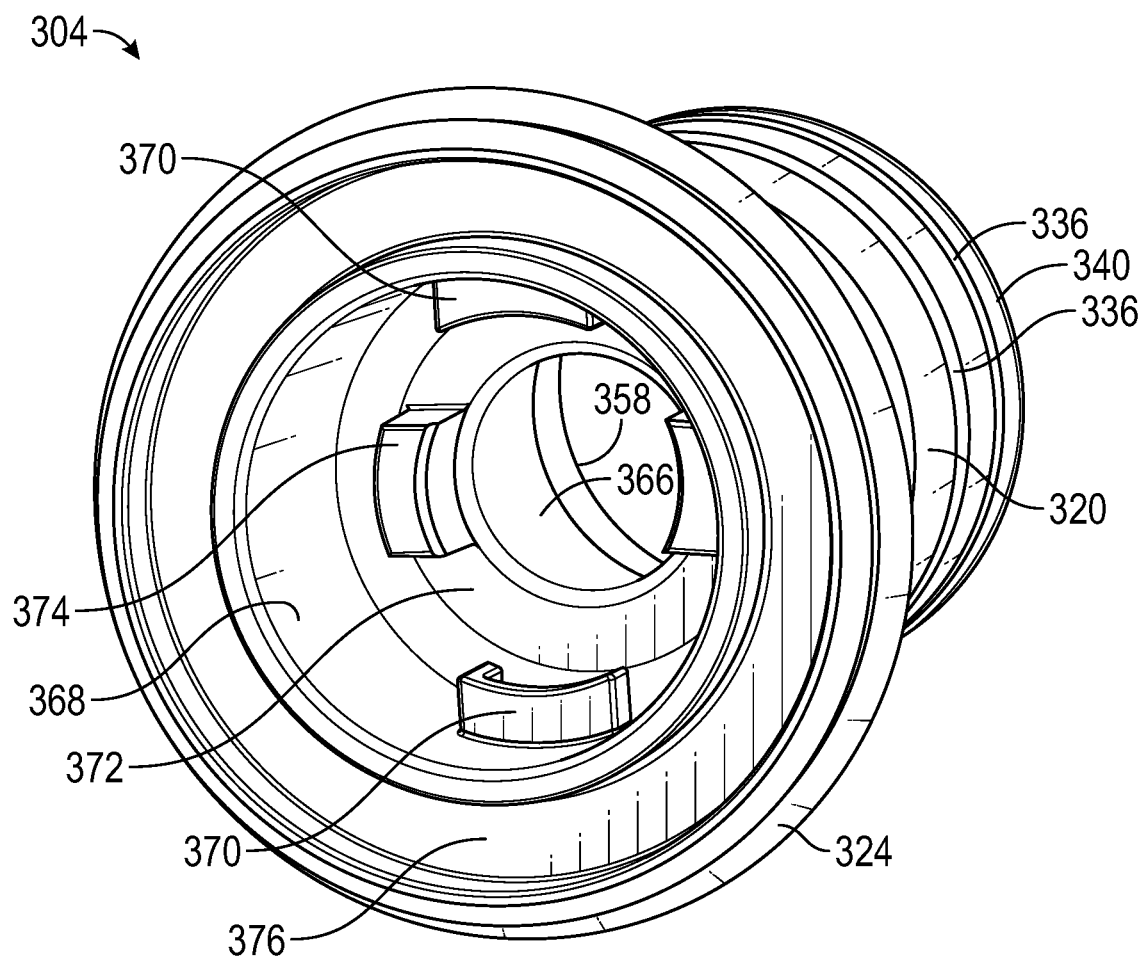
FIG. 13 is an isometric view of the jet body portion shown in FIG. 12.

FIGS. 5-19 show various views of straight back jet 300 and components thereof. FIG. 5 shows an exploded sectional view of jet 300. FIG. 5 depicts illustrative embodiments of jet back 302, jet body 304, and nozzle 308. FIG. 6 is a partially assembled isometric view of straight jet assembly 300 in which nozzle 308 is press fit into jet body 304. FIG. 7 depicts a fully assembled isometric view of straight jet 300. FIG. 8 is a sectional view of a fully assembled straight back jet assembly 300 and depicts how the components of straight jet assembly 300 fit together. FIG. 9 depicts an isometric view of jet back 302. FIG. 10 is a side isometric view of nozzle 308, and FIG. 11 is a rear isometric view of nozzle 308. FIG. 12 depicts nozzle 308 press fit into jet body 304 and the O-rings installed on jet body 304. FIG. 13 is a front isometric view of jet body 304. As discussed below, FIGS. 14-19 depict various views of alternate embodiments of jet body 304. Note that FIGS. 5-19 do not show a jet insert. However, as discussed in greater detail below, jet body 304 is configured to couple with one or more jet inserts (e.g., see jet insert 506 in FIG. 22).

As seen in FIG. 5, straight back jet assembly 300 includes jet back 302, nozzle 308, jet body 304, and may include a jet insert (not shown). Jet back 302 includes two parallel ingress ports: a water ingress port 310 and an air ingress port 312. Water ingress port 310 is larger than air ingress port 312 and is substantially centered on a longitudinal axis 314 of the jet back. Additionally, or alternatively, the water ingress port may be referred to as a water barb. Water ingress port 310 includes a lip or ridge 316 as can best be seen in FIGS. 6 and 7. Lip 316 may include any suitable structure configured to ensure a water tight seal between water ingress port 310 and a length of tubing (such as tubing 120). For example, lip 316 may include a sloped ridge as can best be seen in FIGS. 6 and 7. Air ingress port 312 is parallel to water ingress port 310 and is offset from the center of jet back 302. Additionally, or alternatively, the air ingress port may be referred to as an air barb. In some examples, air ingress port 312 may include a lip or other feature to ensure a seal. In some examples, an external portion of air ingress port 312 may be smooth, as can best be seen in FIGS. 6 and 7.

In the embodiment shown in FIGS. 5-9, jet back 302 is configured to couple with dual extrusion tubing having two parallel passages joined at a periphery (examples of dual extrusion tubing are discussed in more detail below). In some examples, jet back 302 may be configured to couple with any other suitable kind of tubing. For example, jet back 302 may be configured to couple with two separate lengths of tubing, one which carries air and one which carries water. In some examples, configuring jet back 302 to couple with different kinds of tubing may include changing the spacing between the air and water ingress ports and/or the dimensions for the air and water ingress ports.

Jet back 302 further includes a central portion 318 configured to create a water tight seal with jet body 304. Central portion 318 is in direct fluid communication with water ingress port 310 and air ingress port 312 and may include any suitable shape depending on the application and on the characteristics of the jet body. For example, central portion 318 may be substantially cylindrical as can best be seen in FIGS. 6, 7, and 9. In some examples, central portion 318 may be substantially rectangular or substantially triangular.

Jet body 304 includes an upstream portion 320 and a downstream portion 322. Upstream portion 320 may include any suitable structure configured to be at least partially disposed within central portion 318 of the jet back. For example, as can be best seen in FIGS. 6, 7, and 12, upstream portion 320 may be substantially cylindrical. In some examples, downstream portion 322 may have substantially the same cross-section as upstream portion 320. For example, downstream portion 322 may be substantially cylindrical as in FIGS. 6, 7, and 12. Downstream portion 322 may further include any suitable structure configured to engage with hot tub shell 104 and/or a jet insert 206. For example, downstream portion 322 may include a flange 324. Downstream portion 322 will be discussed in further detail below.

Jet back 302 includes an attachment mechanism extending from a first end 326 of central portion 318 and configured to attach the jet back to jet body 304 in a secure manner. The attachment mechanism may include any suitable structure depending on the characteristics of the jet body and the jet back. For example, a plurality of spring biased clips 328 may be configured to couple with a retaining feature, such as a groove 330, on jet body 304. In some examples, groove 330 may be formed as part of upstream portion 320 and/or may be disposed between upstream portion 320 and downstream portion 322. In the embodiment shown in FIGS. 5-9, jet back 302 includes four spring biased clips 328 (see, for example, FIG. 6). Spring biased clips 328 may include a resiliently flexible support 332 and a sloped lip 334 which is configured to engage with groove 330. Groove 330 may include any suitable structure and jet back 302 may include any suitable number and/or shape of spring biased clips 328 or other similar structures configured to couple with groove 330 in a complementary manner.

In some examples, the attachment mechanism may be configured to couple jet back 302 to jet body 304 while allowing jet back 302 to rotate relative to jet body 304. In other words, in some examples, jet back 302 may able to rotate about longitudinal axis 314 when coupled to jet body 304 while maintaining a water-tight and air-tight seal; this may allow a worker to prevent adjacent jet assemblies from interfering with each other, by rotating them as needed.

In addition to groove 330, jet body 304 includes recesses 336 configured to contain one or more O-rings 338. Recesses 336 may include any suitable structure for retaining O-rings 338 depending on the characteristics of the jet back, the jet body, and the O-rings. For example, recesses 336 may include narrow channels disposed on upstream portion 320, such as those shown, for example, in FIG. 13. In some examples, recesses 336 may be configured such that the outside edge of the O-ring is flush with or extends slightly beyond the surface of the upstream portion of the jet body as shown in FIGS. 5, 6, 8 and 12. Allowing the O-ring to extend slightly beyond the surface of the jet body may ensure a water tight seal by compressing the O-ring slightly between an inner surface of the central portion of the jet back and the bottom and sides of recesses 336. In some examples, jet body 304 includes two recesses 336 to accommodate two O-rings 338 as in FIGS. 5-8 and 12. In some examples, jet body 304 may include some other suitable number of O-rings disposed in a similar number of recesses.

As can be seen in FIG. 9, jet back 302 also includes a spacing mechanism configured to ensure sufficient space between a proximate end 340 of upstream portion 320 of jet body 304 and an inner wall 342 of jet back 302. The spacing mechanism may include any suitable structure depending on the characteristics of the jet body and the jet back. For example, a plurality of spacers 344 may be disposed on inner wall 342 and configured to prevent proximate end 340 of the jet body from becoming flush with inner wall 342. In some examples, spacers 344 may be rectangular blocks formed as an integral part of jet back 302. In the example shown in FIG. 5, jet back 302 includes four spacers 344. In some examples, jet back 302 may include any other suitable number of spacers 344, or a continuous spacer.

In the embodiment shown in FIGS. 5-12, nozzle 308 is formed as a separate piece from the jet back and the jet body and is configured to be press fit into the jet body. In this embodiment, nozzle 308 includes a main body 346 and a conical portion 348. Main body 346 may include any suitable structure depending on the characteristics of the jet body. For example, main body 346 may include a hollow, substantially cylindrical tube as best seen in FIGS. 10-11. Conical portion 348 may include any suitable structure depending on the application and the characteristics of the jet body and the jet back.

For example, conical portion 348 may taper from a larger, round first aperture 350 to a smaller, round second aperture 352 as seen in FIG. 11. In some examples, conical portion 348 may include a constant-diameter, annular flange 354 attached to first aperture 350. Nozzle 308 further includes support structures 356. Support structures 356 may include any suitable structure configured to connect conical portion 348 with main body 346, depending on the application and the characteristics of the main body and the conical portion of the nozzle. For example, support structures 356 may include a plurality of substantially rectangular support struts as can be seen in FIGS. 10-11. In some examples, nozzle 308 may include four support structures 356.

In this embodiment, nozzle 308 is configured to be press-fit into jet body 304. As shown in FIGS. 6 and 12, main body 346 is configured to fit at least partially within a main cavity 358 of jet body 304. For example, an outer diameter of main body 346 may be very close to the inner diameter of main cavity 358 to ensure a secure fit. In some examples, main body 346 may have a slight taper to create a wedge fit between nozzle 308 and main cavity 358. Main cavity 358 may be primarily disposed within upstream portion 320. As seen in FIG. 8, conical portion 348 is configured to fit within a recessed portion 360 of inner wall 342 when jet back 302 is coupled with jet body 304. Support structures 356 may be further configured to leave gaps 362 between the conical portion 348, main body 346, and support structures 356. When jet back 302 is coupled to jet body 304, water from water ingress port 310 may be passed through first aperture 350 and second aperture 352 while air from air ingress port 312 may be passed into an air chamber 364 and through gaps 362. The air and water may mix in main cavity 358 of the jet body and/or within the main body 346 of the nozzle before passing through a main aperture 366 of the jet body.

FIGS. 12 and 13 show isometric views of the jet body 304 of the current embodiment. Main aperture 366 connects main cavity 358 with a receiving chamber 368. Receiving chamber 368 is primarily disposed within downstream portion 322 and may include any suitable structure for receiving at least a portion of a jet insert. For example, receiving chamber 368 may include a substantially cylindrical cavity as shown in FIGS. 12 and 13. In some examples, receiving chamber 368 may include a rectangular and/or triangular cavity.

A plurality of hooks 370 are disposed inside of receiving chamber 368. Hooks 370 may include any suitable structure for engaging a jet insert. In the embodiment shown in FIG. 13, hooks 370 include an approximately U-shaped structure wherein one side is shorter than the other. In some examples, hooks 370 may include an approximately L-shaped structure. A jet insert having similarly shaped teeth may be inserted into the receiving cavity such that the hooks and teeth are offset and rotated until the hooks and teeth engage. Jet body 304 may include any suitable number of hooks 370. For example, the embodiment shown in FIG. 13 includes two hooks 370. In some examples, receiving chamber 368 may include other suitable structures for coupling to and suitably positioning a jet insert with respect to jet body 304.

A jet insert may include any suitable structure configured to pass a mixture of air and water to the interior of hot tub body 104. In some examples, some or all of the jet insert may be visible from the interior of hot tub body 104 and/or the jet insert may include decorative portions. In some examples, the jet insert may include any suitable structures configured to manipulate the speed, direction, and/or other properties of the stream of air and water. For example, the jet insert may include a flow director and/or a rotating nozzle.

Jet assembly 300 may include, or be compatible with, multiple versions of a jet insert. For example, a plurality of different jet inserts may be configured to couple with jet body 304. In other words, the same style of jet body may be installed in multiple places on a hot tub 100 and different styles of jet insert may be coupled to each jet body depending on the location within the hot tub and desired application. Different jet inserts may be chosen, for example, to provide different flow characteristics and/or for decorative reasons.

Additionally, or alternatively, jet assembly 300 may include, or be compatible with, multiple versions of jet body 304. For example, a plurality of different sizes and/or styles of jet body 304 may be configured to couple with a single style of jet back 302. Each version of jet body 304 may be configured to couple with one or more versions of the jet insert. In other words, a variety of styles of jet body may be installed in multiple places on a hot tub 100 and different styles of jet insert may be coupled to each jet body depending on the location within the hot tub and the features of the jet body. Different jet bodies may be used, for example, to provide different flow characteristics or to couple with different styles of jet inserts.

As discussed above, FIGS. 12-13 depict a first style of jet body 304. FIGS. 14-19 depict three other styles of jet body 304 indicated at 304a, 304b, and 304c respectively. With the exception of the diameter of downstream portion 322 and certain features of receiving chamber 368, jet bodies 304a, 304b, and 304c are substantially similar to jet body 304. Accordingly, similar features will be denoted with similar reference numbers and will not be discussed here. Features of receiving chamber 368, such as hooks 370, may differ between jet bodies 304, 304a, 304b, and 304c to best couple and position a suitable version of the jet insert within each jet body. Jet body 304 and the jet insert may include any suitable structures configured to couple the jet body and jet insert together. For example, jet body 304 and the jet insert may be coupled together using hooks, clips, threaded engagement, and/or any other suitable method. While jet bodies 304, 304*a*, 304*b* and 304*b* are described below as have particular dimensions, according to the present teachings, a jet body may have any suitable dimensions for a particular application In the embodiment depicted in FIGS. 12-13, downstream portion 322 of jet body 304 has a maximum diameter of approximately 1.9 inches. Jet body 304 includes additional protrusions 374 disposed on an inner wall 372 of receiving chamber 368. As shown in FIG. 13, jet body 304 includes two substantially rectangular protrusions 374. Protrusions 374 may be used as a spacing mechanism to ensure sufficient space between a proximate end of a jet insert and inner wall 372 of receiving chamber 368. Additionally, flange 324 on downstream portion 322 includes a channel 376.

Jet body 304*a* is shown in FIGS. 14-15 and includes a downstream portion 322 having a maximum diameter of approximately 2.7 inches. Jet body 304*a* includes two hooks 370. Jet body 304*a* further includes an annular flange 378 disposed adjacent main aperture 366 and two slots 380 disposed on flange 324. Annular flange 378 and slots 380 may be configured to facilitate coupling with and positioning a jet insert in conjunction with hooks 370.

FIGS. 16 and 17 show jet body 304*b*. Jet body 304*b* includes a downstream portion 322 having a maximum diameter of approximately 3.2 inches. Jet body 304*b* includes four hooks 370 and a flange 324. Flange 324 includes a channel 376 and four slots 380 disposed within channel 376.

Figure 19:
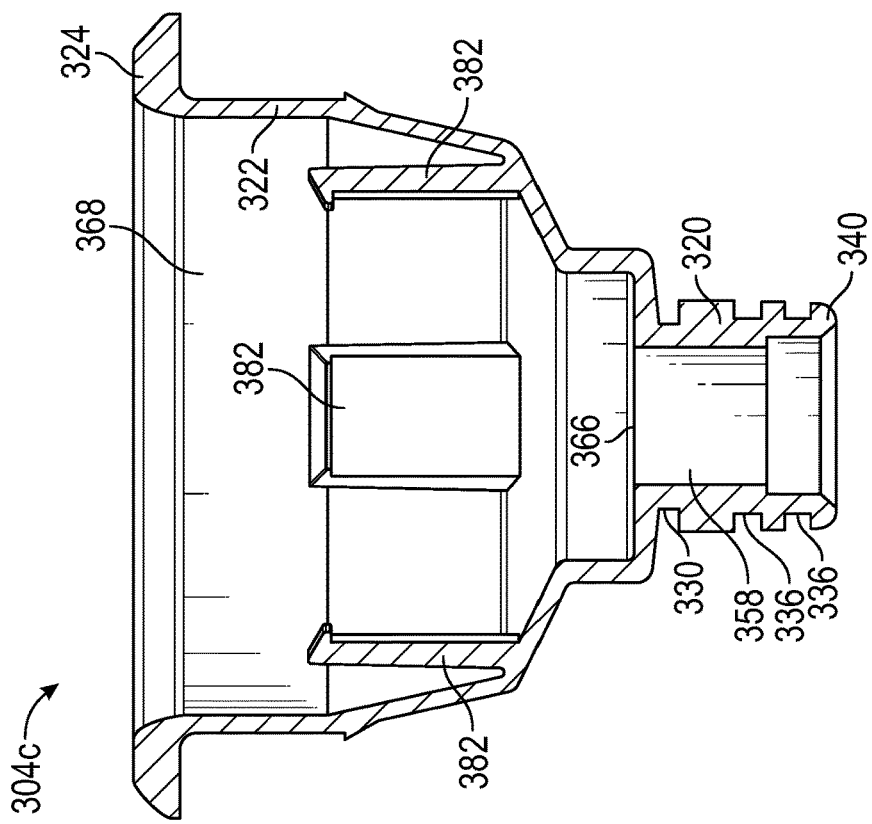
FIG. 19 is a sectional elevational view of the jet body of FIG. 18.
Figure 18:
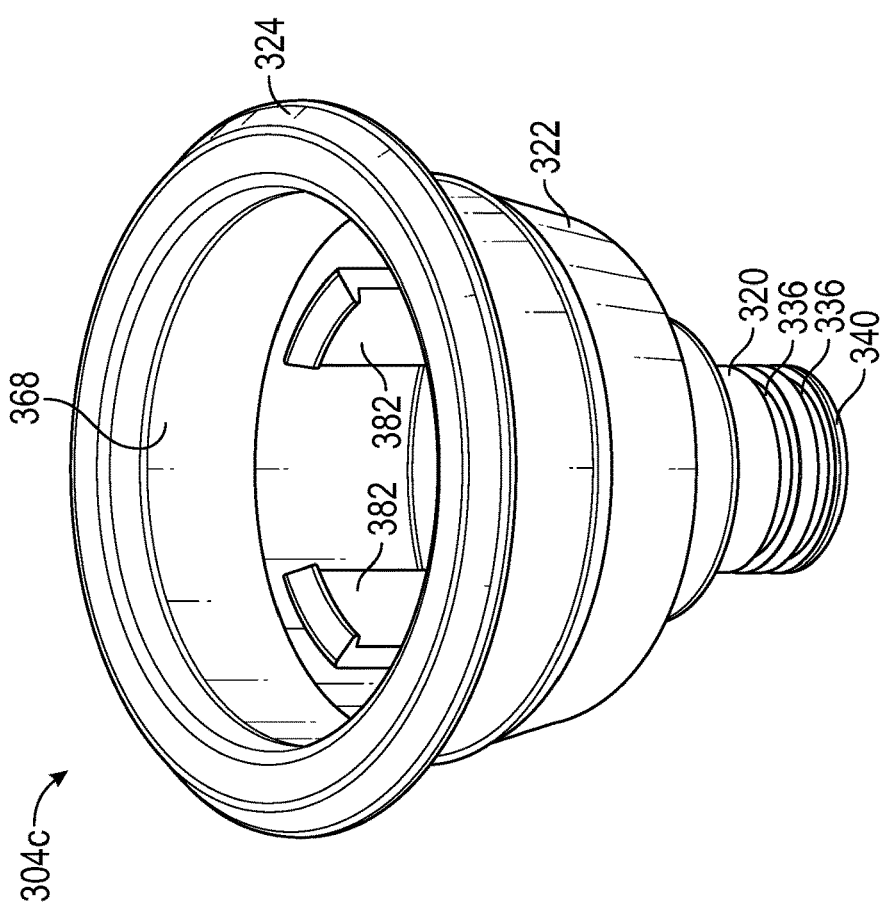
FIG. 18 is an isometric view of still another embodiment of a jet body that can be used as part of a jet assembly, according to aspects of the present teachings.

FIGS. 18 and 19 show jet body 304*c*. Jet body 304*c* includes a downstream portion 322 having a maximum diameter of approximately 4.5 inches. Jet body 304*c* includes a flange 324 and four spring biased clips 382 configured to engage with a suitable style of jet insert.

Each of jet body 304, jet body 304*a*, jet body 304*b*, and jet body 304*c* may be used and installed in hot tub shell 104 in substantially the same way or similar ways. Further, each style of jet body may couple with nozzle 308 and jet back 302 in a substantially similar way.

During installation, jet assembly 300 may be assembled in multiple steps and/or at multiple stations. A first assembly step may include press fitting nozzle 308 into main cavity 358 of jet body 304 (see FIG. 12) and coupling the air and water ingress ports of jet back 302 with tubing 120, which may be dual extrusion tubing. In some examples, press-fitting nozzle 308 into main cavity 358 may include using a lubricant (for example, soapy water). In some examples, press-fitting nozzle 308 into main cavity 358 may include the application of an adhesive and/or primer.

Coupling the air and water ingress ports of jet back 302 with tubing 120 may include any suitable process and/or structure. For example, tubing 120 may be slid over the ends of the air and water ingress ports of jet back 302 and a clamp (described in more detail below) may be used to prevent the tubing from sliding off. In some examples, a lubricant (e.g., soapy water) may be used to facilitate sliding the tubing over the ingress ports. In some examples, tubing 120 may include dual extrusion tubing. In some examples, tubing 120 may include separate air and water tubes which may be installed one at a time on the air and water ingress ports respectively.

Another step in assembling jet assembly 300 may include installing jet body 304 and a jet insert in hot tub shell 104. For example, jet body 304 (with nozzle 308) may be inserted into a hole formed in the shell of hot tub shell 104. Jet body 304 may be inserted from the interior of hot tub shell 104 and may be secured to hot tub shell 104 by any suitable mechanism configured to be water tight and secure. For example, jet body 304 may attach to hot tub shell 104 via threaded engagement, glue, press-fitting, and/or any other suitable attachment mechanism. In some examples, attaching jet body 304 to hot tub shell 104 may include threading the jet body into the hot tub shell and/or the use of a compressive gasket.

A jet insert may be coupled to jet body 304 from the interior of hot tub shell 104 after jet body 304 has been installed in hot tub shell 104. As discussed above, jet body 304 is configured to securely couple with and position a jet insert. In some examples, jet body 304 and/or the jet insert may be installed from the exterior of hot tub shell 104. In some examples, jet body 304 and the jet insert may couple together through a hole in the hot tub shell, thereby attaching both parts to the hot tub shell. In some cases, coupling the jet body and the jet insert together may partially or entirely fix the jet assembly in place relative to the hot tub shell.

The installation of jet assembly 300 further includes coupling jet back 302 (which is attached to tubing 120) to jet body 304 (which includes nozzle 308 and is attached to hot tub shell 104 and a jet insert). Jet back 302 may be coupled with jet body 304 by a "press-and-click" method (described above). For example, jet back 302 and jet body 304 may be aligned and then compressed together to overcome the resistive force of spring biased clips 328. In the embodiment shown in FIGS. 5-19, spring biased clips 328 are configured to flex outward, away from a default position (e.g., away from longitudinal axis 314), when sloped lip 334 slides over proximate end 340 of jet body 304 and along an external portion of upstream portion 320. Spring biased clips 328 are further configured to snap back into the default position (e.g., back towards longitudinal axis 314) when sloped lip 334 encounters groove 330 of jet body 304. Sloped lip 334 engages with groove 330 and prevents spring biased clips 328, and thus jet back 302, from sliding towards proximate end 340 and off of jet body 304. Thus, jet back 302 and jet body 304 are coupled together.

In some examples, jet back 302 and jet body 304 may be configured to be able to be unlocked and/or uncoupled. Uncoupling jet back 302 from jet body 304 may be accomplished by moving spring biased clips 328 away from jet body 304 (e.g., away from longitudinal axis 314) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake.

Each of the components of jet assembly 300 (e.g., jet back 302, jet body 304, a jet insert, and nozzle 308) may be constructed out of any suitable material. For example, the components of jet assembly 300 may include any suitable thermoplastic polymer such as polyvinyl chloride (PVC), acrylonitrile butadiene styrene (ABS), and/or any other suitable materials having similar properties (i.e., stiffness etc.). The components of jet assembly 300 may be manufactured using any suitable process. For example, the manufacturing process may include the use of injection molding, compression molding, and/or extrusion methods. In some examples, each component may be injection molded out of PVC.

Second Straight Back Embodiment

Figure 20:
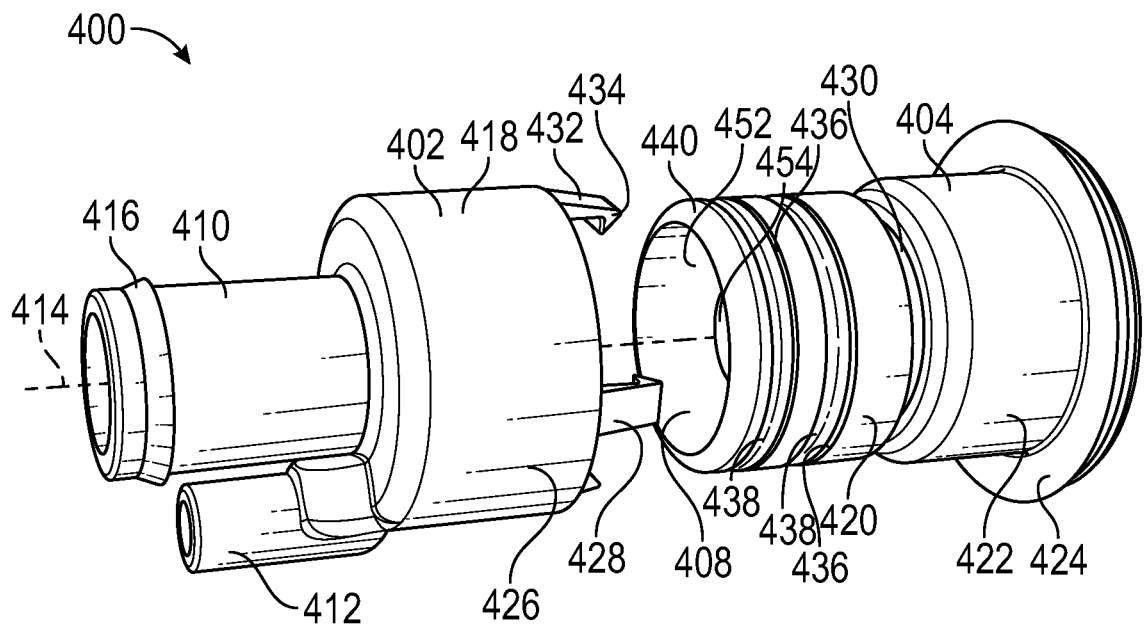
FIG. 20 is an exploded isometric view of another embodiment of a jet assembly, according to aspects of the present teachings.
Figure 21:
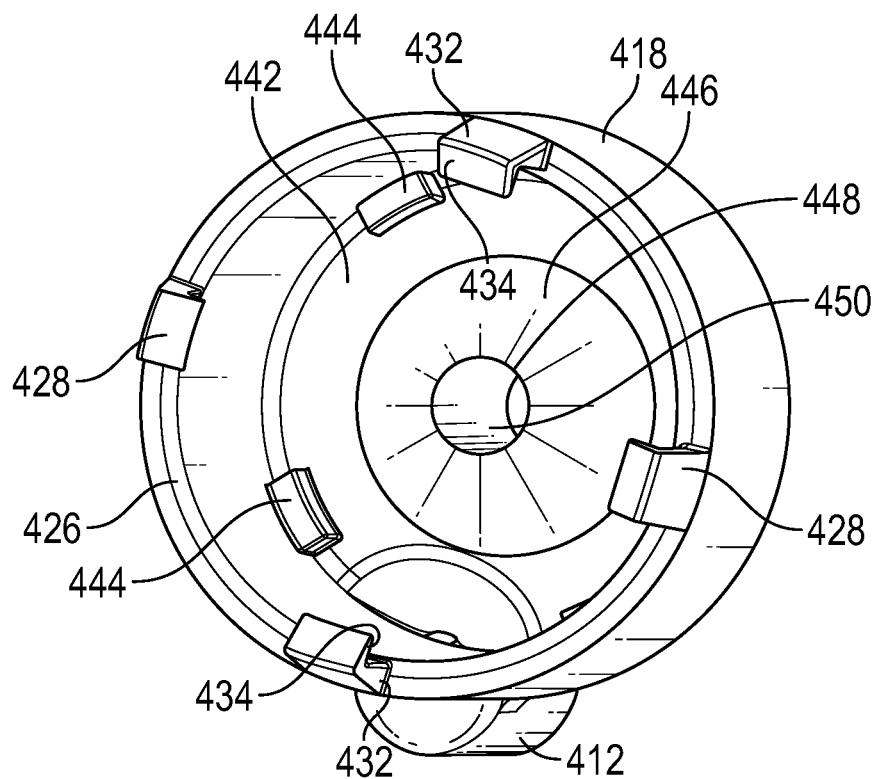
FIG. 21 is an isometric view of a jet back portion of the jet assembly of FIG. 20.

FIGS. 20-21 depict a second embodiment 400 of a general jet assembly 200, which also includes a straight back jet back. The second embodiment of jet assembly 200 is generally indicated at 400 and includes a jet back 402, a jet body 404, and also may include a jet insert (or jet face). A nozzle 408 includes a structure formed as an integral part of jet back 402. Additionally, or alternatively, jet back 402 may be referred to as a straight back jet back or a straight jet back. Jet back 402 is an example of jet back 202 described above, jet body 404 is an example of jet body 204 described above, and a suitable jet insert would be an example of jet insert 206 described above. Many of the features of second embodiment 400 of jet assembly 200 are the same as in first embodiment 300. Accordingly, similar components may be labeled with similar reference numbers and only an abbreviated discussion of such features will be provided here. The differences between the embodiments are described in detail below.

FIGS. 20-21 show various views of straight back jet 400 and components thereof. FIG. 20 depicts a partially exploded view of straight back jet assembly 400. FIG. 21 is a front view of jet back 402 of straight back jet assembly 400. Note that FIGS. 20-21 do not show a jet insert. However, as discussed, jet body 404 is configured to couple with a suitable jet insert, and various styles of jet insert may be compatible with jet body 404 and configured to provide desired ornamental and functional features.

As seen in FIG. 20, straight back jet assembly 400 includes jet back 402, nozzle 408, jet body 404, and a jet insert (not shown). As with jet 300, jet back 402 includes two parallel ingress ports: a water ingress port 410 and an air ingress port 412. Water ingress port 410 is substantially centered on a longitudinal axis 414 of the jet back and includes a lip or ridge 416 as can best be seen in FIG. 20. Air ingress port 412 is parallel to water ingress port 410 and is offset from the center of jet back 402.

In the embodiment shown in FIGS. 20-21, jet back 402—similar to jet back 302—is configured to couple with dual extrusion tubing having two parallel passages joined at a periphery (examples of dual extrusion tubing are discussed in more detail below). In some examples, jet back 402 may be configured to couple with any other suitable kind of tubing. Similar to jet back 302, jet back 402 further includes a central portion 418 configured to create a water tight seal with jet body 404. Central portion 418 is in direct fluid communication with water ingress port 410 and air ingress port 412 and may include any suitable shape depending on the application and on the characteristics of the jet body. In this embodiment, central portion 418 is substantially cylindrical as can best be seen in FIGS. 20 and 21.

As in the previous embodiment, jet body 404 includes an upstream portion 420 and a downstream portion 422 wherein the upstream portion is configured to be at least partially disposed within central portion 418 of jet back 402. Jet back 402 includes an attachment mechanism extending from a first end 426 of central portion 418 and configured to couple the jet back to jet body 404 in a secure manner. The attachment mechanism, like the attachment mechanism for jet 300, includes a plurality of spring biased clips 428 which are configured to couple with a retaining feature, such as a groove 430, on jet body 404. In the embodiment shown in FIGS. 20-21, jet back 402 includes four spring biased clips 428 (as best seen in FIG. 21). In some examples, spring biased clips 428 may include a resiliently flexible support 432 and a sloped lip 434 which is configured to engage with groove 430.

In some examples, the attachment mechanism may be configured to couple jet back 402 to jet body 404 while allowing jet back 402 to rotate relative to jet body 404. In other words, in some examples, jet back 402 may able to rotate about longitudinal axis 414 when coupled to jet body 404 while maintaining a water- and air-tight seal; this may allow a worker to prevent adjacent jet assemblies from interfering with each other.

Similar to jet body 304, jet body 404 includes two recesses 436 disposed on upstream portion 420 and configured to contain one or more O-rings 438, such as those shown in FIG. 20. Recesses 436 may be configured such that the outside edge of the O-ring is flush with or extends slightly beyond the surface of the upstream portion of the jet body as shown in FIG. 20. As best seen in FIG. 21, jet back 402 also includes a spacing mechanism configured to ensure sufficient space between a proximate end 440 of upstream portion 420 of jet body 404 and an inner wall 442 of jet back 402. In the example shown in FIG. 21, jet back 402 includes four spacers 444 disposed on inner wall 442 and formed as an integral part of jet back 402.

In the embodiment shown in FIGS. 20-21, nozzle 408 is a structure formed as an integral part of jet back 402. Nozzle 408 may include any suitable structure formed as part of jet back 402 and configured to change the direction and/or speed of the stream of water. As can best be seen in FIG. 21, inner wall 442 of jet back 402 includes a conical portion 446 narrowing to a first aperture 448. Water ingress port 410 extends from a substantially cylindrical portion to a conical cavity 450 which tapers to first aperture 448. In some examples, conical cavity 450 may be similar in shape to conical portion 348 of nozzle 308.

Upstream portion 420 of jet body 404 includes a conical chamber 452. Conical chamber 452 may be shaped to receive nozzle 408 of jet back 402. In some examples, the shape of conical chamber 452 of jet body 404 may be substantially complementary to the shape of conical portion 446. In some examples, the shape of conical chamber 452 may not be complementary to the shape of conical portion 446. For example, conical chamber 452 may be significantly wider than conical portion 446 and may have a height that is equal to or greater than the height of conical portion 446. A difference in size and shape between conical chamber 452 and conical portion 446 may be used to ensure that there is a space between conical portion 446 and conical chamber 452. In the embodiment shown in FIGS. 20-21, spacers 444 are also included to ensure that there is space between conical portion 446 and conical chamber 452.

In use, water passes through water ingress port 410, through conical cavity 450 and first aperture 448, and into the space between conical portion 446 and conical chamber 452. Air ingress port 412 leads to the space between conical portion 446 and conical chamber 452. The streams of air and water may merge in the space between conical portion 446 and conical chamber 452 and/or in conical chamber 452 before passing through second aperture 454. Second aperture 454 connects conical chamber 452 with a receiving chamber.

The receiving chamber in jet body 404 is functionally substantially the same as receiving chamber 368 in jet body 304 and may be primarily disposed within downstream portion 422. In this embodiment, the receiving chamber in jet body 404 includes a substantially cylindrical cavity. Similar to the first style of jet body 304, jet body 404 further includes substantially rectangular protrusions disposed on an inner wall 460 of receiving chamber 456. The protrusions may be used as a spacing mechanism to ensure sufficient space between a proximate end of the jet insert and the inner wall of the receiving chamber. Two hooks may be disposed inside of the receiving chamber. As in jet body 304, the hooks may include an approximately U-shaped structure wherein one side is shorter than the other. This structure facilitates coupling with a jet insert. In some examples, jet body 404 may include any suitable number of hooks, which may include any suitable structure for engaging the jet insert.

As discussed with respect to jet assembly 300, jet assembly 400 may include one or more versions of a jet insert, and a jet body 404. For example, one or more different sizes and/or styles of jet body 404 may be configured to couple with a single style of jet back 402 and each of the one or more versions of jet body 404 may be configured to couple with one or more version of a jet insert. In other words, a variety of styles of jet body may be installed in multiple places on a hot tub 100 and different styles of jet insert may be coupled to each jet body depending on the location within the hot tub and the features of the jet body. In some examples, jet assembly 400 may include only one version of jet body 404 and/or only one version of a jet insert.

Only one size of jet body 404 is shown in the drawings. In the size of jet body 404 depicted in FIG. 20, the maximum diameter of downstream portion 422 is approximately 2.0 inches. Additionally, downstream portion 422 includes a flange 424 and a channel disposed on flange 424.

In other sizes of jet body 404, downstream portion 422 of jet body 404 may include any suitable maximum diameter. For example, the maximum diameter of downstream portion 422 may be between approximately 1.0 inches and approximately 5.0 inches. In some examples, four sizes of jet body may be used having maximum diameters of approximately 2.0 inches, approximately 3.0 inches, approximately 4.0 inches, and approximately 5.0 inches respectively. With the exception of the diameter of downstream portion 422 and certain features of the receiving chamber, each size of jet body 404 may be substantially identical. Features of the receiving chamber, such as the hooks, may differ between versions of jet body 404 to best couple and position a suitable version of the jet insert within each jet body. Each size of jet body 404 may be used and installed in hot tub body 104 in substantially the same way. Further, each style of jet body couples with jet back 402 in a substantially identical way.

During installation, jet assembly 400 may be assembled in multiple steps or at multiple stations. A first step may include coupling the air and water ingress ports of jet back 402 with tubing 120. Coupling the air and water ingress ports of jet back 402 with tubing 120 may include any suitable process and/or structure. For example, tubing 120 may be slid over the ends of the air and water ingress ports of jet back 402 and a clamp (described in more detail below) may be used to prevent the tubing from sliding off. In some examples, a lubricant (e.g., soapy water) may be used to facilitate sliding the tubing over the ingress ports. In some examples, tubing 120 may include dual extrusion tubing. In some examples, tubing 120 may include separate air and water tubes which may be installed one at a time on the air and water ingress ports respectively.

Another step in assembling jet assembly 400 may include installing jet body 404 and a jet insert on hot tub shell 104. For example, jet body 404 may be inserted into a hole formed in the shell of hot tub shell 104. Jet body 404 may be inserted from the interior of hot tub shell 104 and may be secured to hot tub shell 104 by any suitable mechanism configured to be water tight and secure. For example, jet body 404 may attach to hot tub shell 104 via threaded engagement, glue, press-fitting, and/or any other suitable attachment mechanism. In some examples, attaching jet body 404 may include threading the jet body into the hot tub body and/or the use of a compressive gasket. A jet insert may be coupled to jet body 404 from the interior of hot tub shell 104 after jet body 404 has been installed in hot tub shell 104. As discussed above, jet body 404 is configured to securely couple with and position a jet insert. In some examples, jet body 404 and/or a jet insert may be installed from the exterior of hot tub shell 104. In some examples, jet body 404 and a jet insert may couple together through a hole in the hot tub shell, thereby attaching both parts to the hot tub shell.

Completing the installation of jet assembly 400 may include coupling jet back 402 (which is attached to tubing 120) to jet body 404 (which is attached to hot tub shell 104). Jet back 402 may be coupled with jet body 404 by a "press-and-click" method (described above). For example, jet back 402 and jet body 404 may be aligned and then compressed together to overcome the resistive force of spring biased clips 428. In the embodiment shown in FIGS. 20-21, spring biased clips 428 are configured to flex outward, away from a default position (e.g., away from longitudinal axis 414), when sloped lip 434 slides over proximate end 440 of jet body 404 and along an external portion of upstream portion 420. Spring biased clips 428 are further configured to snap back into the default position (e.g., back towards longitudinal axis 414) when sloped lip 434 encounters groove 430 of jet body 404. Sloped lip 434 prevents spring biased clips 428, and thus jet back 402, from sliding towards proximate end 440 and off of jet body 404. Thus, jet back 402 and jet body 404 are coupled together.

In some examples, jet back 402 and jet body 404 may be configured to be able to be unlocked and/or uncoupled. Uncoupling jet back 402 from jet body 404 may be accomplished by moving spring biased clips 428 away from jet body 404 (e.g., away from longitudinal axis 414) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake.

Each of the components of jet assembly 400 (e.g., jet back 402, jet body 404, and a jet insert) may be constructed out of any suitable material. For example, the components of jet assembly 400 may include any suitable thermoplastic polymer such as polyvinyl chloride (PVC), acrylonitrile butadiene styrene (ABS), and/or any other suitable materials having similar properties (i.e., stiffness etc.). The components of jet assembly 400 may be manufactured using any suitable process. For example, the manufacturing process may include the use of injection molding, compression molding, and/or extrusion methods. In some examples, each component may be injection molded out of PVC.

Third Straight Back Embodiment

Figure 22:
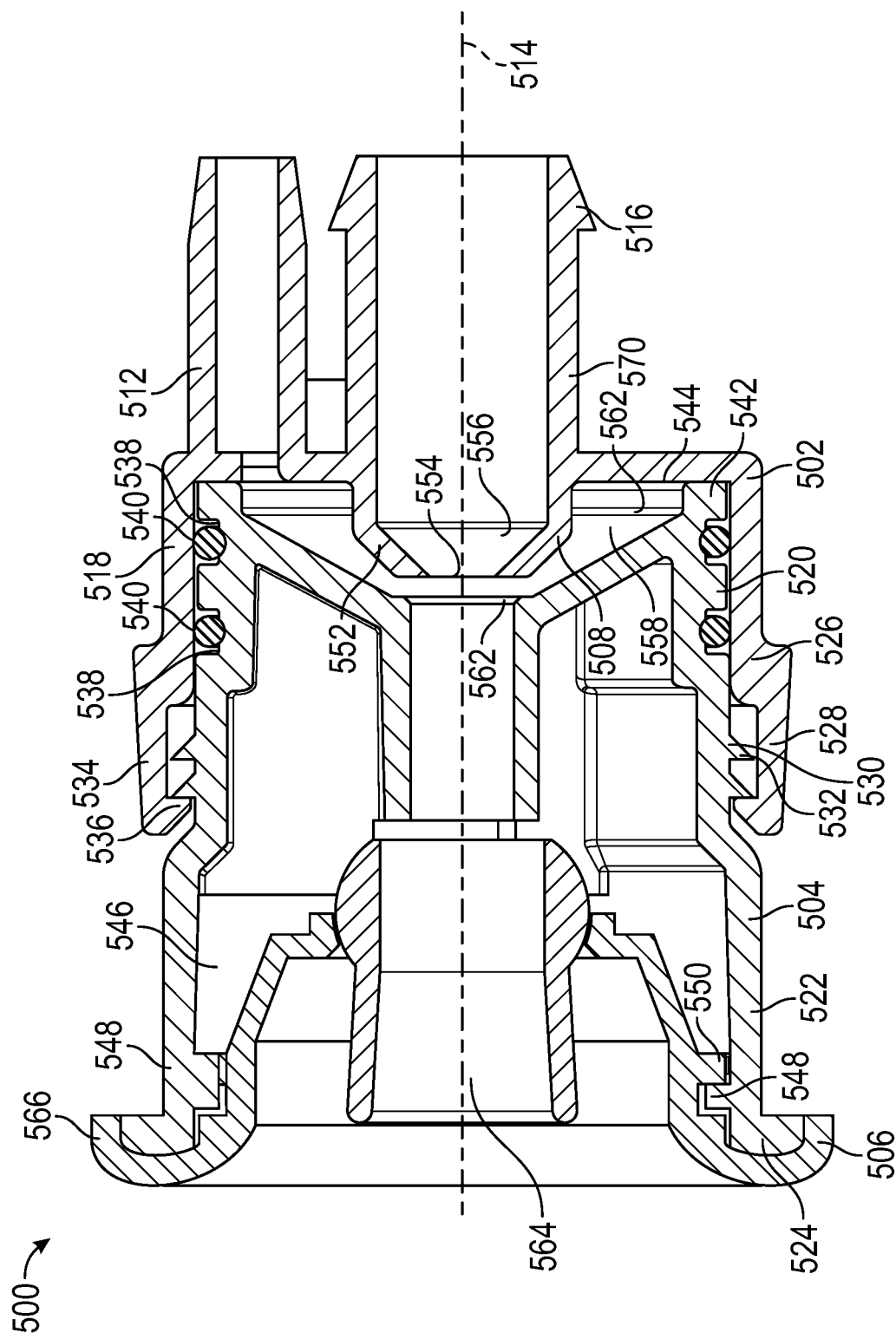
FIG. 22 is a sectional view of yet another embodiment of a jet assembly, according to aspects of the present teachings.

FIG. 22 depicts a third embodiment 500 of straight back jet assembly 200, which also includes a straight back jet back. The third embodiment of jet assembly 200 is generally indicated at 500 and includes a jet back 502, a jet body 504, and a jet insert (or jet face) 506. A nozzle 508 includes a structure formed as an integral part of jet back 502. Additionally, or alternatively, jet back 502 may be referred to as a straight back jet back or a straight jet back. Jet back 502 is an example of jet back 202 described above, jet body 504 is an example of jet body 204 described above, and jet insert 506 is an example of jet insert 206 described above. Many of the features of third embodiment 500 of jet assembly 200 are the same as in first embodiment 300. Accordingly, similar components may be labeled with similar reference numbers and only an abbreviated discussion of such features will be provided here. The differences between the embodiments are described in detail below.

FIG. 22 depicts a sectional view of straight back jet assembly 500, which includes straight back jet back 502, jet body 504, and jet insert 506. As with jets 300 and jets 400, jet back 502 includes two parallel ingress ports: a water ingress port 510 and an air ingress port 512. Water ingress port 510 is substantially centered on a longitudinal axis 514 of the jet back and includes a lip or ridge 516. Air ingress port 512 is parallel to water ingress port 510 and is offset from the center of jet back 502.

In the embodiment shown in FIG. 22, jet back 502—similar to jet backs 302 and 402—is configured to couple with dual extrusion tubing having two parallel passages joined at a periphery (examples of dual extrusion tubing are discussed in more detail below). In some examples, jet back 502 may be configured to couple with any other suitable kind of tubing. Similar to jet backs 302 and 402, jet back 502 further includes a central portion 518 configured to create a water tight seal with jet body 504. Central portion 518 is in direct fluid communication with water ingress port 510 and air ingress port 512 and may include any suitable shape depending on the application and on the characteristics of the jet body. For example, central portion 518 may be substantially cylindrical as can be seen in FIG. 22.

As in the previous embodiments, jet body 504 includes an upstream portion 520 and a downstream portion 522 wherein the upstream portion is configured to be at least partially disposed within central portion 518 of jet back 502. Jet back 502 includes an attachment mechanism extending from a first end 526 of central portion 518 and configured to attach the jet back to jet body 504 in a secure manner. The attachment mechanism, like the attachment mechanism for jet 300 and jet 400, may include a plurality of spring biased clips 528 which are configured to couple with a retaining feature on the jet body (e.g., grooves 330 and 430 in jets 300 and 400 respectively). In some examples, spring biased clips 528 may include a resiliently flexible support 534 and a sloped lip 536 which is configured to couple with the retaining feature. In contrast with straight jets 300 and 400, the retaining feature on jet body 504 takes the form of a ridge 530. In some examples, multiple ridges 530 may be used, forming an adjustable retainer 532. Ridges 530 may be disposed on any suitable portion of jet body 504, for example, on upstream portion 520.

In some examples, the attachment mechanism may be configured to couple jet back 502 to jet body 504 while allowing jet back 502 to rotate relative to jet body 504. In other words, in some examples, jet back 502 may able to rotate about longitudinal axis 514 when coupled to jet body 504 while maintaining a water- and air-tight seal; this may allow a worker to prevent adjacent jet assemblies from interfering with each other.

Similar to jet bodies 304 and 404, jet body 504 includes two recesses 538 configured to contain one or more O-rings 540, such as those shown in FIG. 22. Recesses 538 may be configured such that the outside edge of the O-ring is flush with or extends slightly beyond the surface of the upstream portion of the jet body. Unlike jet backs 302 and 402, jet back 502 does not include a spacing mechanism to create space between a proximate end 542 of upstream portion 520 of jet body 504 and an inner wall 544 of jet back 502. Instead, when jet assembly 500 is assembled, proximate end 542 of the jet body is flush with inner wall 544.

Nozzle 508 may include any suitable structure configured to change the direction and/or speed of the stream of water. In the embodiment of straight jet 500 shown in FIG. 22, as in straight jet 400, nozzle 508 is a structure formed as an integral part of jet back 502 and jet body 504 is shaped to receive the conical portion of jet back 502. Conical portion 552, first aperture 554, conical cavity 556, conical chamber 558, and second aperture 562 of straight jet 500 are substantially the same as the corresponding features of straight jet 400. As can be seen in FIG. 22, inner wall 544 of jet back 502 includes a substantially conical portion 552 narrowing to a first aperture 554. As in jet 400, water ingress port 510 extends from a substantially cylindrical portion to a conical cavity 556 which tapers to first aperture 554.

Upstream portion 520 of jet body 504, like upstream portion 520 of jet body 404, includes a conical chamber 558 shaped to receive nozzle 508 of jet back 502. In some examples, the shape of conical chamber 558 of jet body 504 may be substantially complementary to the shape of conical portion 552. In some examples, the shape of conical chamber 558 may not be complementary to the shape of conical portion 552. For example, conical chamber 558 may be significantly wider than conical portion 552 and may have a height that is equal to or greater than the height of conical portion 552. A difference in size and shape between conical chamber 558 and conical portion 552 may be used to ensure that there is a space 562 between conical portion 552 and conical chamber 558 even when proximate end 542 of the jet body is flush with inner wall 544.

In use, water passes through water ingress port 510, through conical cavity 556 and first aperture 554, and into space 562 between conical portion 552 and conical chamber 558. Air ingress port 512 also leads to space 562. The streams of air and water may merge in space 562 between conical portion 552 and conical chamber 558 and/or in conical chamber 558 before passing through a second aperture 562. Second aperture 562 connects conical chamber 558 with receiving chamber 546.

FIG. 22 shows the jet body of the current embodiment. Second aperture 562 connects conical chamber 558 with receiving chamber 546. Receiving chamber 546 in jet body 504 is substantially the same as the receiving chamber in jet bodies 304 and 404 and may be primarily disposed within downstream portion 522. In this embodiment, receiving chamber 546 includes a substantially cylindrical cavity as shown in FIG. 22. Similar to the first style of jet body 304, jet body 504 further includes two hooks 548 disposed inside of receiving chamber 546 which facilitate coupling with jet insert 506. In some examples, jet body 504 may include any suitable number of hooks 548, which may include any suitable structure for engaging jet insert 506.

A jet insert 506 is also shown in FIG. 22. Jet insert 506 may include teeth 550 configured to engage with hooks 548. For example, to couple jet insert 506 to jet body 504, jet insert 506 may be inserted into the receiving cavity such that hooks 548 and teeth 550 are offset and rotated until the hooks and teeth engage. In some examples, jet insert 506 may include any suitable number of teeth 550.

Jet insert 506 may include any suitable structure configured to pass the mixture of air and water to the interior of hot tub shell 104 and/or to manipulate the speed, direction, and/or other properties of the stream of air and water. For example, jet insert 506 includes a flow director 564. Flow director 564 may be visible to a user from inside hot tub shell 104. Flow director 564 may include any suitable structure configured to manipulate the speed and direction of the stream of air and water depending on the application and the characteristics of jet body 504, hot tub shell 104, and jet insert 506. For example, flow director 564 may include a substantially cylindrical portion. In some examples, jet insert 506 and/or flow director 564 may include decorative portions and/or may include any suitable structures and/or shapes to match an aesthetic.

As discussed with respect to jet assembly 300 and 400, jet assembly 500 may include, or be compatible with, one or more versions of jet insert 506 and jet body 404. For example, one or more different sizes and/or styles of jet body 504 may be configured to couple with a single style of jet back 502 and each of the one or more versions of jet body 504 may be configured to couple with one or more versions of jet insert 506. In other words, a variety of styles of jet body may be installed in multiple places on a hot tub 100 and different styles of jet insert may be coupled to each jet body depending on the location within the hot tub and the features of the jet body. In some examples, jet assembly 500 may include only one version of jet body 504 and/or only one version of jet insert 506.

Only one size of jet body 504 is shown in the drawings. In the size of jet body 504 depicted in FIG. 22, the maximum diameter of downstream portion 522 is approximately 2.0 inches. Additionally, downstream portion 522 includes a flange 524 and jet insert 506 includes a curved flange 566 which overlaps with flange 524. In other sizes of jet body 504, downstream portion 522 of jet body 504 may include any suitable maximum diameter. For example, the maximum diameter of downstream portion 522 may be between approximately 1.0 inches and approximately 5.0 inches. In some examples, four sizes of jet body may be used having maximum diameters of approximately 2.0 inches, approximately 3.0 inches, approximately 4.0 inches, and approximately 5.0 inches respectively.

With the exception of the diameter of downstream portion and certain feature of receiving chamber 546, each size of jet body 504 may be substantially identical. Feature of receiving chamber 546, such as hooks 548, may differ between versions of jet body 504 to best couple and position a suitable version of jet insert 506 within each jet body. Each size of jet body 504 may be used and installed in hot tub shell 104 in substantially the same way. Further, each style of jet body couples with jet back 502 in a substantially identical way.

During installation, jet assembly 500 may be assembled in multiple steps or at multiple stations. A first step may include coupling the air and water ingress ports of jet back 502 with tubing 120. Coupling the air and water ingress ports of jet back 502 with tubing 120 may include any suitable process and/or structure. For example, tubing 120 may be slid over the ends of the air and water ingress ports of jet back 502 and a clamp (described in more detail below) may be used to prevent the tubing from sliding off. In some examples, a lubricant (e.g., soapy water) may be used to facilitate sliding the tubing over the ingress ports. In some examples, tubing 120 may include dual extrusion tubing. In some examples, tubing 120 may include separate air and water tubes which may be installed one at a time on the air and water ingress ports respectively.

Another step in installing jet assembly 500 may include installing jet body 504 and jet insert 506 on hot tub shell 104. For example, jet body 504 may be inserted into a hole formed in the shell of hot tub shell 104. Jet body 504 is inserted from the interior of hot tub shell 104 and may be secured to hot tub shell 104 by any suitable mechanism configured to be water tight and secure. For example, jet body 504 may attach to hot tub shell 104 via threaded engagement, glue, press-fitting, and/or any other suitable attachment mechanism. In some examples, attaching jet body 504 may include threading the jet body into the hot tub body and/or the use of a compressive gasket. Jet insert 506 may be coupled to jet body 504 from the interior of hot tub shell 104 after jet body 504 has been installed in hot tub shell 104. As discussed above, jet body 504 is configured to securely couple with and position jet insert 506.

A further step in the installation of jet assembly 500 may include coupling jet back 502 (which may already be attached to tubing 120) to jet body 504 (which may already be attached to hot tub shell 104). Jet back 502 may be coupled with jet body 504 by a "press-and-click" method (described above). For example, jet back 502 and jet body 504 may be aligned and then compressed together to overcome the resistive force of spring biased clips 528. In the embodiment shown in FIG. 22, spring biased clips 528 are configured to flex outward, away from a default position (e.g., away from longitudinal axis 514), when sloped lip 536 slides over a leading edge of a first one of ridges 530 on jet body 504. Spring biased clips 528 are further configured to snap back into the default position (e.g., back towards longitudinal axis 514) when sloped lip 536 passes the first one of ridges 530 on jet body 504. If jet back 502 and jet body 504 continue to be compressed together, spring biased clips 528 may similarly snap over a second one of ridges 530 on jet body 504. Once past at least one of ridges 530, sloped lip 536 engages with at least one of ridges 530 and prevents spring biased clips 528, and thus jet back 502, from sliding towards proximate end 542 and off of jet 502. Thus, jet back 502 and jet body 504 are coupled together. Using multiple ridges 530 to form adjustable retainer 532 may, among other advantages, allow a worker to control how tightly the jet back and the jet body are coupled.

In some examples, jet back 502 and jet body 504 may be configured to be able to be unlocked and/or uncoupled. Uncoupling jet back 502 from jet body 504 may be accomplished by moving spring biased clips 528 away from jet body 504 (e.g., away from longitudinal axis 514) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake, or to replace a defective or broken jet back.

Each of the components of jet assembly 500 (e.g., jet back 502, jet body 504, and jet insert 506) may be constructed out of any suitable material. For example, the components of jet assembly 500 may include any suitable thermoplastic polymer such as polyvinyl chloride (PVC), acrylonitrile butadiene styrene (ABS), and/or any other suitable materials having similar properties (i.e., stiffness etc.). The components of jet assembly 500 may be manufactured using any suitable process. For example, the manufacturing process may include the use of injection molding, compression molding, and/or extrusion methods. In some examples, each component may be injection molded out of PVC.

Angled Back Jet Back Overview

In some situations, a jet assembly 200 may be disposed in a region of hot tub 100 where the space between hot tub shell 104 and hot tub frame 102 is too small to allow a straight back jet back (such as jet backs 302, 402, or 502) to fit between hot tub shell 104 and hot tub frame 102 while coupled to jet body 204 and tubing 120. For example, if the distance between hot tub shell 104 and hot tub frame 102 is too small, tubing 120 may be forced to bend sharply immediately past the ends of the air and water ingress ports; this may compromise the integrity of the plumbing system by damaging the seal between tubing 120 and jet back 202, damaging tubing 120, and/or impeding the flow of water and/or air through tubing 120 and jet back 202. In some examples, there may not be space for a straight back jet back to couple to jet body 204 even when not coupled to tubing 120.

To avoid this issue, the present disclosure teaches embodiments of jet back 202 which include a water ingress port and an air ingress port which are oriented at an angle with respect to the longitudinal axis of the jet back. Such an angled jet back may extend out from hot tub shell a shorter distance when coupled to a jet body than a straight back jet back (such as jet backs 302, 402, and 502 described above) and therefore may fit in areas of hot tub 100 where a straight jet back might not, for example, in places where there is a small distance between hot tub shell 104 and hot tub frame 102. Additionally, or alternatively, the angled jet back may allow tubing 120 to extend in a direction substantially parallel to hot tub shell 104 and/or may avoid forcing tubing 120 to bend at a sharp angle after extending past the jet back.

Possible disadvantages to the use of an angled back jet back can include increased levels of noise produced by the jet and increased resistance to the flow of water through the jet back. Using angled back jet backs can also clutter the area right next to the hot tub shell, since the first few inches of tubing are positioned right next to hot tub shell 104 instead of immediately extending away from the hot tub shell. This clutter can be an issue in areas where there are many jets as it may obscure uncoupled jet bodies and/or increase the likelihood of mistakes. Using a combination of straight back and angled back jet backs can substantially avoid the issues associated with both types of jet backs. Using straight back jet backs such as jet backs 302, 402, or 502 in most instances avoids crowding and noise issues. Using angled back jet backs in areas with little space between hot tub shell 104 and hot tub frame 102 avoids spacing issues. Selective use of angled back jet backs may limit the extra noise produced while allowing the jet back to fit in smaller spaces.

As shown in FIGS. 23-30, this section describes three embodiments of an angled back jet assembly. Additionally, or alternatively, an angled back jet assembly may be referred to as an angled back jet, an angled jet, an angled jet assembly, and/or a jet. When only the word jet (or the phrase jet assembly) is used, the context indicates whether a straight back jet assembly or an angled back jet assembly is meant. The angled jets described below are substantially similar to the straight back jets described above, except that the water ingress port and the air ingress port of the jet back are oriented at an angle (for example, 90 degrees) with respect to a central portion of the jet back. While this section includes a description of three possible embodiments of an angled back jet assembly, a person of ordinary skill in the art will recognize that other embodiments or variations are possible.

First Angled Back Embodiment

FIGS. 23 through 27 depict a fourth embodiment 600 of jet assembly 200, which includes an angled back jet back. The fourth embodiment of jet assembly 200 is generally indicated at 600 and includes an angled jet back 602, a jet body 604, and a nozzle 608. In some cases, jet assembly 600 also may include a jet insert (not shown). Additionally, or alternatively, jet assembly 600 may be referred to as a jet, a jet assembly, an angled jet, an angled jet assembly, an angled back jet, and/or an angled back jet assembly. Additionally, or alternatively, jet back 602 may be referred to as an angled back jet back or an angled jet back.

Jet back 602 is an example of jet back 202 generally described above, jet body 604 is an example of jet body 204 generally described above, and a suitable jet insert is an example of jet insert 206 generally described above. Jet body 604 and nozzle 608 of angled jet 600 are substantially similar to jet body 304 and nozzle 308, respectively, of jet 300. Accordingly, similar components and/or features may be labeled with similar reference numbers and only an abbreviated discussion of such features will be provided here. Duplicate drawings are not provided for components which are substantially identical to other embodiments of jet assembly 200.

The primary difference between angled jet assembly 600 and straight back jet assembly 300 is the shape of angled jet back 602 compared with jet back 302. Whereas jet back 302 includes air and water ingress ports which are parallel to a longitudinal axis of the jet back, angled jet back 602 includes air and water ingress ports which are not parallel to a longitudinal axis of the jet back. Accordingly, some of the components and features of angled jet assembly 600 are substantially similar to or the same as some of the components and features of straight jet assembly 300. Accordingly, similar components may be labeled with similar reference numbers and only an abbreviated discussion of such features will be provided here. The differences between the embodiments are described in detail below and new features will be given new reference numbers.

Figure 23:
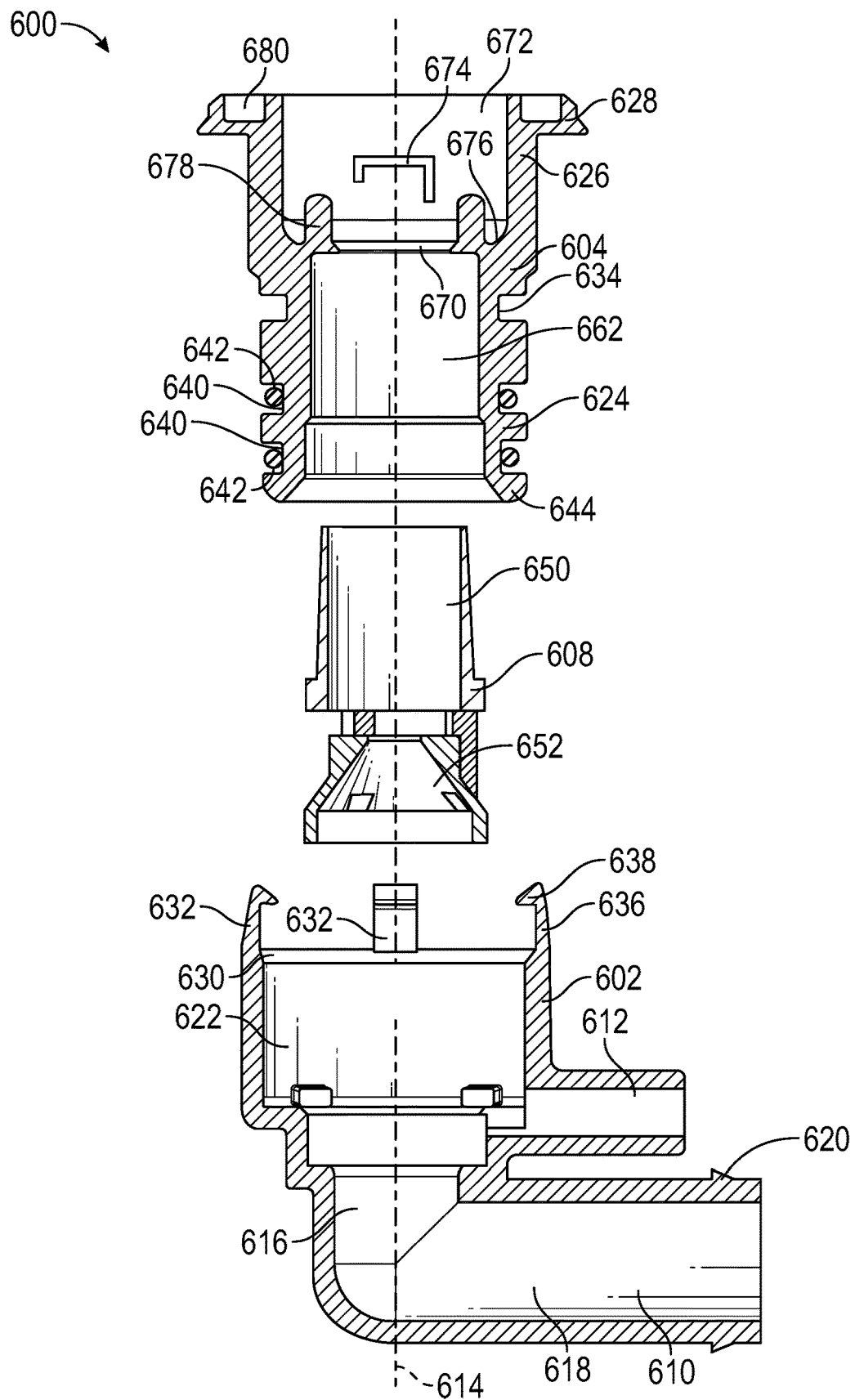
FIG. 23 is an exploded sectional view of still another embodiment of a jet assembly, according to aspects of the present teachings.
Figure 24:
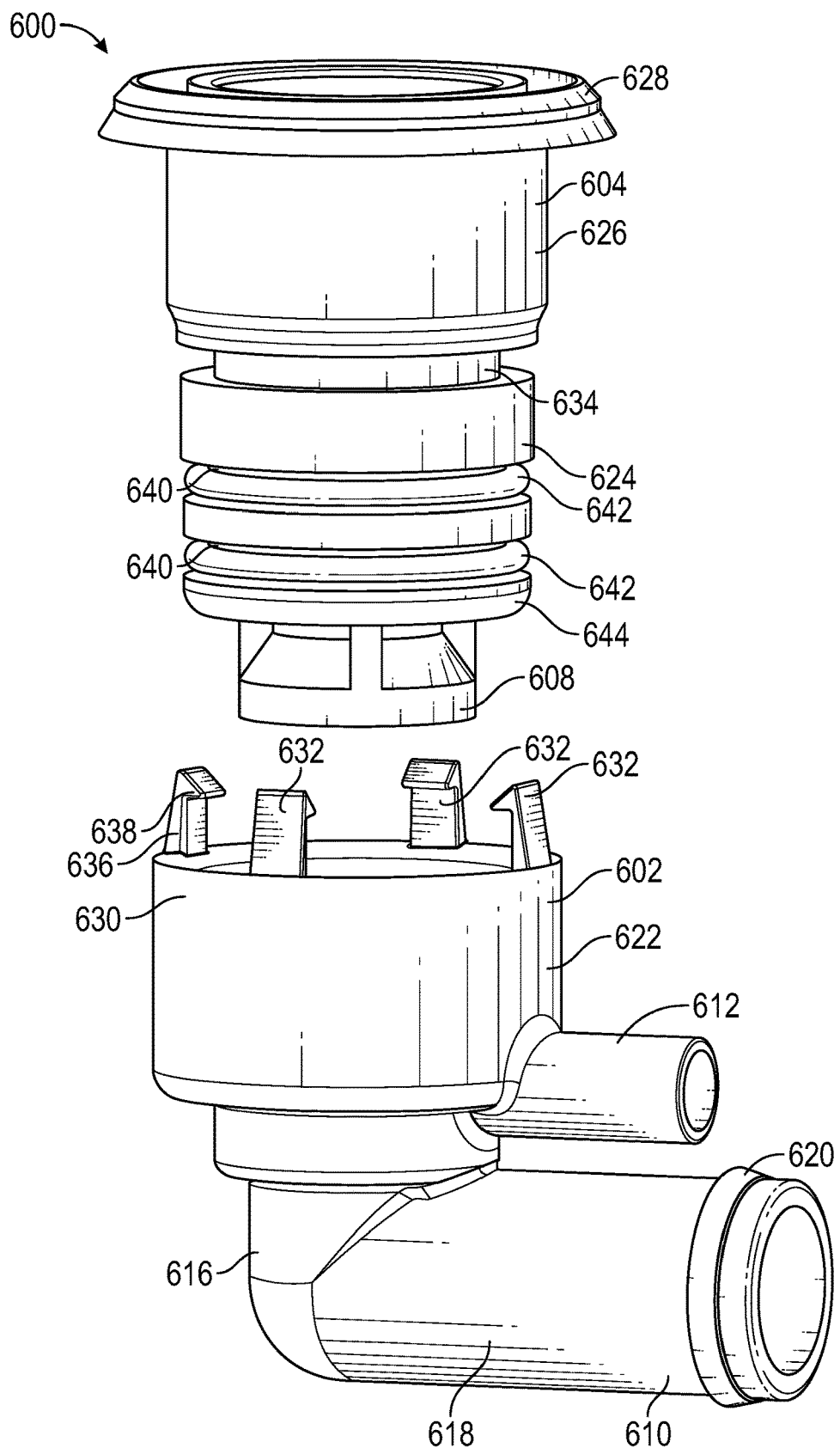
FIG. 24 is a partially exploded isometric view of the jet assembly of FIG. 23, showing the jet assembly in a partially assembled state.
Figure 25:
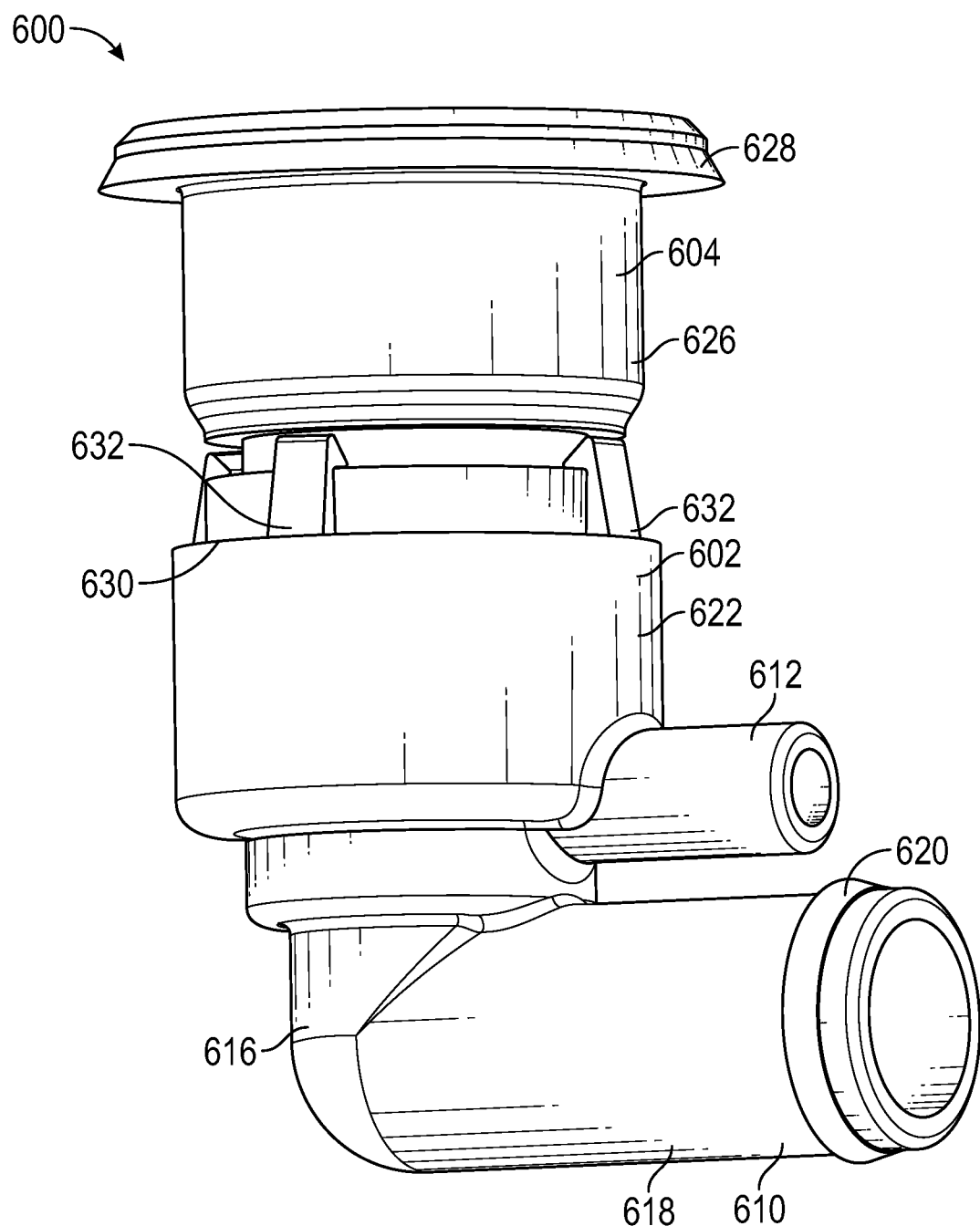
FIG. 25 is an isometric view of the jet assembly of FIG. 23, showing the jet assembly in an assembled state.
Figure 26:
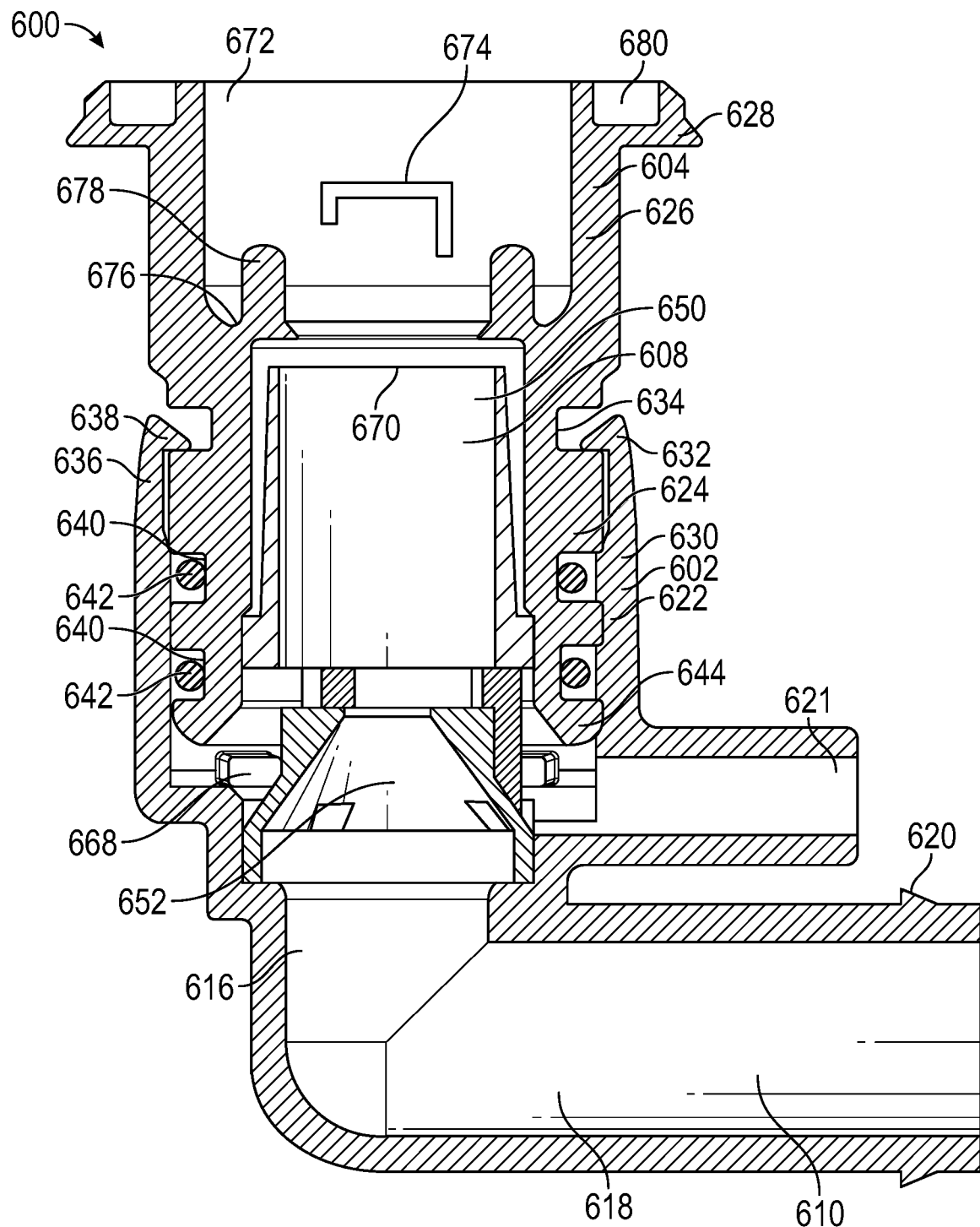
FIG. 26 is a sectional view of the jet assembly of FIG. 23 in an assembled state.
Figure 27:
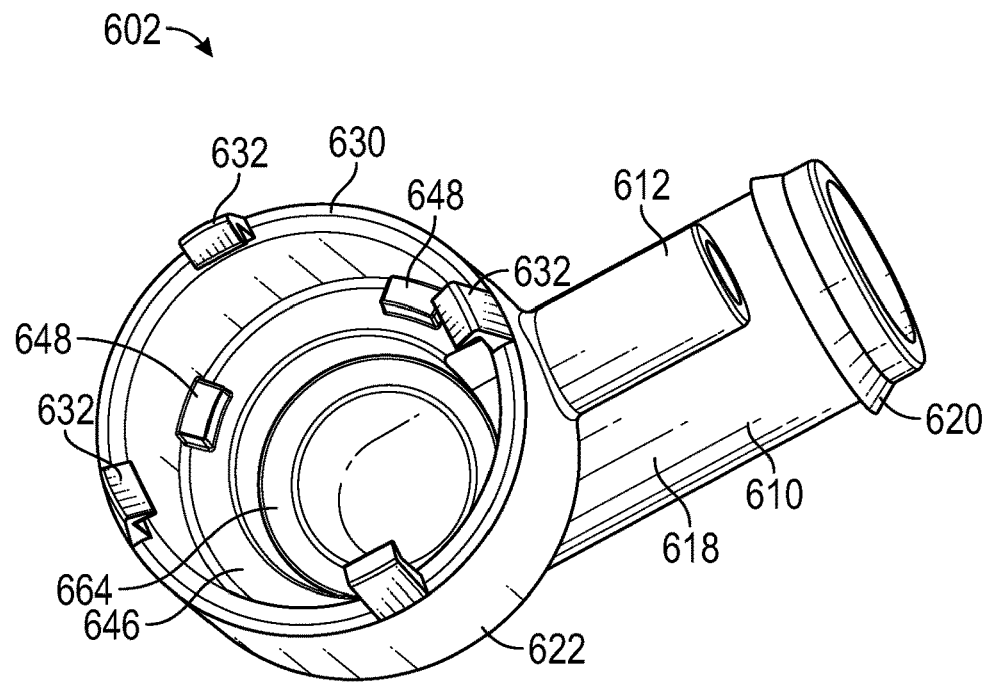
FIG. 27 is an isometric view of a jet back portion of the jet assembly of FIG. 23.

FIGS. 23-27 show various views of angled back jet 600 and components thereof. FIGS. 10-13 show various views of jet body 304 and nozzle 308 (which are substantially similar to jet body 604 and nozzle 608, respectively) suitable for use with jet back 602 to form jet assembly 600. FIG. 23 shows an exploded sectional view of angled jet 600 and includes illustrative embodiments of angled jet back 602, jet body 604, and nozzle 608. FIG. 24 depicts a partially assembled view of angled jet assembly 600 in which nozzle 608 is press fit into jet body 604. FIG. 25 depicts a fully assembled view of angled jet 600. FIG. 26 is a sectional view of a fully assembled angled back jet assembly 600 and depicts how the components of angled jet assembly 600 fit together. FIG. 27 is a front isometric view of angled jet back 602. FIG. 10 is a side isometric view of nozzle 608 (308) and FIG. 11 is a back isometric view of nozzle 608 (308). FIG. 12 depicts nozzle 608 (308) press fit into jet body 604 (304) and the O-rings installed on jet body 604 (304). FIG. 13 is a front isometric view of jet body 604 (304).

The jet insert for jet assembly 600 may be substantially identical to the jet insert for jet assembly 300. Note that FIGS. 23-27 and 10-13 do not show a jet insert, however, as discussed, jet body 604 (304) is configured to couple with a jet insert. As seen in FIG. 23, angled back jet assembly 600 includes angled jet back 602, nozzle 608 (308), jet body 604 (304), and also may include a jet insert (not shown). Jet back 602 is substantially similar to jet back 302; the primary difference between jet back 302 and jet back 602 is the configuration of the air and water ingress ports.

Jet back 602 includes two ingress ports: a water ingress port 610 and an air ingress port 612. Water ingress port 610 is larger in diameter than air ingress port 612 and at least a portion of water ingress port 610 is parallel air ingress port 612. In the embodiment shown in FIGS. 23-27, water ingress port 610 includes a base portion 616 and an extended portion 618. Base portion 616 is substantially centered on longitudinal axis 614 of the jet back and is substantially parallel with longitudinal axis 614. Extended portion 618 may be oriented at any suitable angle relative to base portion 616. In the embodiment shown in FIGS. 23-27, extended portion 618 is oriented at an approximately 90-degree angle with respect to base portion 616. Additionally, or alternatively, water ingress port 610 may be referred to as a water barb, an angled water ingress port, or an angled water barb. Similar to water ingress port 310, water ingress port 610 includes a lip or ridge 620 as can best be seen in FIGS. 24 and 25. Lip 620 may include any suitable structure configured to ensure a water tight seal between water ingress port 610 and a length of tubing (such as tubing 120). For example, lip 620 may include a sloped ridge as in FIGS. 23-26.

Air ingress port 612 is substantially parallel with extended portion 618 of the water ingress port, and may be offset from the center of jet back 602. Air ingress port 612 may form substantially the same angle with longitudinal axis 614 as extended portion 618. For example, air ingress port 612 may form an approximately 90-degree angle with longitudinal axis 614. In some examples, air ingress port 612 may extend from the side of jet back 602. Additionally, or alternatively, air ingress port 612 may be referred to as an air barb, an angled air barb, or an angled air ingress port. In some examples, air ingress port 612 may include a lip or other feature to ensure a seal. In some examples, an external portion of air ingress port 612 may be smooth as can best be seen in FIGS. 23-26.

In the embodiment shown in FIGS. 23-27, jet back 602 is, like jet back 302, configured to couple with dual extrusion tubing having two parallel passages joined at a periphery (examples of dual extrusion tubing are discussed below). In some examples, jet back 602 may be configured to couple with any other suitable kind of tubing. For example, jet back 602 may be configured to couple with two separate lengths of tubing, one which carries air and one which carries water. In some examples, configuring jet back 602 to couple with different kinds of tubing may include changing the spacing between the air and water ingress ports and/or the dimensions for the air and water ingress ports.

As with previous embodiments, jet back 602 further includes a central portion 622 configured to create a water tight seal with jet body 604. Central portion 622 is in direct fluid communication with water ingress port 610 and air ingress port 612 and may include any suitable shape depending on the application and on the characteristics of the jet body. For example, central portion 622 may be substantially cylindrical as can best be seen in FIGS. 24, 25, and 27. In some examples, central portion 622 may be substantially rectangular or substantially triangular.

Jet body 604 is substantially identical to jet body 304. Accordingly, only an abbreviated description will be given here. Jet body 604 includes an upstream portion 624 and a downstream portion 626. Upstream portion 624 may include any suitable structure configured to be at least partially disposed within central portion 622. For example, upstream portion 624 may be substantially cylindrical. Like jet back 302, jet back 602 includes an attachment mechanism which extends from a first end 630 of central portion 622 and which is configured to attach the jet back to jet body 604 in a secure manner. The attachment mechanism, like the attachment mechanism for jet 300, includes a plurality of spring biased clips 632 which are configured to couple with a retaining feature, such as a groove 634, on jet body 604. In the embodiment shown in FIGS. 23-27, jet back 602 includes four spring biased clips 632 (as best seen in FIG. 27). In some examples, spring biased clips 632 may include a resiliently flexible support 636 and a sloped lip 638 which is configured to engage with groove 634.

In some examples, the attachment mechanism may be configured to couple jet back 602 to jet body 604 while allowing jet back 602 to rotate relative to jet body 604. In other words, in some examples, jet back 602 may be able to rotate about longitudinal axis 614 when coupled to jet body 604 while maintaining a water- and air-tight seal; this may allow a worker to prevent adjacent jet assemblies from interfering with each other.

Like jet body 304, jet body 604 includes two recesses 640 disposed on upstream portion 624 and configured to contain two O-rings 642 such as those shown in FIGS. 12 and 13. Recesses 640 may be configured such that the outside edge of the O-ring is flush with or extends slightly beyond the surface of the upstream portion of the jet body as shown in FIG. 24. As best seen in FIG. 27, jet back 602 also includes a spacing mechanism configured to ensure sufficient space between a proximate end 644 of upstream portion 624 of jet body 604 and an inner wall 646 of jet back 602. The spacing mechanism may be substantially identical to the spacing mechanism for jet 300. For example, a plurality of spacers 648 may be disposed on inner wall 646 and configured to prevent proximate end 644 of the jet body from becoming flush with inner wall 646. In the example shown in FIG. 27, jet back 602 includes four spacers 648 disposed on inner wall 646 and formed as an integral part of jet back 602.

Nozzle 608 is substantially identical to nozzle 308. Accordingly, only an abbreviated description will be given here. Nozzle 608, like nozzle 308, is formed as a separate piece from the jet back and the jet body and is configured to be press fit into the jet body. Nozzle 608 includes a main body 650 and a conical portion 652. Main body 650 may include a hollow, substantially cylindrical tube as best seen in FIGS. 10-11. For example, conical portion 652 may taper from a larger, round first aperture 654 to a smaller, round second aperture 656 as best seen in FIG. 11. As in nozzle 308, conical portion 652 of nozzle 608 includes a constant-diameter, annular flange 658 attached to first aperture 654. Nozzle 608 further includes four substantially rectangular support structures 660, as can be seen in FIGS. 10-11.

Nozzle 608 is configured to be press-fit into jet body 604. As shown in FIGS. 24, 26, and 12, main body 650 is configured to fit at least partially within a main cavity 662 of jet body 604 and conical portion 652 is configured to fit within a recessed portion 664 of inner wall 646 when jet back 602 is coupled with jet body 604. For example, an outer diameter of main body 650 may be very close to the inner diameter of main cavity 662 to ensure a secure fit. In some examples, main body 650 may have a slight taper to create a wedge fit between nozzle 608 and main cavity 662. Support structures 660 may be configured to leave gaps 666 between the conical portion 652, main body 650, and support structures 660 (see, e.g., FIG. 11). When jet back 602 is coupled to jet body 604, water from water ingress port 610 may be passed through first aperture 654 and second aperture 656 while air from air ingress port 612 may be passed into an air chamber 668 and through gaps 666. The air and water may mix in main cavity 662 of the jet body and/or within the main body 650 of the nozzle before passing through a main aperture 670 of the jet body.

Jet body 604 is substantially identical to jet body 304. Accordingly, FIGS. 12 and 13 also show the jet body of the current embodiment. Main aperture 670 connects main cavity 662 with a receiving chamber 672. Receiving chamber 672 is primarily disposed within downstream portion 626 and may include any suitable structure for receiving at least a portion of a jet insert. For example, receiving chamber 672 may include a substantially cylindrical cavity as shown in FIGS. 12 and 13. A plurality of hooks 674 are disposed inside of receiving chamber 672. In the embodiment shown in FIG. 13, hooks 674 include an approximately U-shaped structure wherein one side is shorter than the other. A jet insert having similarly shaped teeth may be inserted into the receiving cavity such that the hooks and teeth are offset and rotated until the hooks and teeth engage. Jet body 604 may include any suitable number of hooks 674. For example, the embodiment shown in FIG. 13 includes two hooks 674. In some examples, receiving chamber 672 may include any suitable structures for coupling to and suitably positioning a jet insert.

The jet insert for jet assembly 600 is substantially identical to the jet insert for jet assembly 300 and may include any suitable structure configured to pass the mixture of air and water to the interior of hot tub shell 104. In some examples, some or all of the jet insert may be visible from the interior of hot tub body 104 and/or the jet insert may include decorative portions. In some examples, the jet insert may include any suitable structures configured to manipulate the speed, direction, and/or other properties of the stream of air and water. For example, the jet insert may include a flow director and/or a rotating nozzle.

Similar to jet assembly 300, jet assembly 600 may include multiple versions of the jet insert. For example, a plurality of different jet inserts may be configured to couple with jet body 604. In other words, the same style of jet body may be installed in multiple places on a hot tub 100 and different styles of jet insert may be coupled to each jet body depending on the location within the hot tub and desired application.

Additionally, or alternatively, jet assembly 600, like jet assembly 300, may include multiple versions of jet body 604. For example, a plurality of different sizes and/or styles of jet body 604 may be configured to couple with a single style of jet back 602. Each version of jet body 604 may be configured to couple with one or more versions of the jet insert. In other words, a variety of styles of jet body may be installed in multiple places on a hot tub 100 and different styles of jet insert may be coupled to each jet body depending on the location within the hot tub and the features of the jet body.

As discussed above with respect to jet 300, FIGS. 12-13 depict a first style of jet body 604 (which, as discussed, is substantially identical to jet body 304) and FIGS. 14-19 depict three other styles of jet body 604 (304) indicated at 304*a*, 304*b*, and 304*c* respectively, which are suitable for use with jet assembly 600. As discussed above, many aspects of jet bodies 304*a*, 304*b*, and 304*c* are substantially similar to jet body 604 (304). Accordingly, similar features will be denoted with similar reference numbers and will not be discussed here. Features of receiving chamber 672 (368), such as hooks 674 (370), may differ between jet bodies 304, 304*a*, 304*b*, and 304*c* to best couple and position a suitable version of the jet insert within each jet body. Jet body 604 (304) and the jet insert may be coupled together using hooks, clips, threaded engagement, and/or any other suitable method.

As discussed above, downstream portion 626 of jet body 604 (304) has a maximum diameter of approximately 1.9 inches. Jet body 604 (304) includes two substantially rectangular protrusions 678 disposed on an inner wall 676 of receiving chamber 672. Protrusions 678 may be used as a spacing mechanism to ensure sufficient space between a proximate end of the jet insert and inner wall 676 of receiving chamber 672. Additionally, flange 628 on downstream portion 626 includes a channel 680.

Jet body 304*a* is shown in FIGS. 14-15 and includes a downstream portion 626 having a maximum diameter of approximately 2.7 inches. Jet body 304*a* includes two hooks, an annular flange disposed adjacent a main aperture, and two slots disposed on the flange. The annular flange and the slots may be configured to facilitate coupling with and positioning the jet insert in conjunction with the hooks.

FIGS. 16 and 17 show jet body 304*b*. Jet body 304*b* includes a downstream portion having a maximum diameter of approximately 3.2 inches. Jet body 304*b* includes four hooks and a flange which includes a channel and four slots disposed within the channel.

FIGS. 18 and 19 show jet body 304*c*. Jet body 304*c* includes a downstream portion having a maximum diameter of approximately 4.5 inches. Jet body 304*c* includes a flange and four spring biased clips configured to engage with a suitable style of jet insert. As discussed with respect to jet assembly 300, each of jet body 304, jet body 304*a*, jet body 304*b*, and jet body 304*c* may be used and installed in hot tub body 104 in substantially the same way. Further, each style of jet body couples with nozzle 608 (308) and jet back 602 in a substantially identical way.

During installation, jet assembly 600 may be assembled in substantially the same steps and/or at substantially the same stations as jet assembly 300. A first step may include press fitting nozzle 608 into main cavity 662 of jet body 604 (see FIG. 12) and coupling the air and water ingress ports of jet back 602 with tubing 120. In some examples, press-fitting nozzle 608 into main cavity 662 may include using a lubricant (for example, soapy water) or an adhesive. Coupling the air and water ingress ports of jet back 602 with tubing 120 may include any suitable process and/or structure. For example, tubing 120 may be slid over the ends of the air and water ingress ports of jet back 602 and a clamp (described in more detail below) may be used to prevent the tubing from sliding off. In some examples, a lubricant (e.g., soapy water) may be used to facilitate sliding the tubing over the ingress ports. Tubing 120 may include dual extrusion tubing and/or separate air and water tubes which may be installed one at a time on the air and water ingress ports respectively.

Another step in assembling jet assembly 600 may include installing jet body 604 and a jet insert in hot tub shell 104. For example, jet body 604 (with nozzle 608) may be inserted into a hole formed in the shell of hot tub shell 104. Jet body 604 may be inserted from the interior of hot tub shell 104 and may be secured to hot tub shell 104 by any suitable mechanism configured to be water tight and secure. For example, jet body 604 may attach to hot tub shell 104 via threaded engagement, glue, press-fitting, and/or any other suitable attachment mechanism.

In some examples, attaching jet body 604 may include threading the jet body into the hot tub body and/or the use of a compressive gasket. A jet insert may be coupled to jet body 604*d* from the interior of hot tub shell 104 after jet body 604 has been installed in hot tub shell 104. As discussed above, jet body 604 is configured to securely couple with and position the jet insert. In some examples, jet body 604 and/or a compatible jet insert may be installed from the exterior of hot tub shell 104. In some examples, jet body 604 and a compatible jet insert may couple together through a hole in the hot tub shell, thereby attaching both parts to the hot tub shell.

Completing the installation of jet assembly 600 may include coupling jet back 602 (which is attached to tubing 120) to jet body 604 (which is attached to hot tub shell 104 and includes nozzle 608). Jet back 602 may be coupled with jet body 604 by a "press-and-click" method (described above). For example, jet back 602 and jet body 604 may be aligned and then compressed together to overcome the resistive force of spring biased clips 632. In the embodiment shown in FIGS. 23-27, spring biased clips 632 are configured to flex outward, away from a default position (e.g., away from longitudinal axis 614), when sloped lip 638 slides over proximate end 644 of jet body 604 and along an external portion of upstream portion 624. Spring biased clips 632 are further configured to snap back into the default position (e.g., back towards longitudinal axis 614) when sloped lip 638 encounters groove 634 of jet body 604. Sloped lip 638 prevents spring biased clips 632, and thus jet back 602, from sliding towards proximate end 644 and off of jet 602. Thus, jet back 602 and jet body 604 are coupled together.

In some examples, jet back 602 and jet body 604 may be configured to be able to be unlocked and/or uncoupled. Uncoupling jet back 602 from jet body 604 may be accomplished by moving spring biased clips 632 away from jet body 604 (e.g., away from longitudinal axis 614) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake.

Each of the components of jet assembly 600 (e.g., jet back 602, jet body 604, a suitable jet insert, and nozzle 608) may be constructed out of any suitable material. For example, the components of jet assembly 600 may include any suitable thermoplastic polymer such as polyvinyl chloride (PVC), acrylonitrile butadiene styrene (ABS), and/or any other suitable materials having similar properties (i.e., stiffness etc.). The components of jet assembly 600 may be manufactured using any suitable process. For example, the manufacturing process may include the use of injection molding, compression molding, and/or extrusion methods. In some examples, each component may be injection molded out of PVC.

Second Angled Back Embodiment

Figure 28:
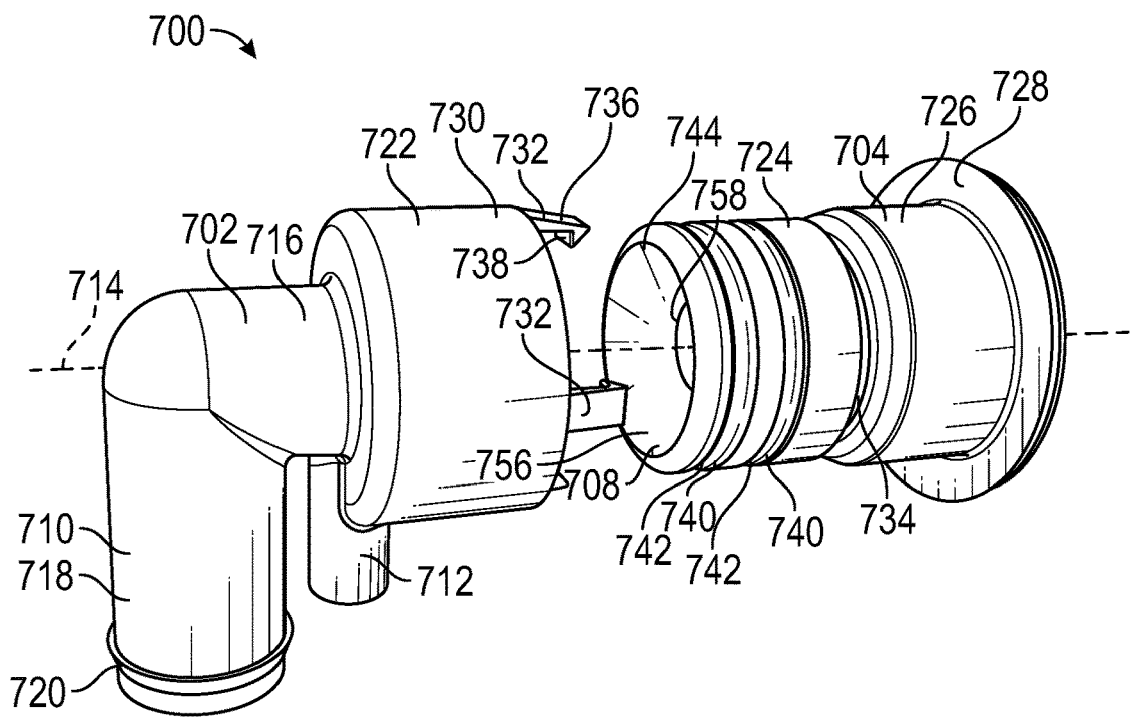
FIG. 28 is a partially exploded isometric view of yet another jet assembly, according to aspects of the present teachings.
Figure 29:
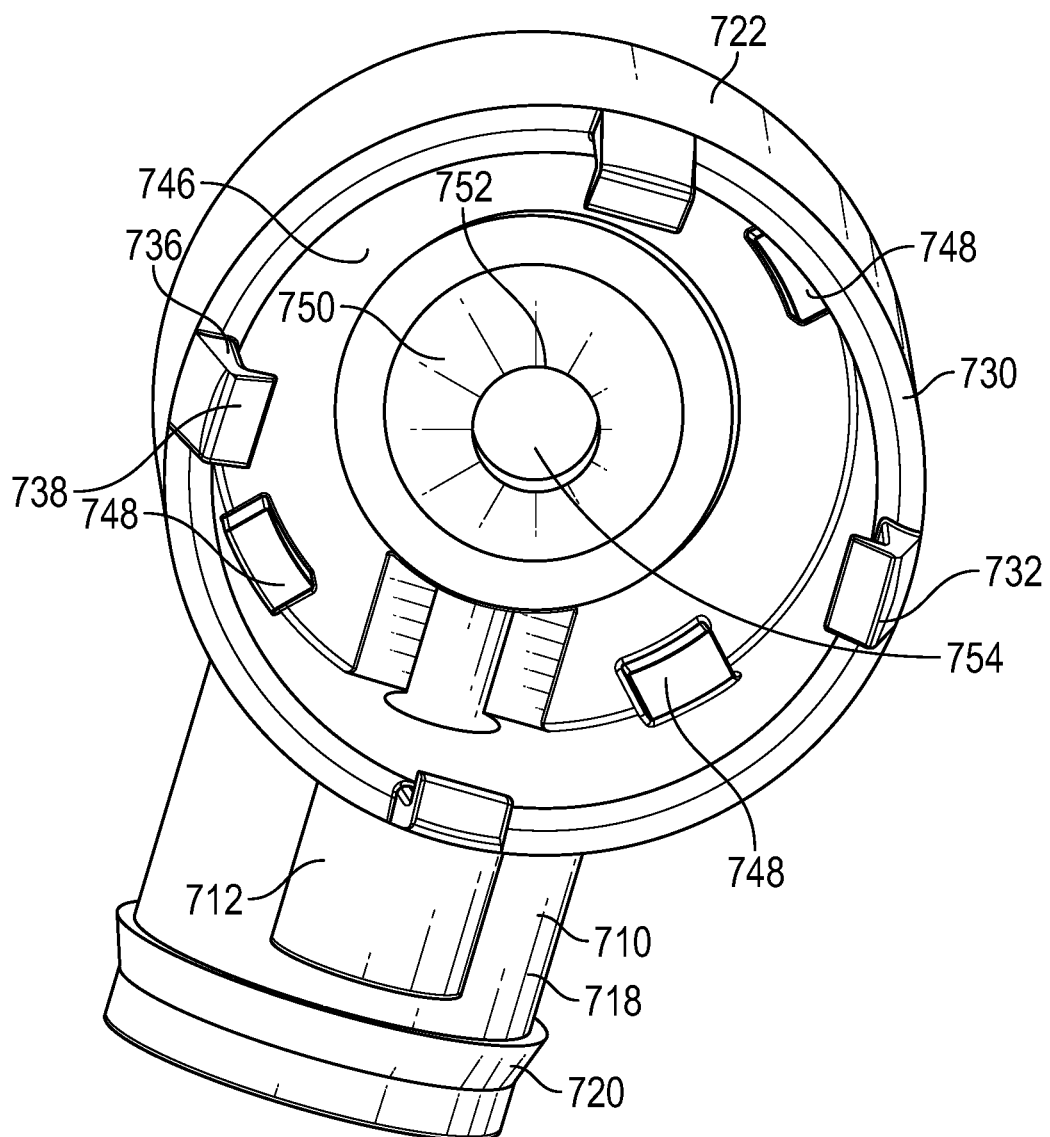
FIG. 29 is an isometric view of a jet back portion of the jet assembly of FIG. 28.

FIGS. 28-29 depict a fifth embodiment 700 of a jet assembly, which also includes an angled back jet back. The fifth jet assembly embodiment is generally indicated at 700 and includes an angled jet back 702, a jet body 704, and a jet insert (not shown). A nozzle 708 includes a structure formed as an integral part of jet back 702. Jet back 702 is an example of jet back 202 described above, jet body 704 is an example of jet back 204 described above, and a suitable jet insert is an example of jet insert 206 described above. Additionally, or alternatively, jet assembly 700 may be referred to as a jet, a jet assembly, an angled jet, an angled jet assembly, an angled back jet, and/or an angled back jet assembly. Additionally, or alternatively, jet back 702 may be referred to as an angled back jet back or an angled jet back. Additionally, or alternatively, the jet insert may be referred to as a jet face.

Many of the features of fifth embodiment 700 of jet assembly 200 are the same as second embodiment 400. The primary difference between angled jet assembly 700 and straight back jet assembly 400, is the shape of angled jet back 702 compared with jet back 402. Whereas jet back 402 includes air and water ingress ports which are parallel to a longitudinal axis of the jet back, angled jet back 702 includes air and water ingress ports which are not parallel to a longitudinal axis of the jet back. Accordingly, jet body 704 and nozzle 708 of angled jet 700 are substantially identical to jet body 404 and nozzle 408 of jet 400. Accordingly, similar components and/or features may be labeled with similar reference numbers and only an abbreviated discussion of such features will be provided here. Duplicate drawings are not provided for components which are substantially identical to other embodiments of jet assembly 200. The differences between the embodiments are described in detail below.

FIGS. 28-29 show various views of angled back jet 700 and components thereof. FIG. 28 depicts a partially exploded isometric view of angled back jet assembly 700 and includes illustrative embodiments of angled jet back 702 and jet body 704. Jet body 704 is substantially identical to jet body 404. FIG. 29 is a front isometric view of angled jet back 702. The jet insert for jet assembly 700 may be substantially identical to the jet insert for jet assembly 400. Note that FIGS. 28-29 do not show a jet insert, however, as discussed, jet body 704 is configured to couple with a compatible jet insert.

As seen in FIG. 28, angled back jet assembly 700 includes angled jet back 702, nozzle 708 (408), jet body 704 (404), and a jet insert (not shown). Jet body 704 and nozzle 708 are substantially identical to jet body 404 and nozzle 408 respectively. Jet back 702 is substantially similar to jet back 402; the primary difference between jet back 402 and angled jet back 702 is the configuration of the air and water ingress ports. Specifically, the air and water ingress ports extend at an angle with respect to the longitudinal axis of the jet back. The air and water ingress ports of jet back 702 are substantially similar to the air and water ingress ports of jet back 602.

Jet back 702 includes two ingress ports: a water ingress port 710 and an air ingress port 712. Water ingress port 710 is larger in diameter than air ingress port 712 and at least a portion of water ingress port 710 is parallel to air ingress port 712. In the embodiment shown in FIGS. 28-29, water ingress port 710 includes a base portion 716 and an extended portion 718. Base portion 716 is substantially centered on longitudinal axis 714 of the jet back and is substantially parallel with longitudinal axis 714. Extended portion 718 may be oriented at any suitable angle relative to base portion 716. In the embodiment shown in FIGS. 28-29, extended portion 718 is oriented at an approximately 90-degree angle with respect to base portion 716. Additionally, or alternatively, water ingress port 710 may be referred to as a water barb, an angled water ingress port, or an angled water barb. Similar to water ingress port 410, water ingress port 710 includes a lip or ridge 720 as can best be seen in FIGS. 28 and 29. For example, lip 720 may include a sloped ridge configured to ensure a water tight seal between water ingress port 710 and a length of tubing (such as tubing 120).

Air ingress port 712 is substantially parallel with extended portion 718 and may be offset from the center of jet back 702. Air ingress port 712 may form substantially the same angle with longitudinal axis 714 as extended portion 718. For example, air ingress port 712 may form an approximately 90-degree angle with longitudinal axis 714. In some examples, air ingress port 712 may extend from the side of jet back 702. Additionally, or alternatively, air ingress port 712 may be referred to as an air barb, an angled air barb, or an angled air ingress port. An external portion of air ingress port 712 may be smooth as can best be seen in FIGS. 28-29.

In the embodiment shown in FIGS. 28-29, jet back 702—similar to jet back 402—is configured to couple with dual extrusion tubing having two parallel passages joined at a periphery (examples of dual extrusion tubing are discussed in more detail below). In some examples, jet back 702 may be configured to couple with any other suitable kind of tubing. Similar to jet back 402, jet back 702 further includes a central portion 722 configured to create a water tight seal with jet body 704 (404). Central portion 722 is in direct fluid communication with water ingress port 710 and air ingress port 712 and may include any suitable shape depending on the application and on the characteristics of the jet body. In this embodiment, central portion 722 is substantially cylindrical as can be seen in FIGS. 28-29.

As in previous embodiments, jet body 704 (404) includes an upstream portion 724 and a downstream portion 726 wherein the upstream portion is configured to be at least partially disposed within central portion 722 of jet back 702. Jet back 702 includes an attachment mechanism extending from a first end 730 of central portion 722 and configured to couple the jet back to jet body 704 (404) in a secure manner. The attachment mechanism, like the attachment mechanism for jet 400, includes a plurality of spring biased clips 732 which are configured to couple with a retaining feature, such as a groove 734, on jet body 704 (404). In the embodiment shown in FIGS. 28-29, jet back 702 includes four spring biased clips 732. In some examples, spring biased clips 732 may include a resiliently flexible support 736 and a sloped lip 738 which is configured to engage with groove 734.

In some examples, the attachment mechanism may be configured to couple jet back 702 to jet body 704 while allowing jet back 702 to rotate relative to jet body 704. In other words, in some examples, jet back 702 may able to rotate about longitudinal axis 714 when coupled to jet body 704 while maintaining a water- and air-tight seal; this may allow a worker to prevent adjacent jet assemblies from interfering with each other.

Jet body 704 includes two recesses 740 disposed on upstream portion 724 and configured to contain one or more O-rings 742, such as those shown in FIG. 28. Recesses 740 may be configured such that the outside edge of the O-ring is flush with or extends slightly beyond the surface of the upstream portion of the jet body as shown in FIG. 28. As best seen in FIG. 29, jet back 702 also includes a spacing mechanism configured to ensure sufficient space between a proximate end 744 of upstream portion 724 of jet body 704 (404) and an inner wall 746 of jet back 702. In the example shown in FIG. 29, jet back 702 includes four spacers 748 disposed on inner wall 746 and formed as an integral part of jet back 702.

The embodiment of jet back 702 shown in FIGS. 28-29 includes a nozzle 708 which is substantially identical to nozzle 408 and which includes a structure formed as an integral part of jet back 702. Nozzle 708 may include any suitable structure formed as part of jet back 402 and configured to change the direction and/or speed of the stream of water. As can best be seen in FIG. 29, inner wall 746 of jet back 702 includes a conical portion 750 narrowing to a first aperture 752. Water ingress port 712 extends from a substantially cylindrical portion to a conical cavity 754 which tapers to first aperture 752. In some examples, conical cavity 754 may be similar in shape to conical portion 348 of nozzle 308.

Upstream portion 724 of jet body 704 includes a conical chamber 756. Conical chamber 756 may be shaped to receive nozzle 708 of jet back 702. In some examples, the shape of conical chamber 756 of jet body 704 (404) may be substantially complementary to the shape of conical portion 750. In some examples, the shape of conical chamber 756 may be significantly wider than conical portion 750 and may have a height that is equal to or greater than the height of conical portion 750. A difference in size and shape between conical chamber 756 and conical portion 750 may be used to ensure that there is a space between conical portion 750 and conical chamber 756. In the embodiment shown in FIGS. 28-29, spacers 748 are also included to ensure that there is space between conical portion 750 and conical chamber 756.

In use, water passes through a water ingress port 710, through conical cavity 754 and first aperture 752, and into the space between conical portion 750 and conical chamber 756. Air ingress port 712 leads to the space between conical portion 750 and conical chamber 756. The streams of air and water may merge in the space between conical portion 750 and conical chamber 756 and/or in conical chamber 756 before passing through second aperture 758. Second aperture 758 connects conical chamber 756 with a receiving chamber.

In other words, water ingress port 710 extends from a first substantially cylindrical portion to a second substantially cylindrical portion at a right angle to the first cylindrical portion. From the second substantially cylindrical portion, water ingress port 710 proceeds to conical cavity 754 which leads to first aperture 752. When jet back 702 and jet body 704 (404) are coupled together, first aperture 752 leads to a conical chamber 756. Air ingress port 712 also leads to conical chamber 756. The streams of air and water may merge in conical chamber 756 before passing through second aperture 758.

As discussed above, jet body 704 is substantially identical to jet body 404 and the jet insert for jet assembly 700 is substantially identical to the jet insert for jet assembly 400. Accordingly, only an abbreviated description of jet body 704, the jet insert, and how the jet body and jet insert interface will be provided. The receiving chamber may be primarily disposed within downstream portion 726 and includes a substantially cylindrical cavity. Similar to the first style of jet body 304, jet body 704 (jet body 404) further includes two substantially rectangular protrusions disposed on an inner wall of the receiving chamber which may be used as a spacing mechanism. Two hooks may be disposed inside of the receiving chamber to facilitate coupling with a jet insert. The hooks may include an approximately U-shaped structure wherein one side is shorter than the other. In some examples, jet body 704 (jet body 404) may include any suitable number of hooks, which may include any suitable structure for engaging the jet insert.

As discussed with respect to jet assembly 300 and 400, jet assembly 700 may include one or more versions of the jet insert and jet body 704 (404). For example, one or more different sizes and/or styles of jet body 704 (404) may be configured to couple with a single style of jet back 702 and each of the one or more versions of jet body 704 (404) may be configured to couple with one or more versions of the jet insert. In other words, a variety of styles of jet body may be installed in multiple places on a hot tub 100 and different styles of jet insert may be coupled to each jet body depending on the location within the hot tub and the features of the jet body. In some examples, jet assembly 700 may include only one version of jet body 704 (404) and/or only one version of the jet insert.

Only one size of jet body 704 (404) is shown in the drawings. In the style of jet body 704 (404) depicted in FIG. 28, the maximum diameter of downstream portion 726 is approximately 2.0 inches. Additionally, downstream portion 726 includes a flange 728 and a channel disposed on flange 728.

As discussed with respect to jet body 404, downstream portion 726 of other sizes of jet body 704 (404) may include any suitable maximum diameter. For example, the maximum diameter of downstream portion 726 may be between approximately 1.0 inches and approximately 5.0 inches. In some examples, four sizes of jet body may be used having maximum diameters of approximately 2.0 inches, approximately 3.0 inches, approximately 4.0 inches, and approximately 5.0 inches respectively. With the exception of the diameter of downstream portion 726 and certain features of the receiving chamber, each size of jet body 704 may be substantially identical. Features of the receiving chamber, such as the hooks, may differ between versions of jet body 704 to best couple and position a suitable version of the jet insert within each jet body. Each size of jet body 704 (404) may be used and installed in hot tub shell 104 in substantially the same way. Jet body 704 may be used and installed in hot tub shell 104 in substantially the same way as jet body 404. Further, each style of jet body couples with jet back 702 in a substantially identical way.

During installation, jet assembly 700 may be assembled in multiple steps and/or at multiple stations. A first step may include coupling the air and water ingress ports of jet back 702 with tubing 120. Jet back 702 may couple with tubing 120 in a way that is substantially similar to the way that jet back 402 couples with tubing 120; the primary difference may be the orientation of the tubing relative to the longitudinal axis of the jet back. Coupling the air and water ingress ports of jet back 702 with tubing 120 may include any suitable process and/or structure. For example, tubing 120 may be slid over the ends of the air and water ingress ports of jet back 702 and a clamp (described in more detail below) may be used to prevent the tubing from sliding off. In some examples, a lubricant (e.g. soapy water) may be used to facilitate sliding the tubing over the ingress ports. In some examples, tubing 120 may include dual extrusion tubing. In some examples, tubing 120 may include separate air and water tubes which may be installed one at a time on the air and water ingress ports respectively.

Another step in installing jet assembly 700 may include installing jet body 704 (404) and the jet insert in or on hot tub shell 104. For example, jet body 704 (404) may be inserted into a hole formed in hot tub shell 104. Jet body 704 (404) may be inserted from the interior of hot tub shell 104 and may be secured to hot tub shell 104 by any suitable mechanism configured to be water tight and secure. For example, jet body 704 (404) may attach to hot tub shell 104 via threaded engagement, glue, press-fitting, and/or any other suitable attachment mechanism. In some examples, attaching jet body 704 (404) may include threading the jet body into the hot tub shell and/or the use of a compressive gasket.

The jet insert may be coupled to jet body 704 (404) from the interior of hot tub shell 104 after jet body 704 (404) has been installed in hot tub shell 104. As discussed above and with respect to jet assembly 400, jet body 704 (404) is configured to securely couple with and position the jet insert. In some examples, jet body 704 (404) and/or the jet insert may be installed from the exterior of hot tub shell 104. In some examples, jet body 704 (404) and the jet insert may couple together through a hole in the hot tub shell, thereby attaching both parts to the hot tub shell.

Completing the installation of jet assembly 700 may include coupling jet back 702 (which is attached to tubing 120) to jet body 704 (404) (which is attached to hot tub shell 104). Jet back 702 may be coupled with jet body 704 (404) by a "press-and-click" method (described above). For example, jet back 702 and jet body 704 (404) may be aligned and then compressed together to overcome the resistive force of spring biased clips 732. In the embodiment shown in FIGS. 28-29, spring biased clips 732 are configured to flex outward, away from a default position (e.g., away from longitudinal axis 714), when sloped lip 738 slides over proximate end 744 of jet body 704 (404) and along an external portion of upstream portion 724. Spring biased clips 732 are further configured to snap back into the default position (e.g., back towards longitudinal axis 714) when sloped lip 738 encounters groove 734 of jet body 704 (404). Sloped lip 738 prevents spring biased clips 732, and thus jet back 702, from sliding towards proximate end 744 and off of jet body 704 (404). Thus, jet back 702 and jet body 704 are coupled together.

In some examples, jet back 702 and jet body 704 (404) may be configured to be able to be unlocked and/or uncoupled. Uncoupling jet back 702 from jet body 704 (404) may be accomplished by moving spring biased clips 732 away from jet body 704 (404) (e.g., away from longitudinal axis 714) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake.

Each of the components of jet assembly 700 (e.g., jet back 702, jet body 704 (404), and a compatible jet insert) may be constructed out of any suitable material. For example, the components of jet assembly 700 may include any suitable thermoplastic polymer such as polyvinyl chloride (PVC), acrylonitrile butadiene styrene (ABS), and/or any other suitable materials having similar properties (i.e., stiffness etc.). The components of jet assembly 700 may be manufactured using any suitable process. For example, the manufacturing process may include the use of injection molding, compression molding, and/or extrusion methods. In some examples, each component may be injection molded out of PVC.

Third Angled Back Embodiment

Figure 30:
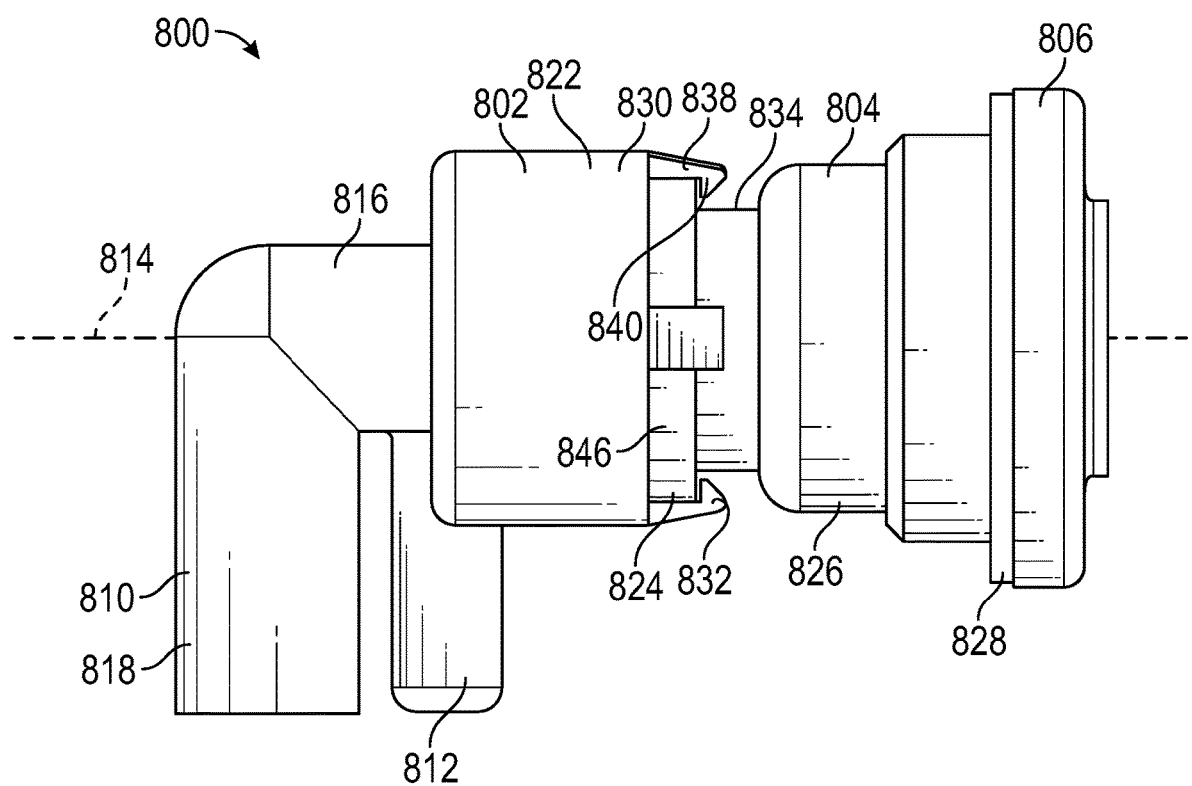
FIG. 30 is an isometric view of yet another jet assembly, according to aspects of the present teachings.

FIG. 30 depicts a sixth embodiment 800 of jet assembly 200, which also includes an angled back jet back. The sixth embodiment of jet assembly 200 is generally indicated at 800 and includes an angled jet back 802, a jet body 804, and a jet insert 806. Additionally, or alternatively, jet assembly 800 may be referred to as a jet, a jet assembly, an angled jet, an angled jet assembly, an angled back jet, and/or an angled back jet assembly. Additionally, or alternatively, jet back 802 may be referred to as an angled back jet back or an angled jet back. Additionally, or alternatively, the jet insert may be referred to as a jet face. Jet back 802 is an example of jet back 202 described above, jet body 804 is an example of jet back 204 described above, and jet insert 806 is an example of jet insert 206 described above.

Many of the features of sixth embodiment 800 of jet assembly 200 are the same as third embodiment 500. The primary difference between angled jet assembly 800 and straight back jet assembly 500, is the shape of angled jet back 802 compared with jet back 502. Whereas jet back 502 includes air and water ingress ports which are parallel to a longitudinal axis of the jet back, angled jet back 802 includes air and water ingress ports which are not parallel to a longitudinal axis of the jet back. Accordingly, jet body 804 and jet insert 806 of angled jet 800 are substantially similar to jet body 504 and jet insert 506 of jet 500. Accordingly, similar components and/or features may be labeled with similar reference numbers and only an abbreviated discussion of such features will be provided here. The differences between the embodiments are described in detail below.

FIG. 30 is a fully assembled isometric view of angled back jet 800 and components thereof. As seen in FIG. 30, angled back jet assembly 800 includes angled jet back 802, jet body 804, and jet insert 806. Jet body 804 and jet insert 806 are substantially similar to jet body 504 and jet insert 506 respectively. Jet back 802 is substantially similar to jet back 502; the primary difference between jet back 502 and angled jet back 802 is the configuration of the air and water ingress ports. Specifically, the air and water ingress ports extend at an angle with respect to the longitudinal axis of the jet back. The air and water ingress ports of jet back 802 are substantially similar to the air and water ingress ports of jet back 602 and jet back 702. In contrast with angled jets 600 and 700, water ingress port 810 does not include a lip (such as lip 620 or 720). Instead, water ingress port 810 has a substantially smooth external surface.

Jet back 802 includes two ingress ports: a water ingress port 810 and an air ingress port 812. Water ingress port 810 is larger in diameter than air ingress port 812 and at least a portion of water ingress port 810 is parallel to air ingress port 812. In the embodiment shown in FIG. 30, water ingress port 810 includes a base portion 816 and an extended portion 818. Base portion 816 is substantially centered on longitudinal axis 814 of the jet back and is substantially parallel with longitudinal axis 814. Extended portion 818 may be oriented at any suitable angle relative to base portion 816. In the embodiment shown in FIG. 30, extended portion 818 is oriented at an approximately 90-degree angle with respect to base portion 816. Additionally, or alternatively, water ingress port 810 may be referred to as a water barb, an angled water ingress port, or an angled water barb.

Air ingress port 812 is substantially parallel with extended portion 818 and may be offset from the center of jet back 802. Air ingress port 812 may form substantially the same angle with longitudinal axis 814 as extended portion 818. For example, air ingress port 812 may form an approximately 90-degree angle with longitudinal axis 814. In some examples, air ingress port 812 may extend from the side of jet back 802. Additionally, or alternatively, air ingress port 812 may be referred to as an air barb, an angled air barb, or an angled air ingress port. An external portion of air ingress port 812 may be smooth as can be seen in FIG. 30.

In the embodiment shown in FIG. 30, jet back 802 is configured to couple with dual extrusion tubing having two parallel passages joined at a periphery (examples of dual extrusion tubing are discussed in more detail below). In some examples, jet back 802 may be configured to couple with any other suitable kind of tubing. Similar to jet back 502, jet back 802 further includes a central portion 822 configured to create a water tight seal with jet body 804. Central portion 822 is in direct fluid communication with water ingress port 810 and air ingress port 812 and may include any suitable shape depending on the application and on the characteristics of the jet body. In this embodiment, central portion 822 is substantially cylindrical as can be seen in FIG. 30.

As in previous embodiments, jet body 804 includes an upstream portion 824 and a downstream portion 826 wherein the upstream portion is configured to be at least partially disposed within central portion 822 of jet back 802. Jet back 802 includes an attachment mechanism extending from a first end 830 of central portion 822 and configured to couple the jet back to jet body 804 in a secure manner. The attachment mechanism, like the attachment mechanism for jets 600 and 700, includes a plurality of spring biased clips 832 which are configured to couple with a retaining feature, such as a groove 834, on jet body 804. In the embodiment shown in FIG. 30, jet back 802 includes four spring biased clips 832. In some examples, spring biased clips 832 may include a resiliently flexible support 838 and a sloped lip 840 which is configured to engage with groove 834.

In some examples, the attachment mechanism may be configured to couple jet back 802 to jet body 804 while allowing jet back 802 to rotate relative to jet body 804. In other words, in some examples, jet back 802 may able to rotate about longitudinal axis 814 when coupled to jet body 804 while maintaining a water- and air-tight seal; this may allow a worker to prevent adjacent jet assemblies from interfering with each other.

Similar to previous embodiments, jet body 804 may include one or more recesses disposed on upstream portion 824 and configured to contain one or more O-rings. In some examples, jet back 802 may include a spacing mechanism configured to ensure sufficient space between a proximate end of upstream portion 824 of jet body 804 and an inner wall of jet back 802. In some embodiments, jet back 802 may include a nozzle which is substantially identical to nozzle 508 and which includes a structure formed as an integral part of jet back 802. For example, a compatible nozzle may include any suitable structure formed as part of jet back 802 and configured to change the direction and/or speed of the stream of water.

In some examples, an inner wall of jet back 802 may include a conical portion narrowing to a first aperture and water ingress port 812 may extend from a substantially cylindrical portion to a conical cavity which tapers to the first aperture. In some examples, the conical cavity may be similar in shape to conical portion 348 of nozzle 308. In some examples, upstream portion 824 of jet body 804 may include a conical chamber shaped to receive a nozzle of jet back 802. In some embodiments, spacers may be included to ensure that there is space between the conical portion and the conical chamber. In use, the streams of air and water may merge in the space between the conical portion and the conical chamber and/or in the conical chamber before passing through to a receiving chamber.

In other words, water ingress port 810 extends from a first substantially cylindrical portion to a second substantially cylindrical portion at a right angle to the first cylindrical portion. From the second substantially cylindrical portion, water ingress port 810 may proceed to a conical cavity which leads to a first aperture. When jet back 802 and jet body 804 are coupled together, the first aperture may lead to a conical chamber. Air ingress port 812 may also lead to a conical chamber. The streams of air and water may merge in the conical chamber before passing through to a receiving chamber.

As discussed above, jet body 804 is substantially similar to jet body 504 and jet insert 806 is substantially identical to jet insert 506. Accordingly, only an abbreviated description of jet body 804 and jet insert 806, and how the jet body and jet insert interface will be provided. In some embodiments, jet body 804 may include a receiving chamber disposed within downstream portion 826. The receiving chamber may include any suitable structures configured to couple with and suitably position jet insert 806. In some examples, the receiving chamber may include protrusions on an inner wall which may be used as a spacing mechanism and/or a plurality of hooks configured to couple with teeth on jet insert 806.

As discussed with respect to previous embodiments of jet assembly 200, jet assembly 800 may include one or more versions of jet insert 806 and jet body 804. For example, one or more different sizes and/or styles of jet body 804 may be configured to couple with a single style of jet back 802 and each of the one or more versions of jet body 804 may be configured to couple with one or more versions of jet insert 806. In other words, a variety of styles of jet body may be installed in multiple places on a hot tub 100 and different styles of jet insert may be coupled to each jet body depending on the location within the hot tub and the features of the jet body. In some examples, jet assembly 800 may include only one version of jet body 804 and/or only one version of jet insert 806.

Only one size of jet body 804 is shown in the drawings. In the style of jet body 804 depicted in FIG. 30, the maximum diameter of downstream portion 826 is approximately 2.0 inches. Additionally, downstream portion 826 includes a flange 828.

As discussed with respect to jet body 504, downstream portion 826 of other sizes of jet body 804 may include any suitable maximum diameter. For example, the maximum diameter of downstream portion 826 may be between approximately 1.0 inches and approximately 5.0 inches. In some examples, four sizes of jet body may be used having maximum diameters of approximately 2.0 inches, approximately 3.0 inches, approximately 4.0 inches, and approximately 5.0 inches respectively. With the exception of the diameter of downstream portion 826, each size of jet body 804 may be substantially identical. Some of the features of downstream portion 826 may differ between versions of jet body 804 to best couple and position a suitable version of jet insert 806 within each jet body. Each size of jet body 804 may be used and installed in hot tub body 104 in substantially the same way. Jet body 804 may be used and installed in hot tub shell 104 in substantially the same way as jet body 504. Further, each style of jet body couples with jet back 802 in a substantially identical way.

During installation, jet assembly 800 may be assembled in multiple steps and/or at multiple stations. A first step may include coupling the air and water ingress ports of jet back 802 with tubing 120. Jet back 802 may couple with tubing 120 in a way that is substantially similar to the way that jet back 502 couples with tubing 120; the primary difference may be the orientation of the tubing relative to the longitudinal axis of the jet back. Coupling the air and water ingress ports of jet back 802 with tubing 120 may include any suitable process and/or structure. For example, tubing 120 may be slid over the ends of the air and water ingress ports of jet back 802 and a clamp (described in more detail below) may be used to prevent the tubing from sliding off. In some examples, a lubricant (e.g. soapy water) may be used to facilitate sliding the tubing over the ingress ports. In some examples, tubing 120 may include dual extrusion tubing. In some examples, tubing 120 may include separate air and water tubes which may be installed one at a time on the air and water ingress ports respectively.

Another step in installing jet assembly 800 may include installing jet body 804 and jet insert 806 on hot tub 104. For example, jet body 804 may be inserted into a hole formed in the shell of hot tub 104. Jet body 804 may be inserted from the interior of hot tub shell 104 and may be secured to hot tub shell 104 by any suitable mechanism configured to be water tight and secure. For example, jet body 804 may attach to hot tub shell 104 via threaded engagement, glue, press-fitting, and/or any other suitable attachment mechanism. In some examples, attaching jet body 804 may include threading the jet body into the hot tub body and/or the use of a compressive gasket.

Jet insert 806 may be coupled to jet body 804 from the interior of hot tub shell 104 after jet body 804 has been installed in hot tub shell 104. As discussed above and with respect to jet assembly 500, jet body 804 is configured to securely couple with and position jet insert 806. In some examples, jet body 804 and/or jet insert 806 may be installed from the exterior of hot tub shell 104. In some examples, jet body 804 and jet insert 806 may couple together through a hole in the hot tub shell, thereby attaching both parts to the hot tub shell.

A further step in the installation of jet assembly 800 may include coupling jet back 802 (which is attached to tubing 120) to jet body 804 (which is attached to hot tub shell 104). Jet back 802 may be coupled with jet body 804 by a "press-and-click" method (described above). For example, jet back 802 and jet body 804 may be aligned and then compressed together to overcome the resistive force of spring biased clips 832. In the embodiment shown in FIG. 30, spring biased clips 832 are configured to flex outward, away from a default position (e.g., away from longitudinal axis 814), when sloped lip 840 slides over proximate end 846 of jet body 804 and along an external portion of upstream portion 824. Spring biased clips 832 are further configured to snap back into the default position (e.g., back towards longitudinal axis 814) when sloped lip 840 encounters groove 834 of jet body 804. Sloped lip 840 prevents spring biased clips 832, and thus jet back 802, from sliding towards proximate end 846 and off of jet body 804. Thus, jet back 802 and jet body 804 are coupled together.

In some examples, jet back 802 and jet body 804 may be configured to be able to be unlocked and/or uncoupled. Uncoupling jet back 802 from jet body 804 may be accomplished by moving spring biased clips 832 away from jet body 804 (e.g., away from longitudinal axis 814) and sliding the jet back off of the jet body. In some examples, a worker may accomplish this using a finger to move the spring biased clips and/or using a tool. Releasably coupling the jet back and the jet body together may be advantageous as it may, among other advantages, allow a worker to uncouple a jet back that was coupled to the wrong jet body by mistake.

Each of the components of jet assembly 800 (e.g., jet back 802, jet body 804, and jet insert 806) may be constructed out of any suitable material. For example, the components of jet assembly 800 may include any suitable thermoplastic polymer such as polyvinyl chloride (PVC), acrylonitrile butadiene styrene (ABS), and/or any other suitable materials having similar properties (i.e., stiffness etc.). The components of jet assembly 800 may be manufactured using any suitable process. For example, the manufacturing process may include the use of injection molding, compression molding, and/or extrusion methods. In some examples, each component may be injection molded out of PVC.

System Using Both Straight and Angled Jets

As described above, a single plumbing system may include both straight back jet assemblies and angled back jet assemblies. A combination of styles of jet backs may be advantageous in situations where a hot tub includes areas having little space between hot tub shell 104 and hot tub frame 102.

As has been indicated, jets 300 and 600, jets 400 and 700, and jets 500 and 800, are each substantially similar to the other except for the orientation of the air and water ingress ports. For example, jets 300 and 600 are substantially the same except that jet 600 has air and water ingress ports oriented at an angle relative to longitudinal axis 614 (which corresponds to longitudinal axis 314) whereas jet 300 has air and water ingress ports that are parallel to longitudinal axis 314. Thus, a jet body 304/604 can be coupled with either a straight jet back 302 or an angled jet back 602. This may be useful in a plumbing system, as the same kind of jet body can be installed in all jet locations on a hot tub, and a worker can couple either a straight back jet back (302) or an angled back jet back (602) to the jet body as needed depending on the location within the hot tub. Accordingly, jets 300 and 600 may form a jet system.

In embodiments which include multiple sizes of jet body 304/604, each size of jet body may be configured to be able to couple with either a straight back jet back or an angled back jet back. In other words, different sizes of jet body may be installed in different locations on hot tub shell 104 depending on the application and/or the design of the hot tub, and either a straight back jet back or an angled back jet back may be coupled to each jet body depending only on the amount of space available adjacent to the jet body. Further, the style and/or size of the jet insert which is coupled to each jet body depends on the size of the jet body and/or the design of the hot tub but may be independent of the style of jet back used at that location.

B. Illustrative Manifold Assembly

This section describes illustrative embodiments of a set of manifold assembly components; see FIGS. 31-53.

Figure 31:
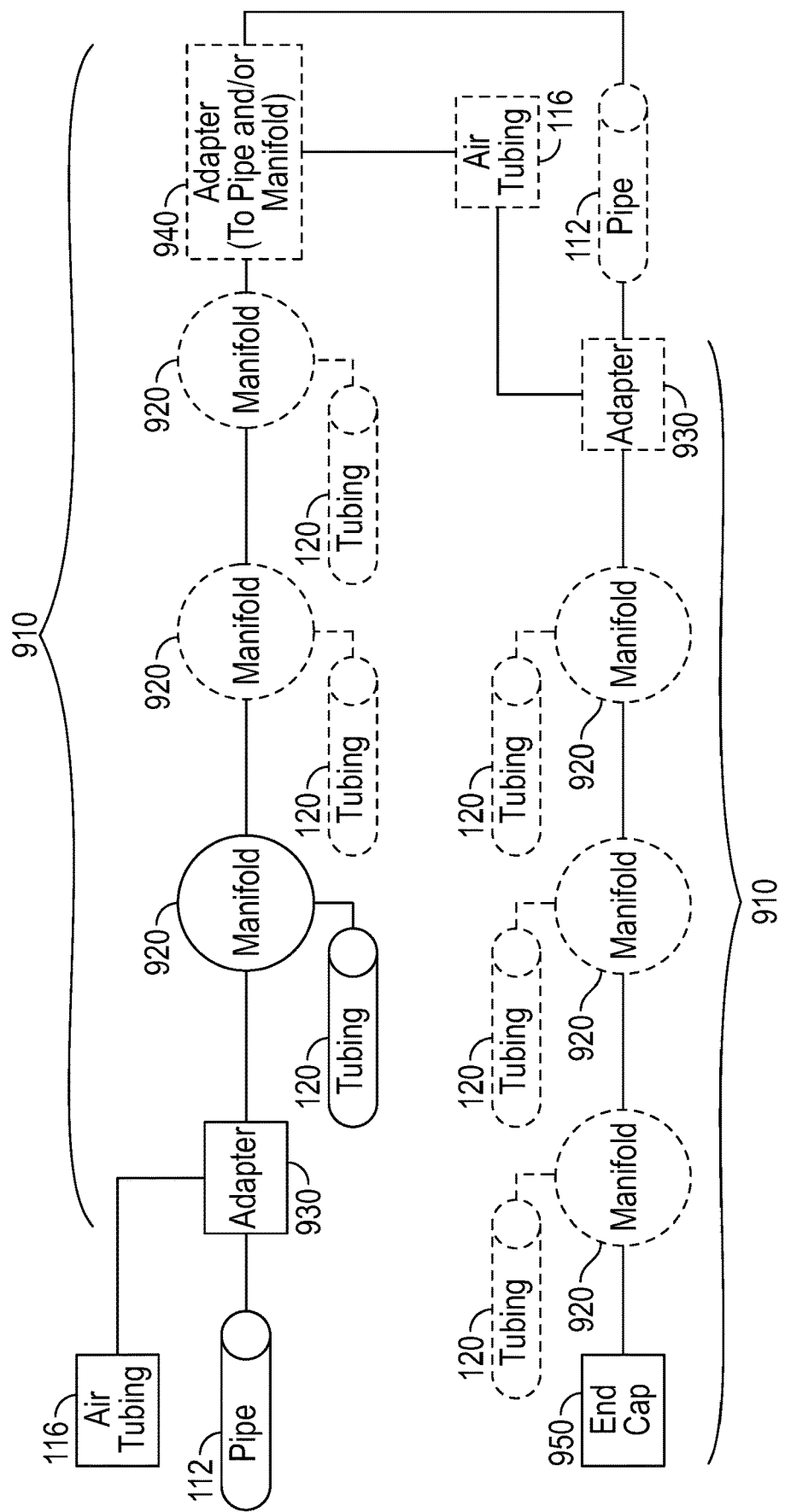
FIG. 31 is a block diagram of a plumbing system showing how manifolds may be integrated into the system, according to aspects of the present teachings.

FIG. 31 is a block diagram of a plumbing system showing how manifolds may be integrated into the system. A hot tub air and water supply manifold assembly, generally indicated at 910, may be formed using one or more manifold assembly components. Illustrative hot tub air and water supply manifold assembly 910 may also be referred to as a manifold assembly. The set of manifold assembly components may include an air and water supply manifold 920, a male manifold adapter 930, a female manifold adapter 940, and a manifold end cap 950.

Additionally, or alternatively, air and water supply manifold 920 may be referred to as a hot tub manifold, a hot tub air and water manifold, a supply manifold, and/or a manifold. Air and water supply manifold 920 is an example of manifold 118, described above. Additionally, or alternatively, male manifold adapter 930 may be referred to as a male adapter. Male adapter 930 is an example of adapter 110, described above. Additionally, or alternatively, female manifold adapter 940 may be referred to as a female adapter. Female adapter 940 is an example of adapter 128, described above. Additionally, or alternatively, manifold end cap 950 may be referred to as an end cap. End cap 950 is an example of end cap 130, described above. Accordingly, similar components may be labeled with similar reference numbers.

Manifold System Overview

The set of manifold assembly components includes each of the components used in forming a manifold assembly. The set of manifold assembly components includes manifold 920, male adapter 930, female adapter 940, and end cap 950. Manifold assembly 910 is composed of any suitable number of each of the components in the set of manifold assembly components and may include any suitable structures configured to separately convey air and water from respective air and water sources to a plurality of lengths of tubing 120. For example, manifold assembly 910 may include male adapter 930, any suitable number of manifolds 920, and female adapter 940 or end cap 950. In some examples, hot tub 100 may include any suitable number of manifold assemblies 910. Each manifold assembly 910 may include any suitable number of manifolds 920. In some examples, manifold assembly 910 may not include female adapter 940 and/or end cap 950.

FIG. 31 is a block diagram which includes two illustrative manifold assemblies 910 and depicts an example of how manifold assembly 910 may interact with other plumbing components. As seen in FIG. 31, male adapter 930 receives air and water from air tubing 116 and pipe 112 respectively. Male adapter 930 is in fluid communication with manifold 920. Each manifold 920 may be in fluid communication with tubing 120 and with female adapter 940, end cap 950, and/or one or two other manifolds 920. Sometimes manifold assembly 910 may include female manifold 940 and sometimes manifold assembly 910 may include end cap 950. This is shown in FIG. 31: one of the illustrative manifold assemblies 910 in FIG. 31 includes female manifold 940 and the other illustrative manifold assembly 910 includes end cap 950. In FIG. 31, both illustrative manifold assemblies 910 include three manifolds 920, however, manifold assembly 910 may include more or less than three manifolds 920. Each of the components of manifold assembly 910 and how the components may couple together is described in more detail in the following sections.

Manifold 920 may include any suitable structures configured to separately receive air and water from a second component, to pass a first portion of the air and water as separate streams to a third component, and to allow a second portion of the air and water to pass as separate streams to tubing 120. The second component may include male adapter 930 or another manifold 920. The third component may include female adapter 940, end cap 950, or another manifold 920. Manifold 920 may receive air and water from the second component as separate air and water supply streams.

Manifold 920 is configured to couple with the second and third components and with tubing 120. For example, an upstream end of manifold 920 may be configured to releasably couple with the second component and a downstream end of manifold 920 may be configured to releasably couple with the third component. Manifold 920 may include any suitable structure configured to form a water and/or air tight connection with the second and third components such that manifold 920 is in fluid communication with the second and third components and such that the streams of air and water remain separate. For example, manifold 920 may include a water conduit which is in fluid communication with water conduits of the second and third components and an air conduit which is in fluid communication with air conduits of the second and third components.

Manifold 920 may further include any suitable structure configured to form a water and/or air tight connection with tubing 120 such that manifold 920 passes the second portion of the air and water to tubing 120 as separate streams. For example, manifold 920 may include air and water egress ports which may be in fluid communication with tubing 120. In some examples, coupling manifold 920 to tubing 120 may include using a clamp.

Male adapter 930 may include any suitable structures configured to separately receive air from air tubing 116 and water from pipe 112, and to pass the air and water as separate streams to a manifold 920. Male adapter 930 is configured to couple with at least manifold 920, air tubing 116, and pipe 112. For example, an upstream end of male adapter 930 may be configured to couple with air tubing 116 and with pipe 112, and a downstream end may be configured to releasably couple with manifold 920. Male adapter 930 may include any suitable structure configured to form a water and/or air tight connection with air tubing 116 and pipe 112 such that male adapter 930 is in fluid communication with air tubing 116 and pipe 112 and such that the streams of air and water remain separate. Male adapter 930 may further include any suitable structure configured to form a water and/or air tight connection with manifold 920 such that male adapter 930 is in fluid communication with manifold 920 and such that the streams of air and water remain separate. For example, male adapter 930 may include a water conduit which is in fluid communication with pipe 112 and with a water conduit of manifold 920 and an air conduit which is in fluid communication with air tubing 116 and with an air conduit of manifold 920.

Female adapter 940 may include any suitable structures configured to separately receive air and water from manifold 920, and to pass the air and water as separate streams to air tubing 116 and pipe 112. Female adapter 940 is configured to couple with at least manifold 920, air tubing 116, and pipe 112. For example, an upstream end of female adapter 940 may be configured to releasably couple with manifold 920, and a downstream end of female adapter 940 may be configured to couple with air tubing 116 and with pipe 112. Female adapter 940 may include any suitable structure configured to form a water and/or air tight connection with manifold 920 such that female adapter 940 is in fluid communication with manifold 920 and such that the streams of air and water remain separate. Female adapter 940 may further include any suitable structure configured to form a water and/or air tight connection with air tubing 116 and pipe 112 such that female adapter 940 is in fluid communication with air tubing 116 and pipe 112 and such that the streams of air and water remain separate. For example, female adapter 940 may include a water conduit which is in fluid communication with a water conduit of manifold 920 and with pipe 112 and an air conduit which is in fluid communication with an air conduit of manifold 920 and with air tubing 116.

End cap 950 may include any suitable structures configured to end the streams of air and water while keeping the streams of air and water separate. End cap 950 is configured to couple with at least manifold 920. For example, an upstream end of end cap 950 may be configured to releasably couple with manifold 920, and a downstream end of end cap 950 may be sealed so as to prevent the flow of air and/or water out of the plumbing system. End cap 950 may include any suitable structure configured to form a water and/or air tight connection with manifold 920 such that the flow of air and/or water ends and such that the streams of air and water remain separate. For example, end cap 950 may include a water cap which couples with a water conduit of manifold 920 and an air cap which couples with an air conduit of manifold 920.

In a plumbing system according to the present teachings, one or more manifolds 920 may be used in combination with one or more other components. For example, male adapter 930 may provide air and water as separate streams to a first manifold 920, the first manifold may be in fluid communication with one or more other manifolds 920, and end cap 950 may be coupled with a last manifold 920. In some examples, female adapter 940 may be coupled with the last manifold in place of an end cap. In some examples, female adapter 940 may be couple with another length of pipe 112 which leads to a second male adapter 930 which is coupled to another group of manifolds. Together, male adapter 930, one or more manifolds 920, and female adapter 940 or end cap 950 form manifold assembly 910.

This section includes a description of two possible embodiments of set of manifold assembly components 900. A person of ordinary skill in the art will recognize that other embodiments or variations of each component are possible.

First Embodiment of a Manifold

FIGS. 32-36 depict various views of a first embodiment 1000 of hot tub air and water multi-port supply manifold 920 which is suitable for use in a first embodiment 912 of manifold assembly 910. Hot tub air and water supply manifold 1000 is an example of manifold 920 described briefly above and forms part of a first embodiment of the set of manifold assembly components. Accordingly, similar components may be labeled with similar reference numbers.

Figure 32:
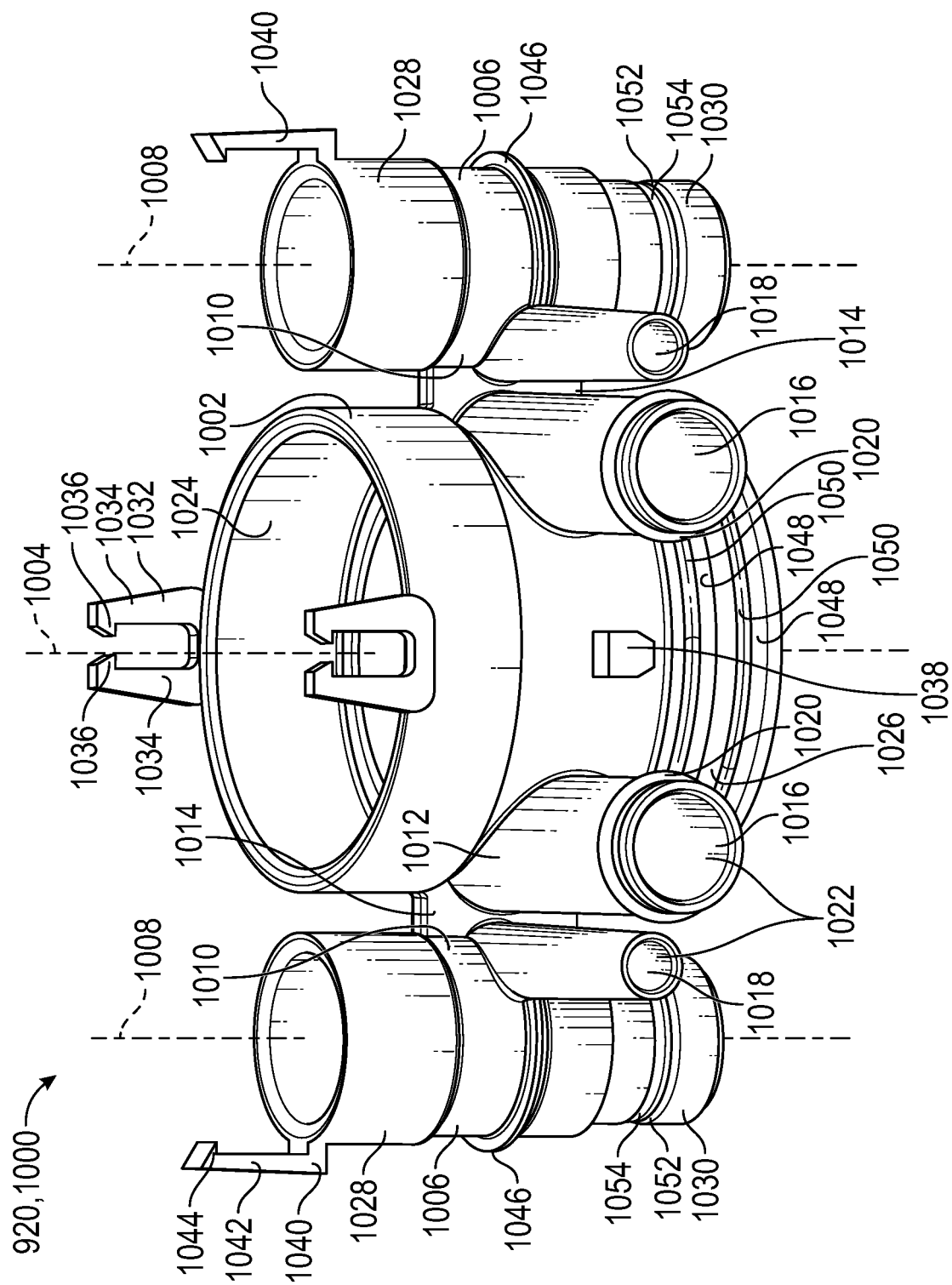
FIG. 32 is an isometric view of an air and water supply manifold, according to aspects of the present teachings.
Figure 33:
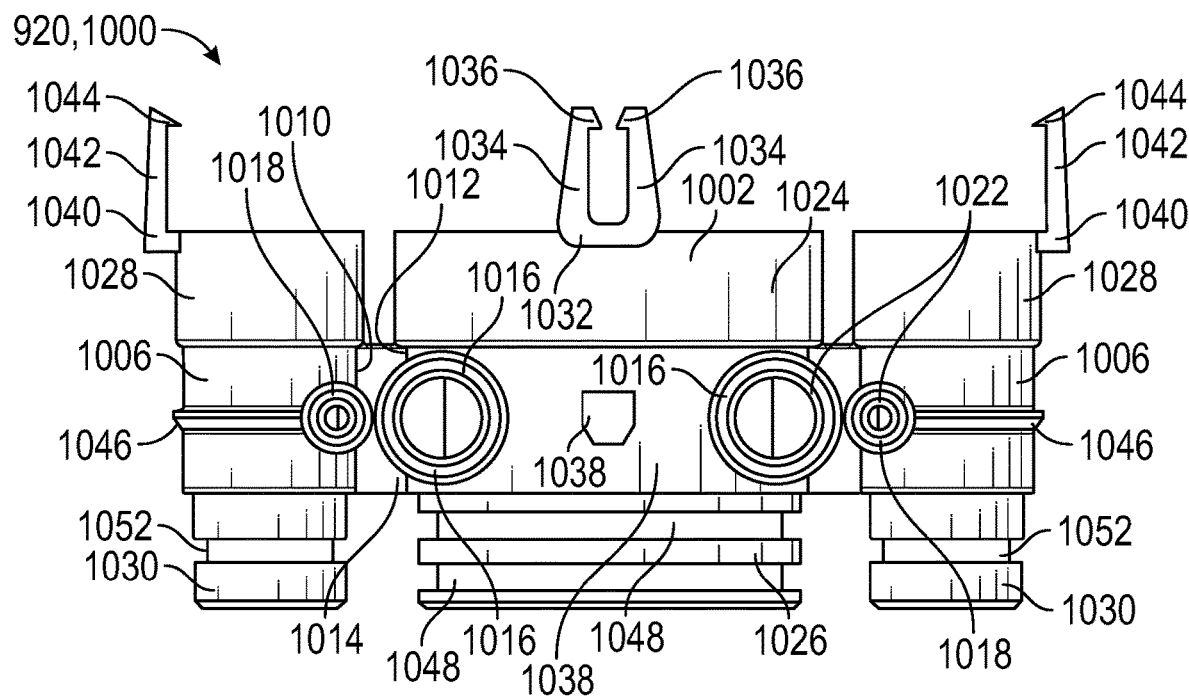
FIG. 33 is a front elevational view of the manifold of FIG. 32.
Figure 34:
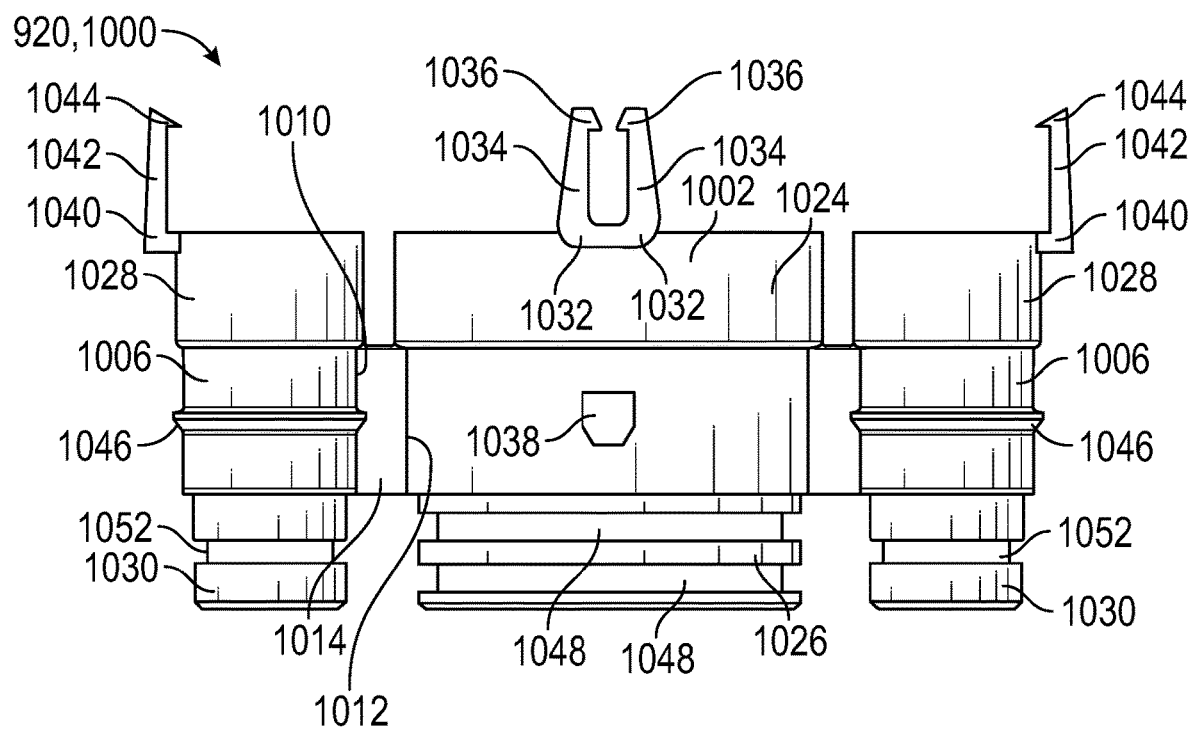
FIG. 34 is a rear elevational view of the manifold of FIG. 32.
Figure 35:
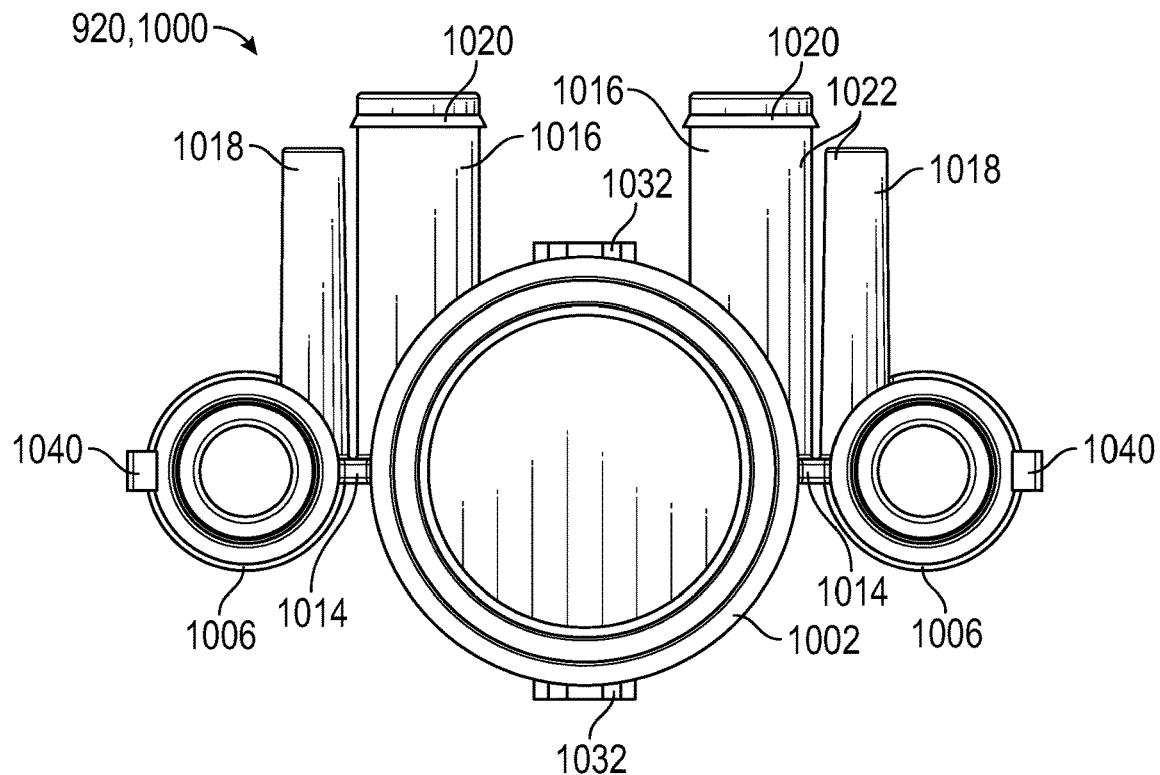
FIG. 35 is a top view of the manifold of FIG. 32.
Figure 36:
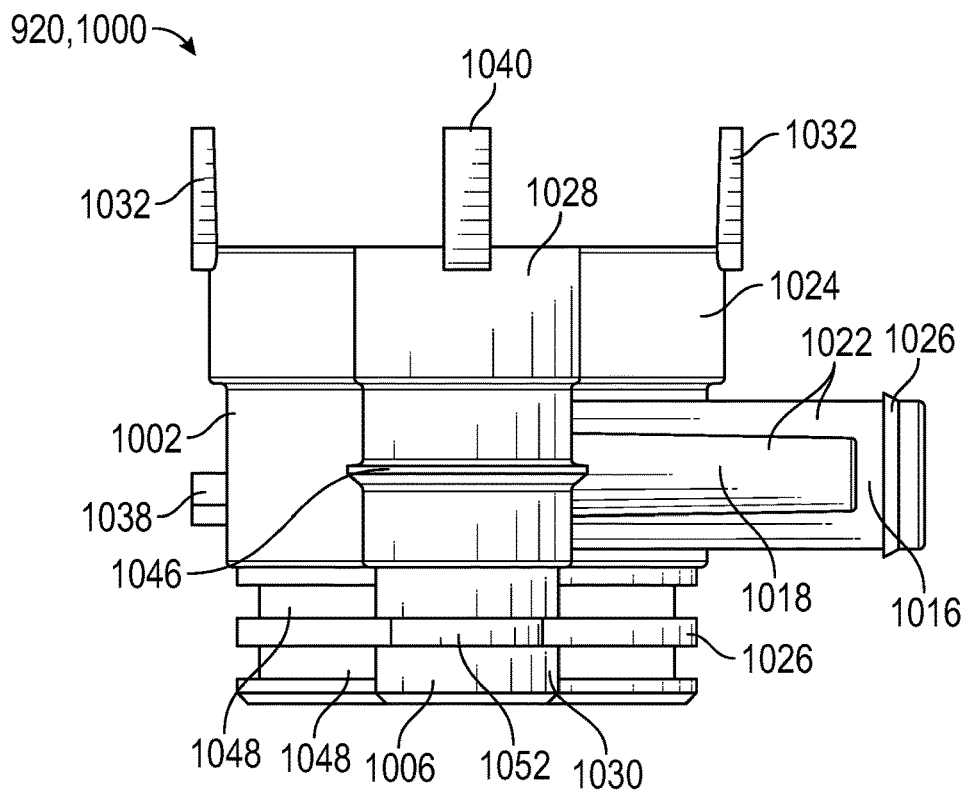
FIG. 36 is a side elevational view of the manifold of FIG. 32.
Figure 37:
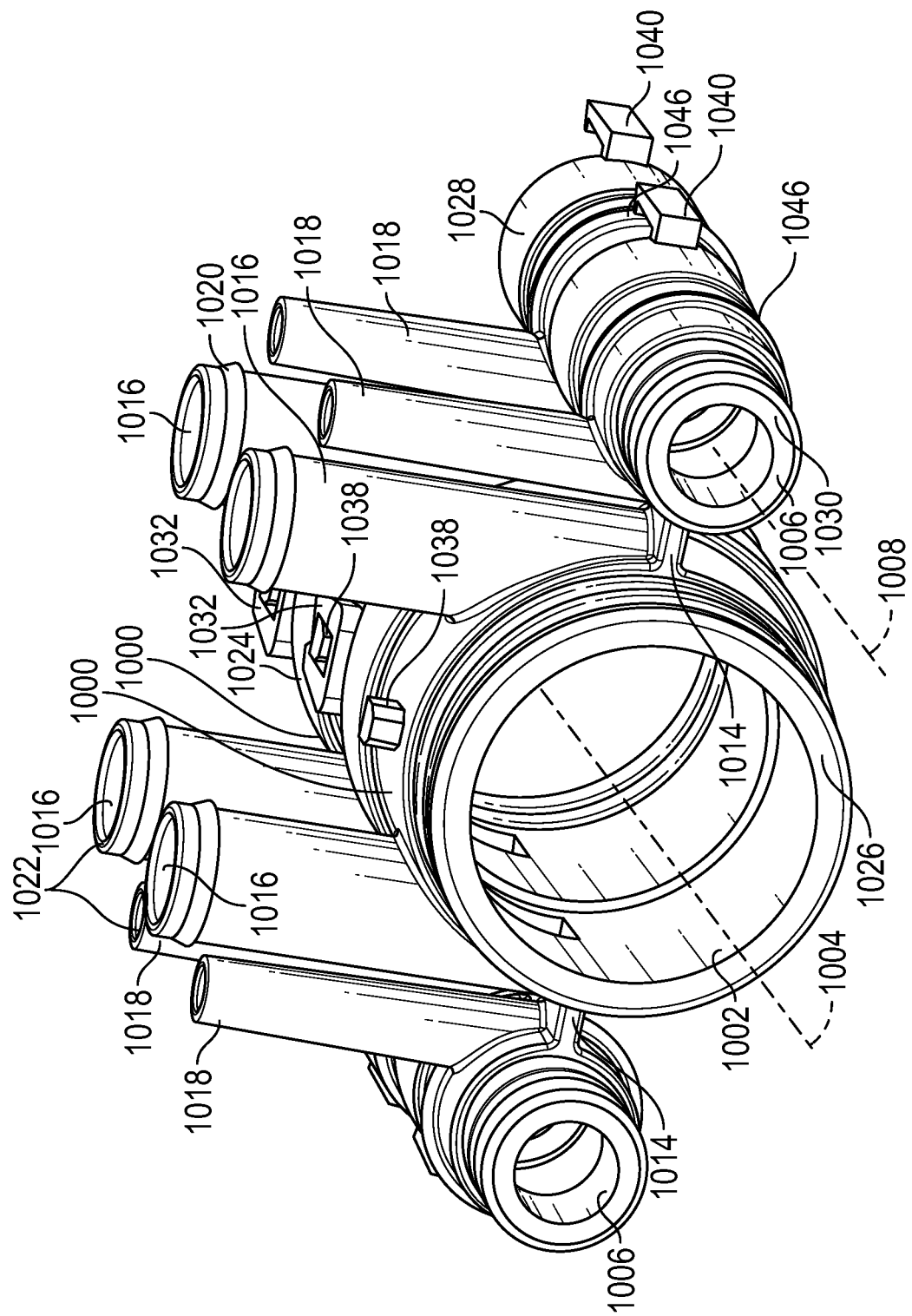
FIG. 37 is an isometric view showing two manifolds of the type depicted in FIGS. 32-36 attached together.

FIG. 32 is an oblique isometric view of manifold 1000; FIG. 32 shows two O-rings. FIG. 33 is a top plan view of manifold 1000 without the O-rings. FIG. 34 is a bottom plan view of manifold 1000. FIG. 35 is a front elevation view of manifold 1000 and FIG. 36 is a side elevation view of manifold 1000. FIG. 37 is an oblique isometric view of two manifolds 1000 coupled together.

Manifold 1000 includes a water conduit 1002 defining a first longitudinal axis 1004. Water conduit 1002 may include any suitable structure configured to receive water from the second component and to deliver at least a first portion of the water to the third component. In some examples, water conduit 1002 may receive water from the second component as a water supply stream. For example, water conduit 1002 may be a substantially cylindrical tube as in FIGS. 32-36. Manifold 1000 further includes at least one air conduit 1006 defining a second longitudinal axis 1008. Air conduit 1006 may include any suitable structure configured to receive air from the second component and to deliver at least a first portion of the air to the third component. In some examples, air conduit 1006 may receive air from the second component as an air supply stream. For example, air conduit 1006 may include a substantially cylindrical tube as in FIGS. 32-36.

In this embodiment, second longitudinal axis 1008 is substantially parallel to first longitudinal axis 1004 and air conduit 1006 includes a periphery 1010 joined to a periphery 1012 of water conduit 1002 via support structure 1014. Support structure 1014 may include any suitable structure for rigidly connecting air conduit 1006 to water conduit 1002. For example, support structure 1014 may include a rigid strut as best seen in FIGS. 32-35. In some examples, second longitudinal axis 1008 may have any suitable orientation with respect to first longitudinal axis 1004 and air conduit 1006 may be joined with water conduit 1002 in any suitable manner.

Manifold 1000 may include any suitable number of water conduits 1002 and air conduits 1006. For example, in the embodiment shown in FIGS. 32-36, manifold 1000 includes two air conduits 1006 rigidly connected to one water conduit 1002. In embodiments having two or more air conduits 1006, the two or more second longitudinal axes 1008 may have any suitable disposition and/or orientation in relation to first longitudinal axis 1004. In the embodiment shown in FIGS. 32-36, two second longitudinal axes 1008 are disposed on either side of, and lie in a plane with, first longitudinal axis 1004. That is, the two air conduits are disposed on opposite sides of the water conduit. In other words, in the embodiment shown in FIGS. 32-36, a first air conduit is joined to a first portion of the periphery of the water conduit, a second air conduit is joined to a second portion of the periphery of the water conduit, and the first and second portions of the periphery of the water conduit are separated from each other by approximately 180 degrees.

Manifold 1000 further includes a water egress port 1016 in fluid communication with water conduit 1002 and an air egress port 1018 in fluid communication with air conduit 1006. Water egress port 1016 and air egress port 1018 are disposed substantially parallel and adjacent to each other and are configured to channel streams of water and air, respectively, to a length of tubing (such as tubing 120). Additionally, or alternatively, water egress port 1016 may be referred to as a water barb and/or air egress port 1018 may be referred to as an air barb. In some examples, water egress port 1016 may be larger than air egress port 1018.

Water egress port 1016 and air egress port 1018 may include any suitable structures configured to form a water tight seal with tubing 120. For example, water egress port 1016 may include a lip or ridge 1020 as can best be seen in FIGS. 35 and 36. Lip 1020 may include any suitable structure configured to ensure a water tight seal between water egress port 1016 and a length of tubing (such as tubing 120). For example, lip 1020 may include a sloped ridge as can best be seen in FIGS. 35 and 36. In some examples, air egress port 1018 may include a lip or other feature to ensure a seal. In some examples, an external portion of air egress port 1018 may be smooth as can best be seen in FIGS. 35 and 36.

Together water egress port 1016 and air egress port 1018 form a set of egress ports 1022. Manifold 1000 may include one or more sets of egress ports 1022. For example, the embodiment in FIGS. 32-36 includes two sets of egress ports 1022. In some examples, manifold 1000 may include a number of sets of egress ports 1022 that is substantially the same as the number of air conduits 1006 and each air egress port 1018 may be in fluid communication with a different air conduit 1006. In some examples, manifold 1000 may include a number of sets of egress ports 1022 that is substantially the same as or greater than the number of air conduits 1006 and two or more air egress ports 1018 may be in communication with the same air conduit. In some examples, manifold 1000 includes only one water conduit 1002 and all of the one or more water egress ports 1016 may be in fluid communication with the same water conduit.

In the embodiment of manifold 1000 shown in FIGS. 32-36, manifold 1000 includes one water conduit 1002, two air conduits 1006 separated by approximately 180 degrees, and two sets of egress ports 1022. In this embodiment, one air egress port 1018 is in communication with each air conduit 1006. In this embodiment, both sets of egress ports 1022 are disposed on the top of manifold 1000, and each water egress port 1016 and each air egress port 1018 are oriented substantially perpendicular to water conduit 1002 and air conduit 1006 respectively. In some embodiments, one or more of the sets of egress ports 1022 may be disposed on the top of manifold 1000 and/or one or more of the sets of egress ports 1022 may be disposed on the bottom of manifold 1000. In some examples, water egress port 1016 and air egress port 1018 may have any suitable orientation relative to water conduit 1002 and air conduit 1006.

In the embodiment shown in FIGS. 32-36, each water egress port 1016 is disposed on a central portion of manifold 1000 approximately equidistant from downstream end 1026 and upstream end 1024, and each air egress port 1018 is disposed on a central portion of manifold 1000 approximately equidistant from downstream end 1030 and upstream end 1028. In some examples, each water egress port 1016 and each air egress port 1018 may be disposed on any suitable portion of water conduit 1002 and air conduit 1006 respectively and may be any suitable distance from a respective downstream and/or upstream end.

In the embodiment shown in FIGS. 32-36, each set of egress ports 1022 is configured to couple with dual extrusion tubing having two parallel passages joined at a periphery (examples of dual extrusion tubing are discussed below). In embodiments where each set of egress ports 1022 is configured to couple with dual extrusion tubing, water egress port 1016 may be configured to couple with a first passage of the dual extrusion tubing and air egress port 1018 may be configured to couple with a second passage of the dual extrusion tubing. In this way, the streams of air and water are kept separate while being conveyed by the same length of tubing. In some examples, each set of egress ports 1022 may be configured to couple with any suitable kind of tubing. For example, each set of egress ports 1022 may be configured to couple with two separate lengths of tubing, one which carries air and one which carries water. In some examples, configuring set of egress ports 1022 to couple with different kinds of tubing may include changing the spacing between the air and water egress ports and/or the dimensions of the air and water egress ports.

Manifold 1000 may be further configured to couple with one or more other components. For example, water conduit 1002 may include an upstream end 1024 and a downstream end 1026 wherein upstream end 1024 is configured to couple with the downstream end of a water conduit of the second component and downstream end 1026 is configured to couple with the upstream end of a water conduit of the third component. Similarly, air conduit 1002 may include an upstream end 1028 and a downstream end 1030 wherein upstream end 1028 is configured to couple with the downstream end of an air conduit of the second component and downstream end 1030 is configured to couple with the upstream end of an air conduit of the third component. In some examples, either or both of the second and third components may be another manifold 1000. Additionally, or alternatively, the second component may be male adapter 930 and the third component may be female adapter 940 and/or an end cap 950.

To facilitate coupling with the one or more other components, manifold 1000 further includes attachment mechanisms for securing manifold 1000 to the second and third components. The attachment mechanisms may include any suitable structures depending on the characteristics of the manifold and the other components. In some examples, water conduit 1002 and air conduit 1006 may each include attachment mechanisms configured to engage with attachment mechanisms disposed on the water and air conduits, respectively, of the second and/or third components.

For example, upstream end 1024 of water conduit 1002 may include one or more spring biased clips configured to couple with a retaining post, hereinafter referred to as post clips 1032. Additionally, or alternatively, post clips 1032 may be referred to as spring-biased clips or water conduit clips. Post clips 1032 may include any suitable structure configured to couple with a retaining post disposed on the downstream end of the water conduit of the second component. For example, post clips 1032 may include a pair of flanges 1034 and a protrusion 1036 disposed on the end of each flange. Flanges 1034 may be flexibly resilient to allow the clip to flex around the retaining post and protrusions 1036 may be configured to engage with the retaining post of the second component (as shown in FIG. 37). Water conduit 1002 of manifold 1000 may also include a retaining post 1038 configured to engage with the third component.

Retaining post 1038 may include any suitable structure configured to engage with spring-biased clips similar to post clips 1032 on the upstream end of the water conduit of the third component. For example, retaining post 1038 may include a substantially pentagonal prism having a height approximately the same as or greater than the height of the post clips. In some examples, retaining post 1038 may be disposed on a middle portion of water conduit 1002 that lies between upstream end 1024 and downstream end 1026. In the embodiment shown in FIGS. 32-36, retaining post 1038 is approximately equidistant from both upstream end 1024 and downstream end 1026. In some examples, retaining post 1038 may be disposed on any suitable portion of water conduit 1002.

Air conduit 1006 of manifold 1000 also includes attachment mechanisms for engaging the air conduits of the second and third components. For example, upstream end 1028 of each air conduit 1006 may include one or more spring biased clips configured to couple with a retaining ridge, hereinafter referred to as ridge clips 1040. Additionally, or alternatively, ridge clips 1040 may be referred to as spring-biased clips or air conduit clips. Ridge clips 1040 may include any suitable structure configured to couple with a retaining ridge disposed on the air conduit of the second component. For example, ridge clips 1040 may include a resiliently flexible support 1042 and a sloped lip 1044 which is configured to engage with the retaining ridge of the second component.

To couple with the third component, air conduit 1006 of manifold 1000 may also include a retaining ridge 1046. Retaining ridge 1046 may include any suitable structure configured to engage with spring-biased clips (e.g., ridge clips) on the upstream end of the air conduit of the third component. For example, retaining ridge 1046 may include a ridge which extends around substantially the entire perimeter of the air conduit. In some examples, retaining ridge 1046 may be disposed on a middle portion of air conduit 1006 that lies between upstream end 1028 and downstream end 1030. In the embodiment shown in FIGS. 32-36, retaining ridge 1046 is approximately equidistant from both upstream end 1028 and downstream end 1030. In some examples, retaining ridge 1046 may be disposed on any suitable portion of air conduit 1006.

In addition to attachment mechanisms, manifold 1000 may include any suitable structures and/or mechanisms for ensuring a water-tight seal between manifold 1000 and the second and third components. For example, both water conduit 1002 and air conduit 1006 may include one or more structures configured to hold one or more O-rings. In the embodiment shown in FIGS. 32-36, downstream end 1026 of water conduit 1002 includes two recesses 1048 each of which is configured to retain an O-ring 1050. Recesses 1048 may include any suitable structure for retaining O-rings 1050 depending on the characteristics of manifold 1000 and the third component. For example, each recess 1048 may include a narrow channel disposed on downstream end 1026 and extending around the entire perimeter of the water conduit.

In some examples, recesses 1048 may be configured such that the outside edge of the O-ring is flush with or extends slightly beyond the surface of the downstream end of the water conduit as shown in FIG. 32. Allowing the O-ring to extend slightly beyond the surface of the water conduit may ensure a water tight seal by compressing the O-ring slightly between an inner surface of the water conduit of the third component and the bottom and sides of recesses 1048. In some examples, water conduit 1002 includes two recesses 1048 to accommodate two O-rings 1050 as in FIGS. 32-37. In some examples, water conduit 1002 may include any suitable number of O-rings in any suitable number of recesses.

In the embodiment shown in FIGS. 32-36, downstream end 1030 of each air conduit 1006 includes a recess 1052, configured to retain an O-ring 1054. In some examples, air conduit 1006 may include a plurality of recesses 1052. Recesses 1052 may include any suitable structure for retaining O-rings 1054 depending on the characteristics of manifold 1000 and the third component. For example, each recess 1052 may include a narrow channel disposed on downstream end 1030 extending around the entire perimeter of the air conduit.

In some examples, recesses 1052 may be configured such that the outside edge of the O-ring is flush with or extends slightly beyond the surface of the downstream end of the air conduit as shown in FIG. 32. Allowing the O-ring to extend slightly beyond the surface of the air conduit may ensure an air tight seal by compressing the O-ring slightly between an inner surface of the air conduit of the third component and the bottom and sides of recesses 1052. In some examples, air conduit 1006 includes one recess 1052 to accommodate one O-ring 1054 as in FIGS. 32-37. In some examples, air conduit 1006 may include any suitable number of O-rings in any suitable number of recesses.

As shown in FIGS. 32-37, water conduit 1002 and air conduit 1006 may have different diameters. Water conduit 1002 and air conduit 1006 may have any suitable dimensions depending on the application and the characteristics of manifold 1000. For example water conduit 1002 may have an outer diameter in the range of approximately 1.50 inches to approximately 3.00 inches and a wall thickness in the range of approximately 0.05 inches to approximately 0.50 inches while air conduit 1006 may have an outer diameter in the range of approximately 0.50 inches to approximately 2.00 inches and a wall thickness in the range of approximately 0.05 inches to approximately 0.50 inches. In some examples, the diameter of water conduit 1002 and the diameter of air conduit 1006 may not be constant. For example, upstream end 1024 of water conduit 1002 may have a larger diameter than downstream end 1026 of water conduit 1002 and upstream end 1028 of air conduit 1006 may have a larger diameter than downstream end 1030 of air conduit 1006.

In some examples, upstream end 1024 of water conduit 1002 may have an outer diameter of approximately 2.80 inches and a wall thickness of approximately 0.12 inches and downstream end 1026 of water conduit 1002 may have an outer diameter of approximately 2.50 inches and a wall thickness of approximately 0.12 inches. In some example, upstream end 1028 of air conduit 1006 may have an outer diameter of approximately 1.23 inches and a wall thickness of approximately 0.09 inches, and downstream end 1030 of air conduit 1006 may have an outer diameter of approximately 1.00 inches and a wall thickness of approximately 0.09 inches. In some examples, upstream end 1024 and downstream end 1026 of water conduit 1002 and upstream end 1028 and downstream end 1030 of air conduit 1006 may have any suitable diameters and wall thicknesses depending on the application and the characteristics of manifold 1000 and other components.

O-rings 1050 and O-rings 1054 may have any suitable dimensions, materials, and/or properties. In some examples, O-rings 1050 and O-rings 1054 may have different dimensions, materials, and/or properties. For example, O-ring 1050 may be larger in diameter than O-ring 1054. For example, O-rings 1050 may have an outer diameter between approximately 1.3 inches and approximately 3.2 inches and O-rings 1054 may have an outer diameter between approximately 0.3 inches and approximately 2.2 inches. In some examples, O-rings 1050 may have an outer diameter of approximately 2.44 inches and O-rings 1054 may have an outer diameter of approximately 0.95 inches.

O-rings 1050 and 1054 also may have any suitable cross-sectional diameter. For example, O-rings 1050 may have a cross-sectional diameter or thickness between approximately 0.10 inches and approximately 0.20 inches, and O-rings 1054 may have a cross-sectional diameter or thickness between approximately 0.07 inches and approximately 0.17 inches. In some examples, O-ring 1050 may have a cross-sectional diameter of approximately 0.14 inches and O-ring 1054 may have a cross-sectional diameter of approximately 0.10 inches. In some examples, O-rings 1050 and 1054 may have any suitable outer diameter and cross-sectional diameter (thickness). O-rings 1050 and 1054 may be installed on manifold 1000 prior to assembling the plumbing system. O-rings 1050 and 1054 may be constructed out of any suitable material. For example, O-rings 1050 and 1054 may be constructed out of elastomer such as any suitable thermosetting polymer and/or thermoplastic.

Manifold 1000, which also may be referred to as a "manifold body," is configured to be coupled with two other plumbing system components. Manifold 1000 may be configured to be coupled with the second and third components by a "press-and-click" method (described above). The "press-and-click" method may be facilitated by post clips 1032, retaining posts 1038, ridge clips 1040, and retaining ridge 1046. For example, manifold 1000 and the second component may be aligned and then compressed together to overcome the resistive force of ridge clips 1040 and post clips 1032. In the embodiment shown in FIGS. 32-37, flanges 1034 of post clips 1032 are configured to flex apart, away from a default position (e.g., away from each other), when protrusions 1036 slide over a retaining post on the second component. Post clips 1032 are further configured to snap back into the default position (e.g., back towards each other), once protrusions 1036 pass by the retaining post on the second component. Protrusions 1036 prevent post clip 1032, and thus manifold 1000, from sliding off of the second component.

Similarly, in the embodiment shown in FIGS. 32-37, ridge clips 1040 are configured to flex outward, away from a default position (e.g., away from second longitudinal axis 1008), when sloped lip 1044 slides over a retaining ridge on the second component. Ridge clips 1040 are further configured to snap back into the default position (e.g., back towards second longitudinal axis 1008) once sloped lip 1044 passes over the retaining ridge on the second component. Sloped lip 1044 prevents ridge clip 1040, and thus manifold 1000, from sliding off of the second component.

Manifold 1000 may be coupled with the third component via a similar method. For example, manifold 1000 and the third component may be aligned and then compressed together to overcome the resistive force of the ridge clips and post clips of the third component. In the embodiment shown in FIGS. 32-37, retaining post 1038 is configured to force the spring biased clips on the air conduit of the third component (e.g., post clips 1032) to flex outward (e.g., away from each other) when the clips begin to slide past retaining post 1038. Once a lip or protrusion (e.g., protrusion 1036) on the spring biased clips has passed retaining post 1038, the clips snap back into the default position (e.g., back towards each other). Retaining post 1038 prevents the third component from sliding off the manifold by engaging with the lip or protrusion on the spring biased clips of the third component.

Similarly, in the embodiment shown in FIGS. 32-37, retaining ridge 1046 is configured to force the spring biased clips on the air conduit of the third component (e.g., ridge clips 1040) to flex outward (e.g., away from second longitudinal axis 1008) when the clips begin to slide over retaining ridge 1046. Once a lip or protrusion (e.g., sloped lip 1044) on the spring biased clips has passed over retaining ridge 1046, the clips snap back into the default position. Retaining ridge 1046 prevents the third component from sliding off of manifold 1000 by engaging with a lip or protrusion on the spring biased clips of the third component.

In some examples, manifold 1000 and the second and third components may be configured to be able to be unlocked and/or uncoupled. Uncoupling manifold 1000 from the second component may be accomplished by moving flanges 1034 of the post clips away from each other (e.g., away from the retaining post), moving ridge clips 1040 away from the air conduit (e.g., away from second longitudinal axis 1008), and sliding the manifold off of the second component. Uncoupling manifold 1000 from the third component may be accomplished by moving the flanges of the post clips on the third component away from each other (e.g., away from retaining post 1038), moving the ridge clips of the third component away from air conduit 1006, and sliding the third component off of manifold 1000. In some examples, a worker may accomplish this using a finger or fingers to move the clips and/or using a tool. Releasably coupling the manifold and the other components together may be advantageous as it may allow a worker to uncouple a manifold that was coupled to the wrong component by mistake.

Manifold 1000 may be constructed out of any suitable material. For example, manifold 1000 may include any suitable thermoplastic polymer such as polyvinyl chloride (PVC), acrylonitrile butadiene styrene (ABS), and/or any other suitable materials having similar properties (i.e., stiffness etc.). Manifold 1000 may be manufactured using any suitable process. For example, the manufacturing process may include the use of injection molding, compression molding, and/or extrusion methods. In some examples, each component may be injection molded out of PVC.

First Embodiment of a Male Manifold Adapter

Figure 38:
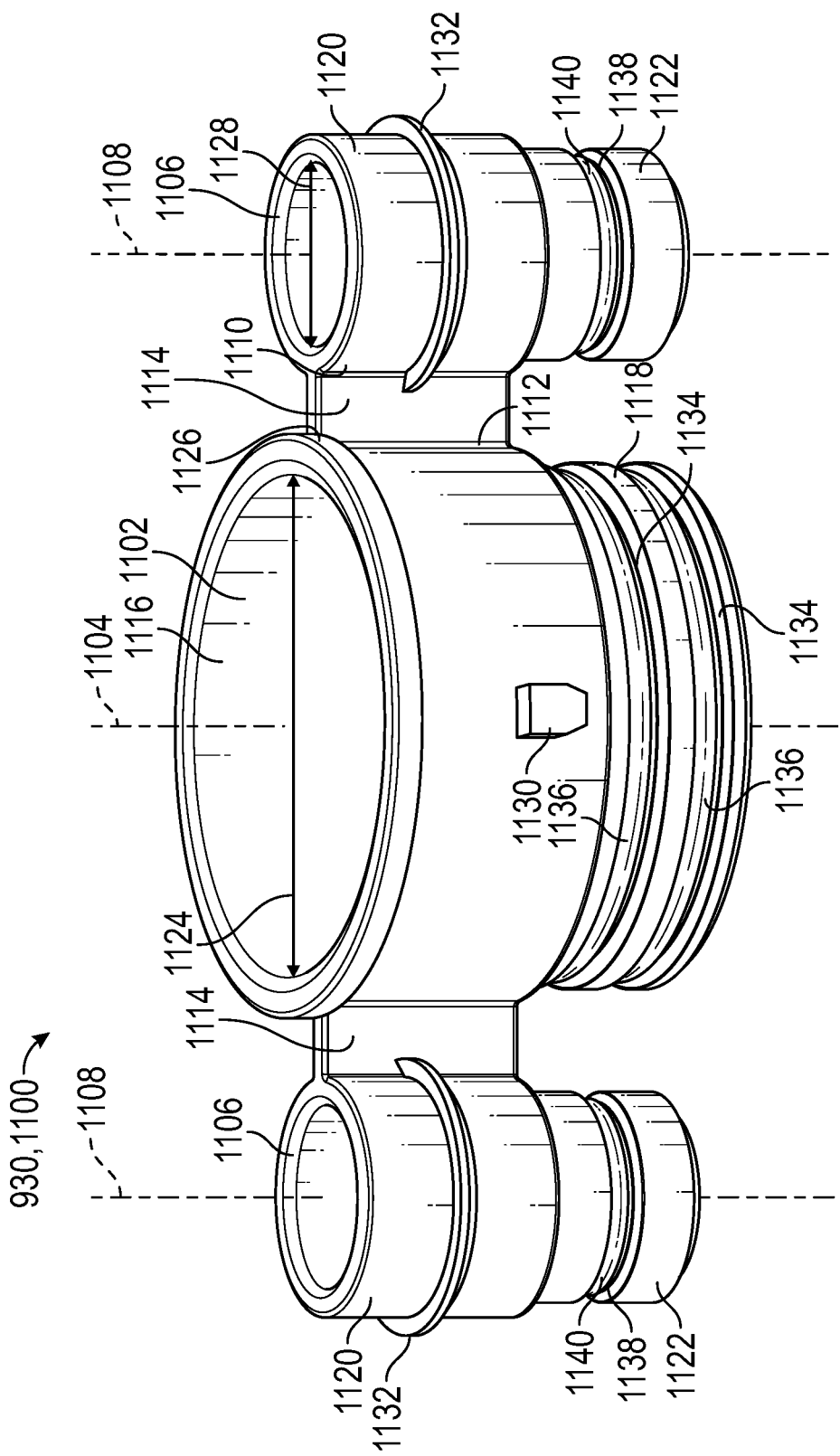
FIG. 38 is an isometric view of a male manifold adapter, according to aspects of the present teachings.
Figure 39:
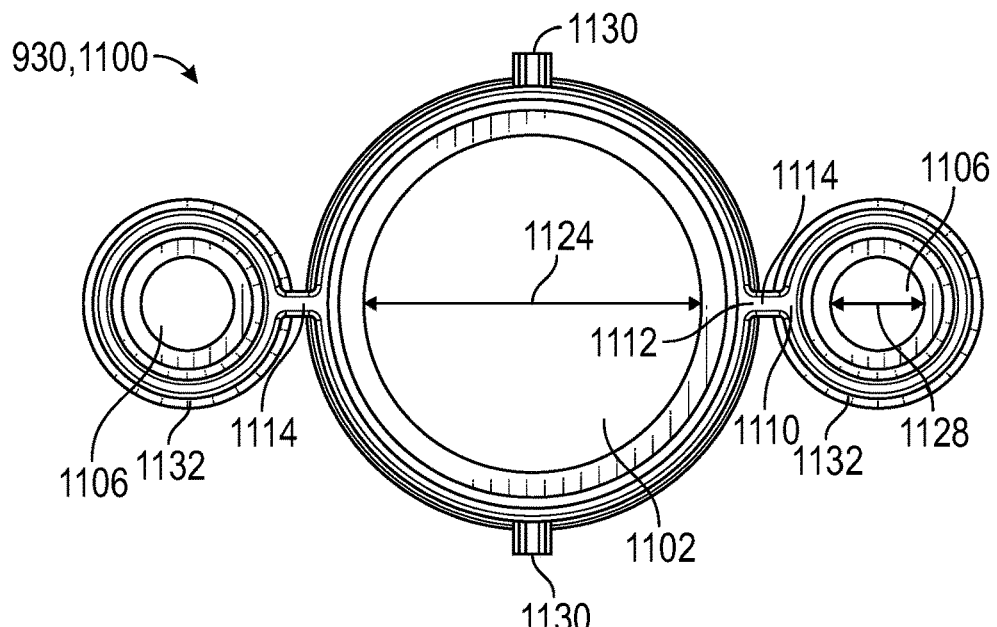
FIG. 39 is a bottom view of the male manifold adapter of FIG. 38.
Figure 40:
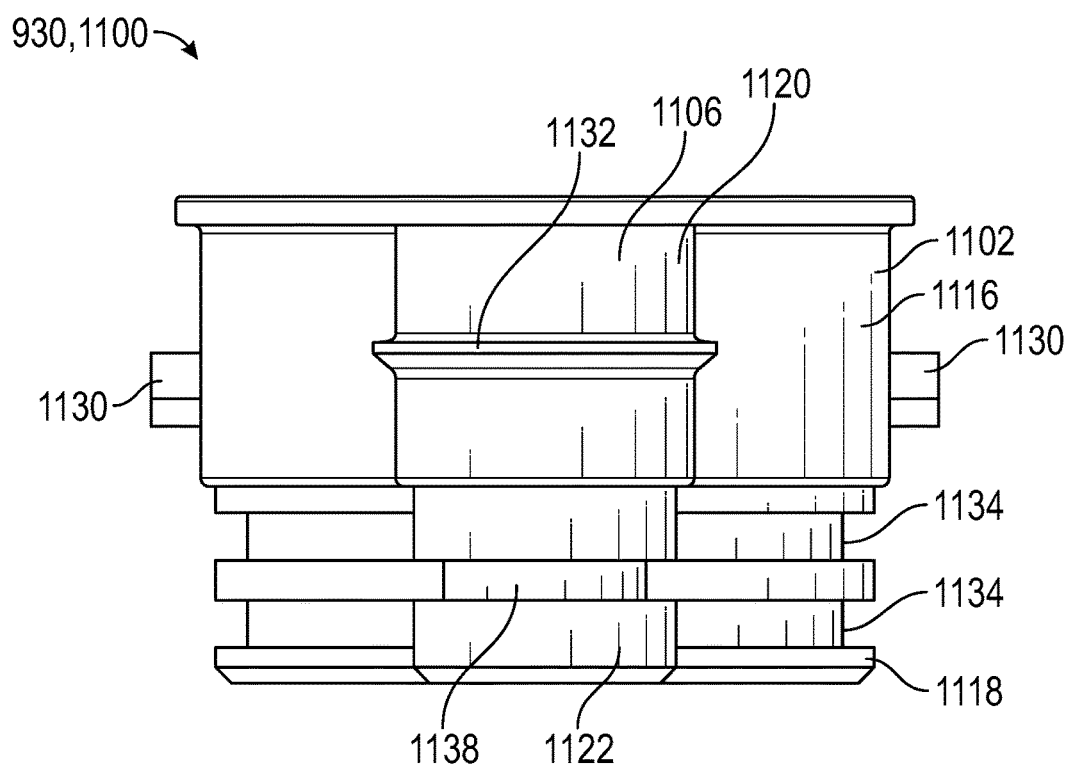
FIG. 40 is a side elevational view of the male manifold adapter of FIG. 38.

FIGS. 38-40 depict various views of a first embodiment 1100 of male manifold adapter 930 which is suitable for use with manifold 1000 in manifold assembly 912. Male manifold adapter 1100 is an example of male adapter 930 described briefly above and, along with manifold 1000, forms part of the first embodiment of the set of manifold assembly components. Accordingly, similar components may be labeled with similar reference numbers. Additionally, or alternatively, male manifold adapter 1100 may be referred to as a male adapter.

Male manifold adapter 1100 is configured to couple with manifold 1000 and to provide air and water as separate streams to manifold 1000. Accordingly, many features of male manifold adapter 1100 are substantially similar to manifold 1000; the primary differences between male adapter 1100 and manifold 1000 are that male adapter 1100 lacks air and water egress ports and the upstream end is configured to couple directly with air and water supply tubing.

FIG. 38 is an oblique isometric view of male adapter 1100; FIG. 38 shows two O-rings. FIG. 39 is a bottom plan view of male adapter 1100. FIG. 40 is a side elevation view of male adapter 1100. FIGS. 39 and 40 do not show the O-rings.

Male adapter 1100 includes a water conduit 1102 defining a first longitudinal axis 1104. Water conduit 1102 may include any suitable structure configured to receive a stream of water from, for example, pipe 112, and to deliver the stream of water to, for example, manifold 1000. In some examples, water conduit 1102 may be a substantially cylindrical tube as in FIGS. 38-40. Male adapter 1100 further includes at least one air conduit 1106 defining a second longitudinal axis 1108. Air conduit 1106 may include any suitable structure configured to receive a stream of air from, for example, air tubing 116, and to deliver the stream of air to, for example, manifold 1000. In some examples, air conduit 1106 may include a substantially cylindrical tube as in FIGS. 38-40. In this embodiment, second longitudinal axis 1108 is substantially parallel to first longitudinal axis 1104 and air conduit 1106 includes a periphery 1110 joined to a periphery 1112 of water conduit 1102 via support structure 1114. Support structure 1114 may include any suitable structure for rigidly connecting air conduit 1106 to water conduit 1102. For example, support structure 1114 may include a rigid strut as best seen in FIGS. 38-39. In some examples, second longitudinal axis 1108 may have any suitable orientation with respect to first longitudinal axis 1104 and air conduit 1106 may be joined with water conduit 1102 in any suitable manner.

Male adapter 1100 may include any suitable number of water conduits 1102 and air conduits 1106. For example, male adapter 1100 may include two air conduits 1106 rigidly connected to one water conduit 1102 as best seen in FIGS. 38-39. In embodiments having two or more air conduits 1106, the two or more second longitudinal axes 1108 may have any suitable disposition and/or orientation in relation to first longitudinal axis 1104. For example, in the embodiment shown in FIGS. 38-40, two second longitudinal axes 1108 are disposed on either side of, and lie in a plane with, first longitudinal axis 1104. That is, the two air conduits are disposed on opposite sides of the water conduit. In other words, in the embodiment shown in FIGS. 38-40, a first air conduit of the male adapter is joined to a first portion of the periphery of the water conduit of the male adapter, a second air conduit of the male adapter is joined to a second portion of the periphery of the water conduit, and the first and second portions of the periphery of the water conduit are separated from each other by approximately 180 degrees.

Note that since male adapter 1100 is configured to couple with manifold 1000, male adapter 1100 generally has the same number of water conduits as manifold 1000 and the same number of air conduits as manifold 1000. For example, in embodiments wherein manifold 1000 includes one water conduit and two air conduits, male adapter 1100 will include one water conduit and two air conduits. In examples wherein male adapter 1100 has a different number of air and/or water conduits than manifold 1000, any suitable structure may be used to plug, seal, and/or otherwise couple with any conduits which do not couple with a conduit of the other component.

Male adapter 1100 may be further configured to couple with one or more components, such as with a segment of pipe 112, a length of air tubing 116, and with a manifold, such as manifold 1000. For example, water conduit 1102 may include an upstream end 1116 configured to couple with pipe 112 and a downstream end 1118 configured to couple with the water conduit of manifold 1000. Similarly, air conduit 1106 may include an upstream end 1120 configured to couple with air tubing 116 and a downstream end 1122 configured to couple with the air conduit of manifold 1000. This description focuses on examples wherein male manifold adapter 1100 is configured to couple with a manifold such as manifold 1000, however, in some examples, male adapter 1100 may be configured to couple with any suitable component including another adapter, any suitable style of manifold, and/or an end cap.

Upstream end 1116 of water conduit 1102 and upstream end 1120 of air conduit 1106 may include any suitable structures and/or mechanisms to facilitate coupling with pipe 112 and air tubing 116 respectively. In some examples, coupling with pipe 112 may include an end of pipe 112 being inserted inside upstream end 1116 of water conduit 1102. For example, upstream end 1116 of water conduit 1102 may include a smooth inner surface and may have an inner diameter 1124 that is substantially the same as an outer diameter of pipe 112. In some examples, inner diameter 1124 may be between approximately 1.8 inches and approximately 3.0 inches. In some examples, inner diameter 1124 may be approximately 2.3 inches and/or any other suitable size.

In some examples, coupling with pipe 112 may include upstream end 1116 of water conduit 1102 being inserted inside an end of pipe 112. For example, upstream end 1116 of water conduit 1102 may include a smooth outer surface and may have an outer diameter that is substantially the same as an inner diameter of pipe 112. In some examples, an outer diameter of upstream end 1116 may be between approximately 1.8 inches and approximately 3.0 inches. In some examples, the outer diameter of upstream end 1116 may be approximately 2.3 inches and/or any other suitable size. In the embodiment shown in FIGS. 38-40, upstream end 1116 is configured to fit over an end of pipe 112 and upstream end 1116 of water conduit 1102 includes a flange or ridge 1126. In some examples, upstream end 1116 may include any suitable structure to facilitate coupling with pipe 112 and/or to improve the structural integrity of the water conduit.

Further, upstream end 1120 of air conduit 1106 is configured to couple with air tubing 116. In some examples, coupling with air tubing 116 may include an end of air tubing 116 being inserted inside upstream end 1120 of air conduit 1106. For example, upstream end 1120 of air conduit 1106 may include a smooth inner surface and may have an inner diameter 1128 that is substantially the same as an outer diameter of air tubing 116. In some examples, inner diameter 1128 may be between approximately 0.8 inches and approximately 1.5 inches. In some examples, inner diameter 1128 may be approximately 0.9 inches and/or any other suitable size.

In some examples, coupling with air tubing 116 may include upstream end 1120 of air conduit 1106 being inserted inside an end of air tubing 116. For example, upstream end 1120 of air conduit 1106 may include a smooth outer surface and may have an outer diameter that is substantially the same as an inner diameter of air tubing 116. In some examples, an outer diameter of upstream end 1120 may be between approximately 0.8 inches and approximately 1.5 inches. In some examples, the outer diameter may be approximately 0.9 inches and/or any other suitable size. In the embodiment shown in FIGS. 38-40, upstream end 1120 is configured to fit over an end of air tubing 116 and upstream end 1120 of air conduit 1106 includes a smooth external surface. In some examples, upstream end 1120 may include any suitable structure to facilitate coupling with air tubing 116 and/or to improve the structural integrity of the air conduit.

To facilitate coupling with manifold 1000 (or any other suitable second component), male adapter 1100 further includes attachment mechanisms for securing male adapter 1100 to manifold 1000. The attachment mechanisms may include any suitable structures depending on the characteristics of the male adapter and the manifold. In some examples, water conduit 1102 and air conduit 1106 may each include attachment mechanisms configured to engage with attachment mechanisms disposed on the water and air conduits, respectively of manifold 1000.

For example, downstream end 1118 of water conduit 1102 may include a retaining post 1130 configured to engage with the manifold. Retaining post 1130 may include any suitable structure configured to engage with spring-biased clips (e.g., post clips 1032 of manifold 1000) on the upstream end of the water conduit of the manifold. For example, retaining post 1130 may include a substantially pentagonal prism having a height approximately the same as or greater than the height of the spring-biased clips. In some examples, retaining post 1130 may be disposed in a middle portion of water conduit 1102 that lies between upstream end 1116 and downstream end 1118 as in FIGS. 38 and 40. In some examples, retaining post 1130 may be approximately equidistant from both upstream end 1116 and downstream end 1118. In some examples, retaining post 1130 may be disposed on any suitable portion of water conduit 1102.

Air conduit 1106 of male adapter 1100 may also include a retaining ridge 1132. Retaining ridge 1132 may include any suitable structure configured to engage with spring biased clips (e.g., ridge clips 1040 of manifold 1000) on the upstream end of the air conduit of the manifold. For example, retaining ridge 1132 may include a ridge which extends around substantially the entire perimeter of the air conduit. In some examples, retaining ridge 1132 may be disposed on a middle portion of air conduit 1106 that lies between upstream end 1120 and downstream end 1122 as in FIGS. 38 and 40. In some examples, retaining ridge 1132 may be approximately equidistant from both upstream end 1120 and downstream end 1122. In some examples, retaining ridge 1132 may be disposed on any suitable portion of air conduit 1106.

In addition to attachment mechanisms, male adapter 1100 may include any suitable structures and/or mechanisms for ensuring a water-tight seal between male adapter 1100 and manifold 1000 (or any other suitable second component). For example, both water conduit 1102 and air conduit 1106 include one or more structures configured to hold one or more O-rings. In the embodiment shown in FIGS. 38-40, downstream end 1118 of water conduit 1102 includes one or more recesses 1134, each of which is configured to retain an O-ring 1136. Recesses 1134 may include any suitable structure for retaining O-rings 1136 depending on the characteristics of male adapter 1100 and the second component.

For example, each recess 1134 may include a narrow channel disposed on downstream end 1118 and extending around the entire perimeter of the water conduit. In some examples, recesses 1134 may be configured such that the outside edge of the O-ring is flush with or extends slightly beyond the surface of the downstream end of the water conduit as shown in FIG. 38. Allowing the O-ring to extend slightly beyond the surface of water conduit 1102 may ensure a water tight seal by compressing the O-ring slightly between an inner surface of the water conduit of the manifold and the bottom and sides of recesses 1134. In some examples, water conduit 1102 includes two recesses 1134 to accommodate two O-rings 1136 as in the embodiment shown in FIGS. 38-40. In some examples, water conduit 1102 may include any suitable number of O-rings in any suitable number of recesses.

In the embodiment shown in FIGS. 38-40, downstream end 1122 of air conduit 1106 includes a recess 1138, configured to retain an O-ring 1140. In some examples, air conduit 1106 may include a plurality of recesses 1138. Recesses 1138 may include any suitable structure for retaining O-rings 1140 depending on the characteristics of male adapter 1100 and the second component. For example, each recess 1138 may include a narrow channel disposed on downstream end 1122 and extending around the entire perimeter of the air conduit. In some examples, recesses 1138 may be configured such that the outside edge of the O-ring is flush with or extends slightly beyond the surface of the downstream end of the air conduit as shown in FIG. 38. Allowing the O-ring to extend slightly beyond the surface of the air conduit may ensure an air tight seal by compressing the O-ring slightly between an inner surface of the air conduit of the second component and the bottom and sides of recesses 1138. In some examples, air conduit 1106 includes one recess 1042 to accommodate one O-ring 1140 as in FIGS. 38-40. In some examples, air conduit 1106 may include any suitable number of O-rings in any suitable number of recesses.

As shown in FIGS. 38-40, water conduit 1102 and air conduit 1106 may have different dimensions. Water conduit 1102 and air conduit 1106 may have any suitable dimensions depending on the application and the characteristics of male adapter 1100 and manifold 1000. Note that since male adapter 1100 is configured to couple with manifold 1000, water conduit 1102 of male adapter 1100 generally has complimentary dimensions to the water conduit of manifold 1000 and air conduit 1106 of male adapter 1100 generally has complementary dimension to the air conduit of manifold 1000. In other words, an outer diameter of downstream end 1118 of water conduit 1102 may be approximately the same as an inner diameter of the upstream end of the water conduit of manifold 1000, and an outer diameter of downstream end 1122 of air conduit 1106 may be approximately the same as an inner diameter of the upstream end of the air conduit of manifold 1000. Thus, a downstream portion of male manifold 1100 may fit within an upstream portion of manifold 1000, forming a water tight seal.

Figure 46:
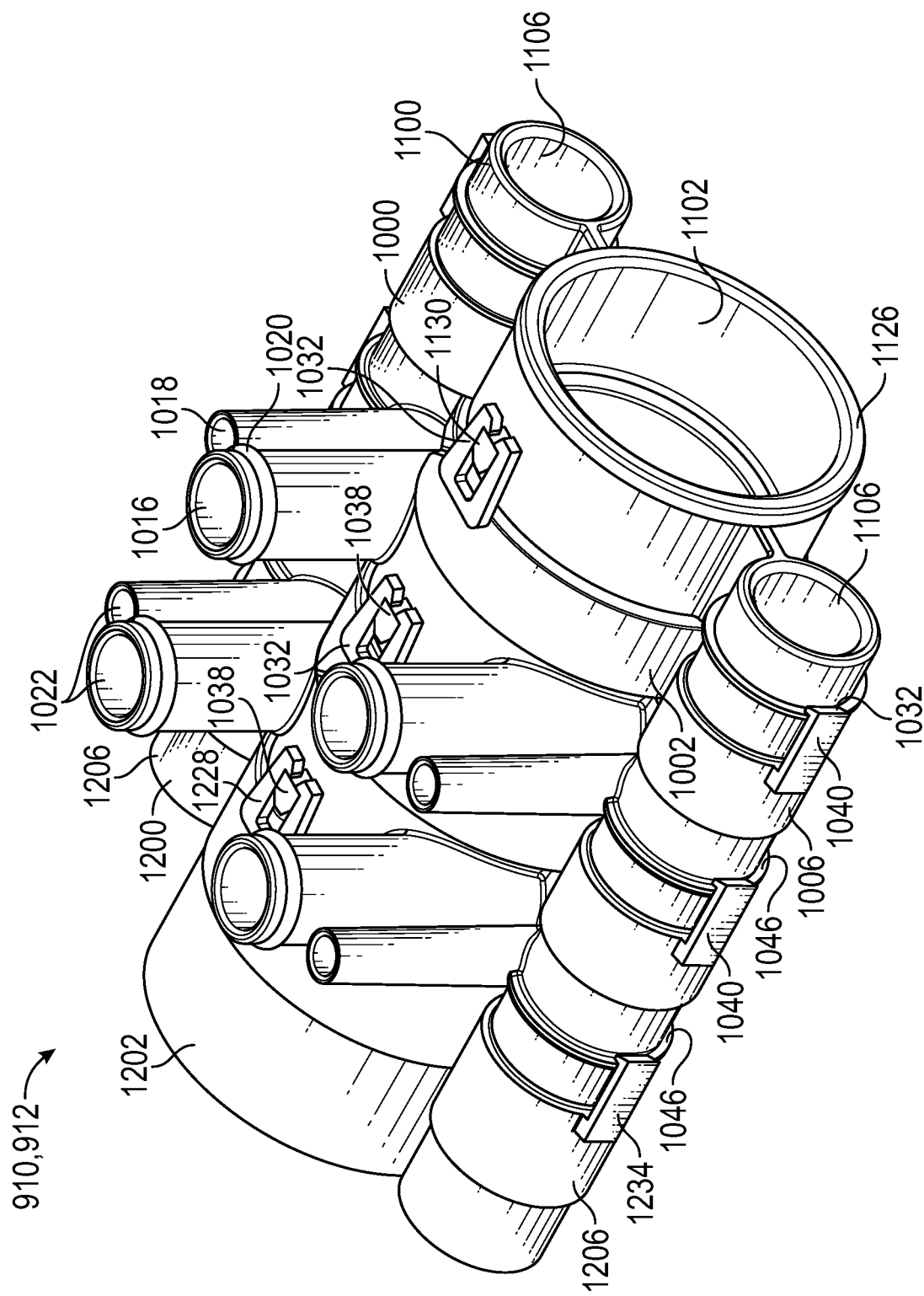
FIG. 46 is an isometric view of an interconnected manifold assembly including two manifolds, a male manifold adapter, and a female manifold adapter, according to aspects of the present teachings.
Figure 47:
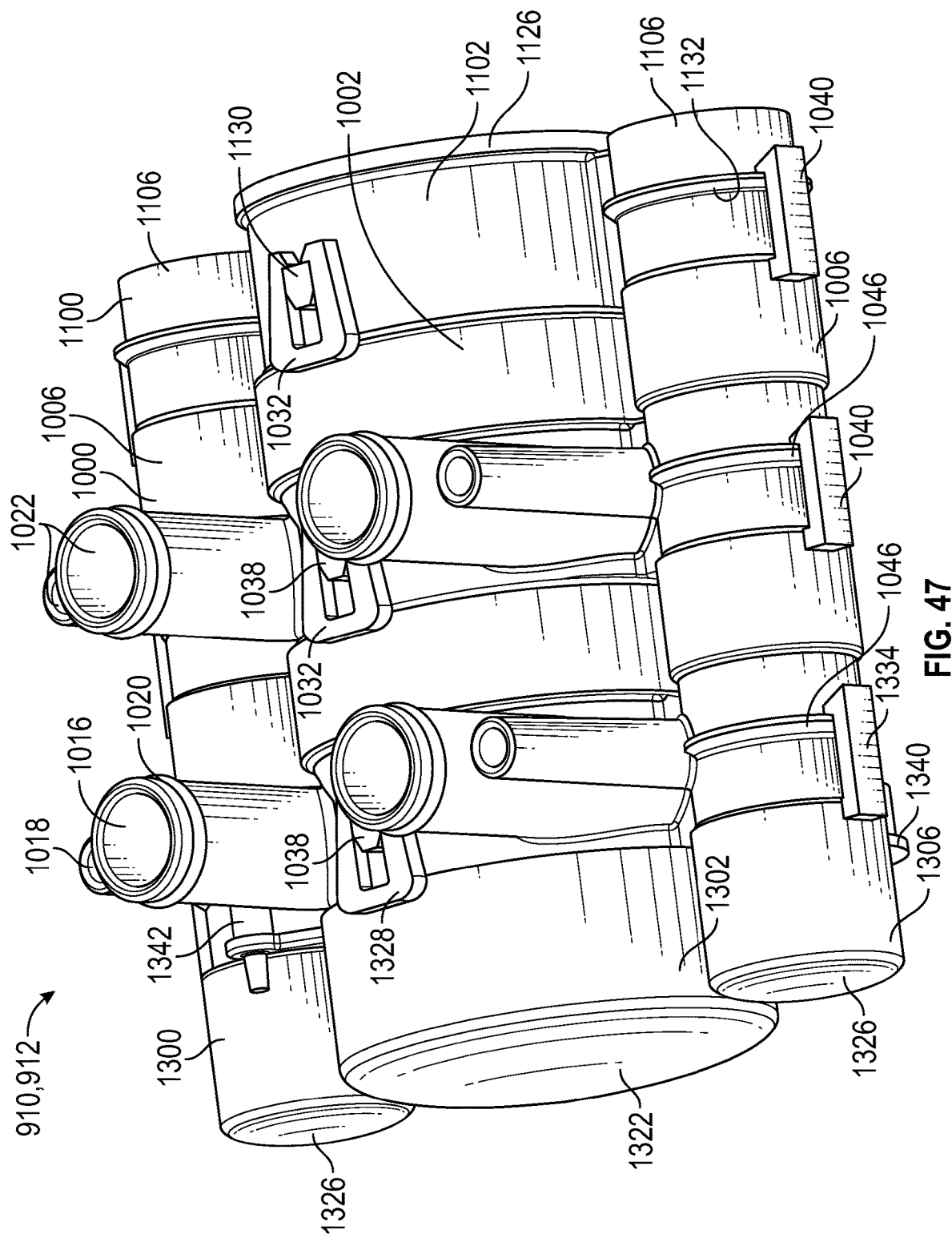
FIG. 47 is an isometric view of an interconnected manifold assembly including two manifolds, a male manifold adapter, and a manifold end cap, according to aspects of the present teachings.

FIGS. 46-47 show male manifold adapter 1100 and a manifold body 1000 coupled together. FIG. 46 also shows a female manifold adapter 1200 coupled to another manifold body 1000, where the two manifold bodies are coupled together. FIG. 47 also shows an end cap coupled to another manifold body 1000, where the two manifold bodies are coupled together.

Water conduit 1102 and air conduit 1106 may have any suitable dimensions depending on the application and the characteristics of male adapter 1100 and manifold 1000. For example, water conduit 1102 may have an outer diameter in the range of approximately 1.50 inches to approximately 3.00 inches and a wall thickness in the range of approximately 0.05 inches to approximately 0.50 inches while air conduit 1106 may have an outer diameter in the range of approximately 0.50 inches to approximately 2.00 inches and a wall thickness in the range of approximately 0.05 inches to approximately 0.50 inches.

In some examples, the diameter of water conduit 1102 and the diameter of air conduit 1106 may not be constant. For example, upstream end 1116 of water conduit 1102 may have a larger diameter than downstream end 1118 of water conduit 1102 and upstream end 1120 of air conduit 1106 may have a larger diameter than downstream end 1122 of air conduit 1106. In some examples, upstream end 1116 of water conduit 1102 may have an outer diameter of approximately 2.80 inches and a wall thickness of approximately 0.12 inches and downstream end 1118 of water conduit 1102 may have an outer diameter of approximately 2.60 inches and a wall thickness of approximately 0.12 inches. In some examples, upstream end 1120 of air conduit 1106 may have an outer diameter of approximately 1.14 inches and a wall thickness of approximately 0.09 inches, and downstream end 1122 of air conduit 1106 may have an outer diameter of approximately 1.00 inches and a wall thickness of approximately 0.09 inches. In some examples, upstream end 1116 and downstream end 1118 of water conduit 1102 and upstream end 1120 and downstream end 1122 of air conduit 1106 may have any suitable diameters and wall thicknesses depending on the application and the characteristics of male adapter 1100, manifold 1000, and other components.

O-rings 1136 and O-rings 1140 may have any suitable dimensions, materials, and/or properties. In some examples, O-rings 1136 and O-rings 1140 may have different dimensions, materials, and/or properties. In some examples, O-rings 1136 may be substantially identical to O-rings 1050 on manifold 1000. In some examples, O-rings 1140 may be substantially identical to O-rings 1054 on manifold 1000. O-ring 1136 may be larger in diameter than O-ring 1140. For example, O-rings 1136 may have an outer diameter between approximately 1.3 inches and approximately 3.2 inches and O-rings 1140 may have an outer diameter between approximately 0.3 inches and approximately 2.2 inches. In some examples, O-rings 1136 may have an outer diameter of approximately 2.44 inches and O-rings 1140 may have an outer diameter of approximately 0.95 inches.

O-rings 1136 and 1140 may have any suitable cross-sectional diameter. For example, O-rings 1136 may have a cross-sectional diameter or thickness between approximately 0.10 inches and approximately 0.20 inches, and O-rings 1140 may have a cross-sectional diameter or thickness between approximately 0.07 inches and approximately 0.17 inches. In some examples, O-ring 1136 may have a cross-sectional diameter of approximately 0.14 inches and O-ring 1140 may have a cross-sectional diameter of approximately 0.10 inches. In some examples, O-rings 1136 and 1140 may have any suitable outer diameter and cross-sectional diameter (thickness). O-rings 1136 and 1140 may be installed on male adapter 1100 prior to assembling the plumbing system. O-rings 1136 and 1140 may be constructed out of any suitable material. For example, O-rings 1136 and 1140 may be constructed out of elastomer such as any suitable thermosetting polymer and/or thermoplastic.

As discussed, male adapter 1100 is configured to be coupled with another component such as manifold 1000. Male adapter 1100 may be configured to be coupled with the second component by a "press-and-click" method (described above). The "press-and-click" method may be facilitated by retaining post 1130 and retaining ridge 1132. For example, male adapter 1100 and the manifold may be aligned and then compressed together to overcome the resistive force of one or more spring biased clips on the manifold (e.g., ridge clips 1040 and post clips 1032), after which the components are locked together.

For example, retaining post 1130 may be configured to couple with the manifold by engaging with suitably configured spring biased clips. For example, in the embodiment shown in FIGS. 38-40, retaining post 1130 is configured to force the spring biased clips on the air conduit of the manifold (e.g., post clips 1032) to flex outward (e.g., away from each other) when the clips begin to slide past retaining post 1130. Once a lip or protrusion (e.g., protrusion 1036) on the spring biased clips has passed retaining post 1130, the clips snap back into the default position (e.g., back towards each other). Retaining post 1130 prevents the manifold from sliding off of the male adapter by engaging with the lip or protrusion on the spring biased clips on the manifold.

Similarly, retaining ridge 1132 may be configured to couple with the manifold by engaging with suitably configured spring biased clips. For example, in the embodiment shown in FIGS. 38-40, retaining ridge 1132 is configured to force the spring biased clips on the air conduit of manifold 1000 (e.g., ridge clips 1040) to flex outward (e.g., away from second longitudinal axis 1108) when the clips begin to slide over retaining ridge 1132. Once a lip or protrusion (e.g., sloped lip 1044) on the spring biased clips has passed over retaining ridge 1132, the clips snap back into the default position. Retaining ridge 1132 prevents the manifold from sliding off of the male adapter by engaging with a lip or protrusion on the spring biased clips on the manifold.

In some examples, male adapter 1100 and manifold 1000 (or any other suitable second component) may be configured to be able to be unlocked and/or uncoupled. Uncoupling the manifold from male adapter 1100 may be accomplished by moving the flanges of the post clips on the manifold away from each other (e.g., away from retaining post 1130), moving the ridge clips on the manifold away from air conduit 1106 (e.g., away from second longitudinal axis 1108), and sliding the manifold off of male adapter 1100. In some examples, a worker may accomplish this using a finger or fingers to move the clips and/or using a tool. Releasably coupling male adapter 1100 and the manifold together may be advantageous as it may allow a worker to uncouple a manifold that was couple to the wrong male adapter by mistake.

Male adapter 1100 may be constructed out of any suitable material. For example, male adapter 1100 may include any suitable thermoplastic polymer such as polyvinyl chloride (PVC), acrylonitrile butadiene styrene (ABS), and/or any other suitable materials having similar properties (i.e., stiffness etc.). Male adapter 1100 may be manufactured using any suitable process. For example, the manufacturing process may include the use of injection molding, compression molding, and/or extrusion methods. In some examples, each component may be injection molded out of PVC.

First Embodiment of a Female Manifold Adapter

Figure 41:
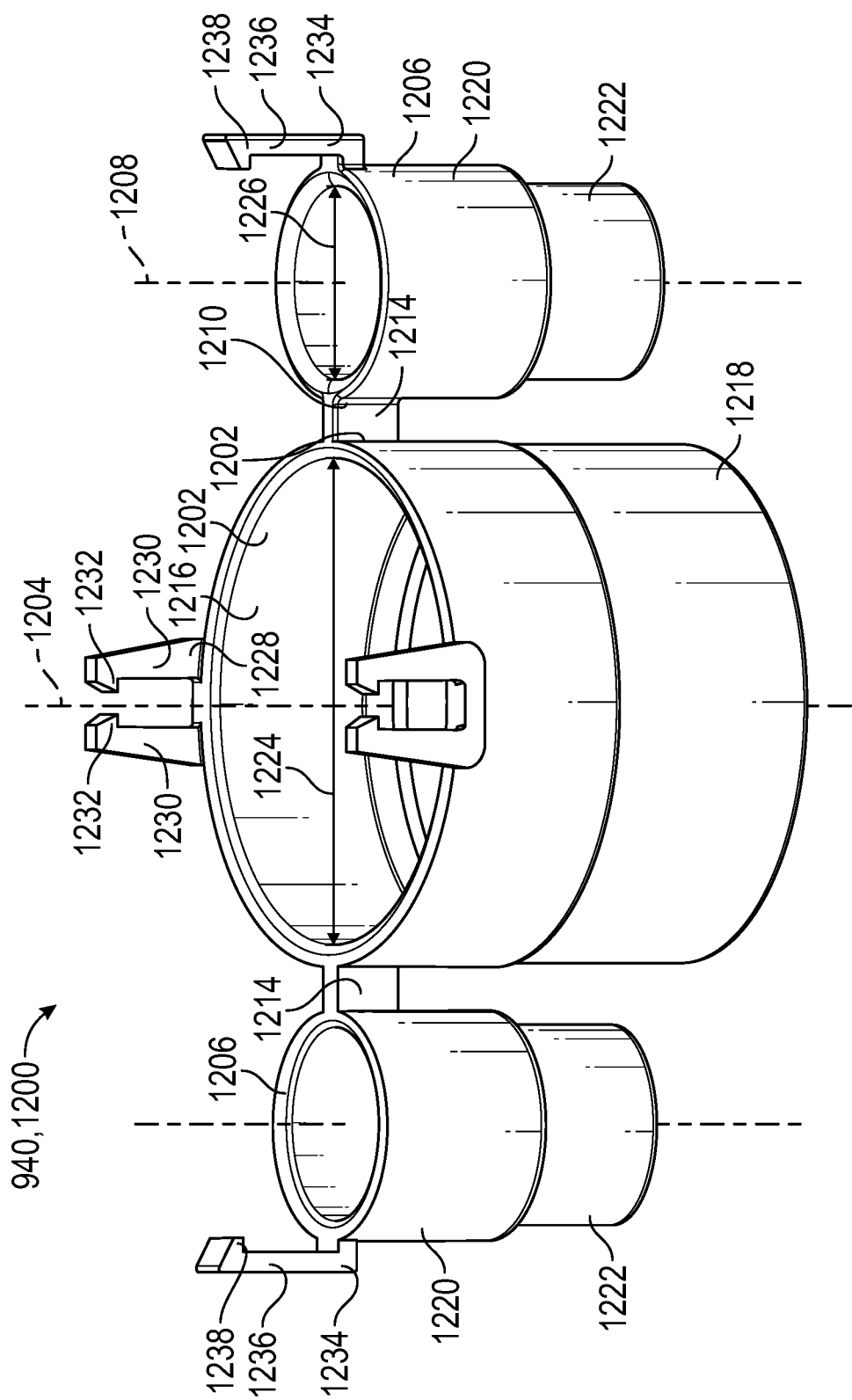
FIG. 41 is an isometric view of a female manifold adapter, according to aspects of the present teachings.
Figure 42:
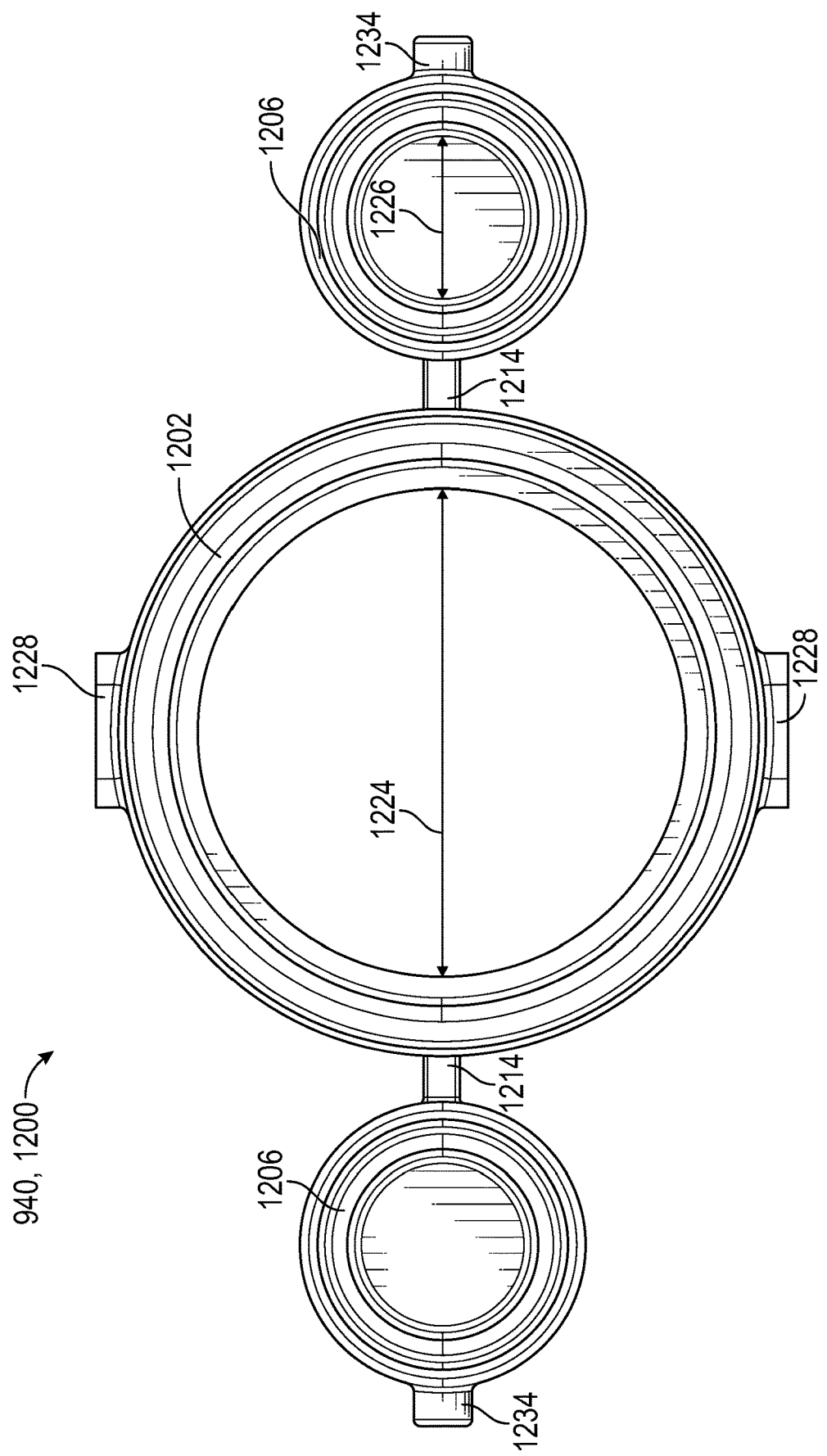
FIG. 42 is a bottom view of the female manifold adapter of FIG. 41.
Figure 43:
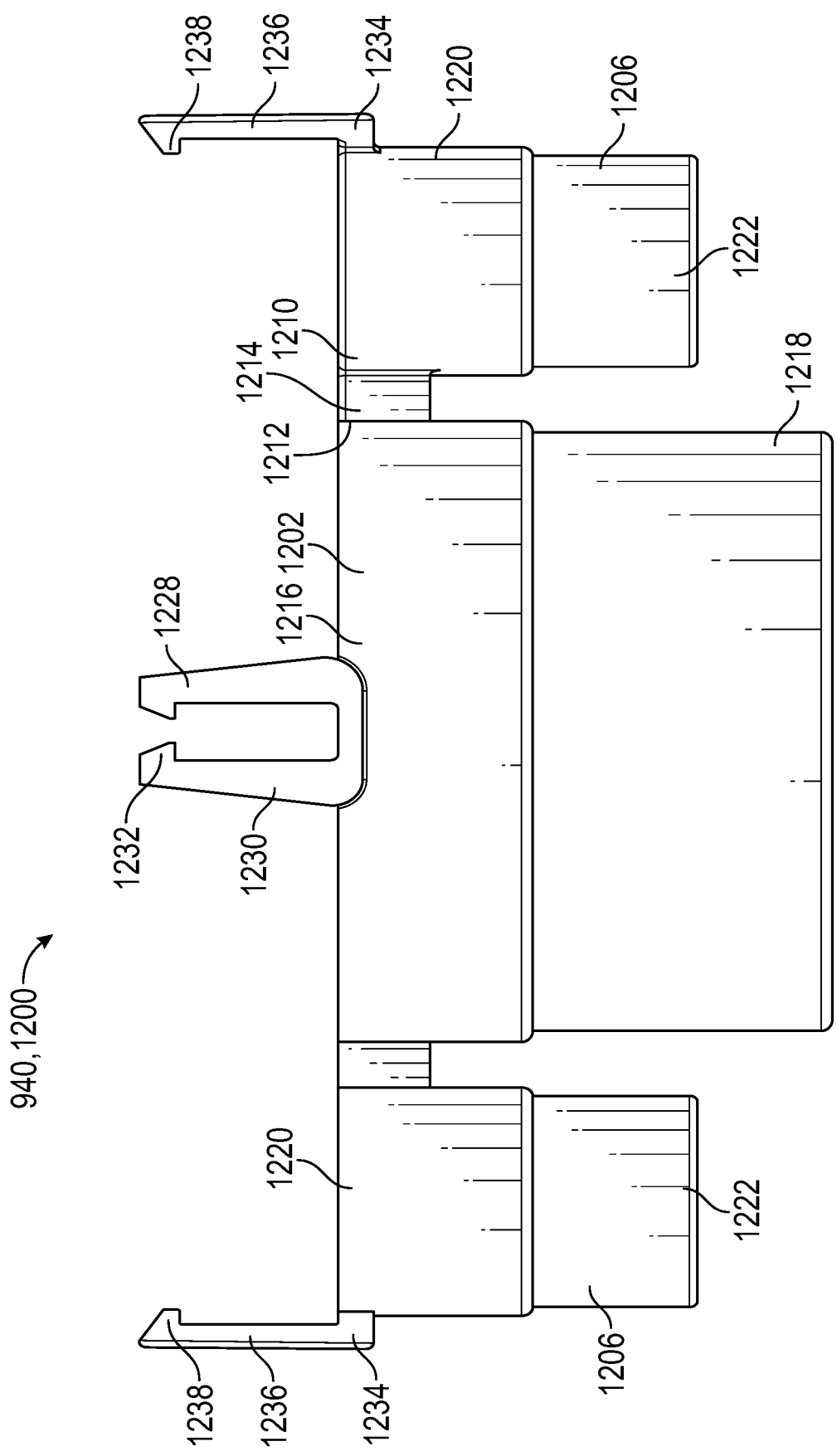
FIG. 43 is a side elevational view of the female manifold adapter of FIG. 41.

FIGS. 41-43 depict various views of a first embodiment 1200 of female manifold adapter 940 which is suitable for use with manifold 1000 in manifold assembly 912. Female manifold adapter 1200 is an example of female adapter 940 described briefly above and, along with manifold 1000 and male adapter 1100, forms part of the first embodiment of the set of manifold assembly components. Accordingly, similar components may be labeled with similar reference numbers. Additionally, or alternatively, female manifold adapter 1200 may be referred to as a female adapter.

Female manifold adapter 1200 is configured to couple with manifold 1000 and to receive air and water as separate streams from manifold 1000. Accordingly, many features of female manifold adapter 1200 are substantially similar to manifold 1000; the primary differences between female adapter 1200 and manifold 1000 are that female adapter 1200 lacks air and water egress ports and the downstream end is configured to couple directly with air and water supply tubing.

FIG. 41 is an oblique isometric view of female adapter 1200. FIG. 42 is a bottom plan view of female adapter 1200. FIG. 43 is a side elevation view of female adapter 1200.

Female adapter 1200 includes a water conduit 1202 defining a first longitudinal axis 1204. Water conduit 1202 may include any suitable structure configured to receive a stream of water from, for example, manifold 1000 and to deliver the stream of water to, for example, pipe 112. In some examples, water conduit 1202 may be a substantially cylindrical tube as in FIGS. 41-43. Female adapter 1200 further includes at least one air conduit 1206 defining a second longitudinal axis 1208. Air conduit 1206 may include any suitable structure configured to receive a stream of air from, for example, manifold 1000, and to deliver the stream of air to, for example, air tubing 116.

In some examples, air conduit 1206 may include a substantially cylindrical tube as in FIGS. 41-43. In this embodiment, second longitudinal axis 1208 is substantially parallel to first longitudinal axis 1204 and air conduit 1206 includes a periphery 1210 joined to a periphery 1212 of water conduit 1202 via support structure 1214. Support structure 1214 may include any suitable structure for rigidly connecting air conduit 1206 to water conduit 1202. For example, support structure 1214 may include a rigid strut as best seen in FIGS. 41-43. In some examples, second longitudinal axis 1208 may have any suitable orientation with respect to first longitudinal axis 1204 and air conduit 1206 may be joined with water conduit 1202 in any suitable manner.

Female adapter 1200 may include any suitable number of water conduits 1202 and air conduits 1206. For example, female adapter 1200 may include two air conduits 1206 rigidly connected to one water conduit 1202 as best seen in FIGS. 41-43. In embodiments having two or more air conduits 1206, the two or more second longitudinal axes 1208 may have any suitable disposition and/or orientation in relation to first longitudinal axis 1204. For example, in the embodiment shown in FIGS. 41-43, two second longitudinal axes 1208 are disposed on either side of, and lie in a plane with, first longitudinal axis 1204. That is, the two air conduits are disposed on opposite sides of the water conduit. In other words, in the embodiment shown in FIGS. 41-43, a first air conduit of the female adapter is joined to a first portion of the periphery of the water conduit of the female adapter, a second air conduit of the female adapter is joined to a second portion of the periphery of the water conduit, and the first and second portions of the periphery of the water conduit are separated from each other by approximately 180 degrees.

Note that since female adapter 1200 is configured to couple with manifold 1000, female adapter 1200 generally has the same number of water conduits as manifold 1000 and the same number of air conduits as manifold 1000. For example, in embodiments wherein manifold 1000 includes one water conduit and two air conduits, female adapter 1200 will include one water conduit and two air conduits. In examples wherein female adapter 1200 has a different number of air and/or water conduits than manifold 1000, any suitable structure may be used to plug, seal, and/or otherwise couple with any conduits which do not couple with a conduit of the other component.

Female adapter 1200 may be further configured to couple with one or more components, such as a manifold (for example, manifold 1000), a segment of pipe 112, and a length of air tubing 116. For example, water conduit 1202 may include an upstream end 1216 configured to couple with the water conduit of manifold 1000 and a downstream end 1218 configured to couple with pipe 112. Similarly, air conduit 1206 may include an upstream end 1220 configured to couple with the air conduit of manifold 1000 and a downstream end 1122 configured to couple with air tubing 116. This description focuses on examples wherein female manifold adapter 1200 is configured to couple with a manifold such as manifold 1000, however, in some examples, female adapter 1200 may be configured to couple with any suitable component including another adapter and/or any suitable style of manifold.

To facilitate coupling with manifold 1000 (or any other suitable component), female adapter 1200 further includes attachment mechanisms for securing female adapter 940 to manifold 1000. The attachment mechanisms may include any suitable structures depending on the characteristics of the adapter, the manifold, and/or other components. In some examples, water conduit 1202 and air conduit 1206 may each include attachment mechanisms to engage with attachment mechanisms disposed on the water and air conduits, respectively, of the manifold.

For example, upstream end 1216 of water conduit 1202 may include one or more spring biased clips configured to couple with a retaining post, hereinafter referred to as post clips 1228. Additionally, or alternatively, post clips 1228 may be referred to as spring-biased clips or water conduit clips. Post clips 1228 may include any suitable structure configured to couple with a retaining post disposed on the downstream end of the water conduit of the manifold. For example, post clips 1228 may include a pair of flanges 1230 and a protrusion or lip 1232 disposed on the end of each flange 1230. Flanges 1230 may be flexibly resilient to allow the clip to flex around the retaining post and protrusions FF24 may be configured to engage with the retaining post of the manifold (as shown in FIG. 46).

Air conduit 1206 of female adapter 1200 also includes attachment mechanisms for engaging with the air conduit of the manifold (or any other suitable component). For example, upstream end 1220 of each air conduit 1206 may include one or more spring biased clips configured to couple with a retaining ridge, hereinafter referred to as ridge clips 1234. Additionally, or alternatively, ridge clips 1234 may be referred to as spring-biased clips or air conduit clips. Ridge clips 1234 may include any suitable structure configured to couple with a retaining ridge disposed on the air conduit of the manifold. For example, ridge clips 1234 may include a resiliently flexible support 1236 and a sloped lip 1238 which is configured to engage with the retaining ridge on the manifold.

Downstream end 1218 of water conduit 1202 and downstream end 1222 of air conduit 1206 may include any suitable structures and/or mechanisms to facilitate coupling with pipe 112 and air tubing 116 respectively. In some examples, coupling with pipe 112 may include an end of pipe 112 being inserted inside downstream end 1218 of water conduit 1202. For example, downstream end 1218 of water conduit 1202 may include a smooth inner surface and may have an inner diameter 1224 that is substantially the same as an outer diameter of pipe 112. In some examples, inner diameter 1224 may be between approximately 1.8 inches and approximately 3.0 inches. In some examples, inner diameter 1224 may be approximately 2.12 inches and/or any other suitable size. In some examples, coupling with pipe 112 may include downstream end 1218 of water conduit 1202 being inserted inside an end of pipe 112.

For example, downstream end 1218 of water conduit 1202 may include a smooth outer surface and may have an outer diameter that is substantially the same as an inner diameter of pipe 112. In some examples, an outer diameter of downstream end 1218 may be between approximately 1.8 inches and approximately 3.0 inches. In some examples, the outer diameter may be approximately 2.12 inches and/or any other suitable size. In some examples, downstream end 1218 of water conduit 1202 may include any suitable structure to facilitate coupling with pipe 112 and/or to improve the structural integrity of the water conduit. In some examples, downstream end 1218 of water conduit 1202 may include a flange or ridge.

Further, downstream end 1222 of air conduit 1206 is configured to couple with air tubing 116. In some examples, coupling with air tubing 116 may include an end of air tubing 116 being inserted inside downstream end 1222 of air conduit 1206. For example, downstream end 1222 of air conduit 1206 may include a smooth inner surface and may have an inner diameter 1226 that is substantially the same as an outer diameter of air tubing 116. In some examples, inner diameter 1226 may be between approximately 0.50 inches and approximately 1.50 inches. In some examples, inner diameter 1226 may be approximately 0.88 inches and/or any other suitable size.

In some examples, coupling with air tubing 116 may include downstream end 1222 of air conduit 1206 being inserted inside an end of air tubing 116. For example, downstream end 1222 of air conduit 1206 may include a smooth outer surface and may have an outer diameter that is substantially the same as an inner diameter of air tubing 116. In some examples, an outer diameter of downstream end 1222 may be between approximately 0.50 inches and approximately 1.50 inches. In some examples, the outer diameter may be approximately 0.88 inches and/or any other suitable size. In the embodiment shown in FIGS. 41-43, downstream end 1222 of air conduit 1206 includes a smooth external surface. In some examples, downstream end 1222 may include any suitable structure to facilitate coupling with air tubing 116 and/or to improve the structural integrity of the air conduit.

In addition to attachment mechanisms, female adapter 1200 may include any suitable structures and/or mechanisms for ensuring a water-tight seal between female adapter 1200 and pipe 112, air tubing 116, and/or manifold 1000 (or any other suitable second component). In some examples, female adapter 1200 may include structures for holding and/or engaging with O-rings and/or any other suitable mechanical seal.

As shown in FIGS. 41-43, water conduit 1202 and air conduit 1206 may have different dimensions. Water conduit 1202 and air conduit 1206 may have any suitable dimensions depending on the application and the characteristics of female adapter 1200 and manifold 1000. Note that since female adapter 1200 is configured to couple with manifold 1000, water conduit 1202 of female adapter 1200 generally has complimentary dimensions to the water conduit of manifold 1000 and air conduit 1206 of female adapter 1200 generally has complementary dimension to the air conduit of manifold 1000. In other words, an inner diameter of upstream end 1216 of water conduit 1202 may be approximately the same as an outer diameter of the downstream end of the water conduit of manifold 1000, and an inner diameter of upstream end 1220 of air conduit 1206 may be approximately the same as an outer diameter of the downstream end of the air conduit of manifold 1000. Thus, a downstream portion of manifold 1000 may fit within an upstream portion of female manifold 1200, forming a water tight seal. FIG. 46 shows female manifold adapter 1200 and manifold 1000 coupled together.

Water conduit 1202 and air conduit 1206 may have any suitable diameters depending on the application and the characteristics of female adapter 1200 and manifold 1000. For example, water conduit 1202 may have an outer diameter in the range of approximately 1.50 inches to approximately 3.00 inches and a wall thickness in the range of approximately 0.05 inches to approximately 0.50 inches while air conduit 1206 may have an outer diameter in the range of approximately 0.50 inches to approximately 2.00 inches and a wall thickness in the range of approximately 0.05 inches to approximately 0.50 inches.

In some examples, the diameter of water conduit 1202 and the diameter of air conduit 1206 may not be constant. For example, upstream end 1216 of water conduit 1202 may have a larger diameter than downstream end 1218 of water conduit 1202 and upstream end 1220 of air conduit 1206 may have a larger diameter than downstream end 1222 of air conduit 1206. In some examples, upstream end 1216 of water conduit 1202 may have an outer diameter of approximately 2.81 inches and a wall thickness of approximately 0.14 inches and downstream end 1218 of water conduit 1202 may have an outer diameter of approximately 2.73 inches and a wall thickness of approximately 0.14 inches. In some example, upstream end 1220 of air conduit 1206 may have an outer diameter of approximately 1.23 inches and a wall thickness of approximately 0.11 inches, and downstream end 1222 of air conduit 1206 may have an outer diameter of approximately 1.09 inches and a wall thickness of approximately 0.11 inches. In some examples, upstream end 1216 and downstream end 1218 of water conduit 1202 and upstream end 1220 and downstream end 1222 of air conduit 1206 may have any suitable diameters and wall thicknesses depending on the application and the characteristics of female adapter 1200, manifold 1000, and other components.

As discussed, female adapter 1200 is configured to be coupled with another component such as manifold 1000. Female adapter 1200 may be configured to be coupled with the second component by a "press-and-click" method (described above). The "press-and-click" method may be facilitated by post clips 1228 and ridge clips 1234. For example, female adapter 1200 and the manifold may be aligned and then compressed together to overcome the resistive force of post clips 1228 and ridge clips 1234, after which the components are locked together.

In the embodiment shown in FIGS. 41-43, flanges 1230 of post clips 1228 are configured to flex apart, away from a default position (e.g., away from each other), when protrusions 1232 slide over a retaining post on the manifold. Post clips 1228 are further configured to snap back into the default position (e.g., back towards each other), once protrusions 1232 pass by the retaining post on the manifold. Protrusions 1232 prevent post clip 1228, and thus female adapter 1200, from sliding off of the manifold. Similarly, in the embodiment shown in FIGS. 41-43, ridge clips 1234 are configured to flex outward, away from a default position (e.g., away from second longitudinal axis 1208), when sloped lip 1238 slides over a retaining ridge on the manifold. Ridge clips 1234 are further configured to snap back into the default position (e.g., back towards second longitudinal axis 1208) once sloped lip 1238 passes over the retaining ridge on the manifold. Sloped lip 1238 prevents ridge clip 1234, and thus female adapter 1200, from sliding off of the manifold.

In some examples, female adapter 1200 and manifold 1000 (or any other suitable second component) may be configured to be able to be unlocked and/or uncoupled. Uncoupling female adapter 1100 from the manifold may be accomplished by moving flanges 1230 of post clips 1228 away from each other (e.g., away from the retaining post on the manifold), moving ridge clips 1234 away from the air conduit of the manifold (e.g., away from second longitudinal axis 1208), and sliding female adapter 1200 off of manifold 1000. In some examples, a worker may accomplish this using a finger or fingers to move the clips and/or using a tool. Releasably coupling female adapter 1200 and the manifold together may be advantageous as it may allow a worker to uncouple a female adapter that was coupled to the wrong manifold by mistake.

Female adapter 1200 may be constructed out of any suitable material. For example, female adapter 1200 may include any suitable thermoplastic polymer such as polyvinyl chloride (PVC), acrylonitrile butadiene styrene (ABS), and/or any other suitable materials having similar properties (i.e., stiffness etc.). Female adapter 1200 may be manufactured using any suitable process. For example, the manufacturing process may include the use of injection molding, compression molding, and/or extrusion methods. In some examples, each component may be injection molded out of PVC.

First Embodiment of a Manifold End Cap

Figure 44:
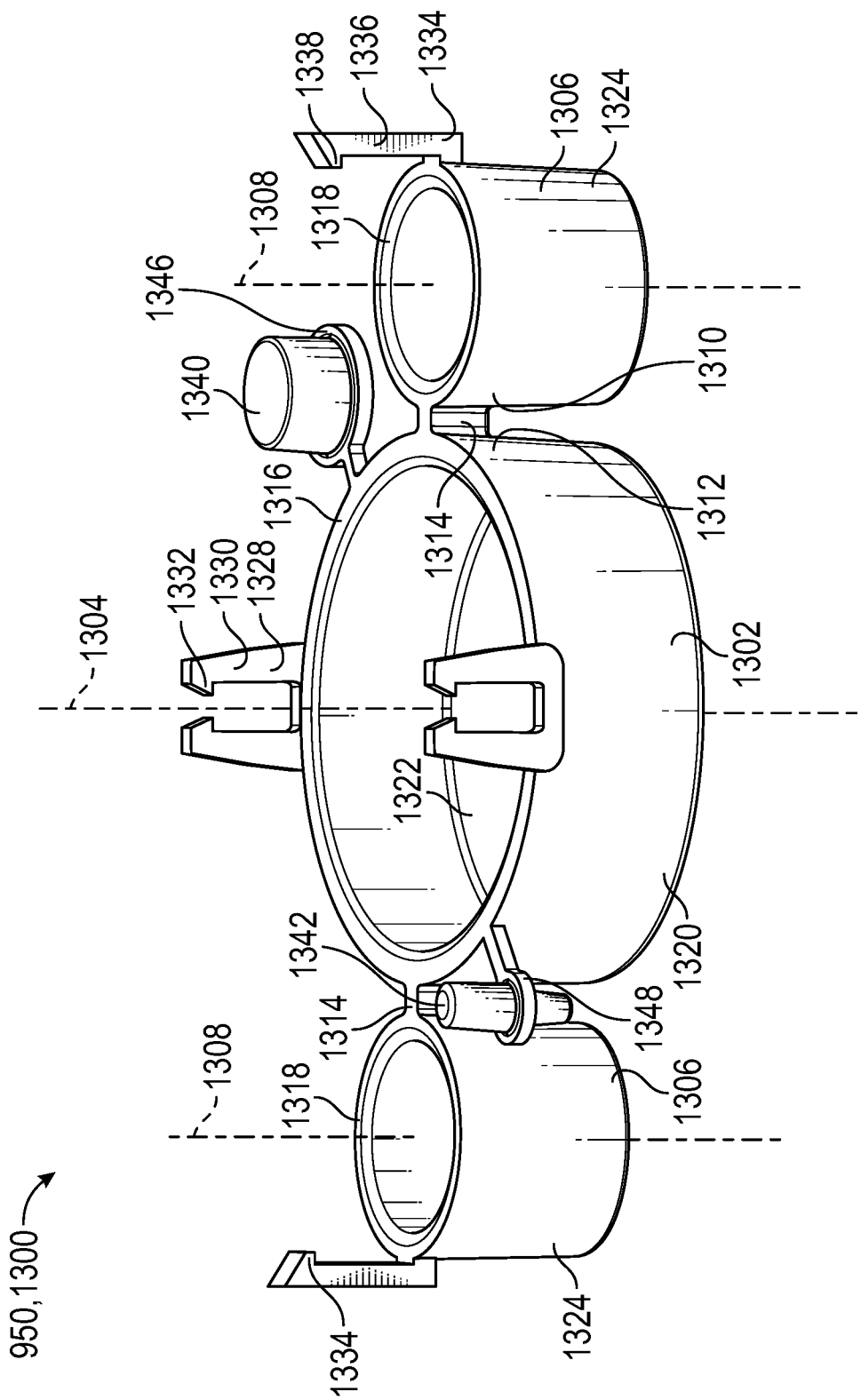
FIG. 44 is an isometric view of a manifold end cap, according to aspects of the present teachings.
Figure 45:
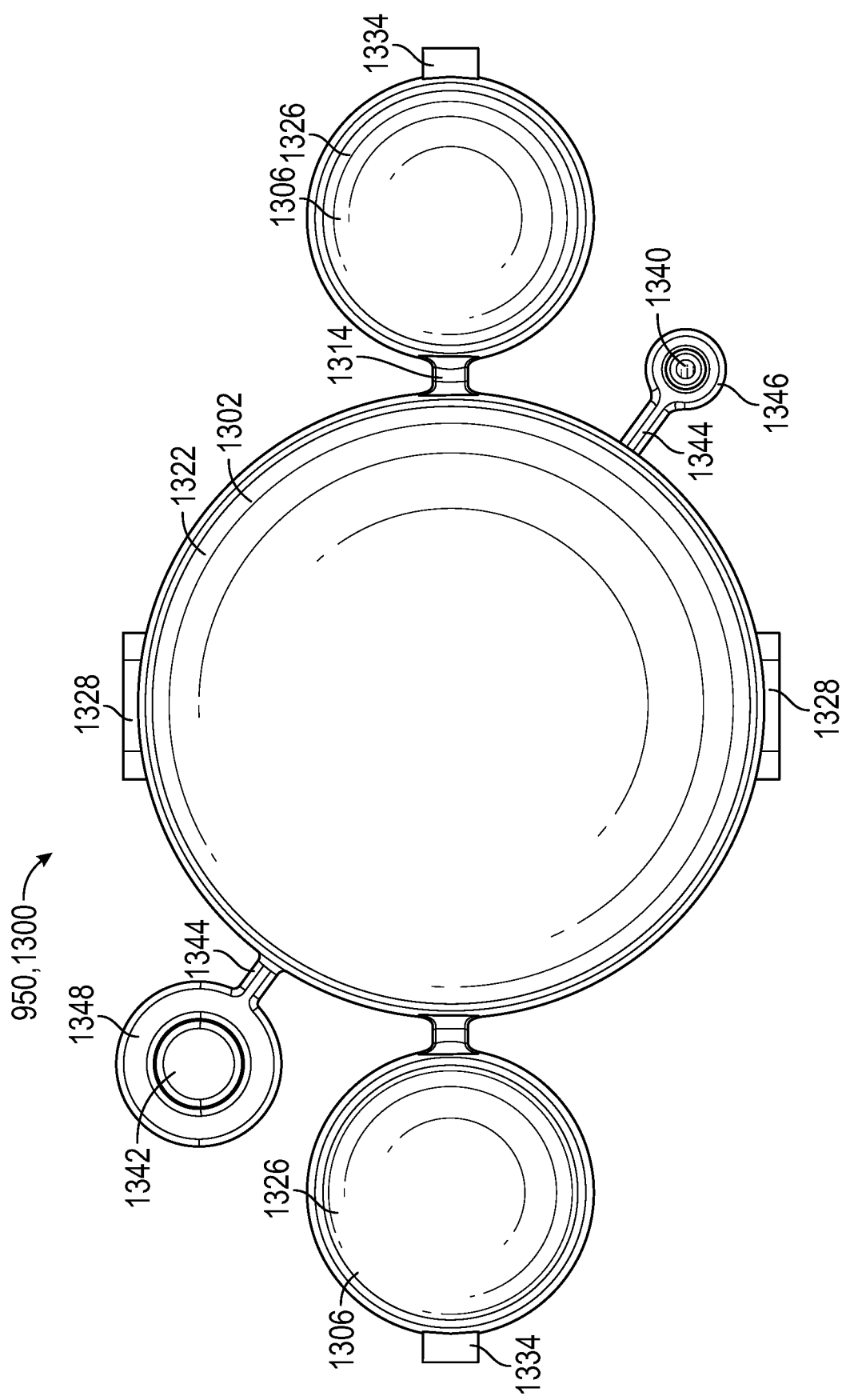
FIG. 45 is a top view of the manifold end cap of FIG. 44.

FIGS. 44-45 depict various views of a first embodiment 1300 of manifold end cap suitable for use with manifold 1000 in manifold assembly 912. Manifold end cap 1300 is an example of manifold end cap 950 described briefly above with respect to FIG. 31. Together, manifold end cap 1300, manifold 1000, male adapter 1100, and female adapter 1200 form the first set of manifold assembly components. Accordingly, similar components may be labeled with similar reference numbers. Additionally, or alternatively, manifold end cap 1300 may be referred to as an end cap.

End cap 1300 is configured to couple with manifold 1000 and end the streams of air and water from manifold 1000 while ensuring that the streams of air and water remain separate. Accordingly, many features of end cap 1300 are substantially similar to manifold 1000; the primary differences between end cap 1300 and manifold 1000 are that end cap 1300 lacks air and water egress ports and the downstream end is configured to end the streams of air and water.

FIG. 44 is an oblique isomeric view of end cap 1300. FIG. 45 is a bottom plan view of end cap 1300.

End cap 1300 includes a water closure 1302 defining a first longitudinal axis 1304. Water closure 1302 may include any suitable structure configured to couple with a water conduit of manifold 1000 and to end the flow of water. In some examples, water closure 1302 may include a substantially cylindrical tube portion which ends in a cap as in FIG. 44. End cap 1300 further includes at least one air closure 1306 defining a second longitudinal axis 1308. Air closure 1306 may include any suitable structure configured to couple with an air conduit of manifold 1000 and to end the flow of air. In some examples, air closure 1306 may include a substantially cylindrical tube portion which ends in a cap as in FIG. 44.

In this embodiment, second longitudinal axis 1308 is substantially parallel to first longitudinal axis 1304 and air closure 1306 includes a periphery 1310 joined to a periphery 1312 of water closure 1302 via support structure 1314. Support structure 1314 may include any suitable structure for rigidly connecting air closure 1306 to water closure 1302. For example, support structure 1314 may include a rigid strut as seen in FIGS. 44 and 45. In some examples, second longitudinal axis 1308 may be any suitable orientation with respect to first longitudinal axis 1304 and air closure 1306 may be joined with water closure 1302 in any suitable manner.

End cap 1300 may include any suitable number of water closure 1302 and air closure 1306. For example, end cap 1300 may include two air closure 1306 rigidly connected to one water closure 1302 as in FIGS. 44-45. In embodiments having two or more air closure 1306, the two or more second longitudinal axes 1308 may have any suitable disposition and/or orientation in relation to first longitudinal axis 1304. For example, in the embodiment shown in FIGS. 44-45, two second longitudinal axes 1308 are disposed on either side of, and lie in a plane with, first longitudinal axis 1304. That is, the two air closures are disposed on opposite sides of the water closure. In other words, in the embodiment shown in FIGS. 44-45, a first air closure of the end cap is joined to a first portion of the periphery of the water closure of the end cap, a second air closure of the end cap is joined to a second portion of the periphery of the water closure, and the first and second portions of the periphery of the water closure are separated from each other by approximately 180 degrees.

Note that since end cap 1300 is configured to couple with manifold 1000, end cap 1300 generally has a number of water closures that is equal to the number of water conduits on manifold 1000 and a number of air closures that is equal to the number of air conduits on manifold 1000. For example, in embodiments wherein manifold 1000 includes one water conduit and two air conduits, end cap 1300 will include one water closure and two air closures. In examples wherein end cap 1300 has a different number of air and/or water conduits than manifold 1000, any suitable structure may be used to plug, seal, and/or otherwise couple with any conduits of the manifold which do not couple with a closure of the end cap.

End cap 1300 may be configured to couple with one or more components, such as a manifold (for example, manifold 1000). For example, water closure 1302 may include an upstream end 1316 configured to couple with the water conduit of manifold 1000. Similarly, air closure 1306 may include an upstream end 1318 configured to couple with the air conduit of manifold 1000. This description focuses on examples wherein end cap 1300 is configured to couple with a manifold such as manifold 1000, however, in some examples, end cap 1300 may be configured to couple with any suitable component including an adapter, a manifold, a water pipe, air tubing, and/or any other suitable component.

Further, water closure 1302 includes a downstream end 1320 configured to end the flow of water and to seal the water passageway. For example, downstream end 1320 may include a water cap 1322. Similarly, air closure 1306 includes a downstream end 1324 configured to end the flow of air and to seal the air passageway. For example, downstream end 1324 may include an air cap 1326. Water cap 1322 and air cap 1326 may include substantially similar structures; the primary difference between water cap 1322 and air cap 1326 may be the size of each cap. Water cap 1322 and air cap 1326 may include any suitable structure for ending the flows of water and air respectively. In some examples, water cap 1322 and air cap 1326 may be slightly convex and/or curved outward from the interior of the water and air conduits of the manifold. Such a curvature may increase the structural integrity of the end cap and/or may fit a chosen aesthetic. In some examples, water cap 1322 and air cap 1326 may be flat.

To facilitate coupling with manifold 1000 (or any other suitable component), end cap 1300 further includes attachment mechanisms for securing end cap 1300 to manifold 1000. The attachment mechanisms may include any suitable structures depending on the characteristics of the end cap, the manifold, and/or other components. In some examples, water closure 1302 and air closure 1306 may each include attachment mechanisms to engage with attachment mechanisms disposed on the water and air conduits, respectively, of the manifold.

For example, upstream end 1316 of water closure 1302 may include one or more spring biased clips configured to couple with a retaining post, hereinafter referred to as post clips 1328. Additionally, or alternatively, post clips 1328 may be referred to as spring-biased clips or water closure clips. Post clips 1328 may include any suitable structure configured to couple with a retaining post disposed on the downstream end of the water conduit of the manifold. For example, post clips 1328 may include a pair of flanges 1330 and a protrusion or lip 1332 disposed on the end of each flange 1330. Flanges 1330 may be flexibly resilient to allow the clip to flex around the retaining post and protrusions 1332 may be configured to engage with the retaining post of the manifold (as shown in FIG. 47).

Air closure 1306 of end cap 1300 also includes attachment mechanisms for engaging with the air conduit of the manifold (or any other suitable component). For example, upstream end 1318 of each air closure 1306 may include one or more spring biased clips configured to couple with a retaining ridge, hereinafter referred to as ridge clips 1334. Additionally, or alternatively, ridge clips 1334 may be referred to as spring-biased clips or air conduit clips. Ridge clips 1334 may include any suitable structure configured to couple with a retaining ridge disposed on the air conduit of the manifold. For example, ridge clips 1334 may include a resiliently flexible support 1336 and a sloped lip 1338 which is configured to engage with the retaining ridge on the manifold.

In addition to attachment mechanisms, end cap 1300 may include any suitable structures and/or mechanisms for ensuring a water-tight seal between end cap 1300 and manifold 1000 (or any other suitable second component). In some examples, end cap 1300 may include structures for holding and/or engaging with O-rings and/or any other suitable mechanical seal.

End cap 1300 may further include a water plug 1340 and an air plug 1342. Water plug 1340 and air plug 1342 may include any suitable structure configured to seal off unused egress ports on manifold 1000. For example, if hot tub 100 includes an odd number of jets, one set of egress ports 1022 on manifold 1000 may not be coupled to tubing 120. To ensure that the plumbing system is sealed, the unused set of egress ports must be plugged. In the embodiment shown in FIGS. 44-45, end cap 1300 includes removable water plug 1340 and removable air plug 1342. In use, water plug 1340 and air plug 1342 may be removed from end cap 1300 and used to seal the unused set of egress ports on manifold 1000. Removing water plug 1340 and air plug 1342 from end cap 1300 may include cutting and/or breaking a support strut 1344 which attaches the plug to end cap 1300. In some examples, cutting and/or breaking support strut 1344 may be accomplished using any suitable tool such as scissors, wire cutters, and/or a knife. In some examples, water plug 1340 and air plug 1342 may be removed from end cap 1300 without the use of a tool. For example, support strut 1344 may be configured to tear and/or break when twisted, bent, and/or pulled.

Water plug 1340 may include any suitable structure configured to seal an unused water egress port. For example, water plug 1340 may include a substantially cylindrical stopper. A diameter of water plug 1340 may be approximately the same as an inner diameter of water egress port 1016. Water plug 1340 may include a flange 1346 configured to prevent the water plug from sliding too far into water egress port 1016. In some examples, water plug 1340 may be press fit into water egress port 1016. In some examples, the friction between water plug 1340 and the inside of water egress port 1016 may be sufficient to hold the water plug in place. In some examples, sealing water egress port 1016 with water plug 1340 may include applying glue, primer, and/or any suitable adhesive to the outside of water plug 1340 and/or the inside of water egress port 1016. In some examples, water plug 1340 may include a water cap which fits over the outside of water egress port 1016 and is held in place by friction and/or an adhesive.

Air plug 1342 may include any suitable structure configured to seal an unused air egress port. For example, air plug 1342 may include a substantially cylindrical stopper. A diameter of air plug 1342 may be approximately the same as an inner diameter of air egress port 1018. Air plug 1342 may include a flange 1348 configured to prevent the air plug from sliding too far into air egress port 1018. In some examples, air plug 1342 may be press fit into air egress port 1018. In some examples, the friction between air plug 1342 and the inside of air egress port 1018 may be sufficient to hold the air plug in place. In some examples, the air system is under vacuum and vacuum pressure holds the air plug in place. In some examples, sealing air egress port 1018 with air plug 1342 may include applying glue, primer, and/or any suitable adhesive to the outside of air plug 1342 and/or the inside of air egress port 1018. In some examples, air plug 1342 may include an air cap which fits over the outside of air egress port 1018 and is held in place by friction, vacuum pressure, and/or an adhesive.

As shown in FIGS. 44-45, water closure 1302 and air closure 1306 may have different dimensions. Water closure 1302 and air closure 1306 may have any suitable dimensions depending on the application and the characteristics of end cap 1300 and manifold 1000. Note that since end cap 1300 is configured to couple with manifold 1000, water closure 1302 of end cap 1300 generally has complimentary dimensions to the water conduit of manifold 1000 and air closure 1306 of end cap 1300 generally has complementary dimension to the air conduit of manifold 1000. In other words, an inner diameter of upstream end 1316 of water closure 1302 may be approximately the same as an outer diameter of the downstream end of the water conduit of manifold 1000, and an inner diameter of upstream end 1318 of air closure 1306 may be approximately the same as an outer diameter of the downstream end of the air conduit of manifold 1000. Thus, a downstream portion of manifold 1000 may fit within an upstream portion of end cap 1300, forming a water tight seal. FIG. 47 shows end cap 1300 and manifold 1000 coupled together.

Water closure 1302 and air closure 1306 may have any suitable diameters depending on the application and the characteristics of end cap 1300 and manifold 1000. In some examples, the diameter of water closure 1302 and the diameter of air closure may not be constant. For example, water closure 1302 may have an outer diameter in the range of approximately 1.50 inches to approximately 3.00 inches and a wall thickness in the range of approximately 0.05 inches to approximately 0.50 inches while air closure 1306 may have an outer diameter in the range of approximately 0.50 inches to approximately 2.00 inches and a wall thickness in the range of approximately 0.05 inches to approximately 0.50 inches. In some examples, water closure 1302 may have an outer diameter of approximately 2.81 inches and a wall thickness of approximately 0.17 inches. In some example, air closure 1306 may have an outer diameter of approximately 1.24 inches and a wall thickness of approximately 0.14 inches. In some examples, water closure 1302 and air closure 1306 may have any suitable diameters and wall thicknesses depending on the application and the characteristics of end cap 1300, manifold 1000, and other components.

As discussed, end cap 1300 is configured to be coupled with another component such as manifold 1000. End cap 1300 may be configured to be coupled with the manifold by a "press-and-click" method (described above). The "press-and-click" method may be facilitated by post clips 1328 and ridge clips 1334. For example, end cap 1300 and the manifold may be aligned and then compressed together to overcome the resistive force of post clips 1328 and ridge clips 1334, after which the components are locked together.

In the embodiment shown in FIGS. 44-45, flanges 1330 of post clips 1328 are configured to flex apart, away from a default position (e.g., away from each other), when protrusions 1332 slide over a retaining post on the manifold. Post clips 1328 are further configured to snap back into the default position (e.g., back towards each other), once protrusions 1332 pass by the retaining post on the manifold. Protrusions 1332 prevent post clip 1328, and thus end cap 1300, from sliding off of the manifold. Similarly, in the embodiment shown in FIGS. 44-45, ridge clips 1334 are configured to flex outward, away from a default position (e.g., away from second longitudinal axis 1308), when sloped lip 1338 slides over a retaining ridge on the manifold. Ridge clips 1334 are further configured to snap back into the default position (e.g., back towards second longitudinal axis 1308) once sloped lip 1338 passes over the retaining ridge on the manifold. Sloped lip 1338 prevents ridge clip 1334, and thus end cap 1300, from sliding off of the manifold.

In some examples, end cap 1300 and manifold 1000 (or any other suitable second component) may be configured to be able to be unlocked and/or uncoupled. Uncoupling end cap 1300 from the manifold may be accomplished by moving flanges 1330 of post clips 1328 away from each other (e.g., away from the retaining post on the manifold), moving ridge clips 1334 away from the air conduit of the manifold (e.g., away from second longitudinal axis 1308), and sliding end cap 1300 off of manifold 1000. In some examples, a worker may accomplish this using a finger or fingers to move the clips and/or using a tool. Releasably coupling end cap 1300 and the manifold together may be advantageous as it may allow a worker to uncouple an end cap that was coupled to the wrong manifold by mistake.

End cap 1300 may be constructed out of any suitable material. For example, end cap 1300 may include any suitable thermoplastic polymer such as polyvinyl chloride (PVC), acrylonitrile butadiene styrene (ABS), and/or any other suitable materials having similar properties (i.e., stiffness etc.). End cap 1300 may be manufactured using any suitable process. For example, the manufacturing process may include the use of injection molding, compression molding, and/or extrusion methods. In some examples, each component may be injection molded out of PVC.

First Illustrative Manifold Assembly

Together, manifold 1000, male manifold adapter 1100, female manifold adapter 1200, and manifold end cap 1300, described above, form a first embodiment of a set of manifold assembly components. Male adapter 1100, one or more manifolds 1000, and female adapter 1200 or end cap 1300 may couple to form manifold assembly 912.

In general, manifold assembly 912 is composed of any suitable number of each of the components in the first set of manifold assembly components and may include any suitable structures configured to separately convey air and water from respective air and water sources to a plurality of lengths of tubing 120. For example, manifold assembly 912 may include male adapter 1100, any suitable number of manifolds 1000, and female adapter 1200 or end cap 1300 depending on the application. In some examples, hot tub 100 may include any suitable number of manifold assemblies 912. In some examples, it may be advantageous to have a plurality of clusters of manifolds spaced out at different portions of hot tub 100 to better reach each jet with the least amount of tubing. Accordingly, any suitable number of manifolds 1000 grouped in any suitable number and/or size of manifold assembly 912 may be used. Each manifold assembly 912 may include any suitable number of manifolds 1000. In some examples, manifold assembly 912 may not include female adapter 1200 and/or end cap 1300. For example, some manifold assemblies 912 may include female adapter 1200 and not end cap 1300, and some manifold assemblies 912 may include end cap 1300 and not female adapter 1200.

As discussed, FIG. 31 is a block diagram which includes two illustrative manifold assemblies 910 and depicts two examples of how manifold assembly 910 may interact with other plumbing components. FIGS. 48 through 51 depict various examples of illustrative manifold assemblies; each figure may be a different view, and may include different manifold components.

Figure 48:
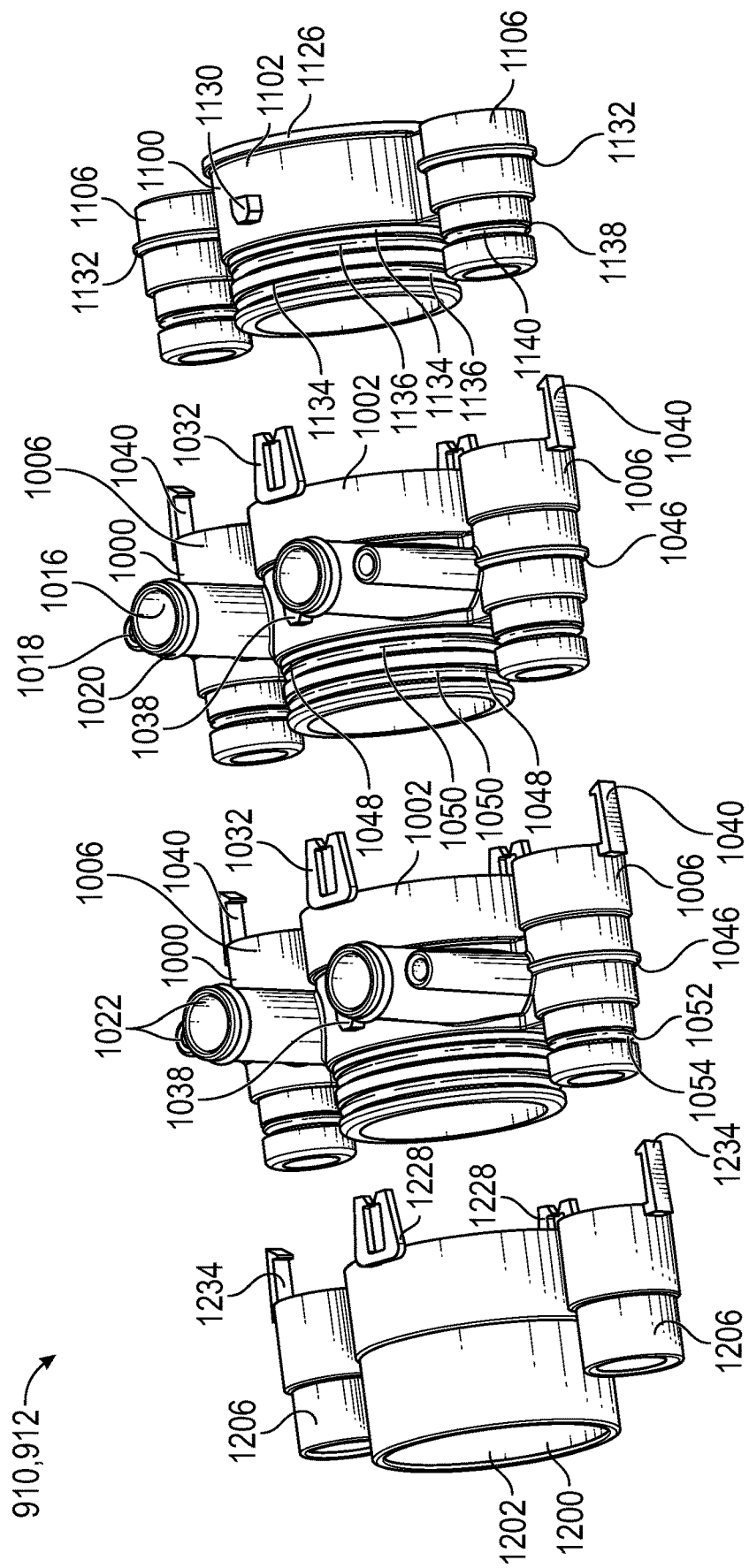
FIG. 48 is an exploded isometric view of the manifold assembly of FIG. 46.
Figure 49:
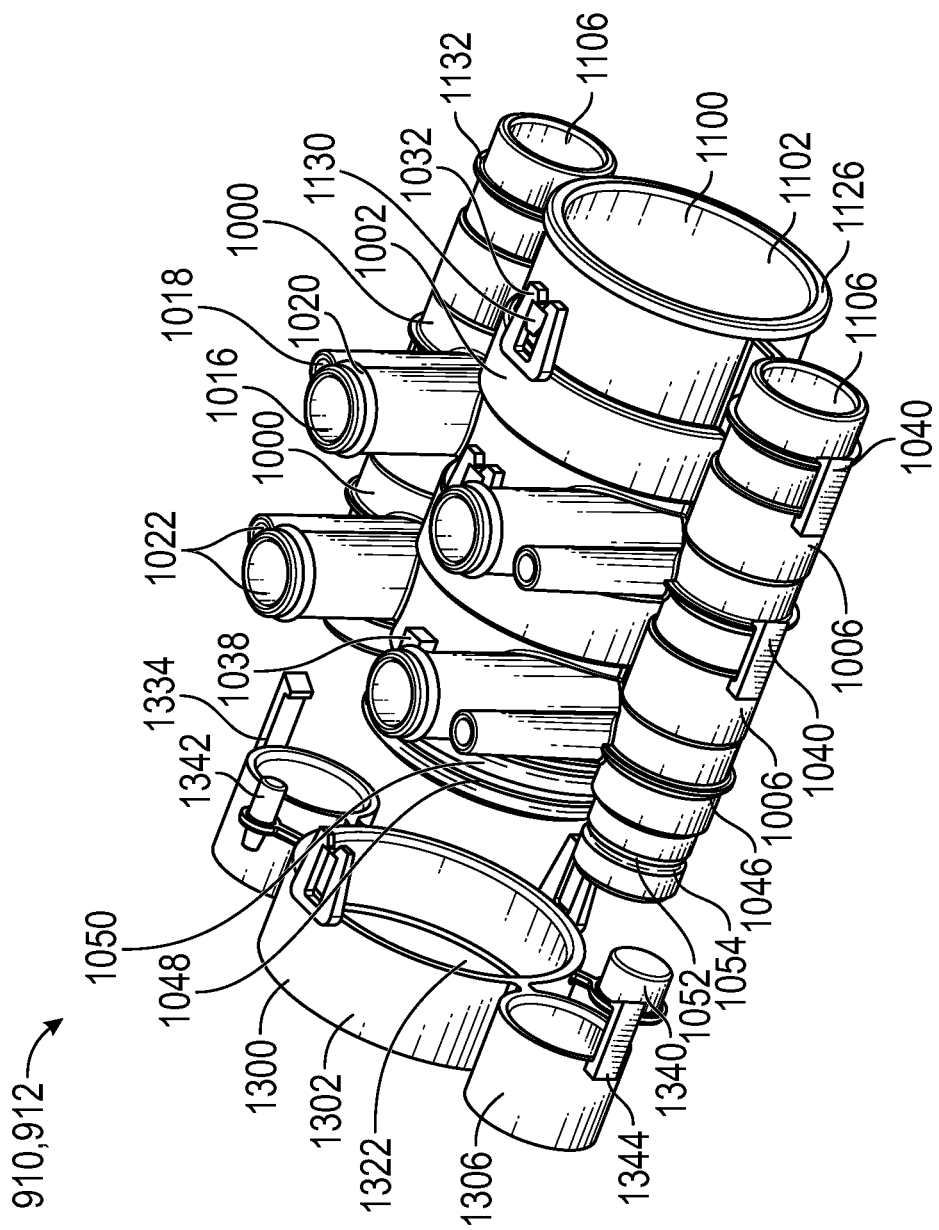
FIG. 49 is a partially exploded isometric view of the manifold assembly of FIG. 47.
Figure 50:
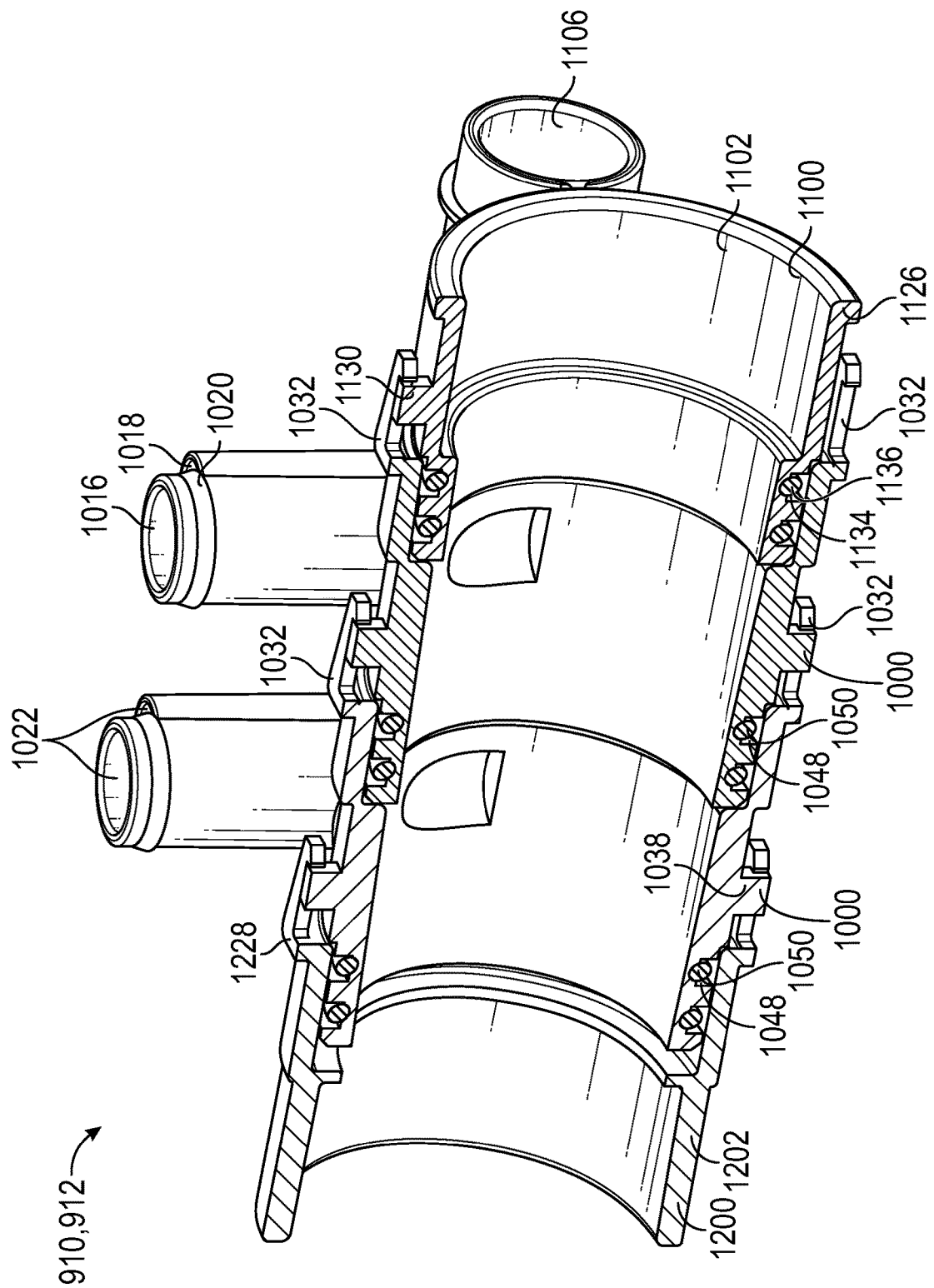
FIG. 50 is a sectional isometric view of the interconnected manifold assembly of FIG. 46, showing internal structure of the water conduits of the manifold assembly.
Figure 51:
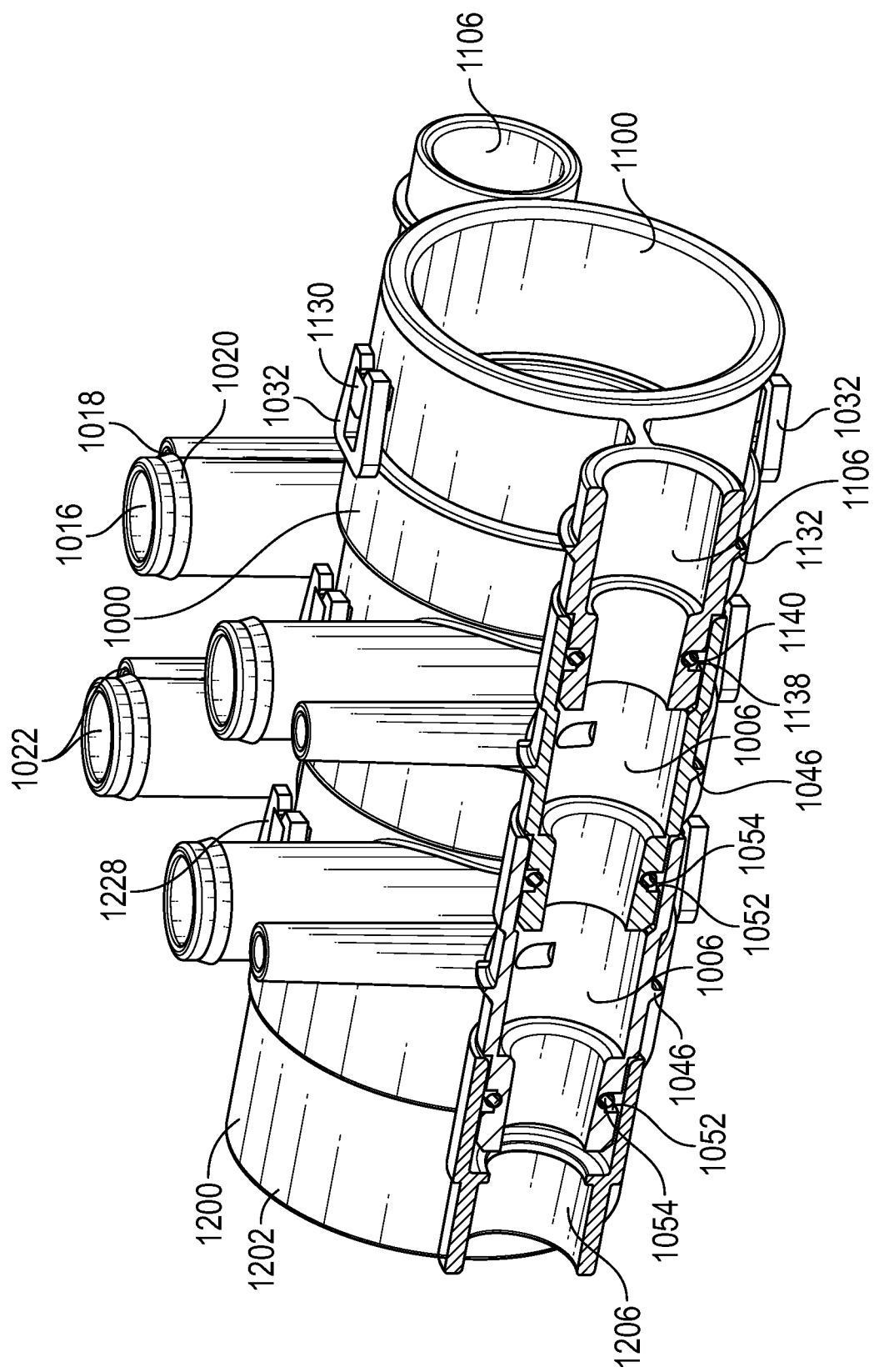
FIG. 51 is another sectional isometric view of the interconnected manifold assembly of FIG. 46, showing internal structure of the air conduits on one side of the manifold assembly.

FIG. 48 depicts an exploded isometric view of an example of first illustrative manifold assembly which includes male adapter 1100, two manifolds or manifold bodies 1000, and female adapter 1200. FIG. 49 depicts a partially exploded isometric view of another example of an illustrative manifold assembly which includes male adapter 1100, two manifolds 1000, and end cap 1300. FIG. 50 depicts a sectional isometric view of the exemplary assembly of FIG. 48; and FIG. 51 depicts another sectional isometric view of the exemplary assembly of FIG. 48.

In each of the examples of manifold assembly 912, male adapter 1100 is in fluid communication with manifold 1000. Each manifold 1000 is in fluid communication with another manifold 1000, female adapter 1200, and/or end cap 1300. Some examples of manifold assembly 912 include female adapter 1200 (FIGS. 48, 50, and 51) and some examples of manifold assembly 912 include end cap 1300 (FIG. 49). Alternate use of female adapter 1200 and end cap 1300 may be advantageous as manifold assemblies which include a female adapter allow the streams of air and water to continue on (for example, through pipe 112 and air tubing 116) to another manifold assembly 912. Alternatively, manifold assemblies which include an end cap end the streams of air and water and ensure that the plumbing system is sealed.

In FIGS. 48-51, the manifold assembly includes either two or three manifolds 1000. More generally, however, manifold assembly 910 may include any suitable number of manifolds 1000 depending on the application and characteristics of the hot tub and the plumbing system. In general, the number of manifolds in a manifold assembly may correspond to the number of jets adjacent the manifold assembly. For example, a manifold assembly which is adjacent four jets may include two manifolds (having a total of four sets of egress ports) while a manifold assembly which is adjacent 16 jets may include 8 manifolds.

In some examples, hot tub 100 may include an odd number of jets and one of the manifolds in hot tub 100 may include an unused set of egress ports which may be plugged using the air and water plugs attached to the end cap. For example, a plumbing system which includes 29 jets may include 15 manifolds (having a total of 30 sets of egress ports), 14 of which couple to two lengths of tubing 120 and one of which couples to one length of tubing 120. The manifold coupling to only one length of tubing 120 has an unused set of egress ports which may be plugged by air and water plugs which may be removed from end cap 1300.

In use, streams of water and air may be passed to male adapter 1100 from a length of water pipe (such as pipe 112) and a length of air tubing (such as air tubing 116) respectively. Male adapter 1100 may pass the streams of water and air to manifold 1000. Manifold 1000 may pass part of the streams of water and air to a length of tubing (such as tubing 120) through a set of egress ports and part of the streams of water and air to another component. In some examples, manifold 1000 may pass part of the streams of water and air to another manifold 920.

In some examples, a plurality of manifolds 1000 may be coupled together; the manifold of the plurality of manifolds that is farthest downstream may be coupled to either a female adapter or an end cap. In cases where there is another manifold assembly further downstream, the plurality of manifolds may be coupled to a female adapter 1200. Female adapter 1200 may be coupled to another length of pipe (such as pipe 112) and a length of air tubing (such as air tubing 116) and pass the streams of water and air to the pipe and air tubing respectively. In cases where there is not another manifold assembly downstream, the plurality of manifolds may be coupled to an end cap 1300. End cap 1300 may ensure that the plumbing system is sealed. For example, in a system including three manifold assemblies 912, the two upstream manifold assemblies may include female adapters 1200 while the most downstream manifold assembly may include end cap 1300.

During installation, manifold assembly may be assembled in multiple steps or at multiple stations. A first step or steps may include coupling at least one male adapter 1100 to suitable lengths of pipe 112 and air tubing 116. Coupling male adapter 1100 to pipe 112 and air tubing 116 may include any suitable process and/or structure. In some examples, coupling male adapter 1100 to pipe 112 and air tubing 116 may include using a glue, primer, and/or any suitable adhesive. For example, glue may be applied to the end of a length of pipe 112 and/or the inside of the upstream portion of the water conduit of male adapter 1100 before inserting the end of pipe 112 into the upstream portion of the water conduit of male adapter 1100.

In some examples, pipe 112 may fit over the upstream portion of the water conduit of male adapter 1100 and glue may be applied to the inside of the end of pipe 112 and/or the outside of the water conduit of male adapter 1100. In some examples, glue may not be used and friction and/or any suitable mechanical mechanism may be used to couple pipe 112 to male adapter 1100. Similarly, in some examples, primer (and/or glue) may be applied to the end of a length of air tubing 116 and/or the inside of the upstream portion of the air conduit of male adapter 1100 before inserting the end of air tubing 116 into the upstream portion of the air conduit of male adapter 1100. In some examples, air tubing 116 may fit over the upstream portion of the air conduit of the male adapter 1100 and primer may be applied to the inside of the end of air tubing 116 and/or the outside of the air conduit of male adapter 1100. In some examples, primer may not be used and friction, vacuum pressure, and/or any suitable mechanical mechanism may be used to couple air tubing 116 to male adapter 1100.

Another step or steps may include coupling female adapter 1200 to suitable lengths of pipe 112 and air tubing 116. Coupling female adapter 1200 to pipe 112 and air tubing 116 may include any suitable process and/or structure. In some examples, coupling female adapter 1200 to pipe 112 and air tubing 116 may include using a glue, primer, and/or any suitable adhesive. For example, glue may be applied to the end of a length of pipe 112 and/or the inside of the downstream portion of the water conduit of female adapter 1200 before inserting the end of pipe 112 into the downstream portion of the water conduit of female adapter 1200. In some examples, pipe 112 may fit over the downstream portion of the water conduit of female adapter 1200 and glue may be applied to the inside of the end of pipe 112 and/or the outside of the water conduit of female adapter 1200.

In some examples, glue may not be used and friction and/or any suitable mechanical mechanism may be used to couple pipe 112 to female adapter 1200. Similarly, in some examples, primer (and/or glue) may be applied to the end of a length of air tubing 116 and/or the inside of the downstream portion of the air conduit of female adapter 1200 before inserting the end of air tubing 116 inside of the downstream portion of the air conduit of female adapter 1200. In some examples, air tubing 116 may fit over the downstream portion of the air conduit of the female adapter 1200 and primer may be applied to the inside of the end of air tubing 116 and/or the outside of the air conduit of female adapter 1200. In some examples, primer may not be used and friction, vacuum pressure, and/or any suitable mechanical mechanism may be used to couple air tubing 116 to female adapter 1200.

Assembling manifold assembly 912 may further include coupling each manifold 1000 with tubing 120. Coupling manifold 1000 with tubing 120 may include any suitable process and/or structure. For example, tubing 120 may be slid over the ends of the air and water egress ports and a clamp (described in more detail below) may be used to prevent the tubing from sliding off. In some examples, a lubricant (e.g., soapy water) may be used to facilitate sliding the tubing over the air and water egress ports. In some examples, a lip formed on water egress port (such as lip 1020) may be configured to help keep tubing 120 on water egress port 1016 and/or may be configured to facilitate a water-tight connection. In some examples, tubing 120 may include dual extrusion tubing. In some examples, tubing 120 may include separate air and water tubes which may be installed one at a time on the air and water egress ports respectively.

Another step in the installation of manifold assembly 912 includes coupling together one or more manifolds 1000 (each of which are attached to tubing 120) and coupling the group of one or more manifolds 1000 to a male adapter 1100. Manifolds 1000 may be coupled together by a "press-and-click" method (described above). For example, two manifolds may be aligned and then compressed together to overcome the resistive force of spring-biased clips (such as post clips 1032 and/or ridge clips 1040). In the embodiment shown in FIGS. 32-51, post clips 1032 and ridge clips 1040 are configured to facilitate coupling with the other manifold by engaging with features on the other manifold.

Any suitable number of manifolds 1000 may be coupled together to form a manifold cluster depending on the characteristics of hot tub 100, the number of jets, and the characteristics of manifold assembly 912. The manifold cluster may be coupled to male adapter 1100 by a "press-and-click" method (described above). For example, the male adapter be aligned with the most upstream manifold and then the adapter and the manifold cluster may be compressed together to overcome the resistive force of spring-biased clips (such as post clips 1032 and/or ridge clips 1040 of the most upstream manifold). In the embodiment shown in FIGS. 32-51, post clips 1032 and ridge clips 1040 on the upstream manifold are configured to facilitate coupling with the male adapter by engaging with retaining features on the adapter.

A further step in the installation of a manifold assembly 912 may include coupling a most downstream manifold of the manifold cluster to either female adapter 1200 or end cap 1300 depending on the characteristics of hot tub 100 and manifold assembly 912. In examples where there is another manifold assembly farther downstream, the downstream manifold may be coupled to female adapter 1200. The manifold cluster may be coupled to female adapter 1200 by a "press-and-click" method (described above). For example, the female adapter be aligned with the most downstream manifold and then the adapter and the manifold cluster may be compressed together to overcome the resistive force of spring-biased clips (such as post clips 1032 and/or ridge clips 1040 of the most downstream manifold). In the embodiment shown in FIGS. 32-51, post clips 1032 and ridge clips 1040 on the downstream manifold are configured to facilitate coupling with the female adapter by engaging with retaining features on the adapter.

In examples where manifold assembly 912 is the furthest downstream manifold assembly, the downstream manifold may be couple to end cap 1300. The manifold cluster may be coupled to end cap 1300 by a "press-and-click" method (described above). For example, the end cap may be aligned with the most downstream manifold and then the end cap and the manifold cluster may be compressed together to overcome the resistive force of spring-biased clips (such as post clips 1328 and/or ridge clips 1334 on the end cap). In the embodiment shown in FIGS. 32-51, post clips 1328 and ridge clips 1334 on the end cap are configured to facilitate coupling with the manifold by engaging with retaining features on the manifold.

In some examples, each of the components of the first set of manifold assembly components may be configured to be able to be unlocked and/or uncoupled. Uncoupling the components may be accomplished by moving spring biased clips away from a default position and sliding the components apart. In some examples, a worker may accomplish this using a finger to move the spring biased clips and/or using a tool. Releasably coupling the components together may be advantageous as it may, among other advantages, allow a worker to uncouple components that were coupled to the wrong component by mistake.

As discussed, each of the components of the first set of manifold assembly components (e.g., manifold 1000, male adapter 1100, female adapter 1200, and end cap 1300) may be constructed out of any suitable material. For example, the components of the first set of manifold assembly components may include any suitable thermoplastic polymer such as polyvinyl chloride (PVC), acrylonitrile butadiene styrene (ABS), and/or any other suitable materials having similar properties (i.e., stiffness etc.). The components of the first set of manifold assembly components may be manufactured using any suitable process. For example, the manufacturing process may include the use of injection molding, compression molding, and/or extrusion methods. In some examples, each component may be injection molded out of PVC.

Second Illustrative Manifold Assembly

Figure 52:
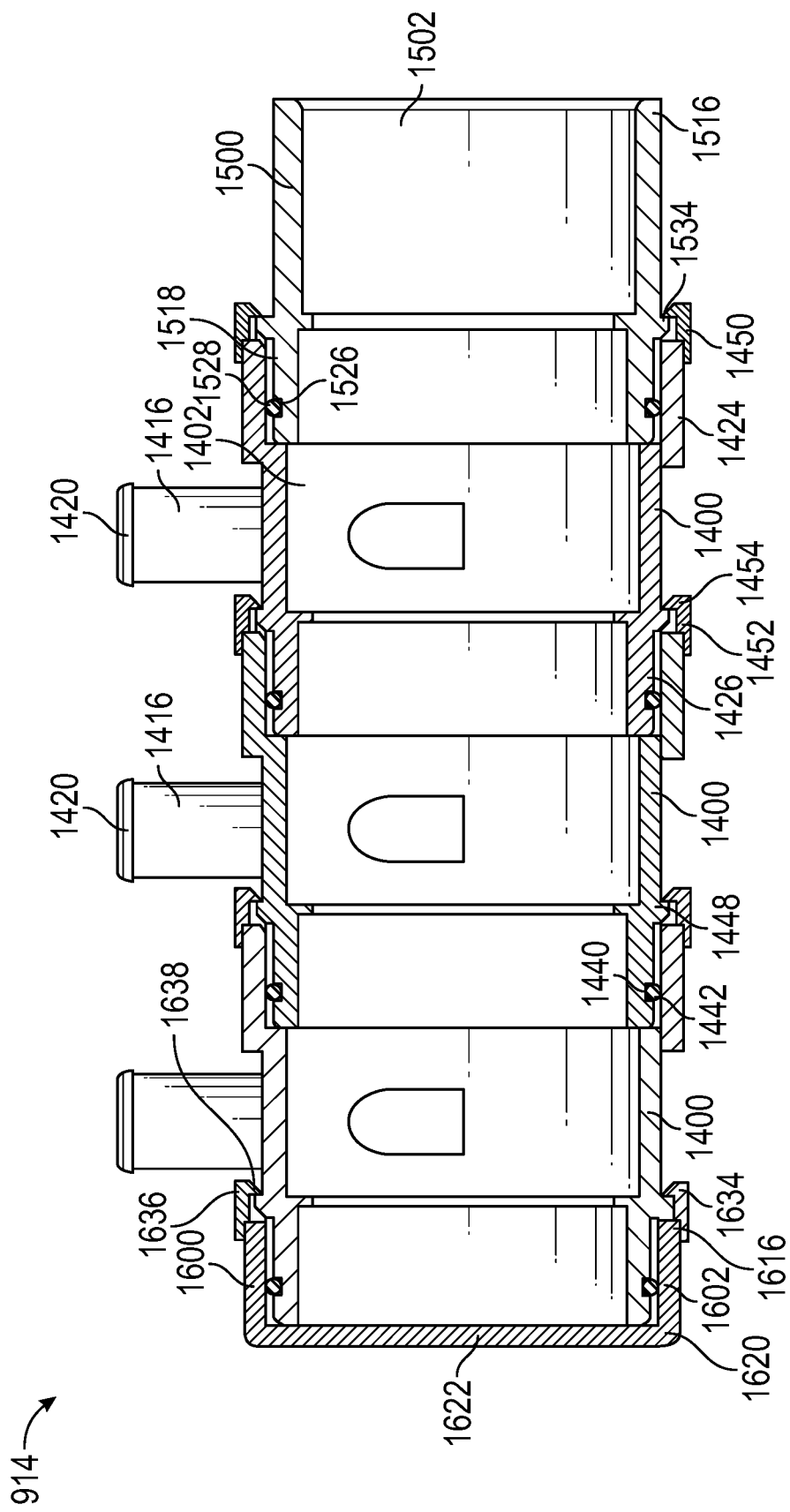
FIG. 52 is a side sectional view of another embodiment of a manifold assembly including three interconnected manifold bodies and a male manifold adapter, according to aspects of the present teachings.
Figure 53:
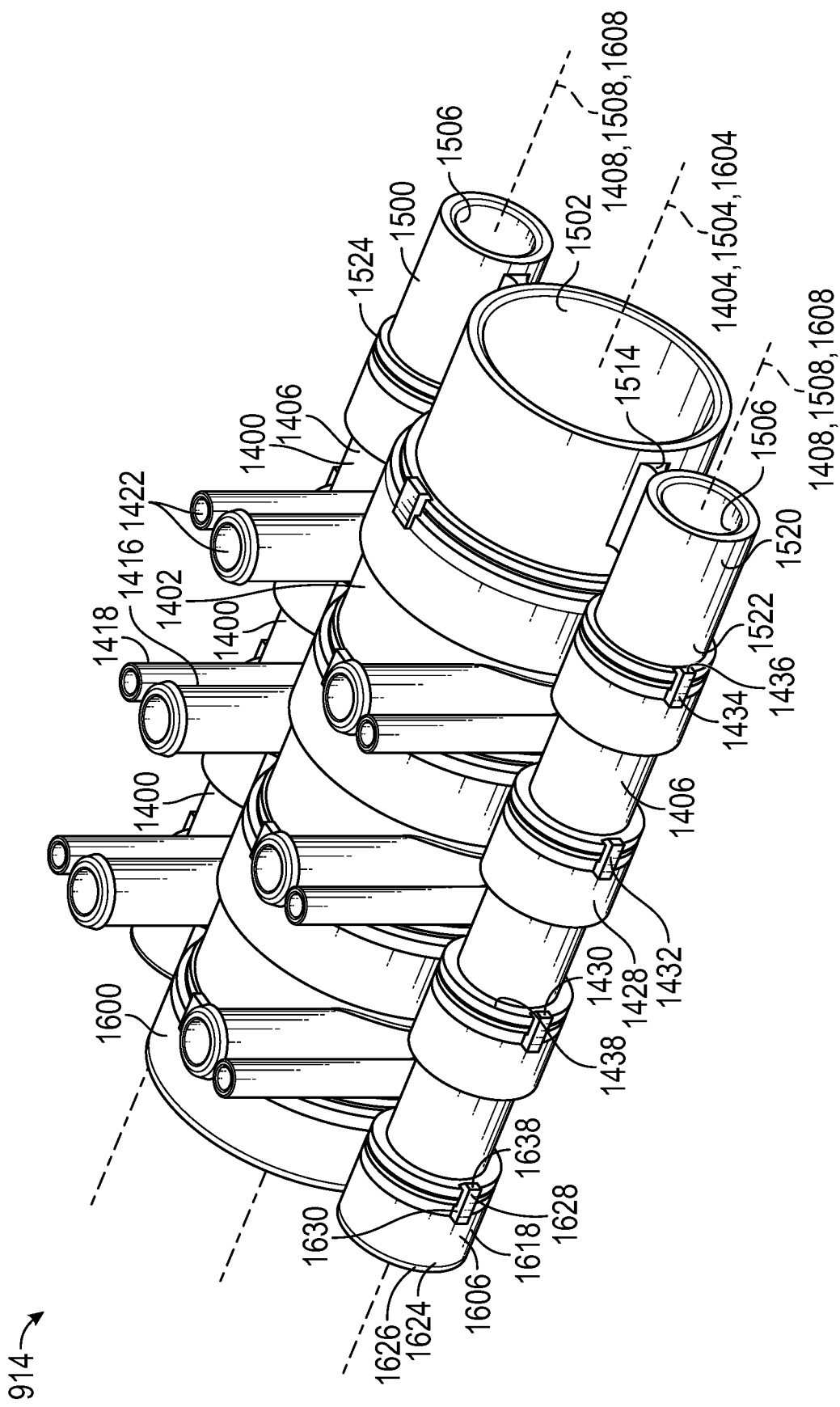
FIG. 53 is an isometric view of the manifold assembly of FIG. 52.
Figure 54:
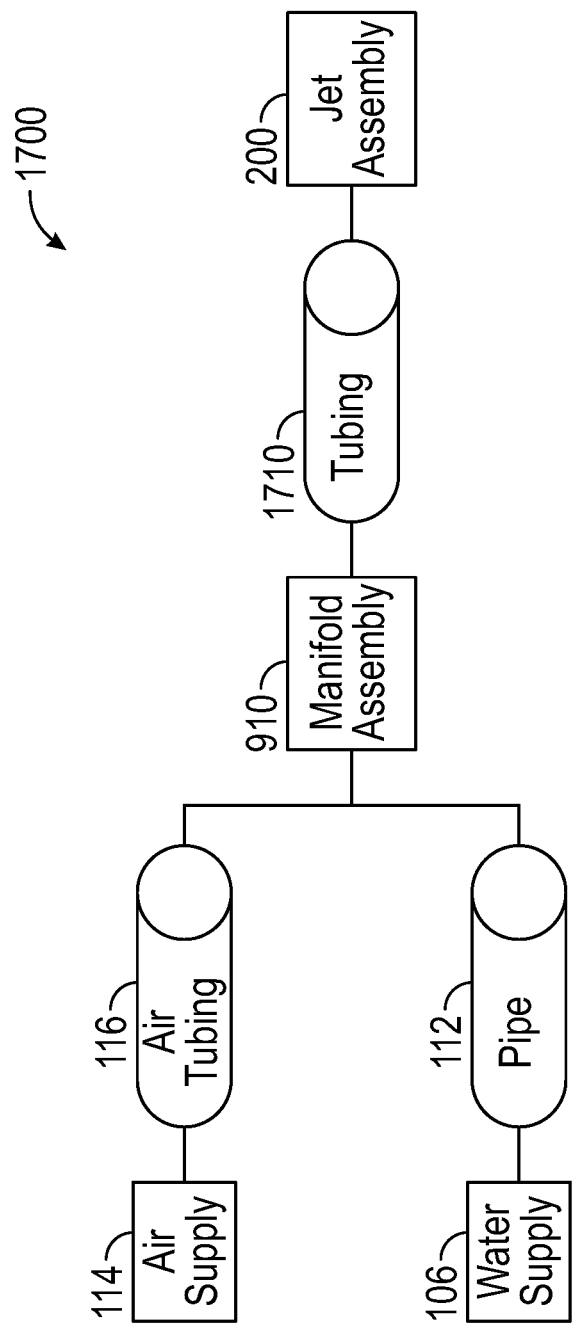
FIG. 54 is a block diagram illustrating how water and air flow from their respective supplies to a jet assembly, according to aspects of the present teachings.

FIGS. 52 and 53 depict the components of a second embodiment of a set of manifold assembly components. The second embodiment of the set of manifold assembly components includes a second embodiment 1400 of manifold 920, a second embodiment 1500 of male manifold adapter 930, and a second embodiment 1600 of manifold end cap 950. Together, male manifold adapter 1500, one or more manifold 1400, and manifold end cap 1600 may form an illustrative manifold assembly 914. Additionally, or alternatively, male manifold adapter 1500 may be referred to as a male adapter; and/or manifold end cap 1300 may be referred to as an end cap.

Each of the components in the second embodiment of the set of manifold assembly components may be substantially similar to the corresponding component in the first set of manifold assembly components. Accordingly, only an abbreviated discussion will be provided below of features which are substantially similar to the first embodiment. A few primary differences will be discussed below, however, there may be various differences in the shape, dimensions, and/or style of the components compared with the first set of manifold assembly components.

First, where the water conduits of manifold 1000 and male manifold adapter 1100 (i.e., water conduits 1002 and 1102 respectively) each included two recesses for O-rings and two O-rings (i.e., recesses 1048 and 1134 respectively and O-rings 1050 and 1134 respectively), a water conduit 1402 of manifold 1400 and a water conduit 1502 of male manifold 1500 each include one recess and one O-ring. Also, in place of post clips and retaining posts as in the first set of manifold assembly components (such as post clips 1032 and 1328 on manifold 1000 and end cap 1300 and retaining post 1038 and 1130 on manifold 1000 and male adapter 1100), the water conduits of each of the components in the second set of manifold assembly components each include a retaining ridge and/or a plurality of ridge clips. Further, where water cap 1322 and air cap 1326 of end cap 1300 are curved, end cap 1600 includes a water cap 1622 and an air cap 1626 which are flat. Each of these components will be discussed in further detail below.

For example, water conduit 1402 of manifold 1400 defines a first longitudinal axis 1404 and includes an upstream end 1424 and a downstream end 1426. Unlike manifold 1000 which includes two recesses 1048 (each of which holds an O-ring 1050), downstream end 1426 of water conduit 1402 of manifold 1400 includes one recess 1440 configured to hold an O-ring 1442. Recess 1440 and O-ring 1442 are substantially similar to recesses 1048 and O-rings 1050 respectively. Downstream end 1426 of water conduit 1402 further includes a retaining ridge 1448 configured to couple with ridge clips on the water conduit of another component.

Retaining ridge 1448 may include any suitable structure configured to engage with spring-biased clips (e.g., ridge clips) on the upstream end of the water conduit of another component. For example, retaining ridge 1448 may include a ridge which extends around substantially the entire perimeter of the water conduit. Upstream end 1424 of water conduit 1402 further includes a plurality of spring-biased clips or ridge clips 1450 configured to couple with a retaining ridge. Ridge clips 1450 may include any suitable structure configured to couple with a retaining ridge disposed on the water conduit of another component. Ridge clips 1450 include a flexible support 1452 and a sloped lip 1454 which is configured to engage with the retaining ridge of another component.

Manifold 1400 further includes two air conduits 1406, each of which define a second longitudinal axis 1408. Air conduits 1406 are substantially identical to air conduits 1006. A periphery of air conduit 1406 is joined to a periphery of water conduit 1402 by a support structure. The support structure is substantially identical to support structure 1014 of manifold 1000. An upstream end 1428 of air conduit 1406 includes at least one ridge clip 1432 configured to couple with a retaining ridge on the air conduit of another component. Ridge clip 1432 includes a flexible support 1434 and a sloped lip 1436 and may be substantially similar to ridge clips 1040.

A downstream end 1430 of air conduit 1406 includes a retaining ridge 1438 configured to couple with retaining clips on another component. Downstream end 1430 of air conduit 1406 further includes a recess configured to hold an O-ring. The recess on air conduit 1406 is substantially similar to recess 1052 and the O-ring on air conduit 1406 may be substantially similar to O-ring 1054. Manifold 1400 further includes a set of egress ports 1422. Set of egress ports 1422 includes a water egress port 1416 and an air egress port 1418, which may be substantially similar to water egress port 1016 and air egress port 1018 respectively. Water egress port 1416 includes a lip or ridge 1420.

Similarly, water conduit 1502 of male adapter 1500 defines a first longitudinal axis 1504 and includes an upstream end 1516 and a downstream end 1518. Unlike male adapter 1100 which includes two recesses 1134 (each holding an O-ring 1136), downstream end 1518 of water conduit 1502 of male adapter 1500 includes one recess 1526 configured to hold an O-ring 1528. Recess 1526 and O-ring 1528 are substantially similar to recess 1134 and O-ring 1136 respectively. Downstream end 1518 further includes a retaining ridge 1534 configured to couple with ridge clips on another component. Retaining ridge 1534 may include any suitable structure configured to engage with spring-biased clips (e.g., ridge clips) on the upstream end of the water conduit of another component.

For example, retaining ridge 1534 may include a ridge which extends around substantially the entire perimeter of the water conduit. Male adapter 1500 further includes two air conduits 1506, each of which define a second longitudinal axis 1508. Air conduits 1506 are substantially identical to air conduits 1106. A periphery of air conduit 1506 is joined to a periphery of water conduit 1502 by a support structure 1514. Support structure 1514 is substantially identical to support structure 1114 of male adapter 1100. A downstream end 1522 of air conduit 1506 includes a retaining ridge 1524 configured to couple with retaining clips on another component. Downstream end 1522 of air conduit 1506 further includes a recess configured to hold an O-ring.

The recess on air conduit 1506 is substantially similar to recess 1138 and the O-ring on air conduit 1506 may be substantially similar to O-ring 1140. Further, upstream end 1516 of water conduit 1502 is configured to couple with a length of pipe, such as pipe 112. An upstream end 1520 of air conduit 1506 is configured to couple with a length of air tubing, such as air tubing 116. Upstream end 1516 and upstream end 1520 may be substantially similar to upstream end 1116 and upstream end 1120 and may couple to pipe 112 and air tubing 116 respectively in substantially the same way as upstream end 1116 and upstream end 1120.

Also, water closure 1602 of end cap 1600 defines a first longitudinal axis 1604 and includes an upstream end 1616 and a downstream end 1620. End cap 1600 further includes two air closures 1606, each of which define a second longitudinal axis 1608. Air closures 1606 are substantially identical to air closures 1606. A periphery of air closure 1606 is joined to a periphery of water closure 1602 by a support structure. The support structure is substantially identical to support structure 1314 of end cap 1300. Unlike end cap 1300 which includes water and air caps which are convex, downstream end 1620 of water closure 1602 of end cap 1600 includes a flat water cap 1622. Similarly, a downstream end 1624 of an air closure 1606 includes a flat air cap 1626. Upstream end 1616 of water closure 1602 further includes a plurality of spring-biased clips or ridge clips 1634 configured to couple with a retaining ridge on another component.

Ridge clips 1634 may include any suitable structure configured to couple with a retaining ridge disposed on the water conduit of another component. Ridge clips 1634 include a flexible support 1636 and a sloped lip 1638 which is configured to engage with the retaining ridge of another component. An upstream end 1618 of air closure 1606 includes at least one ridge clip 1628 configured to couple with a retaining ridge on the air conduit of another component. Ridge clip 1628 includes a flexible support 1630 and a sloped lip 1632 and may be substantially similar to ridge clips 1334.

While FIGS. 52 and 53 do not show a female manifold adapter, in some examples, the second set of manifold assembly components may include a second embodiment of a female manifold adapter. The second embodiment of a female manifold adapter may be substantially the same as female adapter 1200 except that it may include ridge clips on the water conduit in place of post clips 1228. The ridge clips may be configured to couple with a retaining ridge disposed on the water conduit of another component.

Each of the components in the second set of manifold assembly components may be constructed out of any suitable material. For example, manifold 1400, male adapter 1500, end cap 1600, and/or the second embodiment of a female manifold adapter may include any suitable thermoplastic polymer such as polyvinyl chloride (PVC), acrylonitrile butadiene styrene (ABS), and/or any other suitable materials having similar properties (i.e., stiffness etc.). Each of the components in the second set of components may be manufactured using any suitable process. For example, the manufacturing process may include the use of injection molding, compression molding, and/or extrusion methods. In some examples, each component may be injection molded out of PVC.

C. Illustrative Plumbing System

As shown in FIGS. 54-59, this section describes an illustrative plumbing system suitable for use in a hot tub, swim spa or the like. The hot tub plumbing system may include any suitable structures and/or mechanisms configured to simultaneously deliver separate streams of air and water to a plurality of jets. For example, the plumbing system may include a plurality of manifold assemblies, a plurality of lengths of tubing, and/or a plurality of jet assemblies. In the block diagram shown in FIG. 54, a plumbing system 1700 includes water supply 106, water pipe 112, air supply 114, air tubing 116, at least one manifold assembly 910, tubing 1710, and at least one jet assembly 200. In some examples, any of the components described in the previous sections may be used in plumbing system 1700.

Overview

In general, hot tub plumbing system 1700 may comprise: a manifold (such as manifolds 118, 920, 1000, and/or 1400 described previously) configured to receive separate air and water supply streams and to direct those streams into a water egress port (such as water egress ports 1016 and/or 1416) and an air egress port (such as air egress port 1018 and/or 1418), respectively, wherein the water egress port and the air egress port are substantially parallel and adjacent to each other; a flexible dual extrusion tube (such as tubing 1710) including a first hollow cylindrical portion configured to couple to the water egress port and a second hollow cylindrical portion configured to couple to the air egress port, wherein the first and second hollow cylindrical portions are joined together at peripheral portions; a jet back (such as straight jet backs 122, 302, 402, and 502, and/or angled jet backs 602, 702, and 802) including a pair of adjacent parallel hollow protrusions each configured to receive one of the streams of air and water from a respective one of the hollow cylindrical portions of the dual extrusion tube; and a jet body (such as jet bodies 124 and/or 304, 404, 504, 604, 704, and/or 804) configured to receive the streams of air and water from the jet back, to merge the streams of air and water together to form a mixed stream of air and water, and to provide the mixed stream of air and water from an outlet and thereby into the interior of the hot tub.

In some examples, the jet back may further include a central portion (such as central portion 316 in jet assembly 300) configured to create a water tight seal with the jet body, and an attachment mechanism extending from a first end of the central portion and configured to attach the jet back to the jet body in a secure manner. In some examples, the attachment mechanism may include a pair of opposed, spring-biased clips (such as spring-biased clips 328 in jet assembly 300) extending from the first end of the central portion of the jet back, each opposed clip configured to snap into spring-biased engagement with a complementary retaining ridge (such as ridge 530 on jet assembly 500) or groove (such as 330 on jet assembly 300) disposed at a periphery of the jet body. In some examples, the jet body further includes at least one O-ring (such as O-rings 338 on jet assembly 300) disposed around a periphery of the jet body, and an inner cylindrical surface of the central portion of the jet back is configured to fit around the O-ring in a substantially water tight compression fit.

In some examples, hot tub plumbing system 1700 further comprises a jet insert (such as jet inserts 126, 506, and/or 806) configured fit within an aperture of a hot tub body, to receive the mixed stream of air and water from the jet body outlet, and to channel the mixed stream of air and water into an interior portion of the hot tub body through the aperture. In some examples, hot tub plumbing system 1700 further comprises a one-piece clamp (described below) configured to hold the dual extrusion tube in water tight engagement with the egress ports of the manifold. In some examples, the clamp is also configured to hold the dual extrusion tube in water tight engagement with the protrusions of the jet back. For example, the clamp may define a pair of contiguous arcuate apertures and a selectively releasable end portion having first and second sets of complementary ratcheting teeth configured to be engaged with each other upon compression of the end portion.

In other words, hot tub plumbing system 1700 may comprise a manifold configured to receive separate air and water supply streams and to channel the streams into a water egress port and an air egress port; a flexible dual extrusion tube including a first tubular portion configured to couple to the water egress port and a second tubular portion configured to couple to the air egress port, wherein the first and second tubular portions are joined together in a figure-eight configuration; and a jet back including a pair of adjacent parallel hollow protrusions each configured to receive one of the streams of air and water from a respective one of the tubular portions of the dual extrusion tube. Hot tub plumbing system 1700 may further comprise a jet body configured to receive the streams of air and water from the jet back, to merge the streams of air and water together to form a mixed stream of air and water, and to channel the mixed stream of air and water into an outlet. In some examples, hot tub plumbing system 1700 may further comprise a jet insert configured to be attached within an aperture of a hot tub shell, to receive the mixed stream of air and water from the outlet of the jet body, and to channel the mixed stream of air and water into the hot tub through the aperture.

Hot tub plumbing system 1700 may include separate water and air systems. For example, water supply 106, pipe 112, the water conduits of the components of manifold assembly 910, the water portion of tubing 1710, and the water ingress port of jet assembly 200 may form a water system. In some examples, the water system may be under any suitable pressure. For example, the water system may be under approximately 25 pounds per square inch (psi) of pressure. In some examples, the water system may be under approximately 5 psi, 10 psi, 15 psi, 30 psi, and/or any other suitable amount of pressure. The amount of pressure applied to the water system may be configured to facilitate the flow of water through the water system. Water may be supplied to the water system by water supply 106 which may include a pump, filter, and/or any other suitable source of water. In some examples, water may be recycled by the hot tub such that water from the hot tub body is removed, filtered, and reintroduced into the water system.

Air supply 114, tubing 116, the air conduits of the components of manifold assembly 910, the air portion of tubing 1710, and the air ingress port of jet assembly 200 may form an air system. In some examples, the air system may be under any suitable pressure, and in some cases the air system may be under vacuum pressure rather than positive pressure. For example, the air system may be under less than approximately 20 inches of mercury (in.-Hg) of vacuum pressure. The amount of vacuum applied to the air system may be configured to facilitate the flow of air through the system.

In some examples, the vacuum pressure applied to the air system may be produced by the flow of water through the nozzles in the jet assemblies. In other words, water flowing past the air ingress ports of the jet assembly may draw air into the jet (and thus through the air system) due to the Venturi effect. Air may be supplied to the air system by air supply 114, which may include a pump and/or an air vent open to the atmosphere. In some examples, the air system may use atmospheric air and/or filtered air. In some examples, atmospheric air may enter the air system through an air vent. In some examples, the air vent may be adjustable by a user to manipulate the ratio of air and water that the jet assemblies introduce into the hot tub body.

Any suitable dimensions may be used for each component. Components which couple together may have complementary dimensions. For example, the outer diameters of the air and water ingress and egress ports may be approximately the same as the inner diameter of the dual extrusion tubing used in the system.

First Embodiment of a Hot Tub Plumbing System

Figure 55:
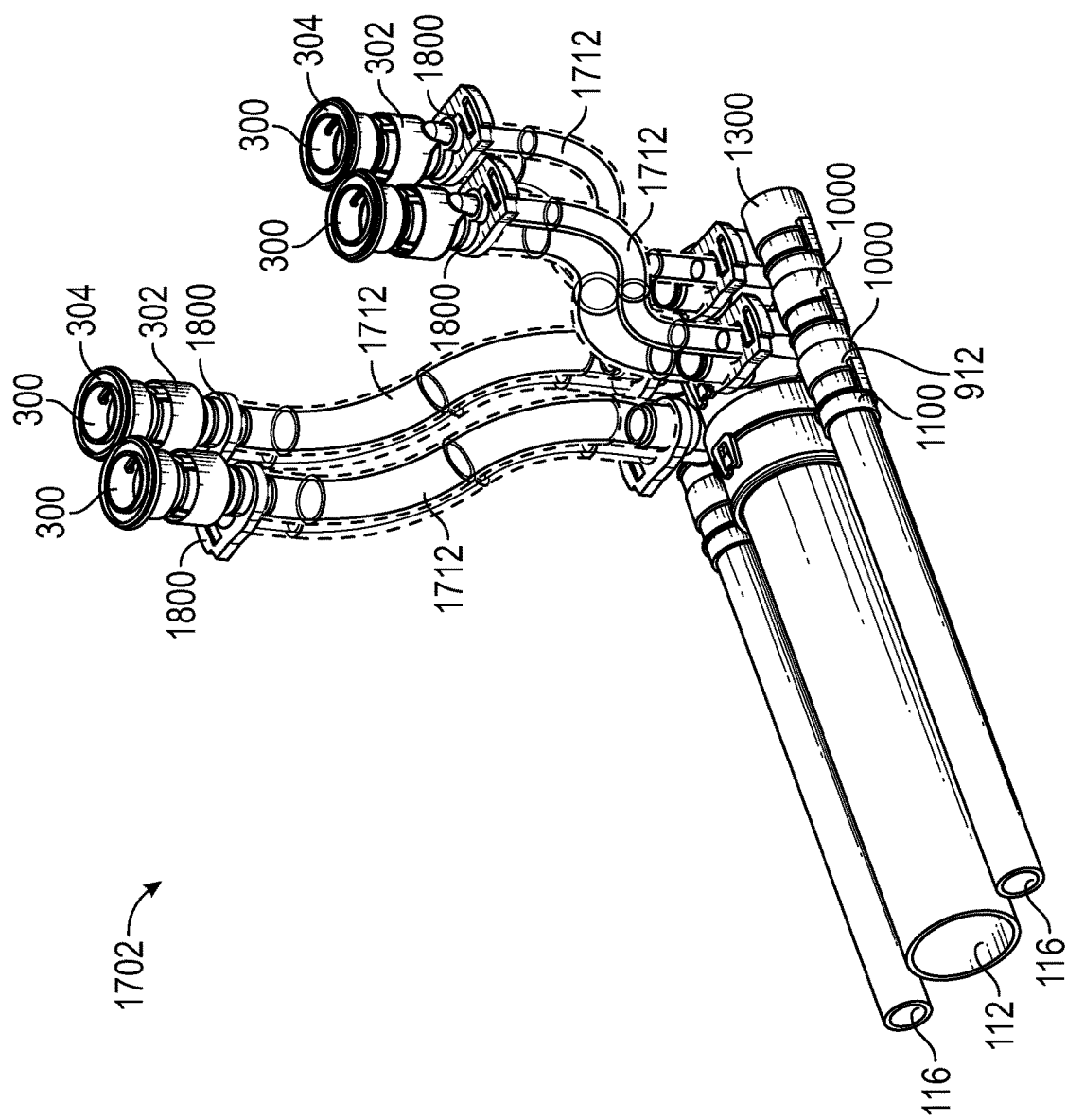
FIG. 55 is an isometric view depicting a portion of an exemplary hot tub plumbing system, according to aspects of the present teachings.
Figure 56:
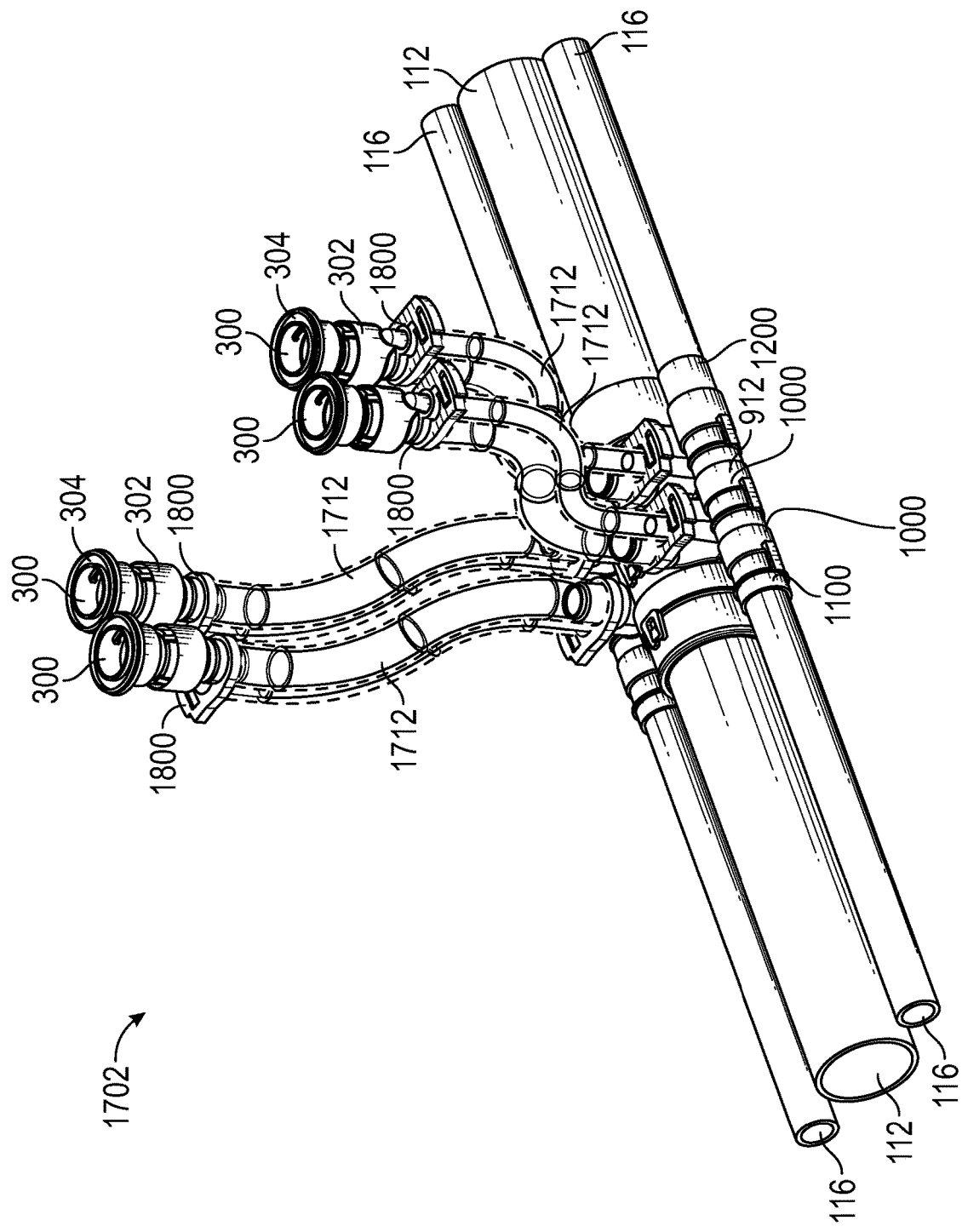
FIG. 56 is an isometric view depicting a portion of another exemplary hot tub plumbing system, according to aspects of the present teachings.

FIG. 55 depicts a portion of a first embodiment 1702 of plumbing system 1700 including an example of manifold assembly 912 and four jet assemblies 300. FIG. 56 depicts another portion of first embodiment 1702 of plumbing system 1700 including another example of manifold assembly 912 and four jet assemblies.

As shown in FIG. 55, system 1702 includes water pipe 112 and air tubing 116 which couple with an example of manifold assembly 912. This example of manifold assembly 912 includes male manifold adapter 1100, two manifolds 1000, and manifold end cap 1300. Each of the components of manifold assembly 912 are described in more detail above. Male manifold adapter 1100 couples with pipe 112 and air tubing 116.

As shown in FIG. 56, another portion of system 1702 includes water pipe 112 and air tubing 116 which couple with another example of manifold assembly 912. This example of manifold assembly 912 includes male manifold adapter 1100, two manifolds 1000, and female manifold adapter 1200. Each of the components of manifold assembly 912 are described in more detail above. Male manifold adapter 1100 couples with pipe 112 and air tubing 116 and female manifold adapter 1200 couples with a second length of each of water pipe 112 and air tubing 116.

Each manifold 1000 in both examples of manifold assembly 912 couples with two lengths of tubing 1712, each of which couples with an example of jet assembly 300. Tubing 1712 is dual extrusion tubing and an example of tubing 1710, which will be described in more detail below. As described above, each jet assembly 300 may include a jet back 302, a nozzle 308, and/or a jet body 304. In some examples, each jet assembly 300 also may include a jet insert.

Both portions of system 1702 (shown respectively in FIG. 55 and FIG. 56) include a plurality of clamps 1800 which are configured to facilitate a water- and/or air-tight seal between tubing 1712 and manifold 1000 and/or jet back 302. Clamps 1800 are positioned over the ends of tubing 1712 where tubing 1712 fits over set of egress ports 1022 on manifold 1000 and where tubing 1712 fits over water ingress port 310 and air ingress port 312 on jet back 302. Clamp 1800 will be described in more detail below with respect to FIGS. 57, 58, and 59.

In some examples, the portion of system 1702 shown in FIG. 56 may be positioned upstream of the portion of system 1702 shown in FIG. 55. In some examples, system 1702 may include any suitable number of manifold assemblies 912 and may include any suitable configurations of manifold assembly 912. For example, each manifold assembly may include any suitable number of manifolds and any suitable adapters and/or end caps. System 1702 may further include a water source (for example, water supply 106) and an air source (for example, air supply 114). In some examples, system 1702 may further include any suitable components and/or structures. For example, system 1702 may include any suitable kinds of tubing, valves, filters, tube splitters, and/or other fittings.

Pipe 112 may include any suitable pipe configured to carry water to manifold assembly 912. For example, pipe 112 may include approximately 2 inch pipe. In some examples, pipe 112 may be constructed out of industrial grade, clear, flexible PVC and/or any other suitable material. Air tubing 116 may include any suitable pipe and/or tubing configured to carry air to manifold assembly 912. For example, air tubing 116 may include approximately 0.5 inch pipe. In some examples, air tubing 116 may be constructed out of industrial grade, clear, flexible PVC and/or any other suitable material.

Many of the components of system 1702 are described in more detail above and may include any suitable dimensions and/or materials such as those described above. For example, each of the components may include any suitable thermoplastic polymer such as polyvinyl chloride (PVC), acrylonitrile butadiene styrene (ABS), and/or any other suitable materials having similar properties (i.e., stiffness etc.). Further, the manufacturing process may include the use of injection molding, compression molding, and/or extrusion methods. In some examples, each component may be injection molded out of PVC.

First Embodiment of a One-Piece Clamp

Figure 57:
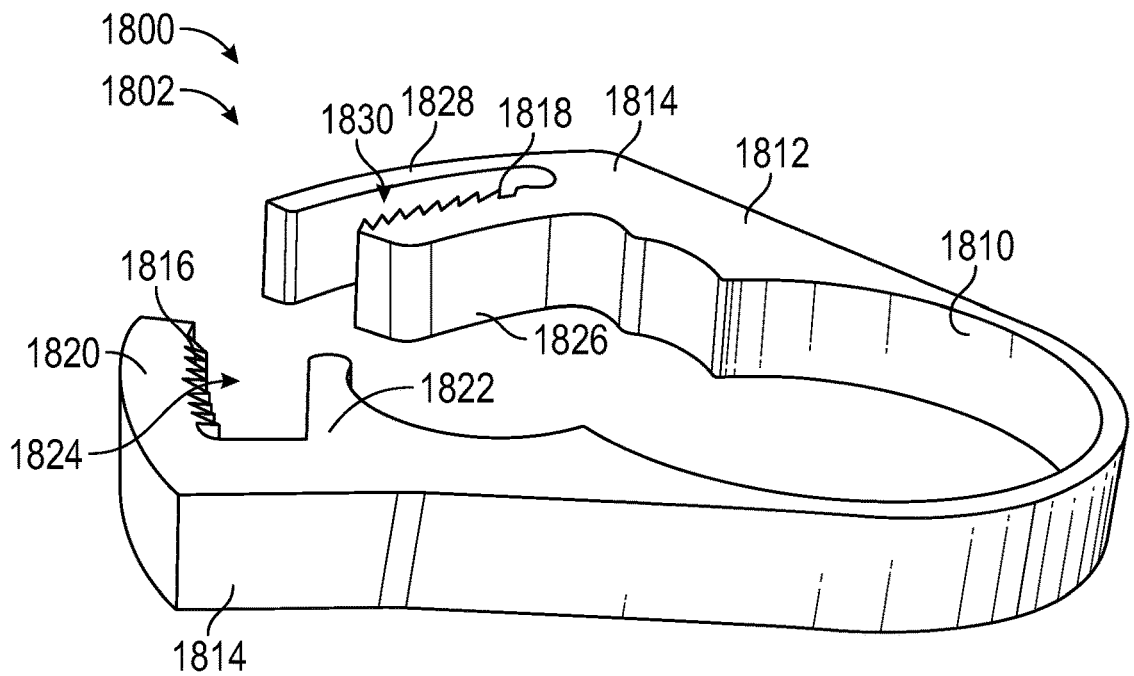
FIG. 57 is an isometric view of a clamp suitable for use with dual extrusion tubing, according to aspects of the present teachings.
Figure 58:
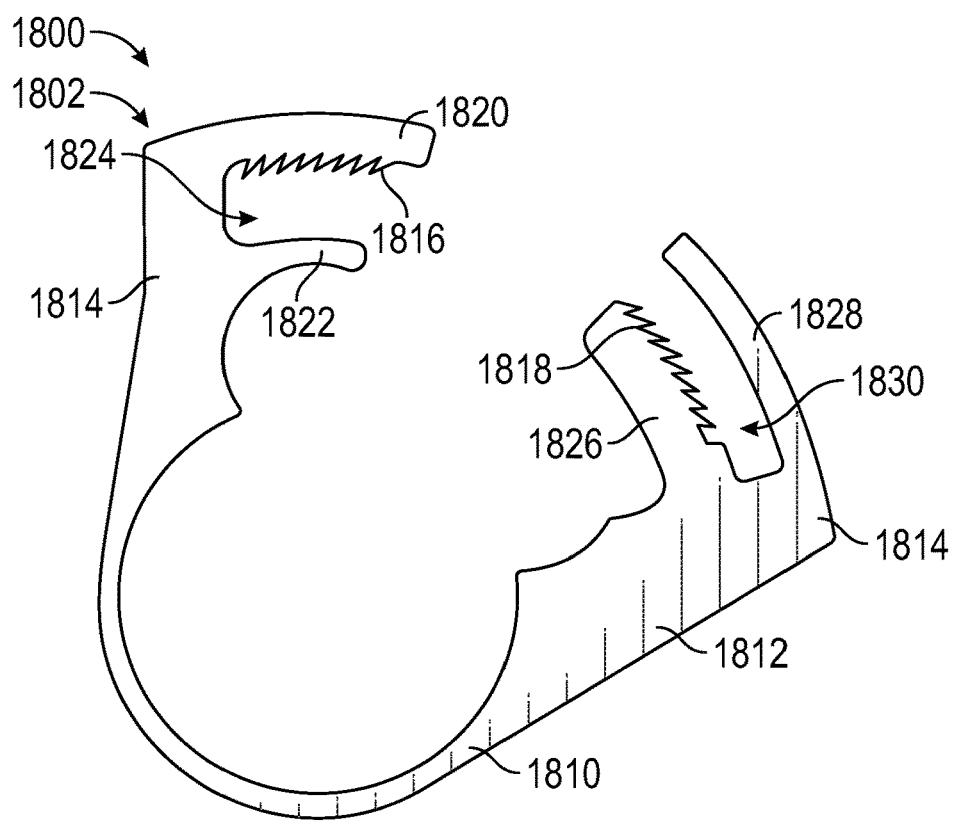
FIG. 58 is a top view of the clamp of FIG. 57.
Figure 59:
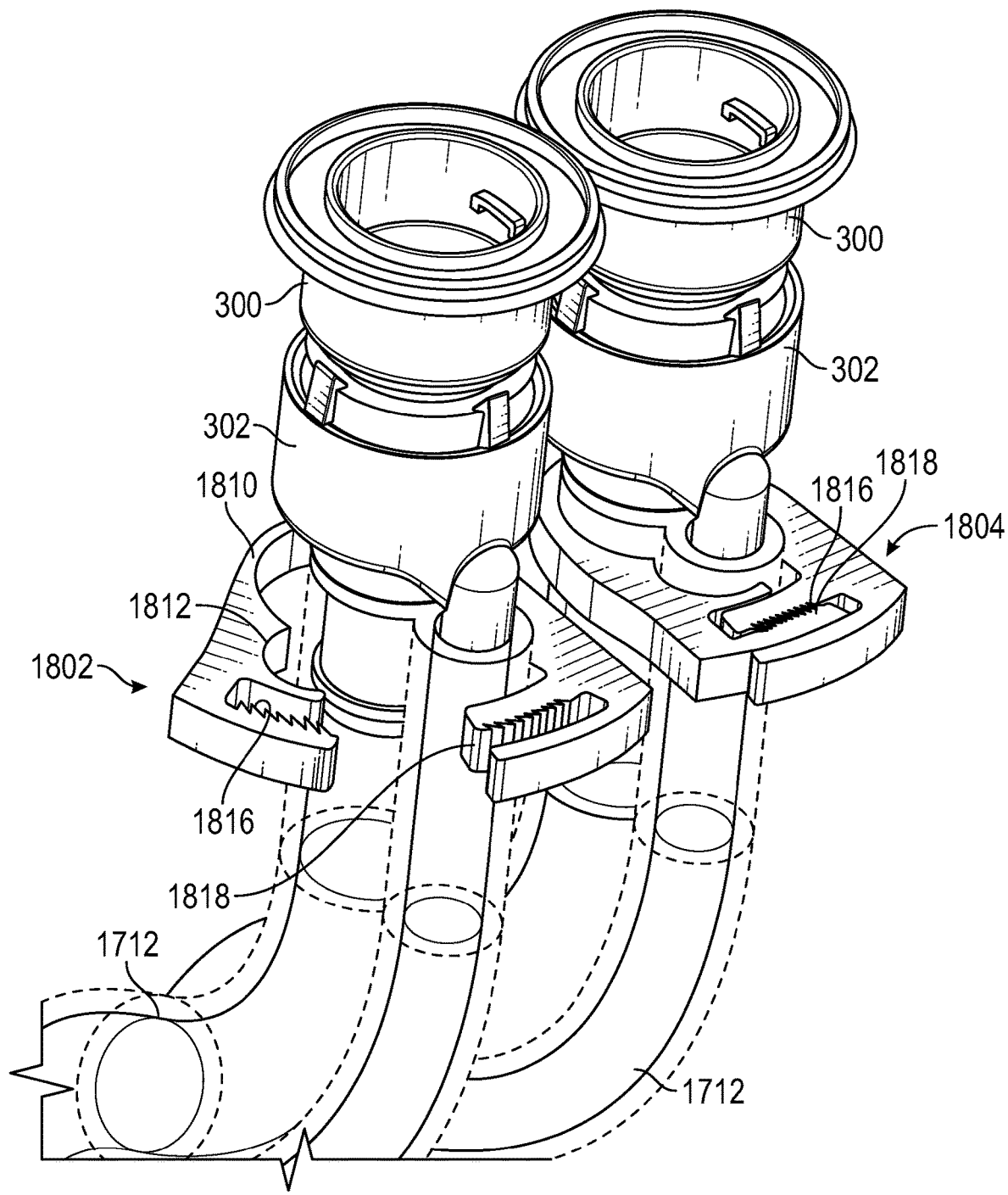
FIG. 59 is an isometric view of a portion of an exemplary hot tub plumbing system, showing clamps of the type depicted in FIGS. 57-58 in use.

FIG. 57 is an isometric view of a first embodiment 1800 of a one-piece clamp suitable for use with dual extrusion tubing. FIG. 58 is a top plan view of one-piece clamp 1800 of FIG. 57. FIG. 59 depicts the clamp of FIGS. 57-58 in use with a jet assembly and dual extrusion tubing; clamp 1800 is shown twice, once in an open position 1802 and once in closed position 1804.

Clamp 1800 may include any suitable structure configured to hold dual extrusion tubing 1712 in water- and/or air-tight engagement with the egress ports of manifold 1000 and/or the ingress ports of jet back 302. For example, clamp 1800 includes a single piece which includes a pair of contiguous arcuate apertures 1810, 1812. A first arcuate aperture 1810 may be configured to fit around a water passage of tubing 1712 and a second arcuate aperture 1812 may be configured to fit around an air passage of tubing 1712. Clamp 1800 may further include an end portion 1814 having a first set of ratcheting teeth 1816 and a second set of ratcheting teeth 1818. In the example shown in FIGS. 57-59, end portion 1814 is adjacent second arcuate aperture 1812; in some examples, end portion 1814 may be adjacent first arcuate aperture 1810 and/or any other suitable portion of clamp 1800.

First set of ratcheting teeth 1816 and second set of ratcheting teeth 1818 may be complementary and may be configured to be engaged with each other upon compression of end portion 1814. For example, in FIGS. 57-59, first set of ratcheting teeth 1816 is disposed on a lower surface of a first upper arm 1820. First upper arm 1820 and a first lower arm 1822 form a first slot 1824. Similarly, second set of ratcheting teeth 1818 is disposed on an upper surface of a second lower arm 1826. Second lower arm 1826 and a second upper arm 1828 form a second slot 1830. When clamp 1800 is closed (as shown in FIG. 59), first upper arm 1820 fits within second slot 1830 and second lower arm 1828 fits within first slot 1824. Thus, the first and second sets of ratcheting teeth are in contact and engage.

The teeth of the first and second sets of ratcheting teeth may be sloped as best seen in FIG. 58, such that forward edges of each set of teeth can pass over each other when end portion 1814 is compressed. Once one or more of the teeth have passed over each other, they may engage or hook together so as to prevent the clamp from opening. For example, a tooth may fit in a space between adjacent teeth on the opposite set of ratcheting teeth.

In some examples, clamp 1800 may be releasable; among other advantages, this may allow a user to uncouple a length of tubing and a set of ports that have been connected by mistake, or for the purpose of replacing damaged or worn tubing, manifold components and/or jet assembly components. For example, a user may be able to compress end portion 1814 to disengage the two sets of ratcheting teeth, shift the arms such that the two sets of ratcheting may pass by each other without engaging, and release end portion 1814 such that it opens. In some examples, the two sets of ratcheting teeth may be resiliently flexible such that the teeth flex away from each other when end portion 1814 is compressed, allowing the two sets of ratcheting teeth to pass by each other. In some examples, the two sets of ratcheting teeth may be releasable by pulling the clamp open with a force greater than some threshold force, such that the two sets of ratcheting teeth flex past each other to disengage. In some examples, any suitable engagement mechanism and/or structure may be used to hold clamp 1800 closed when compressed. For example, clamp 1800 may include spring biased clips, hooks, ridges, magnets, and/or any suitable structure.

Clamp 1800 may have any suitable dimensions configured to facilitate holding dual extrusion tubing 1712 in water- and/or air-tight engagement with the egress ports of manifold 1000 and/or the ingress ports of jet back 302. For example, first arcuate aperture 1810 may have an inner radius between approximately 0.25 inches and approximately 1.0 inches when in closed position 1804. In some examples, first arcuate aperture 1810 may have an inner radius of approximately 0.500 inches when in closed position 1804. First arcuate aperture 1810 may have any suitable wall thickness. For example, first arcuate aperture 1810 may have a wall thickness between approximately 0.05 inches and 0.25 inches. In some examples, first arcuate aperture 1810 may have a wall thickness of approximately 0.125 inches. Furthermore, second arcuate aperture 1812 may have an inner radius between approximately 0.25 inches and approximately 1.0 inches when in closed position 1804. In some examples, second arcuate aperture 1812 may have an inner radius of approximately 0.315 inches when in closed position 1804. Clamp 1800 may have any suitable thickness. For example, clamp 1800 may have a thickness between approximately 0.1 inches and approximately 1.0 inches. In some examples, clamp 1800 may have a thickness of approximately 0.276 inches.

Clamp 1800 may be constructed out of any suitable material. For example, clamp 1800 may include any suitable thermoplastic polymer such as polyvinyl chloride (PVC), acrylonitrile butadiene styrene (ABS), nylon, and/or any other suitable materials having similar properties (i.e., stiffness etc.). Clamp 1800 may be manufactured using any suitable process. For example, the manufacturing process may include the use of injection molding, compression molding, and/or extrusion methods. In some examples, clamp 1800 may be constructed out of molded nylon.

Second Embodiment of a Hot Tub Plumbing System

Figure 60:
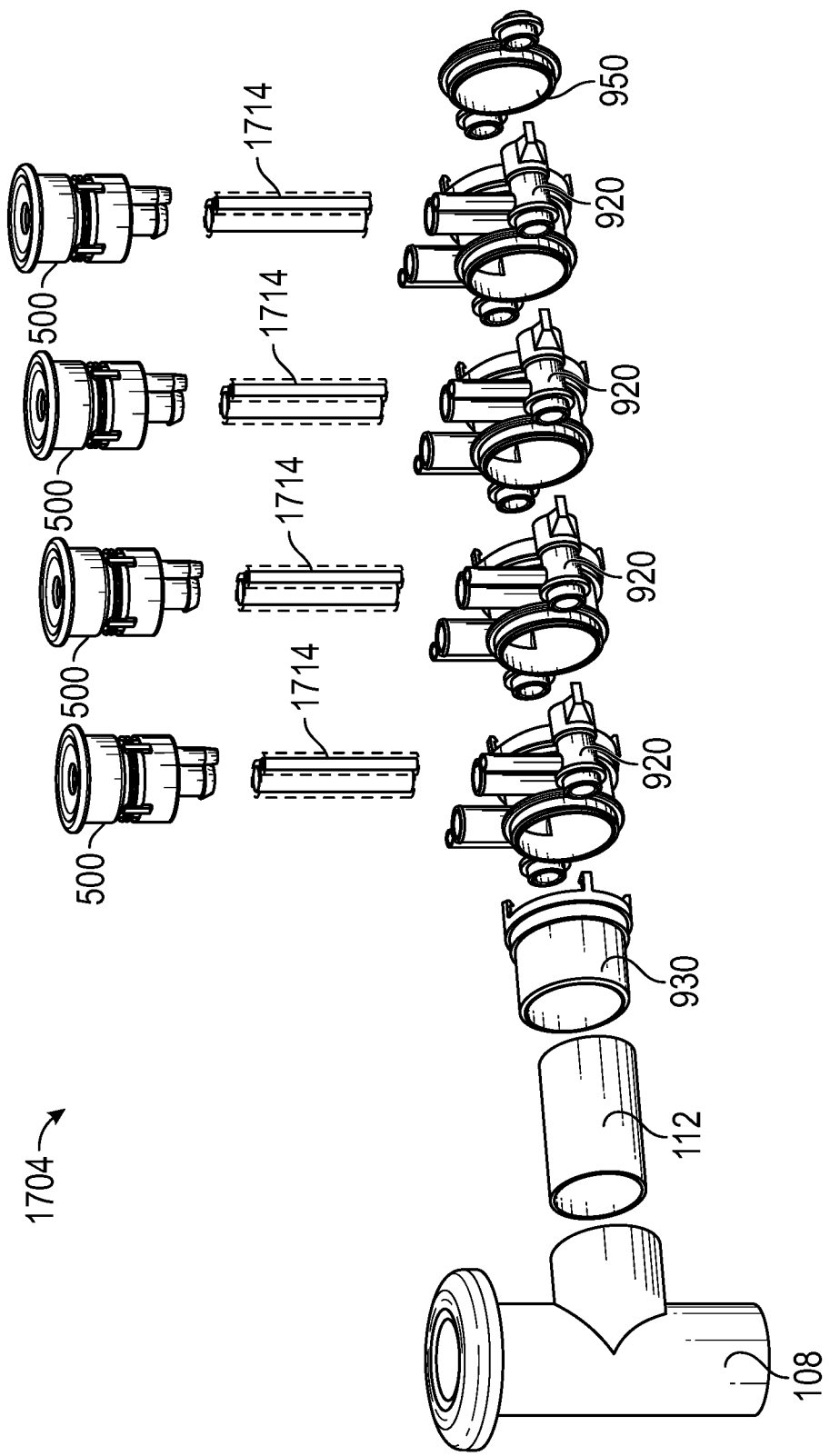
FIG. 60 is a partially exploded isometric view of portions of another exemplary hot tub plumbing system, according to aspects of the present teachings.
Figure 61:
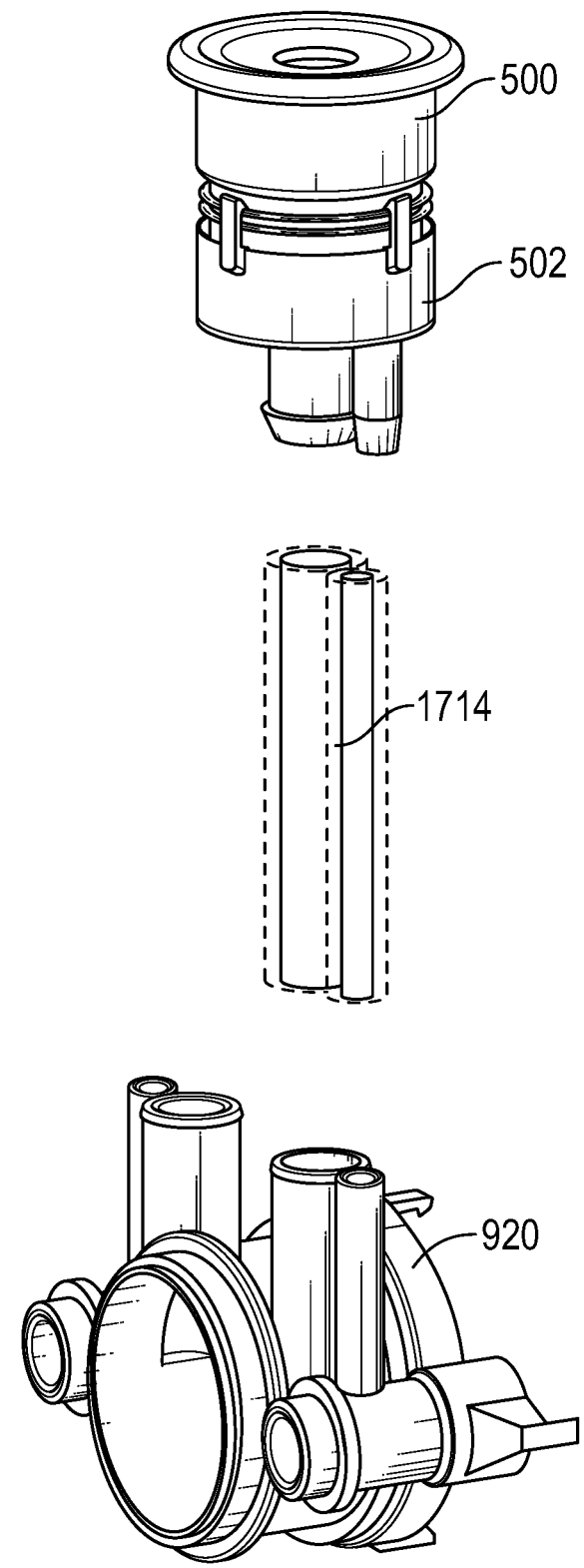
FIG. 61 is a partially exploded isometric view of a magnified portion of the hot tub plumbing system of FIG. 60.

FIG. 60 depicts a partially exploded view of a portion of a second embodiment 1704 of plumbing system 1700, including an embodiment of a manifold assembly having four manifolds 920 and four jet assemblies 500. FIG. 61 depicts a partially exploded view of a magnified portion of second embodiment 1704 of plumbing system 1700 including a single manifold 920 and a single jet assembly 500.

As shown in FIG. 60, a portion of system 1704 includes valve 108 and water pipe 112 which couples with an embodiment of a manifold assembly. In some examples, system 1704 may include air tubing (such as air tubing 116) which may couple to the manifold assembly. This example includes a male manifold adapter 930, four manifolds 920, and a manifold end cap 950. Each of the components of the manifold assembly are described in more detail above; the embodiments shown in FIG. 60 may be generally similar to second embodiment 914 of manifold assembly 910.

Each manifold 920 in system 1704 couples with at least one length of tubing 1714, which couples with an exemplary jet assembly 500. Tubing 1714 is dual extrusion tubing, and is an example of tubing 1710 which will be described in more detail below. As described above, each jet assembly 400 may include a jet back 502, a jet body 504, and/or a jet insert 506.

While not shown in FIGS. 60 and 61, in some examples, system 1704 may include a plurality of clamps, such as clamps 1800 depicted in FIGS. 55-59, or clamps 1900 depicted in FIGS. 62-63 and described in more detail below, which are configured to facilitate a water- and/or air-tight seal between tubing 1714 and manifold 920 and/or jet back 502. For example, the clamps may be positioned over the ends of tubing 1714 where tubing 1714 fits over the egress ports on manifold 920 and where tubing 1714 fits over the ingress ports on jet back 502.

System 1704 may include any suitable number of manifold assemblies, and each manifold assembly may include any suitable number of manifolds 920. System 1704 may further include a water source (for example, water supply 106) and an air source (for example, air supply 114). In some examples, system 1704 may further include any suitable components and/or structures. For example, system 1704 may include any suitable kinds of tubing, valves filters, tube splitters, and/or other fittings.

Many of the components of system 1704 are described in more detail above and may include any suitable dimensions and/or materials such as those described above. For example, each of the components may include any suitable thermoplastic polymer such as polyvinyl chloride (PVC), acrylonitrile butadiene styrene (ABS), and/or any other suitable materials having similar properties (i.e., stiffness etc.). Further, the manufacturing process may include the use of injection molding, compression molding, and/or extrusion methods. In some examples, each component may be injection molded out of PVC.

Second Embodiment of a One-Piece Clamp

Figure 62:
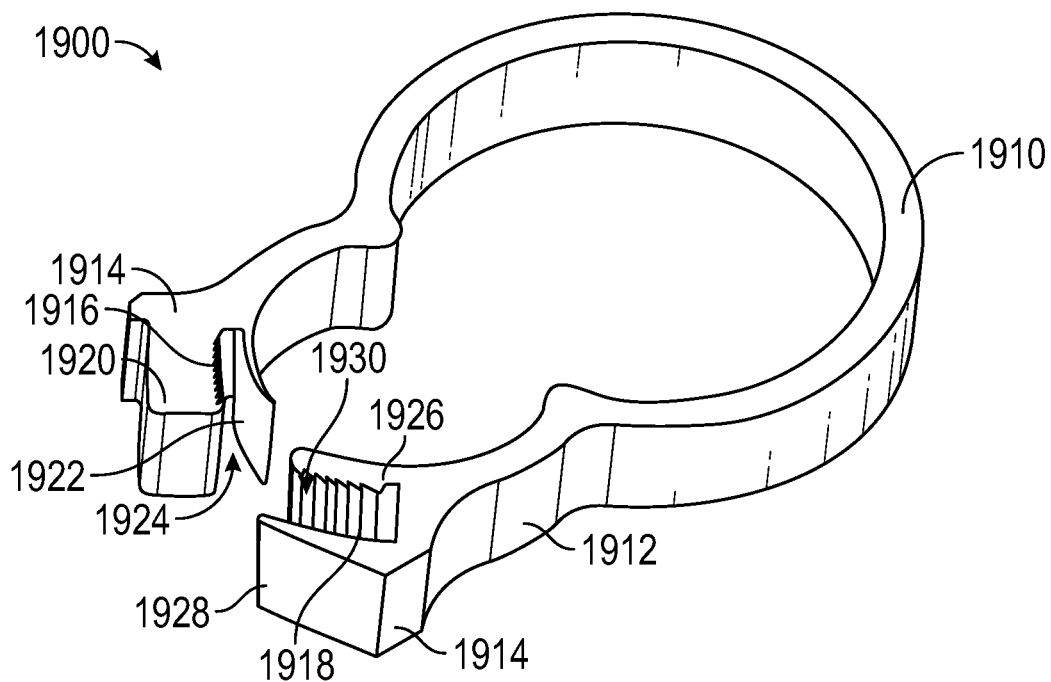
FIG. 62 is an isometric view of another clamp suitable for use with dual extrusion tubing, according to aspects of the present teachings.
Figure 63:
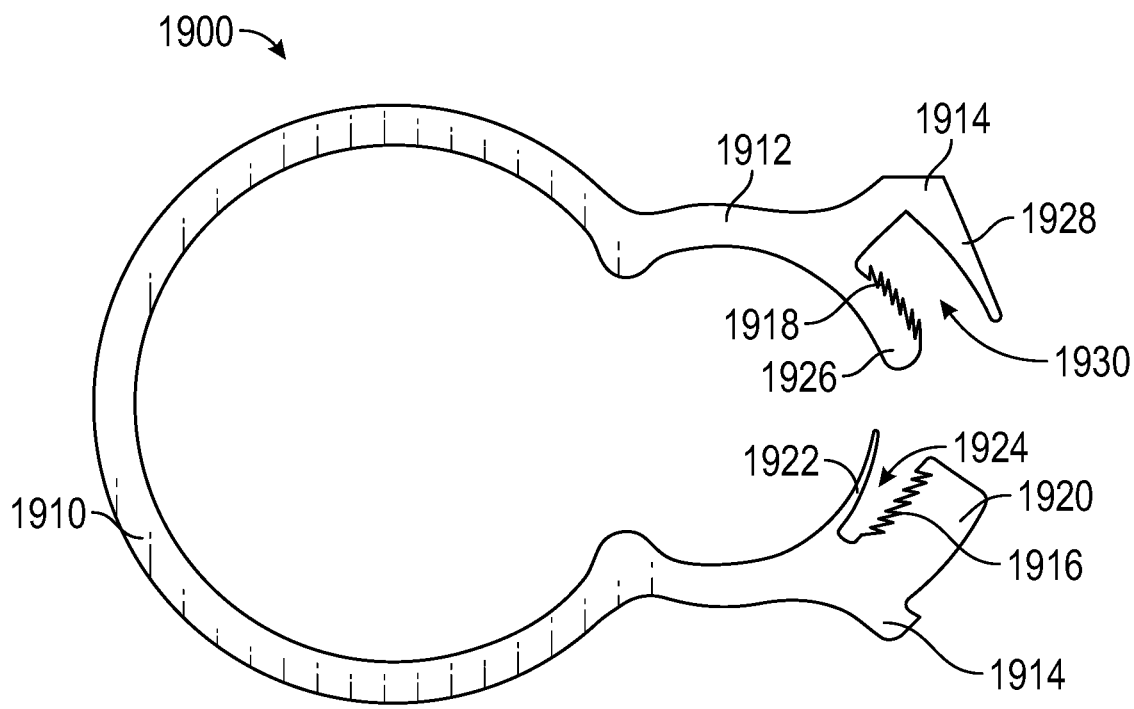
FIG. 63 is a top view of the clamp of FIG. 62.

FIG. 62 is an isometric view of a second embodiment 1900 of a one-piece clamp suitable for use with dual extrusion tubing. FIG. 63 is a top plan view of one-piece clamp 1900 of FIG. 62.

Clamp 1900 may include any suitable structure configured to hold dual extrusion tubing 1714 in water- and/or air-tight engagement with the egress ports of manifold 920 and/or the ingress ports of jet back 502. For example, clamp 1900 includes a single piece which includes a pair of contiguous arcuate apertures. A first arcuate aperture 1910 may be configured to fit around a water passage of tubing 1714 and a second arcuate aperture 1912 may be configured to fit around an air passage of tubing 1714. Clamp 1900 may further include an end portion 1914 having a first set of ratcheting teeth 1916 and a second set of ratcheting teeth 1918. In the example shown in FIGS. 62-63, end portion 1914 is adjacent second arcuate aperture 1912; in some examples, end portion 1914 may be adjacent first arcuate aperture 1910 and/or any other suitable portion of clamp 1900.

First set of ratcheting teeth 1916 and second set of ratcheting teeth 1918 may be complementary and may be configured to be engaged with each other upon compression of end portion 1914. For example, in FIGS. 62-63, first set of ratcheting teeth 1916 is disposed on a lower surface of a first upper arm 1920. First upper arm 1920 and a first lower arm 1922 form a first slot 1924. Similarly, second set of ratcheting teeth 1918 is disposed on an upper surface of a second lower arm 1926. Second lower arm 1926 and a second upper arm 1928 form a second slot 1930. When clamp 1900 is closed, first upper arm 1920 fits within second slot 1930 and second lower arm 1928 fits within first slot 1924. The teeth of the first and second sets of ratcheting teeth may be sloped such that forward edges of each set of teeth can pass over each other when end portion 1914 is compressed. Once one or more of the teeth have passed over each other, they may engage so as to prevent the clamp from opening. For example, a tooth may fit in a space between adjacent teeth on the opposite set of ratcheting teeth.

In some examples, clamp 1900 may be releasable; among other advantages, this may be advantageous as it may allow a user to uncouple a length of tubing and a set of ports that have been connected by mistake, or to replace defective, broken or worn parts. For example, a user may be able to compress end portion 1914 to disengage the two sets of ratcheting teeth, shift the arms such that the two sets of ratcheting may pass by each other without engaging, and release end portion 1914 such that it opens. In some examples, the two sets of ratcheting teeth may be resiliently flexible such that the teeth flex away from each other when end portion 1914 is compressed, allowing the two sets of ratcheting teeth to pass by each other. In some examples, the two sets of ratcheting teeth may be releasable by pulling the clamp open with sufficient force, such that the two sets of ratcheting teeth flex past each other to disengage. In some examples, any suitable engagement mechanism and/or structure may be used to hold clamp 1900 closed when compressed. For example, clamp 1900 may include spring biased clips, hooks, ridges, magnets, and/or any suitable structure.

Clamp 1900 may have any suitable dimensions configured to facilitate holding dual extrusion tubing 1714 in water- and/or air-tight engagement with the egress ports of manifold 920 and/or the ingress ports of jet back 502. For example, first arcuate aperture 1810 may have any suitable wall thickness and clamp 1800 may have any suitable thickness.

Clamp 1900 may be constructed out of any suitable material. For example, clamp 1900 may include any suitable thermoplastic polymer such as polyvinyl chloride (PVC), acrylonitrile butadiene styrene (ABS), nylon, and/or any other suitable materials having similar properties (i.e., stiffness etc.). Clamp 1900 may be manufactured using any suitable process. For example, the manufacturing process may include the use of injection molding, compression molding, and/or extrusion methods. In some examples, clamp 1900 may be constructed out of molded nylon.

Illustrative Tubing

Figure 64:
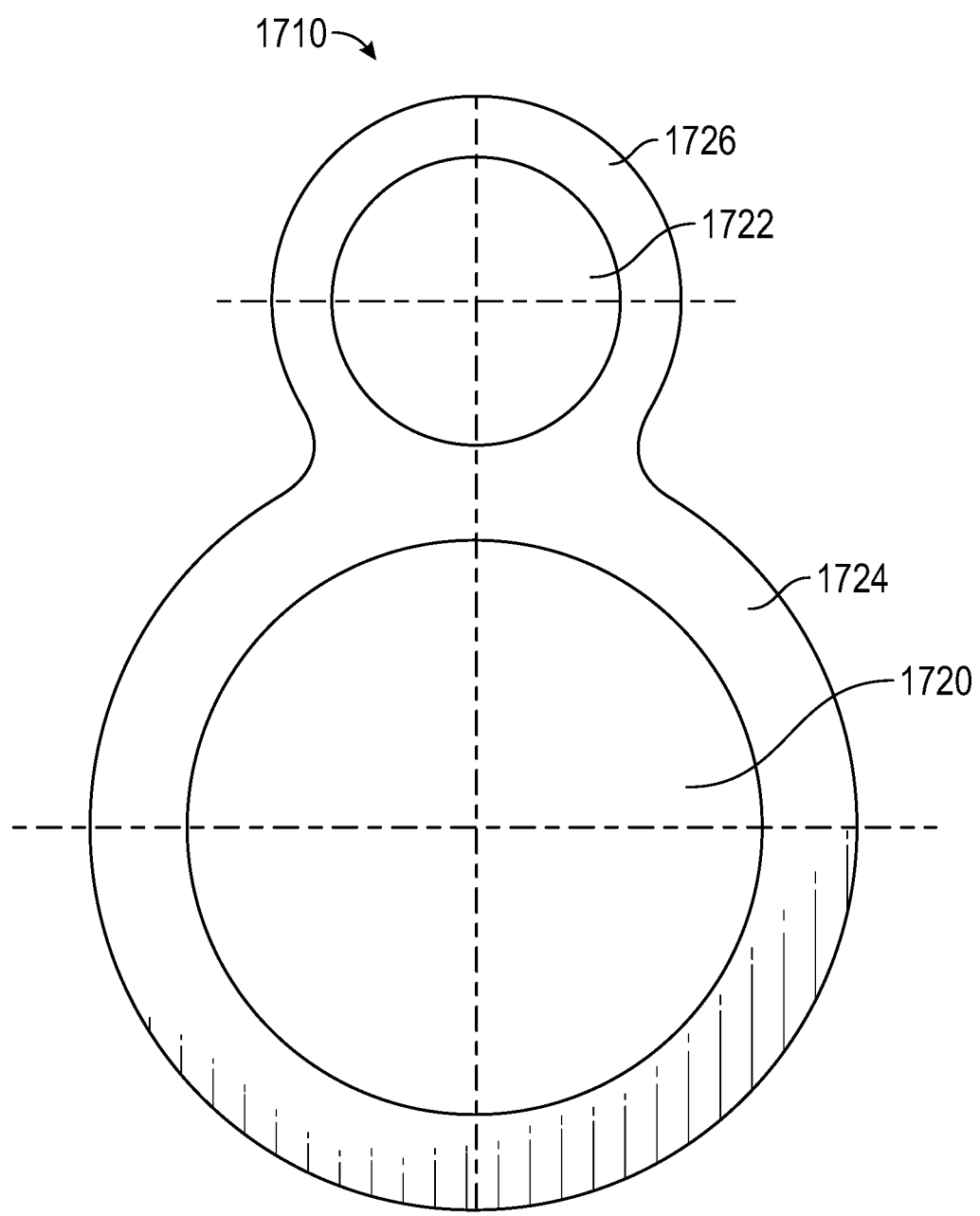
FIG. 64 is a sectional view of dual extrusion tubing that can be used in conjunction with presently disclosed hot tub plumbing systems, according to aspects of the present teachings.

FIG. 64 includes a cross-section of an example of dual extrusion tubing 1710. Tubing 1710 may include any suitable structure configured to convey streams of air and water from the egress ports of manifold 920 to the ingress ports of jet assembly 200. In the example shown in FIG. 64, tubing 1710 is dual extrusion tubing. In some examples, tubing 1710 may include any suitable kind of tubing. For example, tubing 1710 may include separate air and water tubes.

In the embodiment shown in FIG. 64, tubing 1710 is flexible dual extrusion tubing including a first hollow cylindrical portion 1720 configured to couple to the water egress port and a second hollow cylindrical portion 1722 configured to couple with the air egress port. First portion 1720 and second portion 1722 are joined together at peripheral portions. For example, a periphery 1724 of first portion 1720 may be joined with a periphery 1726 of second portion 1722. In other words, tubing 1710 is a flexible dual extrusion tube and includes a first tubular portion configured to couple to the water egress port and a second tubular portion configured to couple to the air egress port. The first and second tubular portions are joined together in a figure-eight configuration.

In some embodiments, first hollow cylindrical portion 1720 and second hollow cylindrical portion 1722 may be joined by any suitable mechanism. In some embodiments, first hollow cylindrical portion 1720 and second hollow cylindrical portion 1722 may not be joined. For example, first hollow cylindrical portion 1720 may include a water tube and second hollow cylindrical portion 1722 may include an air tube. In some examples, the water tube and the air tube may be coupled with the same manifolds and/or jet assemblies and/or may travel substantially similar paths. In some examples, the water tube and the air tube may be couple with different manifolds and/or jet assemblies and/or may travel substantially different paths. In some examples, the water tube and the air tube may or may not be substantially the same lengths.

Tubing 1710 may have any suitable dimensions configured to facilitate coupling with the egress ports of manifold 920 and the ingress ports of jet assembly 200. For example, first portion 1720 may have an inner diameter between approximately 0.5 inches and approximately 1.0 inches. In some examples, first portion 1720 may have an inner diameter of approximately 0.750 inches. First portion 1720 may have any suitable wall thickness. For example, first portion 1720 may have a wall thickness between approximately 0.05 inches and 0.25 inches. In some examples, first portion 1720 may have a wall thickness of approximately 0.125 inches.

Second portion 1722 may have an inner diameter between approximately 0.25 inches and approximately 0.5 inches. In some examples, second portion 1722 may have an inner diameter of approximately 0.375 inches. Second portion 1722 may have any suitable wall thickness. For example, second portion 1722 may have a wall thickness between approximately 0.03 inches and approximately 0.1 inches. In some examples, second portion 1722 may have a wall thickness of approximately 0.080 inches.

Tubing 1710 may be constructed out of any suitable material. For example, tubing 1710 may include any suitable thermoplastic polymer such as polyvinyl chloride (PVC), acrylonitrile butadiene styrene (ABS), and/or any other suitable materials having similar properties (i.e., stiffness etc.). Tubing 1710 may be manufactured using any suitable process. For example, the manufacturing process may include the use of injection molding, compression molding, and/or extrusion methods. In some examples, tubing 1710 may be constructed out of industrial grade, clear, flexible PVC on dual extruded tooling.

First embodiment 1702 of system 1700 and second embodiment 1704 of system 1700 each include an embodiment of tubing 1710 (tubing 1712 and tubing 1714 respectively). Each embodiment of tubing 1710 may include any suitable structure and/or dimensions suitable for coupling with other components of the system. For example, the inner diameters of first portion 1720 and second portion 1722 may correspond to outer diameters of the corresponding embodiment of the egress ports of manifold 920 and the ingress ports of jet assembly 200. For example, the dimensions of tubing 1712 may correspond with the dimensions of the ports of manifold 1000 and jet assembly 300.

D. Illustrative Methods of Assembly

Figure 65:
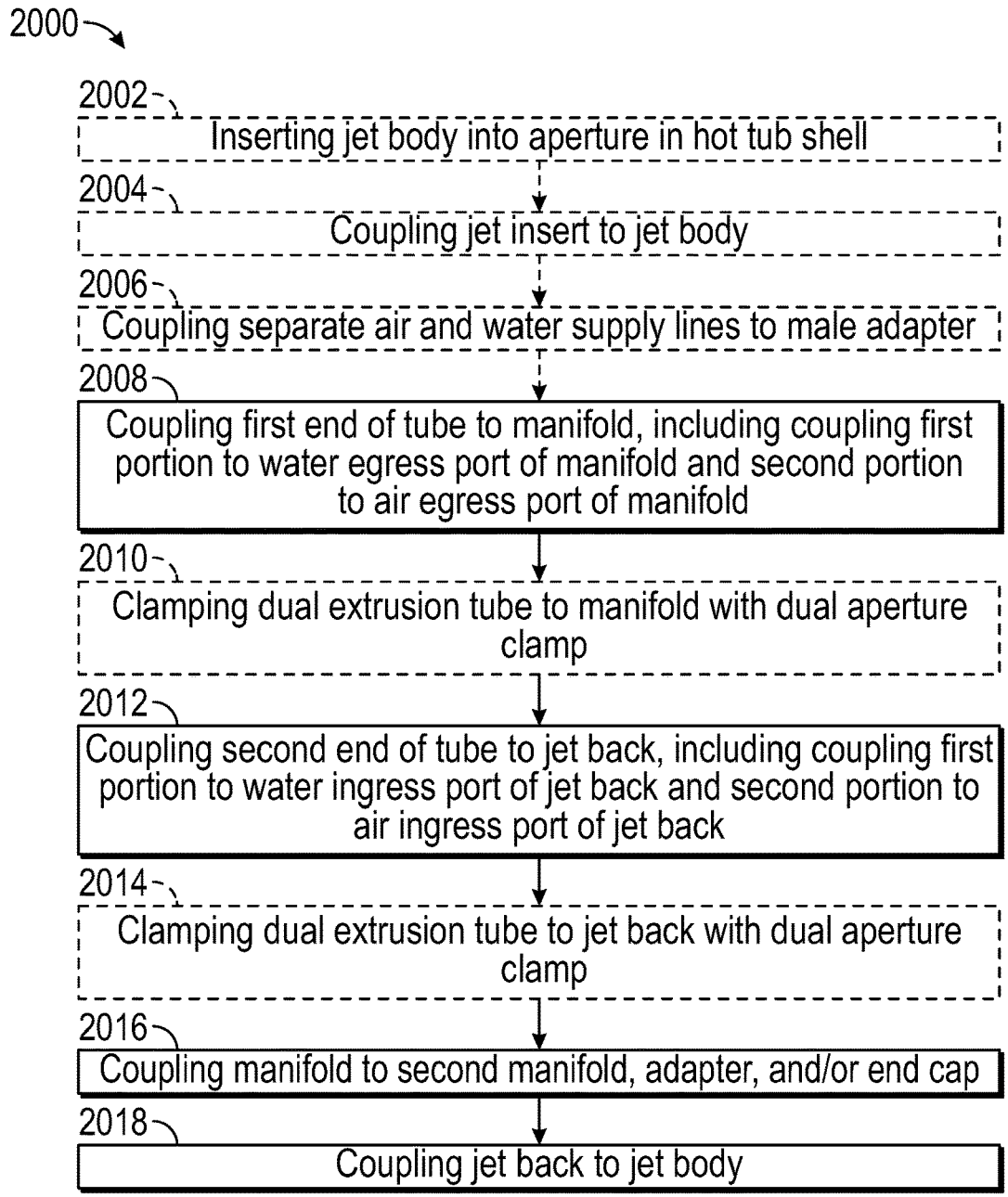
FIG. 65 is a flowchart depicting steps performed in an illustrative method of installing a hot tub plumbing system, according to aspects of the present teachings.

This section describes steps of an illustrative method for installing a hot tub plumbing system; see FIG. 65. Aspects and/or components of hot tub 100, jet assembly 200, manifold assembly 910, and/or system 1700 may be utilized in the method steps described below. Where appropriate, reference may be made to components and systems that may be used in carrying out each step. These references are for illustration and are not intended to limit the possible ways of carrying out any particular step of the method.

Although the methods described in this section are described with reference to a plumbing system for a hot tub and/or spa, the disclosed methods may be used for any plumbing system involving multiple pieces wherein efficient assembly is needed.

FIG. 65 is a flowchart illustrating steps performed in an illustrative method and may not recite the complete process or all steps of the method. Although various steps of method 2000 are described below and depicted in FIG. 65, the steps need not necessarily all be performed, and in some cases may be performed simultaneously or in a different order than the order shown.

At step 2002, a worker inserts a jet body (such as jet body 124 and/or 204) into an aperture in a wall of the hot tub body (such as hot tub body 104). In some examples, step 2002 may include using a tool, threading the jet body into the hot tub body, and/or installing additional components such as gaskets (for example, compressive gaskets). In some examples, step 2002 may include and/or follow a step which includes creating the aperture in the hot tub body. At optional step 2004, the worker couples a jet insert (such as jet insert 126 and/or 106) to the jet body. In some examples, coupling the jet insert to the jet body may facilitate securing the jet body to the hot tub body. In some examples, step 2004 may be combined with step 2002, may occur later, may be combined with another method, and/or may not occur at all.

At step 2006, the worker couples separate air and water supply lines (such as pipe 112 and air tubing 116) to a male adapter (such as adapter 110 or male adapter 930). In some examples, any suitable mechanism for coupling the supply lines to the adapter may be used. In some examples, this step may include the application of glue, primer, and/or any other suitable adhesive to the supply lines and/or the adapter. For example, glue may be applied to the outside of the end of the water supply line before it is inserted into the end of the water conduit of the male adapter. Similarly, primer may be applied to the outside of the end of the air supply line before it is inserted into the end of the air conduit of the male adapter. In some examples, this step may include the application of a clamp and/or any other suitable connection mechanism.

At step 2008, the worker couples a first end of a length of tubing (such as tubing 1710) to a manifold (such as manifold 118 or 920). In some examples, coupling the tubing to the manifold includes coupling a first portion of the tubing (such as first portion 1720) to a water egress port (such as water egress port 1016) of the manifold and a second portion of the tubing (such as second portion 1722) to an air egress port (such as air egress port 1018) of the manifold. For example, the tubing may be dual extrusion tubing and the first and second portions may be joined at a periphery. In some examples, coupling the tubing to the egress ports may include sliding the tubing over the end of the egress ports. In some examples, step 2008 may include the use of a lubricant (such as soapy water) to facilitate sliding the end of the tubing over the end of the egress ports.

At step 2010, the worker clamps the tubing to the manifold using a dual aperture clamp (such as clamp 1800 or 1900). The clamp ensures that the tubing does not slip off of the egress ports of the manifold; the clamp cannot flex around a lip on the water egress port (such as lip 1020 or 1420) and so cannot slip off of the set of egress ports. The clamp compresses the tubing against the egress ports and ensures a water- and/or air-tight seal between the tubing and the egress ports. For example, a water- and air-tight seal can be achieved using the clamp and without the use of glue, primer, and/or other adhesives. Additionally, the worker may place the clamp where the clamp is needed and tighten the clamp in place. In other words, in may not be necessary to put the clamp on the tubing before coupling the tubing to the ports and then move the clamp to get the correct positioning, instead the clamp can be placed in the correct location right away.

At step 2012, the worker couples a second end of the length of tubing to the jet back. In some examples, coupling the tubing to the jet back includes coupling the first portion of the tubing to a water ingress port (such as water ingress port 310) of the jet back and the second portion of the tubing to an air ingress port (such as air ingress port 312) of the jet back. For example, the tubing may be dual extrusion tubing the first and second portions may be joined at a periphery. In some examples, coupling the tubing to the ingress ports may include sliding the tubing over the end of the ingress ports. In some examples, step 2012 may include the use of a lubricant (such as soapy water) to facilitate sliding the end of the tubing over the end of the ingress ports.

At step 2014, the worker clamps the tubing to the jet back using another dual aperture clamp (such as clamp 1800 or 1900). The clamp ensures that the tubing does not slip off of the ingress ports of the jet back; the clamp cannot flex around a lip disposed on the water ingress port (such as lip 316 on jet assembly 300) and so cannot slip off of the set of ingress ports. The clamp compresses the tubing against the ingress ports and ensures a water- and/or air-tight seal between the tubing and the ingress ports. For example, a water- and air-tight seal can be achieved using the clamp and without the use of glue, primer, and/or other adhesives. Additionally, the worker may place the clamp where the clamp is needed and tighten the clamp in place. In other words, in may not be necessary to put the clamp on the tubing before coupling the tubing to the ports and then move the clamp to get the correct positioning, instead the clamp can be placed in the correct location right away.

At step 2016, the worker couples the manifold to another manifold, an adapter, and/or an end cap. For example, the worker may assemble one or more manifold assemblies (such as manifold assembly 910). In some examples, the worker may couple the manifold to the male adapter and to a second manifold. In some examples, the worker may couple the manifold to a second and a third manifold. In some examples, the worker may couple the manifold to a second manifold and a female adapter (such as female adapter 940). In some examples, the worker may couple the manifold to a second manifold and an end cap (such as end cap 950). Coupling the manifold to other components of a manifold assembly may include coupling the components by a "press-and-click" method as described above. For example, the components may be aligned and compressed together to overcome the resistive force of a set of spring-biased clips, after which the components are coupled together.

At step 2018, the worker couples the jet back to the jet body. Coupling the jet back to the jet body may include coupling the components of the jet assembly by a "press-and-click" method as described above. For example, the jet back and the jet body may be aligned and compressed together to overcome the resistive force of a set of spring-biased clips (such as spring-biased clips 328 in jet assembly 300), after which the jet back and the jet body are coupled together.

Installing Jet Assembly

Figure 66:
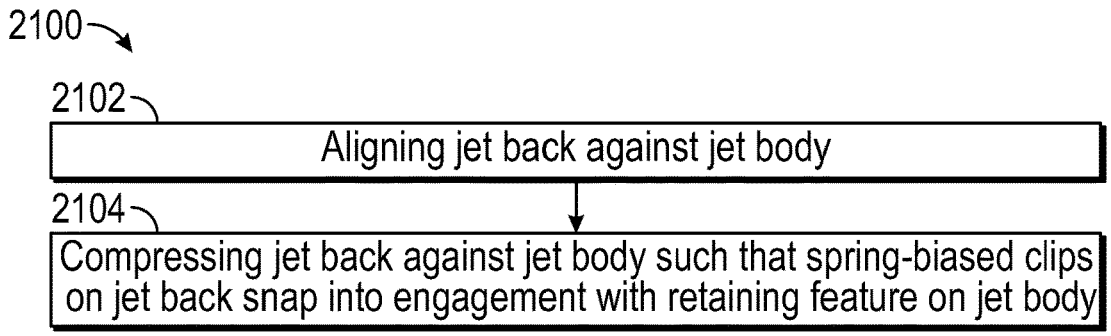
FIG. 66 is a flowchart depicting steps performed in an illustrative method of coupling a jet back to a jet body, according to aspects of the present teachings.
Figure 67:
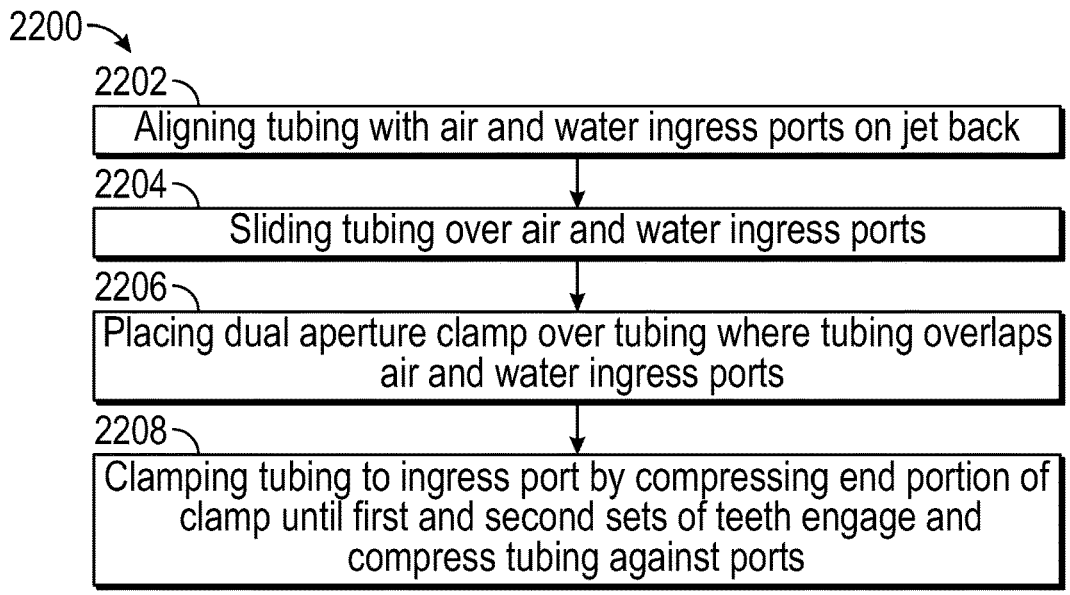
FIG. 67 is a flowchart depicting steps performed in an illustrative method of attaching tubing to a jet back, according to aspects of the present teachings.

This section describes steps of illustrative methods for assembling a hot tub jet assembly such as jet assembly 200; see FIGS. 66 and 67. Aspects and/or components of hot tub 100, jet assembly 200, manifold assembly 910, and/or system 1700 may be utilized in the method steps described below. Where appropriate, reference may be made to components and systems that may be used in carrying out each step. These references are for illustration and are not intended to limit the possible ways of carrying out any particular step of the method.

FIG. 66 is a flowchart illustrating steps performed in an illustrative method of coupling a jet back to a jet body, and may not recite the complete process or all steps of the method. Although various steps of method 2100 are described below and depicted in FIG. 66, the steps need not necessarily all be performed, and in some cases may be performed simultaneously or in a different order than the order shown. Method 2100 includes coupling the jet back (such as jet back 202) to the jet body (such as jet body 204) and may performed as part of installing a jet assembly (such as jet assembly 200) and/or installing a hot tub plumbing system (such as system 1700). Additionally, or alternatively, method 2100 may be referred to as and/or may be included in a "press-and-click" method such as those described above.

At step 2102, a worker aligns a jet back (such as jet back 122 and/or 202) with a jet body (such as jet body 124 and/or 204). In some examples, the jet back may already be coupled with tubing (such as tubing 1710) and/or the jet body may be installed in hot tub shell 104. In some examples, aligning the jet back with the jet body may include positioning the jet back against the jet body. At step 2104, the worker compresses the jet back against the jet body such that spring-biased clips (such as spring-biased clips 328 in jet assembly 300) on the jet back engage with a retaining feature (such as groove 330 on jet assembly 300) on the jet body.

For example, the spring-biased clips may be configured to flex outward, away from a default position, when a sloped lip (such as sloped lip 334 of jet assembly 300) slides over a proximate end of the jet body and along an external portion of the jet body. The spring-biased clips may be further configured to snap back into the default position when the sloped lip encounters the retaining feature on the jet body. In some examples, the spring-biased clips may engage with the retaining feature and prevent the jet back from sliding off of the jet body. Thus, the jet back and the jet body are coupled together.

In some examples, the jet back and the jet body may be configured to be able to be unlocked and/or uncoupled. Uncoupling the jet back from the jet body may be accomplished by moving the spring-biased clips away from the jet body and reversing steps 2104 and 2102. For example, to uncouple the jet back from the jet body, the worker may move the spring-biased clips away from the default position and slide the jet back off of the jet body. In some examples, the worker may use a finger to move the spring biased clips and/or may use a tool. Releasably coupling the jet back and the jet body together may be advantageous as it may, among other advantages, allow the worker to uncouple a jet back that was coupled to the wrong jet body by mistake.

FIG. 67 is a flowchart illustrating steps performed in an illustrative method of coupling tubing to a jet back, and may not recite the complete process or all steps of the method. Although various steps of method 2200 are described below and depicted in FIG. 67, the steps need not necessarily all be performed, and in some cases may be performed simultaneously or in a different order than the order shown. Method 2200 includes coupling the tubing (such as tubing 120 or 1710) to the jet back (such as jet back 202) and may be performed as part of installing a jet assembly (such as jet assembly 200) and/or installing a hot tub plumbing system (such as system 1700).

At step 2202, a worker aligns an end of a length of tubing with the air and/or water ingress ports (such as water ingress port 310 and/or air ingress port 312) on the jet back. At step 2204, the worker slides the tubing over the air and water ingress ports. In some examples, step 2202 and/or step 2204 may include and/or may occur after dipping the end of the length of tubing in a lubricant (such as soapy water). For example, coupling the tubing to the ingress ports may include sliding the tubing over the end of the ingress ports and use of a lubricant may facilitate sliding the end of the tubing over the end of the air and/or water ingress ports.

In some examples, coupling the tubing to the jet back includes coupling the first portion of the tubing to the water ingress port of the jet back and the second portion of the tubing to the air ingress port of the jet back. For example, the tubing may be dual extrusion tubing and the first and second portions may be joined at a periphery. In some examples, the tubing may be dual extrusion tubing and the two portions of the tubing may be slid over the ends of the air and water ingress ports substantially simultaneously. In some examples, the tubing may include separate air and water tubing and the tubing may be slid over the ends of the air and water ingress ports substantially independently. For example, the water tubing may be slid over the end of the water ingress port and then the air tubing may be slid over the end of the air ingress port or vice versa. In other words, the tubing may be slid over the end of one ingress port and then over the end of the other ingress port.

At step 2206, the worker places a dual aperture clamp (such as clamp 1800 or 1900) over the tubing where the tubing overlaps the air and water ingress ports. At step 2208, the worker clamps the tubing to the ingress ports by compressing an end portion (such as end portion 1814 and/or 1914) of the clamp until a first and second set of teeth engage and compress the tubing against the ingress ports. The clamp ensures that the tubing does not slip off of the ingress ports of the jet back; the clamp cannot flex around a lip disposed or formed upon the water ingress port (such as lip 316 on jet assembly 300) and so cannot slip off of the set of ingress ports. The clamp compresses the tubing against the ingress ports and ensures a water- and/or air-tight seal between the tubing and the ingress ports. For example, a water- and air-tight seal can be achieved using the clamp and without the use of glue, primer, and/or other adhesives.

In some examples, the tubing is dual extrusion tubing and the clamp has a shape that is complementary to the shape of the tubing such that the clamp compresses all portions of the tubing. In some examples, the tubing includes separate air and water tubing and the clamp is shaped such that it can compress both the air tubing and the water tubing substantially separately and substantially simultaneously.

Installing Manifold Assembly

This section describes steps of illustrative methods for assembling portions of a hot tub manifold assembly such as manifold assembly 910; see FIGS. 68, 69, 70 and 71. Aspects and/or components of hot tub 100, jet assembly 200, manifold assembly 910, and/or system 1700 may be utilized in the method steps described below. Where appropriate, reference may be made to components and systems that may be used in carrying out each step. These references are for illustration and are not intended to limit the possible ways of carrying out any particular step of the method.

Figure 68:
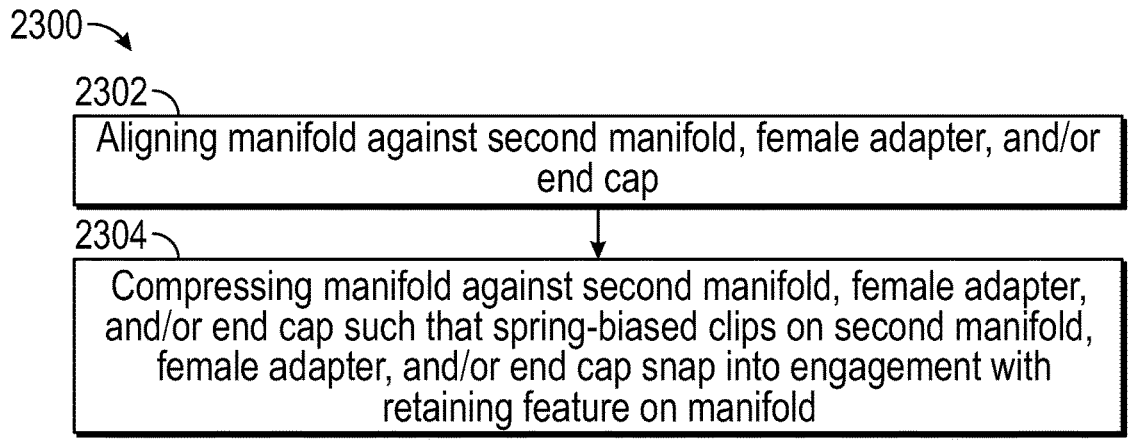
FIG. 68 is a flowchart depicting steps performed in an illustrative method of assembling a portion of a manifold assembly, according to aspects of the present teachings.

FIG. 68 is a flowchart illustrating steps performed in an illustrative method of assembling a portion of a manifold assembly, and may not recite the complete process or all steps of the method. Although various steps of method 2300 are described below and depicted in FIG. 68, the steps need not necessarily all be performed, and in some cases may be performed simultaneously or in a different order than the order shown. Method 2300 includes coupling the manifold (such as manifold 920) to another component and may performed as part of installing a manifold assembly (such as manifold assembly 910) and/or installing a hot tub plumbing system (such as system 1700). Specifically, method 2300 includes coupling the manifold to a component which is downstream of the manifold and which may include a second manifold, a female adapter (such as female adapter 940), and/or an end cap (such as end cap 950).

At step 2302, a worker aligns the manifold with another component. In some examples, the other component may be a second manifold, a female adapter, and/or an end cap. In some examples, the manifold and/or the other manifold may already be coupled with tubing (such as tubing 1710). In some examples, the female adapter may already be coupled with air and/or water supply lines (such as pipe 112 and/or air tubing 116). In some examples, aligning the manifold with the other component may include positioning the manifold against the other component. At step 2304, the worker compresses the manifold against the other component such that spring-biased clips (such as clips 1032, 1040, 1432, 1448, 1228, 1234, 1328, 1334, 1628, and/or 1634) on the other component engage with a retaining feature (such as retaining post 1038 and/or ridge 1046, 1438, and/or 1448) on the manifold.

For example, the spring-biased clips may be configured to flex away from a default position when a sloped lip (such as lip 1036, 1044, 1436, 1454, 1232, 1238, 1332, 1338, 1632, and/or 1638) slides along an external portion of the manifold and over the retaining feature. The spring-biased clips may be further configured to snap back into the default position when the sloped lip passes the retaining feature on the manifold. In some examples, the spring-biased clips may engage with the retaining feature and prevent the other component from sliding off of the manifold. Thus, the manifold and the other component are coupled together.

In some examples, the manifold and the other component may be configured to be able to be unlocked and/or uncoupled. Uncoupling the manifold from the other component may be accomplished by moving the spring-biased clips away from the default position and reversing steps 2304 and 2302. For example, to uncouple the manifold from the other component, the worker may move the spring-biased clips away from the default position and slide the other component off of the manifold. In some examples, the worker may use a finger to move the spring-biased clips and/or may use a tool. Releasably coupling the manifold and the other component together may be advantageous as it may, among other advantages, allow the worker to uncouple a manifold that was coupled to the wrong component by mistake.

Figure 69:
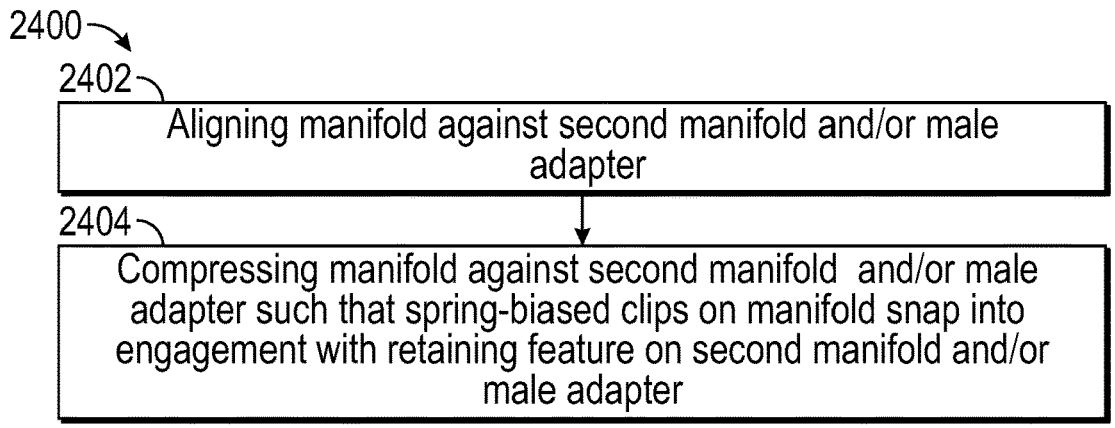
FIG. 69 is a flowchart depicting steps performed in an illustrative method of assembling another portion of a manifold assembly, according to aspects of the present teachings.

FIG. 69 is a flowchart illustrating steps performed in an illustrative method of assembling another portion of a manifold assembly, and may not recite the complete process or all steps of the method. Although various steps of method 2400 are described below and depicted in FIG. 69, the steps need not necessarily all be performed, and in some cases may be performed simultaneously or in a different order than the order shown. Method 2400 includes coupling the manifold (such as manifold 920) to another component and may performed as part of installing a manifold assembly (such as manifold assembly 910) and/or installing a hot tub plumbing system (such as system 1700). Specifically, method 2400 includes coupling the manifold to a component which is upstream of the manifold and which may include a second manifold and/or a male adapter (such as male adapter 930).

At step 2402, a worker aligns the manifold with another component. In some examples, the other component may be a second manifold and/or a male adapter. In some examples, the manifold and/or the other manifold may already be coupled with tubing (such as tubing 1710). In some examples, the male adapter may already be coupled with air and/or water supply lines (such as pipe 112 and/or air tubing 116). In some examples, aligning the manifold with the other component may include positioning the manifold against the other component. At step 2404, the worker compresses the manifold against the other component such that spring-biased clips (such as clips 1032, 1040, 1432, and/or 1448) on the manifold engage with a retaining feature (such as retaining post 1038 and/or 1130 and/or ridge 1046, 1438, 1448, 1132, 1524, and/or 1534) on the other component.

For example, the spring-biased clips may be configured to flex away from a default position when a sloped lip (such as lip 1036, 1044, 1436, and/or 1454) slides along an external portion of the other component and over the retaining feature. The spring-biased clips may be further configured to snap back into the default position when the sloped lip passes the retaining feature on the other component. In some examples, the spring-biased clips may engage with the retaining feature and prevent the manifold from sliding off of the other component. Thus, the manifold and the other component are coupled together.

In some examples, the manifold and the other component may be configured to be able to be unlocked and/or uncoupled. Uncoupling the manifold from the other component may be accomplished by moving the spring-biased clips away from the default position and reversing steps 2404 and 2402. For example, to uncouple the manifold from the other component, the worker may move the spring-biased clips away from the default position and slide the manifold off of the other component. In some examples, the worker may use a finger to move the spring-biased clips and/or may use a tool. Releasably coupling the manifold and the other component together may be advantageous as it may, among other advantages, allow the worker to uncouple a manifold that was coupled to the wrong component by mistake.

Figure 70:
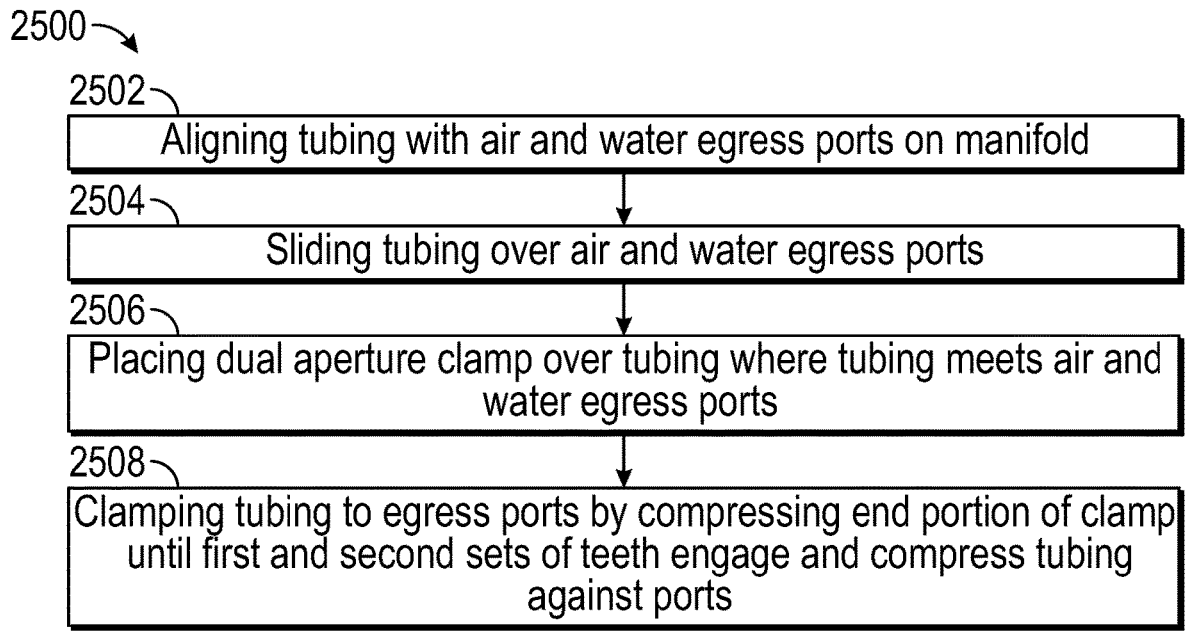
FIG. 70 is a flowchart depicting steps performed in an illustrative method of attaching tubing to a manifold assembly, according to aspects of the present teachings.

FIG. 70 is a flowchart illustrating steps performed in an illustrative method of attaching tubing to a manifold assembly, and may not recite the complete process or all steps of the method. Although various steps of method 2500 are described below and depicted in FIG. 70, the steps need not necessarily all be performed, and in some cases may be performed simultaneously or in a different order than the order shown. Method 2500 includes coupling the tubing (such as tubing 120 or 1710) to the manifold (such as manifold 920) and may be performed as part of installing a manifold assembly (such as manifold assembly 910) and/or installing a hot tub plumbing system (such as system 1700).

At step 2502, a worker aligns an end of a length of tubing with the air and/or water egress ports (such as water egress port 1016 and/or 1416 and/or air egress port 1018 and/or 1418) on the manifold. At step 2504, the worker slides the tubing over the air and water egress ports. In some examples, step 2502 and/or step 2504 may include and/or may occur after dipping the end of the length of tubing in a lubricant (such as soapy water). For example, coupling the tubing to the egress ports may include sliding the tubing over the end of the egress ports and use of a lubricant may facilitate sliding the end of the tubing over the end of the air and/or water egress ports.

In some examples, coupling the tubing to the manifold includes coupling the first portion of the tubing to the water egress port of the manifold and the second portion of the tubing to the air egress port of the manifold. For example, the tubing may be dual extrusion tubing and the first and second portions may be joined at a periphery. In some examples, the tubing may be dual extrusion tubing and the two portions of the tubing may be slid over the ends of the air and water egress ports substantially simultaneously. In some examples, the tubing may include separate air and water tubing and the tubing may be slid over the ends of the air and water egress ports substantially independently. For example, the water tubing may be slid over the end of the water egress port and then the air tubing may be slid over the end of the air egress port or vice versa. In other words, the tubing may be slid over the end of one egress port and then over the end of the other egress port.

At step 2506, the worker places a dual aperture clamp (such as clamp 1800 or 1900) over the tubing where the tubing overlaps the air and water egress ports. At step 2508, the worker clamps the tubing to the egress ports by compressing an end portion (such as end portion 1814 and/or 1914) of the clamp until a first and second set of teeth engage and compress the tubing against the egress ports. The clamp ensures that the tubing does not slip off of the egress ports of the manifold; the clamp cannot flex around a lip disposed on the water egress port (such as lip 1020) and so cannot slip off of the set of egress ports. The clamp compresses the tubing against the egress ports and ensures a water- and/or air-tight seal between the tubing and the egress ports. For example, a water- and air-tight seal can be achieved using the clamp and without the use of glue, primer, and/or other adhesives.

In some examples, the tubing is dual extrusion tubing and the clamp has a shape that is complementary to the shape of the tubing such that the clamp compresses all portions of the tubing. In some examples, the tubing includes separate air and water tubing and the clamp is shaped such that it can compress both the air tubing and the water tubing substantially separately and substantially simultaneously.

Figure 71:
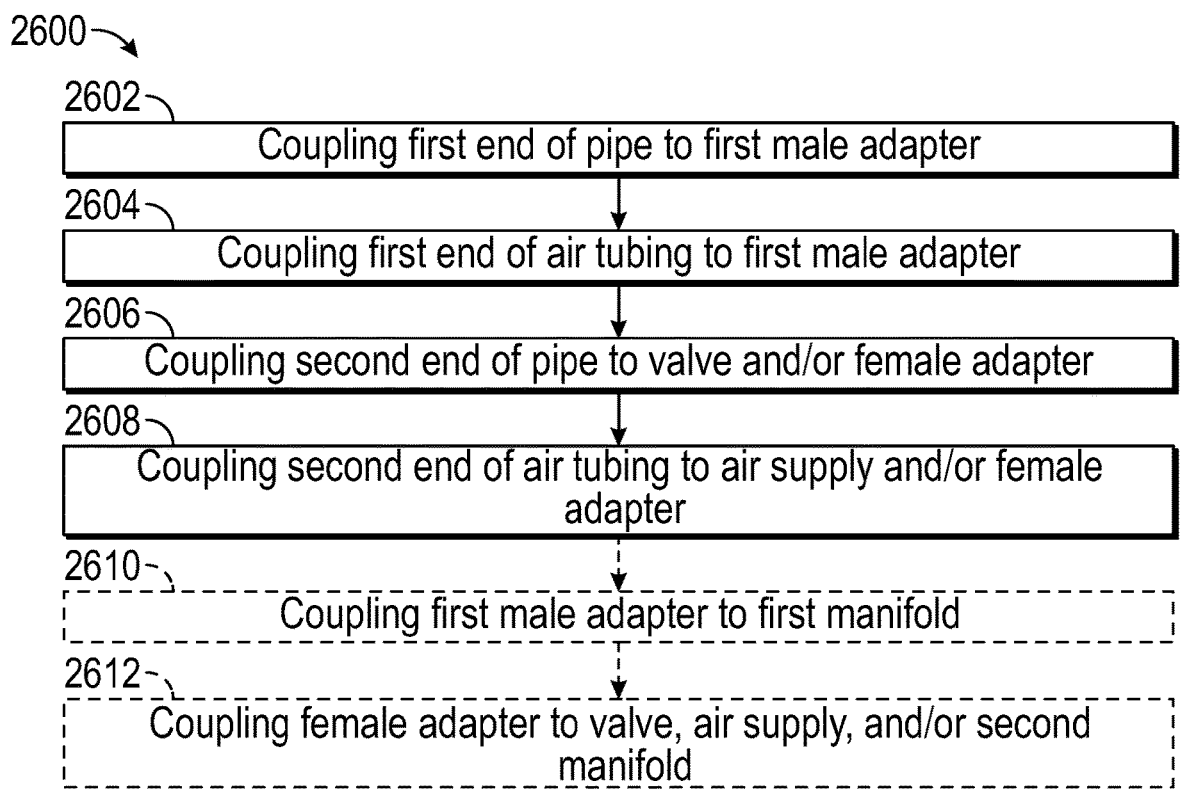
FIG. 71 is a flowchart depicting steps performed in an illustrative method of coupling air and water sources to manifold adapters, according to aspects of the present teachings.

FIG. 71 is a flowchart illustrating steps performed in an illustrative method of coupling air and water sources to manifold adapters in a manifold assembly, and may not recite the complete process or all steps of the method. Although various steps of method 2600 are described below and depicted in FIG. 71, the steps need not necessarily all be performed, and in some cases may be performed simultaneously or in a different order than the order shown. Method 2600 includes installing air and water supply lines (such as pipe 112 and/or air tubing 116) and may be performed as part of installing a manifold assembly (such as manifold assembly 910) and/or installing a hot tub plumbing system (such as system 1700).

At step 2602, a worker couples a first end of a water supply line or pipe (such as pipe 112) to a first male adapter (such as male adapter 930). In some examples, any suitable mechanism for coupling the water supply line to the adapter may be used. In some examples, this step may include the application of glue, primer, and/or any other suitable adhesive to the water supply line and/or the adapter. For example, glue may be applied to the outside of the end of the water supply line before it is inserted into the end of the water conduit of the male adapter. In some examples, this step may include the application of a clamp and/or any other suitable connection mechanism.

At step 2604, the worker couples a first end of an air supply line or air tubing (such as air tubing 116) to the first male adapter (such as male adapter 930). In some examples, any suitable mechanism for coupling the air supply line to the adapter may be used. In some examples, this step may include the application of glue, primer, and/or any other suitable adhesive to the air supply line and/or the adapter. For example, primer may be applied to the outside of the end of the air supply line before it is inserted into the end of the air conduit of the male adapter. In some examples, this step may include the application of a clamp and/or any other suitable connection mechanism.

At step 2606, the worker couples a second end of the water supply line to a valve (such as valve 108) and/or a female adapter (such as female adapter 940). In some examples, the water supply line may be connecting a first manifold assembly to a water source and the second end of the water supply line may couple with a valve and/or with a female adapter which couples with the valve. In some examples, the water supply line may be connecting a first manifold assembly to a second manifold assembly and the water supply line may couple with a female adapter. In some examples, any suitable mechanism for coupling the water supply line to the valve and/or adapter may be used. Step 2606 may be generally similar to step 2602. For example, step 2606 may include the application of glue, primer, and/or any other suitable adhesive to the water supply line, the valve, and/or the adapter. For example, glue may be applied to the outside of the end of the water supply line before it is inserted into the end of a water conduit of the female adapter and/or the valve. In some examples, this step may include the application of a clamp and/or any other suitable connection mechanism.

At step 2608, the worker couples a second end of the air supply line to an air supply (such as air supply 114) and/or a female adapter (such as female adapter 940). In some examples, the air supply line may be connecting a first manifold assembly to an air supply and the second end of the air supply line may couple with the air supply and/or with a female adapter which couples with the air supply. In some examples, the air supply line may be connecting a first manifold assembly to a second manifold assembly and the air supply line may couple with a female adapter. In some examples, any suitable mechanism for coupling the air supply line to the air supply and/or adapter may be used. Step 2608 may be generally similar to step 2604. For example, step 2608 may include the application of glue, primer, and/or any other suitable adhesive to the air supply line, the air supply, and/or the adapter. For example, primer may be applied to the outside of the end of the water supply line before it is inserted into the end of an air conduit of the female adapter and/or the air supply. In some examples, this step may include the application of a clamp and/or any other suitable connection mechanism.

At optional step 2610, the worker couples the first male adapter to a first manifold (such as manifold 920). Coupling the first male adapter to the manifold may include any suitable mechanism. For example, the first male adapter and the manifold may be coupled by a "press-and-click" method described above. At optional step 2612, the worker couples the female adapter to a valve (such as valve 108), an air supply (such as air supply 114), and/or a second manifold (such as manifold 920). Coupling the female adapter to the valve, the air supply, and/or the second manifold may include any suitable mechanism. For example, the female adapter and the second manifold may be coupled by a "press-and-click" method described above. In some examples, the female adapter may be coupled with the valve and/or the air supply using a "press-and-click" method such as described above.

E. Illustrative Jet Assemblies Including a Spring-Biased Ring

With reference to FIGS. 72-78, this section describes illustrative jet assemblies including a jet body configured to couple to a jet back via a press-and-click fitting mechanism including a spring-biased ring.

Straight Back Embodiment

Straight back jet assembly 2700 is an illustrative embodiment of general jet assembly 200. Jet assembly 2700 may be substantially similar in at least some respects to jet assembly 200 and/or to other jet assembly examples described above. Accordingly, similar components may be labeled with similar reference numbers and only an abbreviated discussion of some features is provided here.

Figure 72:
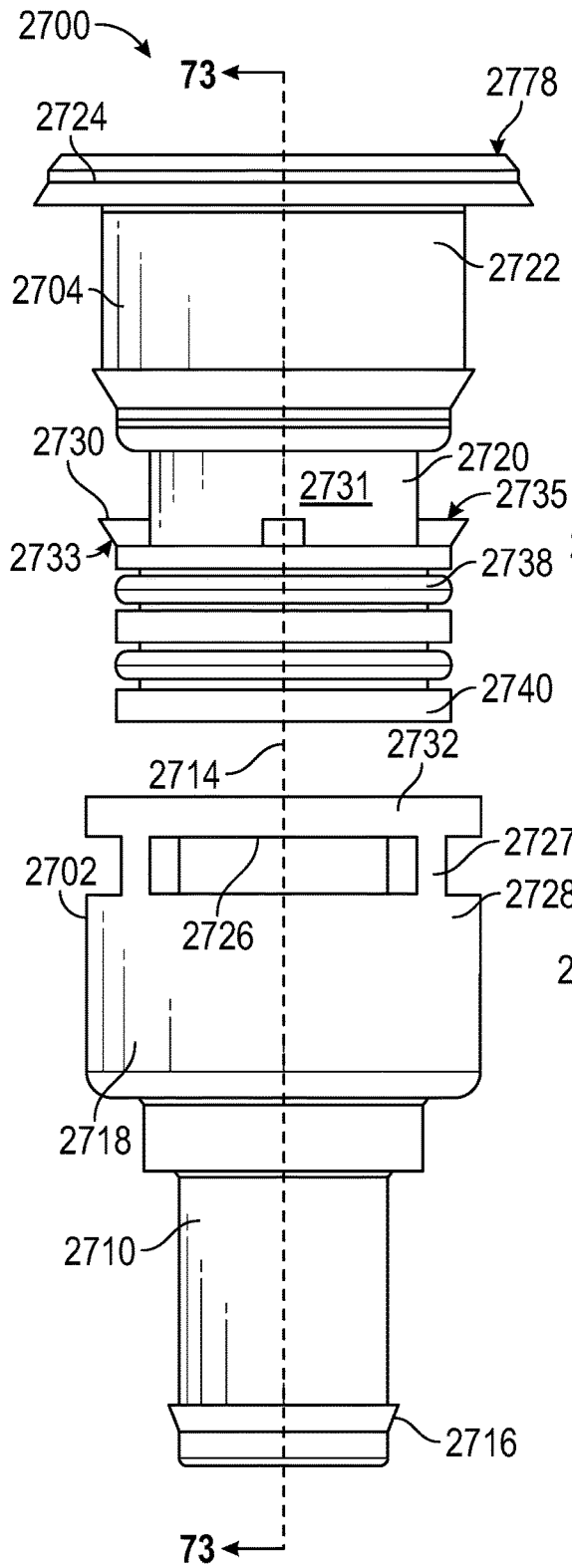
FIG. 72 is an exploded side view of yet another jet assembly according to aspects of the present teachings.
Figure 73:
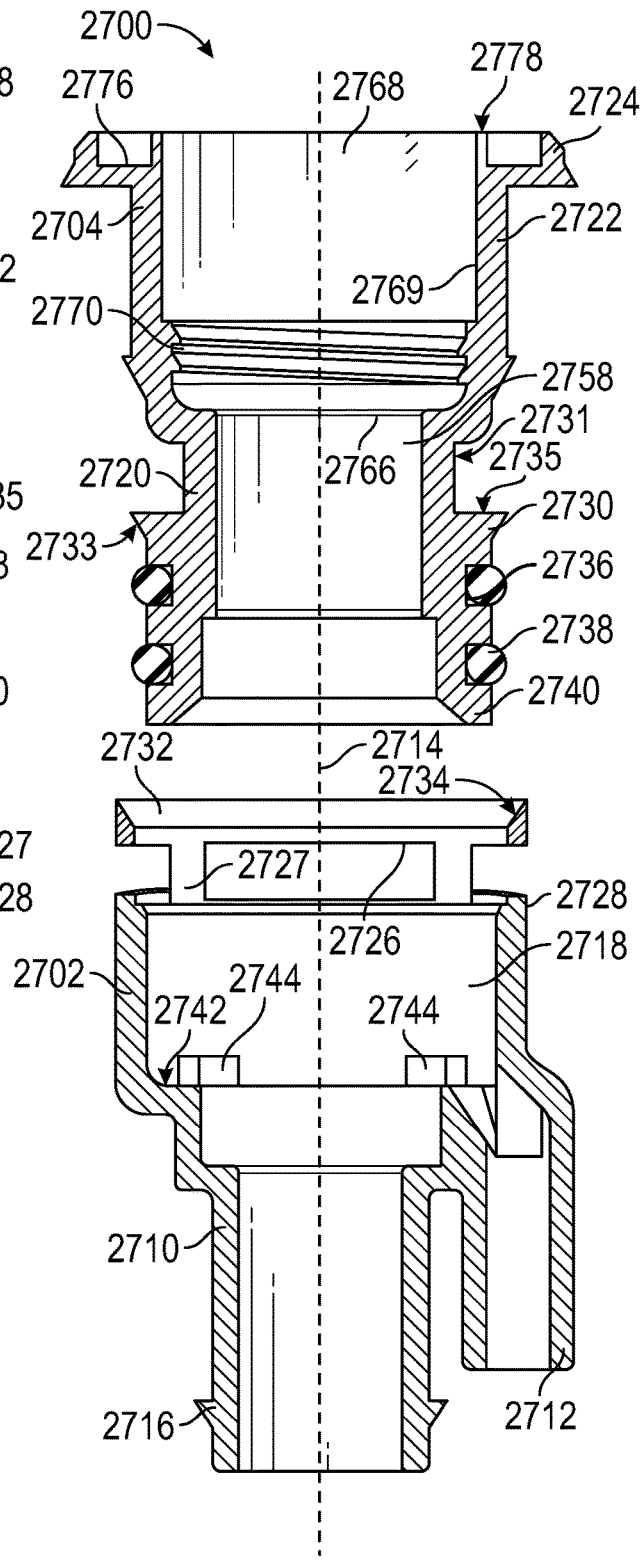
FIG. 73 is an exploded sectional side view of the jet assembly of FIG. 72.
Figure 74:
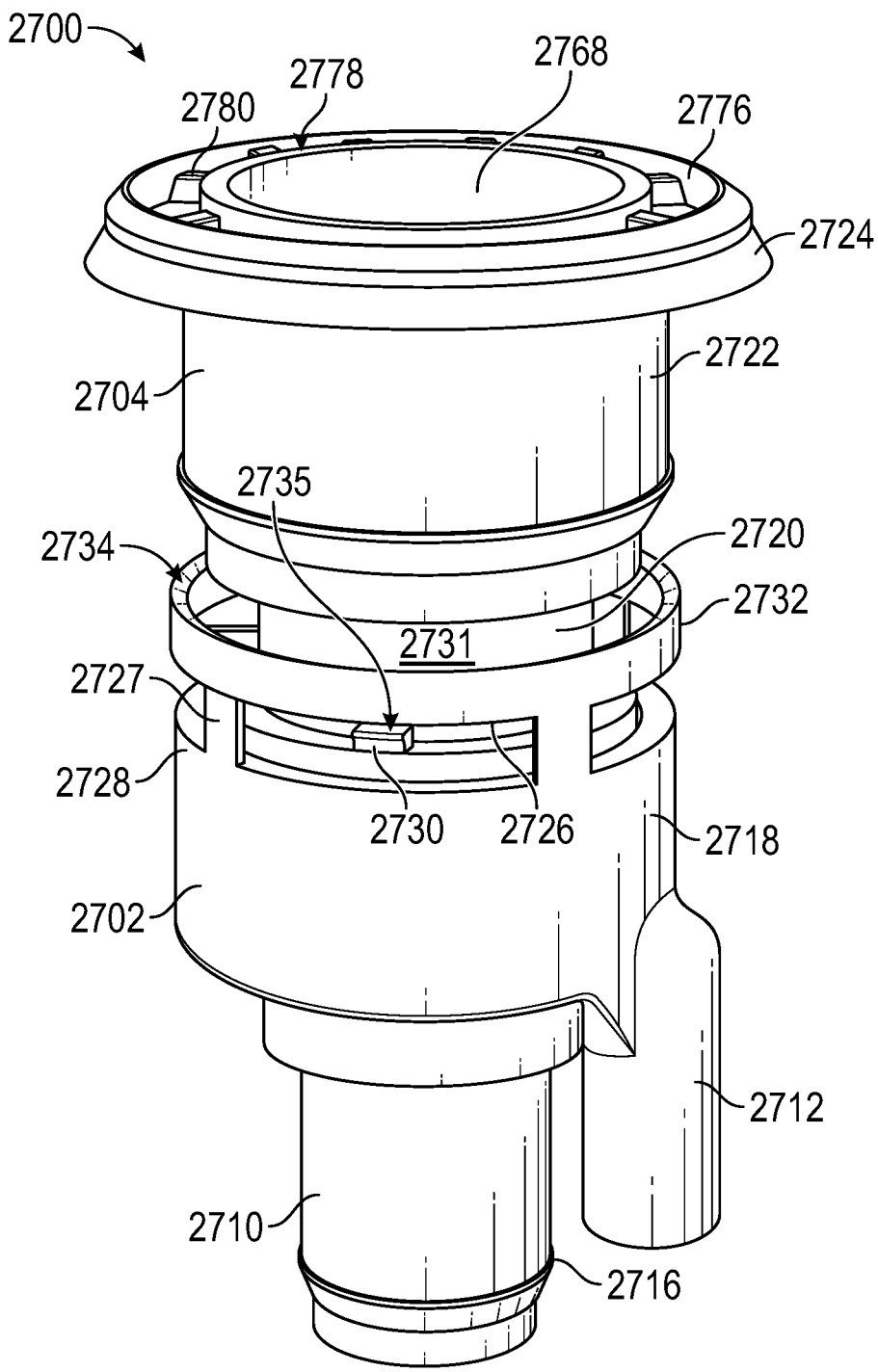
FIG. 74 is an isometric view of the jet assembly of FIG. 72.

FIGS. 72-74 depict various views of jet assembly 2700. Specifically, FIG. 72 is an exploded side view of jet assembly 2700, FIG. 73 is an exploded sectional side view of the jet assembly, and FIG. 74 is an isometric view of the jet assembly. As shown in these views, jet assembly 2700 includes a jet back 2702 and a jet body 2704. Jet assembly 2700 may further include a jet insert, also referred to as a jet face (not shown). Jet back 2702 may be referred to as a straight-back jet back, or a straight jet back. Jet back 2702 is an example of jet back 202 described above, jet body 2704 is an example of jet body 204 described above, and a compatible jet insert would be an example of jet insert 206 described above.

Jet back 2702 includes two parallel ingress ports: a water ingress port 2710 and an air ingress port 2712. Water ingress port 2710 is larger than air ingress port 2712 and is substantially centered on a longitudinal axis 2714 of the jet back.

Water ingress port 2710 (also referred to as a barb) includes a lip or ridge 2716. Lip 2716 may include any suitable structure configured to ensure a water-tight seal between water ingress port 2710 and a length of tubing (such as tubing 120). In the example depicted in FIGS. 72-74, lip 2716 includes a sloped ridge having a vertex distal an exterior surface of water ingress port 2710, but in other examples, the lip may have another suitable structure.

Air ingress port 2712 (also referred to as a barb) is parallel to water ingress port 2710 and is offset from the center of jet back 2702. In some examples, air ingress port 2712 may include a lip or other feature configured to ensure a seal. In some examples, an external portion of air ingress port 2712 may be smooth, as in the example depicted in FIGS. 72-74.

In the example depicted in FIGS. 72-74, jet back 2702 is configured to couple with dual extrusion tubing having two fluid passages joined at a periphery, but in other examples the jet back may be configured to couple with any other suitable type of tubing. Dimensions of the air and water ingress ports and/or the spacing between the ingress ports may be selected to facilitate coupling with desired tubing.

Jet back 2702 further includes a central portion 2718 configured to create a water-tight seal with jet body 2704. Central portion 2718 is in direct fluid communication with water ingress port 2710 and air ingress port 2712, and may have any shape suitable for a selected application and/or for the characteristics of the jet body. For example, central portion 2718 may be substantially cylindrical, as in the example depicted in FIGS. 72-74. In other examples, the central portion may be rectangular, triangular, elliptical, and/or have any other suitable shape.

Jet body 2704 includes an upstream portion 2720 and a downstream portion 2722. Upstream portion 2720 may include any suitable structure configured to be at least partially disposed within central portion 2718 of the jet back. For example, as shown in FIGS. 72-74, upstream portion 2720 may be substantially cylindrical. In some examples, downstream portion 2722 may have substantially the same cross-sectional shape and/or size as upstream portion 2720. For example, downstream portion 2722 may also be substantially cylindrical, as in FIGS. 72-74. Downstream portion 2722 may further include any suitable structure configured to engage with hot tub shell 104 and/or a jet insert. For example, downstream portion 2722 may include a flange 2724. Downstream portion 2722 is discussed in further detail below.

One or more openings 2726 are formed within jet back 2702 adjacent a downstream end 2728 of the jet back. Openings 2726 are separated by unmodified portions 2727 of the jet back. Openings 2726 are configured to receive one or more protrusions 2730 projecting from an exterior surface 2731 of jet body 2704. Protrusions 2730 may also be referred to as hooks, prongs, or projections. Openings 2726 are sized and shaped to define a resilient ring 2732 spaced from downstream end 2728 and supported above the downstream end by unmodified portions 2727. As shown in FIG. 74, when protrusions 2730 are disposed within openings 2726, the protrusions engage ring 2732 such that the ring tends to prevent the protrusions from sliding out of the openings (e.g., in a downstream direction). In this manner, ring 2732 and protrusions 2730 couple the jet back 2702 to jet body 2704.

Ring 2732 is configured to be resilient (e.g., spring biased), such that the ring is at least partially deformable and/or translatable in at least a radial direction. For example, a shape of ring 2732 may be deformed in at least one direction in response to a suitable force, and/or the ring may be displaced in a radial and/or axial direction (e.g., by deformation of unmodified portions 2727) in response to a suitable force. The resiliency of ring 2732 allows jet body 2704 to be coupled to jet back 2702 in a press-and-click manner. Specifically, inserting jet body 2704 into jet back 2702 causes protrusions 2730 to push against ring 2732, urging at least some portions of the ring radially outward (e.g., away from longitudinal axis 2714) and thereby allowing the protrusions to pass through the ring to be received in openings 2726. With protrusions 2730 received in openings 2726, the protrusions no longer deform ring 2732, and the resilient bias of the ring restores the ring to its typical or default shape (e.g., the cross-sectional shape of jet back 2702) and/or position.

Ring 2732 and protrusions 2730 may each have any suitable shape. In some examples, the ring and the protrusions are shaped in a manner that facilitates insertion of the jet body into the jet back and inhibits removal of the jet body from the jet back. In other words, the ring and the protrusions may be shaped such that the protrusions are relatively easy to move past the ring into the openings, but difficult or impossible to move out of the openings past the ring without intervention (e.g., manually deforming and/or displacing the ring and/or protrusions). In the example depicted in FIGS. 72-74, protrusions 2730 are tapered such that the protrusions are longer radially at a downstream end than at an upstream end, and ring 2732 is tapered such that its inner diameter increases in the downstream direction. Accordingly, protrusions 2730 each have a sloped surface 2733, and ring 2732 has a complementary sloped lip 2734. When jet body 2704 and jet back 2702 are aligned and pushed together, sloped surface 2733 of protrusions 2730 slide against sloped lip 2734 of ring 2732, flexing the ring outward. The complementary tapered shapes of ring 2732 and protrusions 2730 facilitate deformation of the ring by the projections during insertion of jet body 2704 into jet back 2702. When protrusions 2730 are within openings 2726, a downstream surface 2735 of each protrusion engages ring 2732, thereby retaining the jet body within the jet back. In other examples, however, ring 2732 and/or protrusions 2730 may be shaped differently.

Protrusions 2730 may be substantially rigid, substantially as resilient as ring 2732, more resilient than ring 2732, or less resilient than ring 2732. In some examples, protrusions 2730 are resilient and ring 2732 is substantially rigid. The protrusions may extend from jet body 2704 in a substantially orthogonal and/or transverse direction, as in the example depicted in FIGS. 72-74, or in any other suitable direction (s).

The degree of resiliency of ring 2732 may be at least partially determined by the material of the ring, the axial length of the ring, the size (e.g., circumferential extent) of openings 2726 and/or unmodified portions 2727 of jet back 2702 connecting the ring to the jet back, and/or other factors. Any suitable material(s) and dimensions may be selected. In the example depicted in FIGS. 72-74, openings 2726 comprise channels having a relatively long circumferential extent, and unmodified portions 2727 have a much shorter circumferential extent than do the openings. In other examples, the sizes of the openings and/or unmodified portions may be changed, which may lead to a corresponding change in the resiliency of the ring. Jet back 2702 may include any suitable number of openings 2726 and unmodified portions 2727.

In some examples, protrusions 2730 and openings 2726 are sized and shaped to allow jet body 2704 to rotate relative to jet back 2702 while maintaining a water-tight and/or air-tight seal. For example, in the embodiment depicted in FIGS. 72-74, the long circumferential extent of openings 2726 defines an angular span over which jet body 2704 can rotate while protrusions 2730 are within the openings. This may facilitate installation and/or maintenance of the jet assembly in a hot tub or other system. For example, it may allow a worker to prevent adjacent jet assemblies from interfering with each other by rotating one or more of the jet assemblies as needed.

In the example depicted in FIGS. 72-74, ring 2732 is integral with jet back 2702, such that the ring is defined by openings 2726 within the jet back and supported by unmodified portions 2727 of the jet back. In other examples, the ring is not integral with the jet back, and is attached to the jet back by a suitable connector(s).

In the example depicted in FIGS. 72-74, ring 2732 has a circular and/or annular shape. In other examples, however, the ring may have another shape (e.g., triangular, rectangular, elliptical, polygonal, etc.). The ring may have a shape similar or identical to a cross-sectional shape of the jet back, or the ring may have a different shape from the cross-sectional shape of the jet back.

Jet body 2704 includes recesses 2736 configured to contain one or more O-rings 2738. Recesses 2736 may include any structure suitable for retaining O-rings 2738 depending, e.g., on characteristics of the jet back, jet body, and/or O-rings. For example, in the embodiment depicted in FIGS. 72-74, recesses 2736 comprise narrow circumferential channels within upstream portion 2720. In this example, recesses 2736 are configured such that the outside edge of the O-ring is flush with, or extends slightly beyond, the surface of the upstream portion of the jet body. Allowing the O-ring to extend slightly beyond adjacent surfaces of the jet body may ensure a water-tight seal by facilitating compression of the O-ring between an inner surface of the jet back and the sides of recesses 2736. Jet body 2704 may include any suitable number of recesses and/or O-rings.

Jet back 2702 also includes a spacing mechanism configured to ensure sufficient space between a proximate end 2740 of upstream portion 2720 of jet body 2704 and an inner wall 2742 of jet back 2702. The spacing mechanism may include any suitable structure depending on the characteristics of the jet body and the jet back. In the example depicted in FIG. 73, jet back 2702 includes a plurality of spacers 2744. Any suitable number of spacers 2744 may be provided, including a single continuous spacer extending circumferentially around some or all of inner wall 2742.

Jet body 2704 has a main aperture 2766 connecting a main cavity 2758 with a receiving chamber 2768. Receiving chamber 2768 is primarily disposed within downstream portion 2722 and includes a substantially cylindrical cavity configured for receiving at least a portion of a jet insert. In other examples, receiving chamber 2768 may include a rectangular and/or triangular cavity, and/or any other suitably shaped cavity (depending, e.g., on the shape of the jet insert). Inner wall 2769 of receiving chamber 2768 has a threaded portion 2770 configured for threadedly receiving at least a portion of a jet insert. Threaded portion 2770 may extend longitudinally along any suitable fraction of inner wall 2769. In the example depicted in FIG. 73, threaded portion 2770 is disposed proximate aperture 2766, but in other examples, the threaded portion may be disposed at another suitable location. The position of threaded portion 2770 may be selected to enable and/or ensure a desired distance between the jet insert and aperture 2766. Jet body 2704 may be configured to receive any suitable type(s) of jet insert.

As shown in FIGS. 73-74, a recess or channel 2776 is formed in a downstream surface 2778 of flange 2724 of jet body 2704. In the example depicted in FIGS. 73-74, channel 2776 has a rectangular cross-sectional shape, but in other examples, the channel may have a different cross-sectional shape, and/or may have a different cross-sectional shape at different points. Channel 2776 is configured to facilitate coupling between jet body 2704 and a jet insert (not shown).

Channel 2776 includes a plurality of molded ribs 2780 (see FIG. 74) configured to engage with the jet insert such that the jet insert is inhibited from rotating relative to flange 2724. In this manner, molded ribs 2780 act as stops to prevent the jet insert from unscrewing from threaded portion 2770 of jet body 2704, thereby increasing the security of the connection between the jet insert and the jet body. In the example depicted in FIG. 74, molded ribs 2780 have a height that is smaller than the depth of channel 2776 (e.g., the molded ribs do not extend all the way from the bottom of the channel to the top of the channel). This height may allow the jet insert to be screwed into threaded portion 2770 during installation, while inhibiting inadvertent unscrewing of the jet insert from the threaded portion. In general, molded ribs 2780 may have any suitable size and shape for engaging with the jet insert in this manner.

As described above, jet back 2702 and jet body 2704 may be coupled together by aligning the jet back and the jet body and compressing the jet back and jet body together to overcome the resistive force of spring-biased ring 2732.

Each of the components of jet assembly 2700 (e.g., jet back 2702, jet body 2704, a jet insert) may comprise any suitable material(s). For example, the components may comprise any suitable thermoplastic polymer such as polyvinyl chloride (PVC), acrylonitrile butadiene styrene (ABS), and/or any other suitable materials having similar properties (i.e., stiffness etc.). The components may be manufactured using any suitable process. For example, the manufacturing process may include the use of injection molding, compression molding, and/or extrusion methods. In some examples, each component may be injection molded out of PVC.

In some examples, jet assembly 2700 may include a nozzle configured to, e.g., increase the speed of a water stream, control a direction of the water stream, and/or merge streams of air and water. See, e.g., the description of nozzle 308 above.

Angled Back Embodiment

Figure 75:
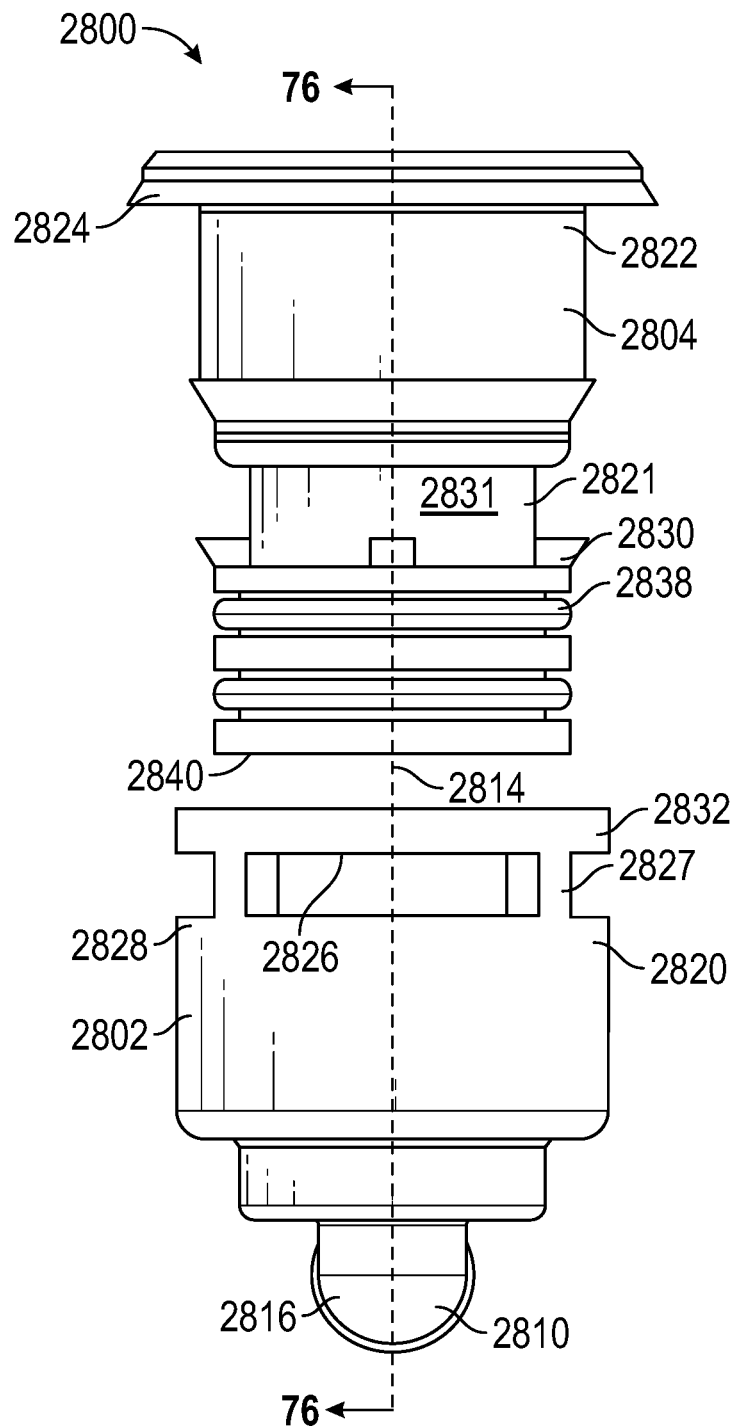
FIG. 75 is an exploded side view of yet another jet assembly according to aspects of the present teachings.
Figure 76:
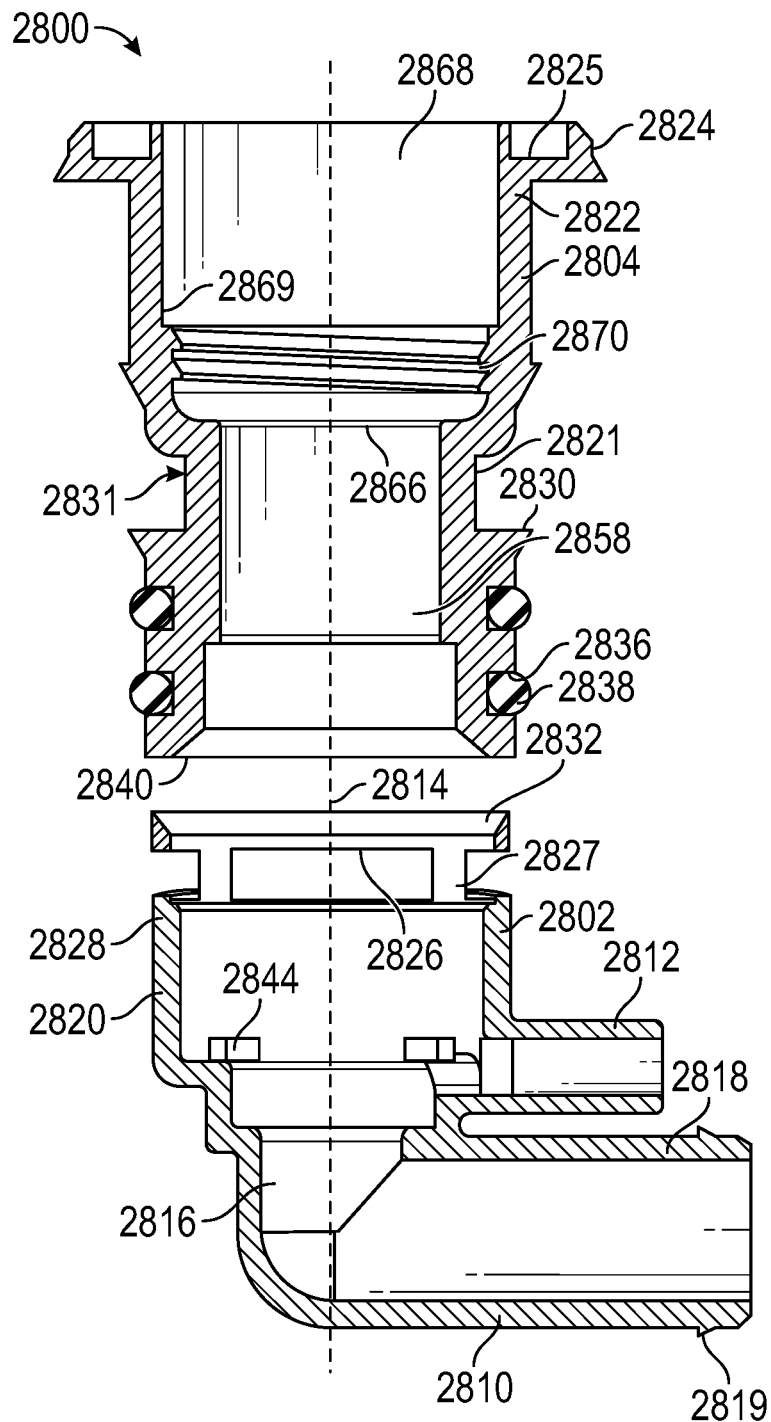
FIG. 76 is an exploded sectional side view of the jet assembly of FIG. 75.

FIGS. 75-76 depict another illustrative jet assembly 2800. Jet assembly 2800, which is another example of jet assembly 200, includes a jet back 2802, a jet body 2804, and may further include a jet insert. Jet body 2804 and jet back 2802 may be substantially similar in at least some respects to jet body 2704 and jet back 2702, and accordingly the description provided below is abbreviated. In some examples, jet body 2804 and jet body 2704 are substantially identical and/or are interchangeable.

FIG. 75 is an exploded side view of jet assembly 2800, and FIG. 26 is an exploded sectional view of jet assembly 2800. As shown in these views, jet back 2802 is an angled jet back, having a water ingress port 2810 and an air ingress port 2812 that are not parallel to a longitudinal axis 2814 of the jet back. Water ingress port 2810 and air ingress port 2812 may be substantially similar to, e.g., water ingress port 610 and air ingress port 612 described above. For example, water ingress port 2810 may include a base portion 2816 substantially parallel with and centered on longitudinal axis 2814, and an extended portion 2818 angled relative to the base portion. In the example depicted in FIGS. 75-76, extended portion 2818 is oriented at an approximately 90-degree angle relative to base portion 2816, but in other examples, the extended portion and base portion may form any other suitable angle. Water ingress portion 2810 includes a lip 2819 configured to form a water-tight seal between the water ingress port and a length of tubing (e.g., tubing 120).

Air ingress port 2812 is substantially parallel to extended portion 2818. In some examples, air ingress port 2812 includes a lip configured to form an air-tight seal with tubing.

As with previous embodiments, jet back 2802 includes a central portion 2820 in direct fluid communication with water ingress port 2810 and air ingress port 2812 and configured to create a water-tight seal with jet body 2804. Jet body 2804 includes an upstream portion 2821 and a downstream portion 2822. Upstream portion 2821 is configured to be at least partially disposed within central portion 2820. Downstream portion 2822 includes a flange 2824, which includes a channel 2825. Channel 2825 may include molded ribs similar or identical to molded ribs 2780 (not shown).

Jet body 2804 and jet back 2802 are configured to couple together in substantially the same manner as jet body 2704 and jet back 2702. Accordingly, jet back 2802 includes one or more openings 2826 separated by unmodified portions 2827 of the jet back. Openings 2826 are disposed adjacent a downstream end 2828 of the jet back and are configured to receive one or more protrusions 2830 projecting from an exterior surface 2831 of jet body 2804. Openings 2826 define a resilient ring 2832 spaced from downstream end 2828.

Like jet body 2704, jet body 2804 includes recesses 2836 configured to hold O-rings 2838. Proximate end 2840 of jet body 2804 are retained above inner wall 2869 of jet back 2802 by spacers 2844 disposed on the inner wall. Jet body 2804 has a main cavity 2858, a main aperture 2866, and a receiving chamber 2868.

Inner wall 2869 of receiving chamber 2868 has a threaded portion 2870 configured for threadedly receiving at least a portion of a jet insert. Jet body 2804 may be configured to receive any suitable type(s) of jet insert.

Illustrative Jet Body Shapes

Figure 77:
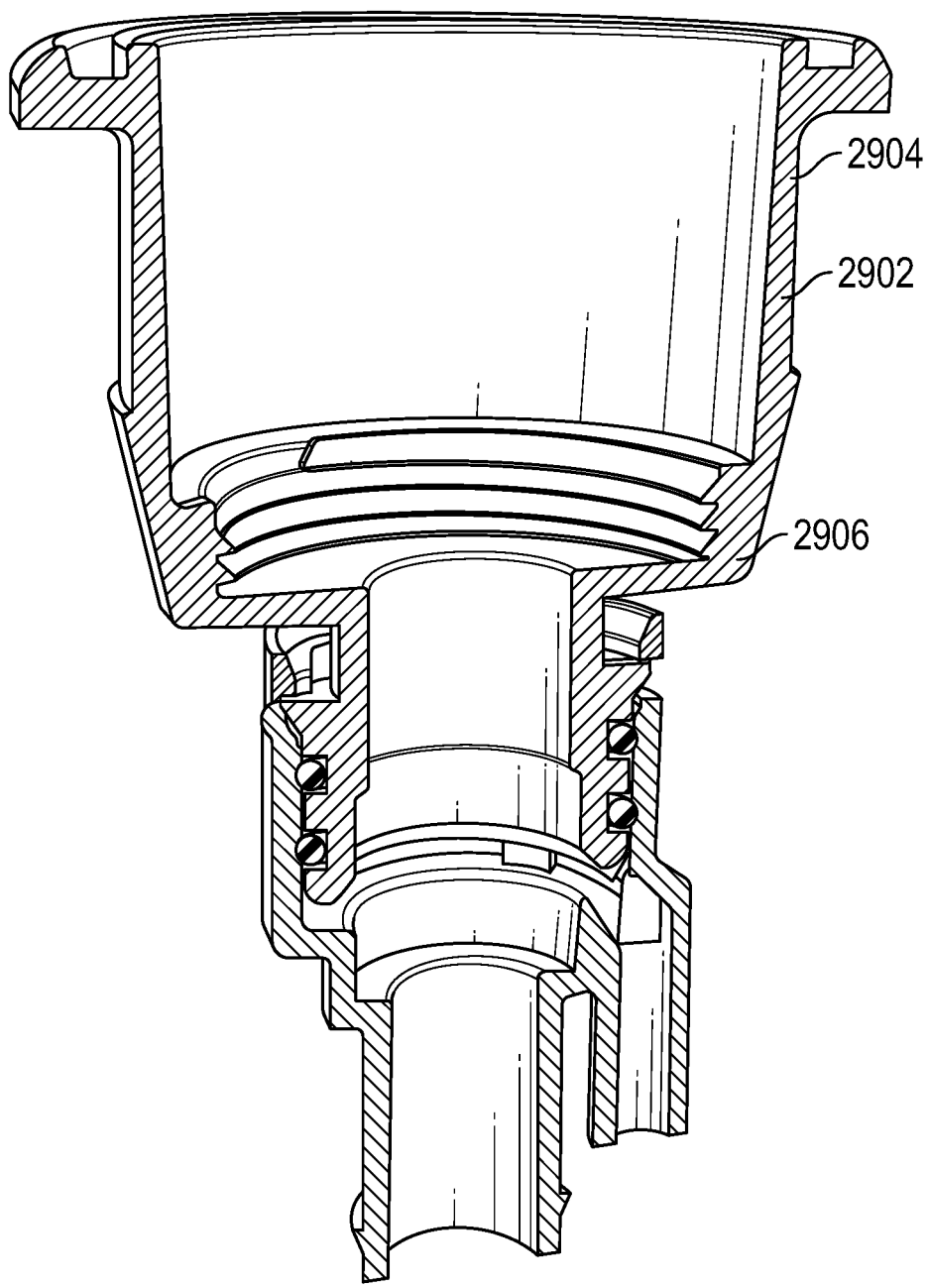
FIG. 77 is a sectional isometric view of yet another jet assembly according to aspects of the present teachings.
Figure 78:
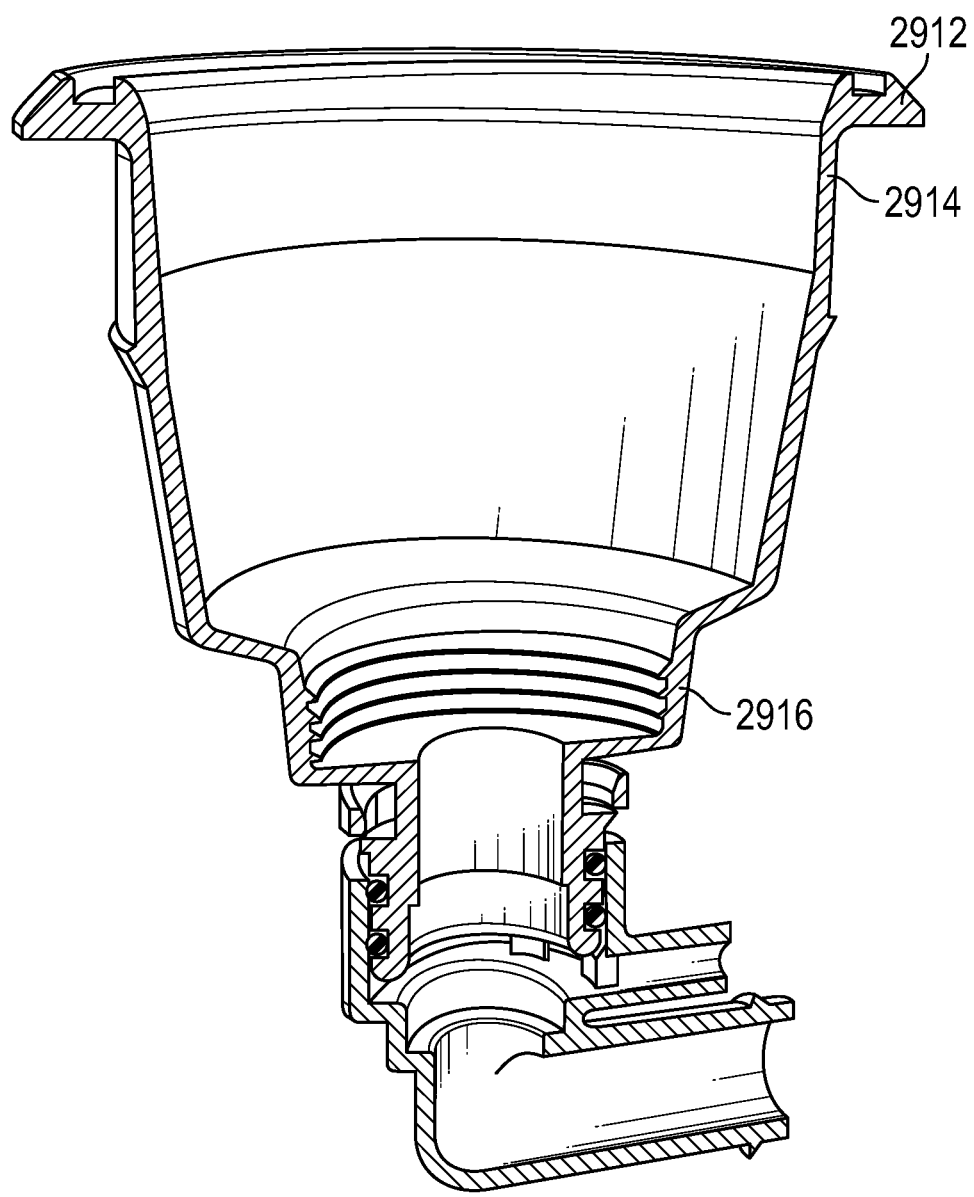
FIG. 78 is a sectional isometric view of yet another jet assembly according to aspects of the present teachings.

FIGS. 77-78 are sectional views depicting illustrative jet bodies suitable for use in assemblies 2700 and 2800. These exemplary jet bodies have different shapes and/or sizes than the example jet bodies depicted in FIGS. 72-76. Specifically, FIG. 77 is a sectional view depicting an illustrative jet body 2902 that has a downstream end 2904 having a first diameter, and a threaded portion 2906 having a second diameter smaller than the first diameter. In some examples, the first diameter of downstream end 2904 is approximately four inches, but other values are possible.

FIG. 78 is a sectional view depicting an illustrative jet body 2912 that has a downstream end 2914 having a third diameter, and a threaded portion 2916 having a fourth diameter smaller than the third diameter. In some examples, the third diameter of downstream end 2914 is approximately five inches, but other values are possible.

Aside from the diameters of the downstream ends and threaded portions, jet bodies 2902 and 2912 may be substantially similar to jet body 2802 and/or jet body 2702. Jet bodies 2902 and 2912 may be configured to be coupled to jet back 2804, jet back 2704, and/or any other suitable jet back.

In general, any suitable diameter may be selected for the downstream end of the jet body, and any suitable diameter may be selected for the threaded portion of the jet body. The downstream-end diameter and the threaded-portion diameter, and/or the difference between the downstream-end and threaded-portion diameters, may be selected based on characteristics of a jet insert to be coupled to the jet body, and/or on any other suitable basis.

F. Additional Examples and Illustrative Combinations

This section describes additional aspects and features of a hot tub plumbing system, its components and its methods of assembly, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A hot tub jet assembly, comprising:

a jet body configured to receive separate streams of air and water, to merge the separate streams of air and water together to form a mixed stream of air and water, and to provide the mixed stream of air and water from an outlet aperture;

a jet back configured to couple to the jet body and to provide the separate streams of air and water to the jet body, the jet back including:

a central portion configured to create a water tight seal with the jet body;

an attachment mechanism extending from a first end of the central portion and configured to attach the jet back to the jet body in a secure manner; and a pair of parallel hollow protrusions extending from a second end of the central portion, each protrusion configured to receive one of the separate streams of air and water from a dual extrusion tube.

A1. The jet assembly of paragraph A, wherein the attachment mechanism includes at least two spring-biased clips extending from the first end of the central portion of the jet back, each clip configured to snap into spring-biased engagement with a retaining ridge disposed at a periphery of the jet body.

A2. The jet assembly of paragraph A, wherein the jet body includes at least one O-ring disposed around a periphery of the jet body, and wherein an inner cylindrical surface of the central portion of the jet back is configured to fit around the O-ring in a substantially water tight compression fit.

A3. The jet assembly of paragraph A, further comprising a jet insert configured fit within an aperture of a hot tub body, to receive the mixed stream of air and water from the jet body and to channel the mixed stream of air and water into an interior portion of the hot tub body through the aperture.

A4. The jet assembly of paragraph A, wherein the parallel hollow protrusions define longitudinal axes oriented parallel to a longitudinal axis defined by the central portion.

A5. The jet assembly of paragraph A, wherein the parallel hollow protrusions define longitudinal axes oriented at a non-zero angle relative to a longitudinal axis defined by the central portion.

A6. The jet assembly of paragraph A5, wherein the non-zero angle is 90 degrees.

AA. A hot tub jet back configured to provide separate streams of air and water to a hot tub jet body, comprising:

a central portion configured to create a water tight seal with the jet body;

an attachment mechanism extending from a first end of the central portion and configured to attach the jet back to the jet body in a secure manner; and a pair of parallel hollow fluid ports extending from a second end of the central portion, each protrusion configured to receive one of the separate streams of air and water from a dual extrusion tube.

AA1. The jet back of paragraph AA, wherein the attachment mechanism includes at least two opposed, spring-biased clips extending from the first end of the central portion of the jet back, each opposed clip configured to snap into spring-biased engagement with a complementary retaining ridge.

AA2. The jet back of paragraph AA1, further comprising a hot tub jet body, wherein the jet body includes at least one O-ring and a retaining ridge disposed around a periphery of the jet body, an inner cylindrical surface of the central portion of the jet back is configured to fit around the O-ring in a substantially water tight compression fit, and the opposed clips of the jet back are configured to snap into spring-biased engagement with the retaining ridge of the jet body.

AA3. The jet back of paragraph AA2, further comprising a hot tub jet insert configured to fit within an aperture of a hot tub body, to receive the mixed stream of air and water from the hot tub jet body and to channel the mixed stream of air and water into an interior portion of the hot tub body through the aperture.

AB. A hot tub jet assembly, comprising:

a jet back including first and second parallel, hollow fluid receiving ports extending from one end, wherein the first and second ports are configured to receive a stream of air and a stream of water, respectively, from a dual extrusion tube carrying both streams in adjacent portions of the tube, the jet back further including a plurality of spring-biased clips extending from another end of the jet back and configured to engage securely with a complementary ridge.

AB1. The jet assembly of paragraph AB, further comprising a jet body configured to engage securely with the jet back, to receive the streams of air and water from the jet back, to merge the separate streams of air and water together to form a mixed stream of air and water, and to provide the mixed stream of air and water from an outlet aperture.

AB2. The jet assembly of paragraph AB1, further wherein the spring-biased clips are configured to engage securely with a complementary ridge formed on the jet body.

AB3. The jet assembly of paragraph AB2, wherein the at least two spring-biased clips include four spring-biased clips evenly spaced around a periphery of the jet back.

AB4. The jet assembly of paragraph AB2, wherein the jet body includes two O-rings disposed around a periphery of the jet body, and wherein the jet back is configured to engage securely with the jet body in a substantially water tight manner when the spring-biased clips of the jet back are engaged with the complementary ridge of the jet body.

B. A hot tub air and water supply manifold, comprising:

a water conduit defining a first longitudinal axis and configured to receive water from a water supply line;

at least one air conduit defining a second longitudinal axis parallel to the first longitudinal axis and configured to receive air from an air supply line, the air conduit having a periphery joined to a periphery of the water conduit;

a first water egress port in fluid communication with the water conduit;

a first air egress port in fluid communication with the air conduit;

wherein the first water egress port and the first air egress port are disposed substantially parallel and adjacent to each other, and are configured to channel streams of water and air, respectively, to a first dual extrusion tube.

B1. The supply manifold of paragraph B, wherein the first water egress port and the first air egress port are both oriented substantially perpendicular to the water conduit and to the air conduit.

B2. The supply manifold of paragraph B, wherein the at least one air conduit includes a first air conduit joined to a first portion of the periphery of the water conduit, and a second air conduit joined to a second portion of the periphery of the water conduit, wherein the first air egress port is in fluid communication with the first air conduit, and further comprising:

a second water egress port in fluid communication with the water conduit;

a second air egress port in fluid communication with the second air conduit;

wherein the second water egress port and the second air egress port are disposed substantially parallel and adjacent to each other and are configured to channel streams of water and air, respectively, to a second dual extrusion tube.

B3. The supply manifold of paragraph B2, wherein the first portion of the periphery of the water conduit and the second portion of the periphery of the water conduit are separated from each other by approximately 180 degrees.

B4. The supply manifold of paragraph B2, further comprising a first spring-biased clip extending from a peripheral portion of a distal end of the first air conduit and a second spring-biased clip extending from a peripheral portion of a distal end of the second air conduit, and wherein the first and second spring-biased clips are respectively configured to engage complementary retaining ridges disposed at peripheral portions of first and second air conduits of an adjacent air and water supply manifold.

B5. The supply manifold of paragraph B2, further comprising a first retaining ridge disposed at a peripheral portion of the first air conduit and a second retaining ridge disposed at a peripheral portion of the second air conduit, wherein the first retaining ridge is configured to engage securely with a spring-biased clip extending from a first air conduit of an adjacent air and water supply manifold, and the second retaining ridge is configured to engage securely with a spring-biased clip extending from a second air conduit of the adjacent air and water supply manifold.

BA. A hot tub air and water supply manifold system, comprising:

a male manifold adapter, including:

a male manifold adapter water conduit defining a first longitudinal axis and configured to receive water from a water supply pipe; and a first male manifold adapter air conduit defining a second longitudinal axis parallel to the first longitudinal axis, the first male manifold adapter air conduit having a periphery joined to a periphery of the male manifold adapter water conduit;
a manifold body, including:
a manifold body water conduit having a first end configured to connect with one end of the male manifold adapter water conduit in a water tight manner with a longitudinal axis of the manifold body water conduit collinear with the first longitudinal axis;
a first manifold body air conduit having a first end configured to connect with one end of the first male manifold adapter air conduit in an air tight manner with a longitudinal axis of the first manifold body air conduit collinear with the second longitudinal axis;
a first water egress port in fluid communication with the manifold body water conduit; and
a first air egress port in fluid communication with the first manifold body air conduit;
wherein the first water egress port and the first air egress port are disposed substantially parallel to each other, and are configured to channel respective streams of water and air to a first dual extrusion tube.

BA1. The manifold system of paragraph BA, further comprising an end cap including a water conduit end cap configured to attach securely to a second end of the manifold body water conduit and to prevent passage of water, and a first air conduit end cap configured to attach securely to a second end of the first manifold body air conduit and to prevent passage of air.

BA2. The supply manifold of paragraph BA, wherein the first water egress port and the first air egress port are each oriented perpendicular to the first longitudinal axis.

BA3. The supply manifold of paragraph BA, wherein the male manifold adapter includes:
a second male manifold adapter air conduit defining a third longitudinal axis parallel to the first and second longitudinal axes, the second male manifold adapter air conduit having a periphery joined to the periphery of the male manifold adapter water conduit; and
wherein the manifold body includes:
a second manifold body air conduit having a first end configured to connect with one end of the second male manifold adapter air conduit in an air tight manner with a longitudinal axis of the second manifold body air conduit collinear with the third longitudinal axis;
a second water egress port in fluid communication with the manifold body water conduit; and
a second air egress port in fluid communication with the second manifold body air conduit;
wherein the second water egress port and the second air egress port are disposed substantially parallel to each other, and are configured to channel respective streams of water and air to a second dual extrusion tube.

BA4. The supply manifold of paragraph BA, wherein the male manifold adapter includes a pair of male manifold adapter air conduits, each defining a separate longitudinal axis parallel to the first longitudinal axis, each having a periphery joined to a periphery of the male manifold adapter water conduit, and separated along the periphery of the male manifold adapter water conduit by 180 degrees;
wherein the manifold body includes:
a pair of manifold body air conduits each having a first end configured to connect with an end of a corresponding one of the male manifold adapter air conduits in an air tight manner with a longitudinal axis each manifold body air conduit collinear with the longitudinal axis of the corresponding male manifold adapter air conduit;
a pair of water egress ports each in fluid communication with the manifold body water conduit; and
a pair of air egress ports each in fluid communication with a corresponding one of the manifold body air conduits; and
wherein a first one of the water egress ports and a first one of the air egress ports are disposed substantially parallel and adjacent to each other, and are configured to channel respective streams of water and air to a first dual extrusion tube; and a second one of the water egress ports and a second one of the air egress ports are disposed substantially parallel and adjacent to each other, and are configured to channel respective streams of water and air to a second dual extrusion tube.

BA5. The supply manifold of paragraph BA4, wherein each of the water egress ports and each of the air egress ports is oriented perpendicular to the first longitudinal axis.

C. A hot tub plumbing system, comprising:
a manifold configured to receive separate air and water supply streams and to direct those streams into a water egress port and an air egress port, respectively, wherein the water egress port and the air egress port are substantially parallel and adjacent to each other;
a flexible dual extrusion tube including a first hollow cylindrical portion configured to couple to the water egress port and a second hollow cylindrical portion configured to couple to the air egress port, wherein the first and second hollow cylindrical portions are joined together at peripheral portions;
a jet back including a pair of adjacent parallel hollow protrusions each configured to receive one of the streams of air and water from a respective one of the hollow cylindrical portions of the dual extrusion tube; and
a jet body configured to receive the streams of air and water from the jet back, to merge the streams of air and water together to form a mixed stream of air and water, and to provide the mixed stream of air and water from an outlet.

C1. The hot tub plumbing system of paragraph C, wherein the jet back includes a central portion configured to create a water tight seal with the jet body, and an attachment mechanism extending from a first end of the central portion and configured to attach the jet back to the jet body in a secure manner.

C2. The hot tub plumbing system of paragraph C1, wherein the attachment mechanism includes a pair of opposed, spring-biased clips extending from the first end of the central portion of the jet back, each opposed clip configured to snap into spring-biased engagement with a complementary retaining ridge disposed at a periphery of the jet body.

C3. The hot tub plumbing system of paragraph C1, wherein the jet body includes at least one O-ring disposed around a periphery of the jet body, and wherein an inner cylindrical surface of the central portion of the jet back is configured to fit around the O-ring in a substantially water tight compression fit.

C4. The hot tub plumbing system of paragraph C, further comprising a jet insert configured fit within an aperture of a hot tub body, to receive the mixed stream of air and water from the jet body outlet, and to channel the mixed stream of air and water into an interior portion of the hot tub body through the aperture.

C5. The hot tub plumbing system of paragraph C, further comprising a one-piece clamp configured to hold the dual extrusion tube in water tight engagement with the egress ports of the manifold.

C6. The hot tub plumbing system of paragraph C5, wherein the clamp is also configured to hold the dual extrusion tube in water tight engagement with the protrusions of the jet back.

C7. The hot tub plumbing system of paragraph C6, wherein the clamp defines a pair of contiguous arcuate apertures and a selectively releasable end portion having first and second sets of complementary ratcheting teeth configured to be engaged with each other upon compression of the end portion.

CA. A hot tub plumbing system, comprising:

a manifold configured to receive separate air and water supply streams and to channel the streams into a water egress port and an air egress port;

a flexible dual extrusion tube including a first tubular portion configured to couple to the water egress port and a second tubular portion configured to couple to the air egress port, wherein the first and second tubular portions are joined together in a figure-eight configuration; and a jet back including a pair of adjacent parallel hollow protrusions each configured to receive one of the streams of air and water from a respective one of the tubular portions of the dual extrusion tube.

CA1. The hot tub plumbing system of paragraph CA, further comprising a jet body configured to receive the streams of air and water from the jet back, to merge the streams of air and water together to form a mixed stream of air and water, and to channel the mixed stream of air and water into an outlet.

CA2. The hot tub plumbing system of paragraph CA1, further comprising a jet insert configured to be attached within an aperture of a hot tub body, to receive the mixed stream of air and water from the outlet of the jet body, and to channel the mixed stream of air and water into the hot tub through the aperture.

D. A method of plumbing a hot tub, comprising:

coupling a first end of a flexible dual extrusion tube to a manifold, including coupling a first hollow cylindrical portion of the dual extrusion tube to a water egress port of the manifold and coupling a second hollow cylindrical portion of the dual extrusion tube to an air egress port of the manifold, wherein the water egress port and the air egress port of the manifold are substantially parallel and adjacent to each other;

coupling a second end of the dual extrusion tube to a jet back having a pair of adjacent parallel hollow protrusions each configured to couple to a respective one of the hollow cylindrical portions of the dual extrusion tube; and coupling the jet back to a jet body configured to receive streams of air and water from the jet back, to merge the streams of air and water together to form a mixed stream of air and water, and to provide the mixed stream of air and water from an outlet.

D1. The method of paragraph D, further comprising coupling the jet body to a jet insert, and inserting the jet insert into an aperture of the hot tub.

D2. The method of paragraph D, further comprising coupling separate air and water supply lines to the air ingress port and the water ingress port of the manifold, respectively.

D3. The method of paragraph D, wherein coupling the jet back to the jet body includes compressing the jet back against the jet body until a pair of opposed, spring-biased clips extending from a distal end of the jet back snap into spring-biased engagement with a complementary retaining ridge disposed at a periphery of the jet body.

D4. The method of paragraph D, wherein coupling the jet back to the jet body includes compressing the jet back against the jet body until four spring-biased clips extending from a distal end of the jet back snap into spring-biased engagement with a complementary retaining ridge disposed at a periphery of the jet body.

D5. The method of paragraph D, further comprising clamping the dual extrusion tube to the manifold with a dual aperture clamp defining a pair of contiguous arcuate apertures and a selectively releasable end portion having first and second sets of complementary ratcheting teeth, by compressing the end portion of the clamp until the first and second sets of teeth engage with each other and compress the tube against the egress ports of the manifold.

D6. The method of paragraph D, further comprising clamping the dual extrusion tube to the jet back with a dual aperture clamp defining a pair of contiguous arcuate apertures and a selectively releasable end portion having first and second sets of complementary ratcheting teeth, by compressing the end portion of the clamp until the first and second sets of teeth engage with each other and compress the tube against the protrusions of the jet back.

DA. A method of plumbing a hot tub, comprising:

coupling a first end of a flexible dual extrusion tube to an air egress port and a water egress port of a manifold;

coupling a second end of the dual extrusion tube to a jet back having a pair of adjacent parallel hollow protrusions each configured to couple to a respective hollow cylindrical portion of the dual extrusion tube; and DB. A method of plumbing a hot tub, comprising:

coupling a first end of a flexible dual extrusion tube to a manifold, including coupling a first hollow cylindrical portion of the dual extrusion tube to a water egress port of the manifold and coupling a second hollow cylindrical portion of the dual extrusion tube to an air egress port of the manifold, wherein the water egress port and the air egress port of the manifold are substantially parallel and adjacent to each other;

coupling a second end of the dual extrusion tube to a jet back;

coupling an outlet of the jet back to a jet body;

coupling the jet body to a jet insert; and attaching the jet insert within an aperture of a hot tub body.

E1. A hot tub air and water supply manifold assembly, comprising:

a manifold body, including:

a water ingress conduit having a first end configured to receive water;

a first air ingress conduit having a first end configured to receive air;

a second air ingress conduit having a first end configured to receive air;

a first water egress port in fluid communication with the water ingress conduit;

a second water egress port in fluid communication with the water ingress conduit;

a first air egress port in fluid communication with the first air ingress conduit; and a second air egress port in fluid communication with the second air ingress conduit;

wherein the water ingress conduit, the first air ingress conduit, and the second air ingress conduit define a first set of parallel longitudinal axes; the first water egress port, the second water egress port, the first air egress port and the second air egress port define a second set of parallel longitudinal axes perpendicular to the first set of parallel longitudinal axes; the first water egress port and the first air egress port are closely separated and configured to couple to a first dual extrusion tube; and the second water egress port and the second air egress port are closely separated and configured to couple to a second dual extrusion tube.

E2. The hot tub air and water supply manifold assembly of paragraph E1, further comprising at least two spring biased clips extending from a second end of the water ingress conduit, at least one spring biased clip extending from a second end of the first air ingress conduit, and at least one spring biased clip extending from a second end of the second air ingress conduit.

E3. The hot tub air and water supply manifold assembly of paragraph E2, further comprising retaining ridges formed around outer peripheral portions of the first end of the water ingress conduit, the first air ingress conduit, and the second air ingress conduit, wherein the retaining ridges are configured to securely engage spring biased clips extending from an adjacent manifold component.

E4. The hot tub air and water supply manifold assembly of paragraph E1, further comprising a male manifold adapter including:
  a male manifold adapter water conduit configured to receive water from a water supply line and to provide water to the first end of the water ingress conduit of the manifold body;
  a first male manifold adapter air conduit having a peripheral portion joined to a first peripheral portion of the male manifold adapter water conduit, configured to receive air from a first air supply line and to provide air to the first end of the first air ingress conduit of the manifold body; and
  a second male manifold adapter air conduit having a peripheral portion joined to a second peripheral portion of the male manifold adapter water conduit, configured to receive air from a second air supply line and to provide air to the first end of the second air ingress conduit of the manifold body.

E5. The hot tub air and water supply manifold assembly of paragraph E1, further comprising a female manifold adapter including:
  a female manifold adapter water conduit configured to receive water from a second end of the water ingress conduit of the manifold body and to provide water to a water supply line;
  a first female manifold adapter air conduit configured to receive air from a second end of the first air ingress conduit of the manifold body and to provide air to a first air supply line; and
  a second female manifold adapter air conduit configured to receive air from a second end of the second air ingress conduit of the manifold body and to provide air to a second air supply line.

E6. The hot tub air and water supply manifold assembly of paragraph E1, further comprising a manifold end cap including a water conduit end cap configured to attach securely to a second end of the water ingress conduit and to prevent passage of water, a first air conduit end cap configured to attach securely to a second end of the first air ingress conduit and to prevent passage of air, and a second air conduit end cap configured to attach securely to a second end of the second air ingress conduit and to prevent passage of air.

E7. The hot tub air and water supply manifold assembly of paragraph E1, further comprising a first dual extrusion tube configured to couple to the first water egress port and the first air egress port, and a second dual extrusion tube configured to couple to the first water egress port and the first air egress port.

E8. The hot tub air and water supply manifold assembly of paragraph E1, wherein the assembly includes a plurality of substantially identical manifold bodies configured to fit together in a water tight manner, and wherein each of the manifold bodies is configured to emit water and air through a pair of dual extrusion tubes.

E9. A hot tub air and water supply manifold, comprising:
  a water conduit defining a first longitudinal axis and configured to receive water from a water supply line;
  at least one air conduit defining a second longitudinal axis parallel to the first longitudinal axis and configured to receive air from an air supply line, the air conduit having a periphery joined to a periphery of the water conduit;
  a first water egress port in fluid communication with the water conduit;
  a first air egress port in fluid communication with the air conduit;
  wherein the first water egress port and the first air egress port are disposed substantially parallel and adjacent to each other, and are configured to channel streams of water and air, respectively, to a first dual extrusion tube.

E10. The hot tub air and water supply manifold of paragraph E9, wherein the first water egress port and the first air egress port are both oriented substantially perpendicular to the water conduit and to the air conduit.

E11. The hot tub air and water supply manifold of paragraph E9, wherein the at least one air conduit includes a first air conduit joined to a first portion of the periphery of the water conduit, and a second air conduit joined to a second portion of the periphery of the water conduit, wherein the first air egress port is in fluid communication with the first air conduit, and further comprising:
  a second water egress port in fluid communication with the water conduit;
  a second air egress port in fluid communication with the second air conduit;
  wherein the second water egress port and the second air egress port are disposed substantially parallel and adjacent to each other and are configured to channel streams of water and air, respectively, to a second dual extrusion tube.

E12. The hot tub air and water supply manifold of paragraph E11, wherein the first portion of the periphery of the water conduit and the second portion of the periphery of the water conduit are separated from each other by approximately 180 degrees.

E13. The hot tub air and water supply manifold of paragraph E11, further comprising a first spring-biased clip extending from a peripheral portion of a distal end of the first air conduit and a second spring-biased clip extending from a peripheral portion of a distal end of the second air conduit, and wherein the first and second spring-biased clips are respectively configured to engage complementary retaining ridges disposed at peripheral portions of first and second air conduits of an adjacent air and water supply manifold.

E14. The hot tub air and water supply manifold of paragraph E11, further comprising a first retaining ridge disposed at a peripheral portion of the first air conduit and a second retaining ridge disposed at a peripheral portion of the second air conduit, wherein the first retaining ridge is configured to engage securely with a spring-biased clip extending from a first air conduit of an adjacent air and water supply manifold, and the second retaining ridge is configured to engage securely with a spring-biased clip extending from a second air conduit of the adjacent air and water supply manifold.

E15. A hot tub air and water supply manifold system, comprising:
- a male manifold adapter, including:
  - a male manifold adapter water conduit defining a first longitudinal axis and configured to receive water from a water supply pipe; and
  - a first male manifold adapter air conduit defining a second longitudinal axis parallel to the first longitudinal axis, the first male manifold adapter air conduit having a periphery joined to a periphery of the male manifold adapter water conduit;
- a manifold body, including:
  - a manifold body water conduit having a first end configured to connect with one end of the male manifold adapter water conduit in a water tight manner with a longitudinal axis of the manifold body water conduit collinear with the first longitudinal axis;
  - a first manifold body air conduit having a first end configured to connect with one end of the first male manifold adapter air conduit in an air tight manner with a longitudinal axis of the first manifold body air conduit collinear with the second longitudinal axis;
  - a first water egress port in fluid communication with the manifold body water conduit; and
  - a first air egress port in fluid communication with the first manifold body air conduit;
  - wherein the first water egress port and the first air egress port are disposed substantially parallel to each other, and are configured to channel respective streams of water and air to a first dual extrusion tube.

E16. The hot tub air and water supply manifold system of paragraph E15, further comprising an end cap including a water conduit end cap configured to attach securely to a second end of the manifold body water conduit and to prevent passage of water, and a first air conduit end cap configured to attach securely to a second end of the first manifold body air conduit and to prevent passage of air.

E17. The hot tub air and water supply manifold system of paragraph E15, wherein the first water egress port and the first air egress port are each oriented perpendicular to the first longitudinal axis.

E18. The hot tub air and water supply manifold system of paragraph E15, wherein the male manifold adapter includes:
- a second male manifold adapter air conduit defining a third longitudinal axis parallel to the first and second longitudinal axes, the second male manifold adapter air conduit having a periphery joined to the periphery of the male manifold adapter water conduit; and
- wherein the manifold body includes:
  - a second manifold body air conduit having a first end configured to connect with one end of the second male manifold adapter air conduit in an air tight manner with a longitudinal axis of the second manifold body air conduit collinear with the third longitudinal axis;
  - a second water egress port in fluid communication with the manifold body water conduit; and
  - a second air egress port in fluid communication with the second manifold body air conduit;
  - wherein the second water egress port and the second air egress port are disposed substantially parallel to each other, and are configured to channel respective streams of water and air to a second dual extrusion tube.

E19. The hot tub air and water supply manifold system of paragraph E15, wherein the male manifold adapter includes a pair of male manifold adapter air conduits, each defining a separate longitudinal axis parallel to the first longitudinal axis, each having a periphery joined to a periphery of the male manifold adapter water conduit, and separated along the periphery of the male manifold adapter water conduit by 180 degrees;
- wherein the manifold body includes:
  - a pair of manifold body air conduits each having a first end configured to connect with an end of a corresponding one of the male manifold adapter air conduits in an air tight manner with a longitudinal axis each manifold body air conduit collinear with the longitudinal axis of the corresponding male manifold adapter air conduit;
  - a pair of water egress ports each in fluid communication with the manifold body water conduit; and
  - a pair of air egress ports each in fluid communication with a corresponding one of the manifold body air conduits; and
  - wherein a first one of the water egress ports and a first one of the air egress ports are disposed substantially parallel and adjacent to each other, and are configured to channel respective streams of water and air to a first dual extrusion tube; and a second one of the water egress ports and a second one of the air egress ports are disposed substantially parallel and adjacent to each other, and are configured to channel respective streams of water and air to a second dual extrusion tube.

E20. The hot tub air and water supply manifold system of paragraph E19, wherein each of the water egress ports and each of the air egress ports is oriented perpendicular to the first longitudinal axis.

F0. A hot tub jet assembly comprising:
- a jet back including a first hollow protrusion configured to receive a stream of water and a second hollow protrusion adjacent the first hollow protrusion and configured to receive a stream of air;
- a jet body configured to receive the streams of water and air from the jet back, to merge the streams of water and air together to form a mixed stream of air and water, and to provide the mixed stream of air and water from an outlet;
- wherein the jet back includes a resilient ring configured to engage one or more hooks disposed on the jet body.

F1. The hot tub jet assembly of paragraph F0, wherein each of the one or more hooks comprises a tapered projection extending radially from the jet body.

F2. The hot tub jet assembly of any one of paragraphs F0 through F1, wherein the resilient ring is integral with the jet back.

F3. The hot tub jet assembly of any one of paragraphs F0 through F2, wherein the first and second hollow protrusions extend substantially parallel to a longitudinal axis of the jet back.

F4. The hot tub jet assembly of any one of paragraphs F0 through F3, further comprising a jet insert configured to fit within an aperture of a hot tub body, to receive the mixed stream of air and water from the jet body outlet, and to channel the mixed stream of air and water into an interior portion of the hot tub body through the aperture.

F5. The hot tub jet assembly of paragraph F4, wherein the jet body includes a threaded interior wall portion configured to threadedly receive the jet insert.

F6. The hot tub jet assembly of paragraph F5, wherein the jet body has a first diameter at the threaded interior wall portion and a second diameter at a downstream portion, and the first diameter is smaller than the second diameter.

F7. The hot tub jet assembly of any one of paragraphs F5 through F6, wherein a flange is disposed at a downstream end of the jet body, the flange has a circumferential channel, and the channel includes a plurality of molded ribs configured to engage the jet insert, thereby preventing the jet insert from disengaging from the threaded interior wall portion.

G0. A hot tub plumbing system comprising:

a manifold assembly configured to receive separate air and water supply streams and to direct the streams into a water egress port and an air egress port, wherein the air egress port is substantially parallel to and adjacent to the water egress port;

a dual extrusion tube including a first tubular portion configured to couple to the water egress port and a second tubular portion configured to couple to the air egress port;

a jet back including a pair of adjacent parallel hollow protrusions each configured to receive one of the streams of air and water from a respective one of the tubular portions of the dual extrusion tube; and a jet body configured to receive the streams of air and water from the jet back, to merge the streams of air and water together to form a mixed stream of air and water, and to provide the mixed stream of air and water from an outlet;

wherein the jet back includes a resilient member extending from a first end of the jet back and configured to engage one or more projections extending from the jet body.

G1. The hot tub plumbing system of paragraph G0, wherein the resilient member comprises a resilient ring spaced from the first end of the jet back by one or more openings, and the resilient ring is configured to retain the one or more projections within the one or more openings.

G2. The hot tub plumbing system of paragraph G1, wherein the one or more projections extending from the jet body each have a sloped surface configured to slidingly engage a complementary sloped lip of the resilient ring, thereby facilitating insertion of the jet body into the jet back.

G3. The hot tub plumbing system of any one of paragraphs G0 through G2, wherein at least a portion of an interior of the jet body is configured to threadedly receive a jet face.

G4. The hot tub plumbing system of any one of paragraphs G0 through G2, wherein the jet body further includes a grooved flange, and the grooved flange includes a plurality of stops configured to prevent rotation of a jet face engaging the flange.

G5. The hot tub plumbing system of any one of paragraphs G0 through G4, further comprising a first monolithic clamp configured to hold the dual extrusion tube in water-tight engagement with the egress ports of the manifold assembly.

G6. The hot tub plumbing system of paragraph G4, further comprising a second monolithic clamp configured to hold the dual extrusion tube in water-tight engagement with the hollow protrusions of the jet back.

H0. A hot tub plumbing system comprising:

a manifold configured to channel an air stream into an air egress port and to channel a water stream into a water egress port;

a dual extrusion tube including a first hollow portion configured to couple to the water egress port and a second hollow portion configured to couple to the air egress port; and a jet back including:

a first hollow protrusion configured to receive the water stream from the first hollow portion of the dual extrusion tube;

a second hollow protrusion configured to receive the air stream from the second hollow portion of the dual extrusion tube; and a spring-biased ring spaced from a first end of the jet back.

H1. The hot tub plumbing system of paragraph H0, further comprising a jet body including one or more retaining surfaces configured to engage the spring-biased ring, thereby retaining the jet body at least partially within the jet back.

H2. The hot tub plumbing system of paragraph H1, further comprising a jet insert, and wherein the jet body includes a threaded portion configured to threadedly engage the jet insert and a circumferential channel including a plurality of ribs configured to inhibit the jet insert from screwing out of the threaded portion of the jet body.

H3. The hot tub plumbing system of any one of paragraphs H0 through H2, wherein the first and second hollow protrusions of the jet back extend in a direction transverse to a longitudinal axis of the jet back.

H4. The hot tub plumbing system of any one of paragraphs H0 through H3, wherein the first and second hollow portions of the dual extrusion tube are flexible and are joined together in a figure-eight configuration.

Advantages, Features, Benefits

The different embodiments and examples of the hot tub plumbing system, its components, and its methods of installation described herein provide several advantages over known solutions for delivering air and water to hot tub jets and for efficiently assembling a plumbing system.

For example, illustrative embodiments and examples described herein reduce the amount of labor during hot tub assembly by significantly decreasing the number of tubes, connections and associated fittings used. This decrease is accomplished by using dual extrusion tubing which delivers air and water simultaneously. Benefits of using dual extrusion tubing may include significantly reducing (for example, by 50%) the amount of labor involved in installing the plumbing system in a hot tub, as well as decreasing the likelihood of mistakes in the tube routing. Furthermore, dual extrusion tubing can be used in conjunction with specialized manifolds, described herein, which simplify how air and water are routed to the hot tub jets.

Additionally, the systems and methods of installing a plumbing system according to the present teachings may simplify installation by using a "press-and-click" assembly. Benefits of this method of assembly may include a further reduction in labor, as well as a reduction in the amount of glue and adhesive used. The reduction or elimination of glue and primer is significant for several reasons. For example, manual application can be inconsistent, which can lead to failures of the joint that are difficult and costly to repair. Furthermore, glue and primer contain volatile organic compounds that can pose environmental and human health issues.

No known system or device can provide the advantages described above, among others. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A hot tub jet assembly system comprising:
a manifold including a water conduit defining a first longitudinal axis and configured to receive water from a water supply line and to channel the water into a water egress port, and an air conduit defining a second longitudinal axis parallel to the first longitudinal axis and configured to receive air from an air supply line and to channel the air into an air egress port, wherein the air conduit has a periphery joined to a portion of a periphery of the water conduit;
a flexible tube including a first tubular portion configured to couple to the water egress port and a second tubular portion configured to couple to the air egress port, wherein the first and second tubular portions are joined together in a figure-eight configuration;
a jet back including a first hollow protrusion configured to receive a stream of water from the first tubular portion and a second hollow protrusion adjacent the first hollow protrusion and configured to receive a stream of air from the second tubular portion; and
a jet body configured to receive the streams of water and air from the jet back, to merge the streams of water and air together to form a mixed stream of air and water, and to provide the mixed stream of air and water from an outlet;
wherein one or more hooks are disposed on the jet body, and the jet back includes a resilient ring configured to engage the one or more hooks.

2. The hot tub jet assembly of claim 1, wherein each of the one or more hooks comprises a tapered projection extending radially from the jet body.

3. The hot tub jet assembly of claim 1, wherein the resilient ring is integral with the jet back.

4. The hot tub jet assembly of claim 1, wherein the first and second hollow protrusions extend substantially parallel to a longitudinal axis of the jet back.

5. The hot tub jet assembly of claim 1, further comprising a jet insert configured to fit within an aperture of a hot tub body, to receive the mixed stream of air and water from the jet body outlet, and to channel the mixed stream of air and water into an interior portion of the hot tub body through the aperture.

6. The hot tub jet assembly of claim 5, wherein the jet body includes a threaded interior wall portion configured to threadedly receive the jet insert.

7. The hot tub jet assembly of claim 6, wherein the jet body has a first diameter at the threaded interior wall portion and a second diameter at a downstream portion, and the first diameter is smaller than the second diameter.

8. The hot tub jet assembly of claim 6, wherein a flange is disposed at a downstream end of the jet body, the flange has a circumferential channel, and the channel includes a plurality of molded ribs configured to engage the jet insert, thereby preventing the jet insert from disengaging from the threaded interior wall portion.

9. A hot tub plumbing system comprising:
a manifold assembly including parallel water and air conduits joined at their peripheries, configured to receive separate air and water supply streams through the water and air conduits, respectively, and to direct the streams into a water egress port and an air egress port, wherein the air egress port is substantially parallel to and adjacent to the water egress port;
a dual extrusion tube including a first tubular portion configured to couple to the water egress port and a second tubular portion configured to couple to the air egress port;
a jet back including a pair of adjacent parallel hollow protrusions each configured to receive one of the streams of air and water from a respective one of the tubular portions of the dual extrusion tube; and
a jet body configured to receive the streams of air and water from the jet back, to merge the streams of air and water together to form a mixed stream of air and water, and to provide the mixed stream of air and water from an outlet;
wherein one or more projections extend from the jet body, and the jet back includes a resilient member extending from a first end of the jet back and configured to engage the one or more projections.

10. The hot tub plumbing system of claim 9, wherein the resilient member comprises a resilient ring spaced from the first end of the jet back by one or more openings, and the resilient ring is configured to retain the one or more projections within the one or more openings.

11. The hot tub plumbing system of claim 10, wherein the one or more projections extending from the jet body each have a sloped surface configured to slidingly engage a complementary sloped lip of the resilient ring, thereby facilitating insertion of the jet body into the jet back.

12. The hot tub plumbing system of claim 9, wherein at least a portion of an interior of the jet body is configured to threadedly receive a jet face.

13. The hot tub plumbing system of claim 9, wherein the jet body further includes a grooved flange, and the grooved flange includes a plurality of stops configured to prevent rotation of a jet face engaging the flange.

14. The hot tub plumbing system of claim 9, further comprising a first monolithic clamp configured to hold the dual extrusion tube in water-tight engagement with the egress ports of the manifold assembly.

15. The hot tub plumbing system of claim 14, further comprising a second monolithic clamp configured to hold the dual extrusion tube in water-tight engagement with the hollow protrusions of the jet back.

16. A hot tub plumbing system comprising:
a manifold including (i) a water conduit defining a first longitudinal axis and configured to receive water from a water supply line and (ii) an air conduit defining a second longitudinal axis parallel to the first longitudinal axis and configured to receive air from an air supply line, wherein the air conduit has a periphery joined to a portion of a periphery of the water conduit, and wherein the manifold is configured to channel an air stream from the air supply line into an air egress port and to channel a water stream from the water supply line into a water egress port;
a dual extrusion tube including a first hollow portion configured to couple to the water egress port and a second hollow portion configured to couple to the air egress port; and
a jet back including:

a first hollow protrusion configured to receive the water stream from the first hollow portion of the dual extrusion tube;

a second hollow protrusion configured to receive the air stream from the second hollow portion of the dual extrusion tube; and a spring-biased ring spaced from a first end of the jet back.

17. The hot tub plumbing system of claim 16, further comprising a jet body including one or more retaining surfaces configured to engage the spring-biased ring, thereby retaining the jet body at least partially within the jet back.

18. The hot tub plumbing system of claim 17, further comprising a jet insert, and wherein the jet body includes a threaded portion configured to threadedly engage the jet insert and a circumferential channel including a plurality of ribs configured to inhibit the jet insert from screwing out of the threaded portion of the jet body.

19. The hot tub plumbing system of claim 16, wherein the first and second hollow protrusions of the jet back extend in a direction transverse to a longitudinal axis of the jet back.

20. The hot tub plumbing system of claim 16, wherein the first and second hollow portions of the dual extrusion tube are flexible and are joined together in a figure-eight configuration.

* * * * *